(12) United States Patent
Zambetti et al.

(10) Patent No.: US 12,050,766 B2
(45) Date of Patent: Jul. 30, 2024

(54) CROWN INPUT FOR A WEARABLE ELECTRONIC DEVICE

(71) Applicant: Apple Inc., Cupertino, CA (US)

(72) Inventors: Nicholas Zambetti, San Francisco, CA (US); Imran Chaudhri, San Francisco, CA (US); Jonathan R. Dascola, San Francisco, CA (US); Alan C. Dye, San Francisco, CA (US); Christopher Patrick Foss, San Francisco, CA (US); Aurelio Guzman, San Jose, CA (US); Chanaka G. Karunamuni, San Jose, CA (US); Duncan Robert Kerr, San Francisco, CA (US); Stephen O. Lemay, Palo Alto, CA (US); Christopher Wilson, San Francisco, CA (US); Eric Lance Wilson, San Jose, CA (US); Lawrence Y. Yang, Bellevue, WA (US); Gary Ian Butcher, San Jose, CA (US); Jonathan P. Ive, San Jose, CA (US); Kevin Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 831 days.

(21) Appl. No.: 16/703,486

(22) Filed: Dec. 4, 2019

(65) Prior Publication Data

US 2020/0110522 A1    Apr. 9, 2020

Related U.S. Application Data

(63) Continuation of application No. 15/049,049, filed on Feb. 20, 2016, now Pat. No. 10,503,388, which is a
(Continued)

(51) Int. Cl.
    *G06F 3/048*     (2013.01)
    *G06F 1/16*      (2006.01)
    (Continued)

(52) U.S. Cl.
    CPC ............ *G06F 3/0485* (2013.01); *G06F 1/163* (2013.01); *G06F 3/0362* (2013.01)

(58) Field of Classification Search
    CPC .......... G04C 3/146; G04C 17/00; G04C 9/00; G04G 9/0064; G04G 9/0076; G04G 5/04;
    (Continued)

(56) References Cited

U.S. PATENT DOCUMENTS 3,357,173 A    12/1967   Wyssen
4,358,837 A    11/1982   Yamazaki et al.
(Continued)

FOREIGN PATENT DOCUMENTS

AU    2007283771 A1    4/2008
AU    2008201540 A1    6/2008
(Continued)

OTHER PUBLICATIONS

Applicant-Initiated Interview Summary received for U.S. Appl. No. 15/930,300, mailed on Oct. 27, 2020, 3 pages.
(Continued)

*Primary Examiner* — Steven B Theriault
(74) *Attorney, Agent, or Firm* — DLA Piper LLP (US)

(57) ABSTRACT

The present disclosure relates to manipulating a user interface on a wearable electronic device using a mechanical crown. In some examples, the user interface can be scrolled or scaled in response to a rotation of the crown. The direction of the scrolling or scaling and the amount of scrolling or scaling can depend on the direction and amount of rotation of the crown, respectively. In some examples, the amount of scrolling or scaling can be proportional to the
(Continued)

change in rotation angle of the crown. In other examples, a speed of scrolling or a speed of scaling can depend on a speed of angular rotation of the crown. In these examples, a greater speed of rotation can cause a greater speed of scrolling or scaling to be performed on the displayed view.

12 Claims, 45 Drawing Sheets

Related U.S. Application Data continuation of application No. 14/913,345, filed as application No. PCT/US2014/053951 on Sep. 3, 2014, now Pat. No. 10,691,230, which is a continuation-in-part of application No. 14/476,657, filed on Sep. 3, 2014, now abandoned.

(60) Provisional application No. 61/873,359, filed on Sep. 3, 2013, provisional application No. 61/873,360, filed on Sep. 3, 2013, provisional application No. 61/873,356, filed on Sep. 3, 2013, provisional application No. 61/959,851, filed on Sep. 3, 2013.

(51) Int. Cl.
*G06F 3/0362* (2013.01)
*G06F 3/0485* (2022.01)

(58) Field of Classification Search
CPC ........ G04G 9/085; G04B 19/26; G04B 23/12; G04B 25/04; G06F 3/0485; G06F 3/0362
See application file for complete search history.

(56) References Cited

U.S. PATENT DOCUMENTS

| | | | |
|---|---|---|---|
| 4,395,134 A | 7/1983 | Luce | |
| 4,445,785 A | 5/1984 | Chambon et al. | |
| 4,623,261 A | 11/1986 | Muto | |
| 5,088,070 A | 2/1992 | Shiff | |
| 5,204,600 A | 4/1993 | Kahkoska | |
| 5,220,260 A | 6/1993 | Schuler | |
| 5,313,229 A | 5/1994 | Gilligan et al. | |
| 5,323,363 A | 6/1994 | Hysek et al. | |
| 5,329,501 A | 7/1994 | Meister et al. | |
| 5,463,725 A | 10/1995 | Henckel et al. | |
| 5,477,508 A | 12/1995 | Will | |
| 5,508,978 A | 4/1996 | Kalbermatter et al. | |
| 5,519,393 A | 5/1996 | Brandestini | |
| 5,528,260 A | 6/1996 | Kent | |
| 5,530,455 A * | 6/1996 | Gillick | G06F 3/0485 345/163 |
| 5,563,631 A | 10/1996 | Masunaga | |
| 5,592,195 A * | 1/1997 | Misono | G06F 3/0485 715/835 |
| 5,623,588 A | 4/1997 | Gould | |
| 5,634,064 A | 5/1997 | Warnock et al. | |
| 5,689,628 A | 11/1997 | Robertson | |
| 5,691,747 A | 11/1997 | Amano | |
| 5,739,775 A | 4/1998 | Brandestini | |
| 5,751,260 A | 5/1998 | Nappi et al. | |
| 5,825,353 A | 10/1998 | Will | |
| 5,852,413 A | 12/1998 | Bacchi et al. | |
| 5,874,961 A | 2/1999 | Bates et al. | |
| 5,901,366 A | 5/1999 | Nakano et al. | |
| 5,903,229 A | 5/1999 | Kishi | |
| 5,940,521 A | 8/1999 | East et al. | |
| 5,960,366 A | 9/1999 | Duwaer | |
| 5,973,670 A | 10/1999 | Barber et al. | |
| 5,982,710 A | 11/1999 | Rawat et al. | |
| 6,005,579 A | 12/1999 | Sugiyama et al. | |
| 6,061,063 A | 5/2000 | Wagner et al. | |
| 6,081,256 A * | 6/2000 | Herget | G06F 3/04847 345/157 |
| 6,128,006 A | 10/2000 | Rosenberg et al. | |
| 6,141,018 A | 10/2000 | Beri et al. | |
| 6,157,381 A | 12/2000 | Bates et al. | |
| 6,161,957 A * | 12/2000 | Guanter | G04G 21/08 368/185 |
| 6,192,258 B1 | 2/2001 | Kamada et al. | |
| 6,203,190 B1 | 3/2001 | Stotz | |
| 6,249,689 B1 | 6/2001 | Aizawa | |
| 6,266,098 B1 | 7/2001 | Cove et al. | |
| 6,275,173 B1 * | 8/2001 | Wu | H01H 25/008 341/13 |
| 6,297,795 B1 | 10/2001 | Kato et al. | |
| 6,300,939 B1 | 10/2001 | Decker et al. | |
| 6,305,234 B1 | 10/2001 | Thies et al. | |
| 6,310,648 B1 | 10/2001 | Miller et al. | |
| 6,323,846 B1 | 11/2001 | Westerman et al. | |
| 6,336,126 B1 | 1/2002 | Bjorklund et al. | |
| 6,339,438 B1 | 1/2002 | Bates et al. | |
| 6,351,657 B2 | 2/2002 | Yamada | |
| 6,356,283 B1 | 3/2002 | Guedalia | |
| 6,369,794 B1 | 4/2002 | Sakurai et al. | |
| 6,380,927 B1 | 4/2002 | Ostrum et al. | |
| 6,396,482 B1 | 5/2002 | Griffin et al. | |
| 6,477,117 B1 | 11/2002 | Narayanaswami et al. | |
| 6,489,950 B1 | 12/2002 | Griffin et al. | |
| 6,501,487 B1 | 12/2002 | Taguchi | |
| 6,522,347 B1 * | 2/2003 | Tsuji | G06Q 30/02 345/419 |
| 6,525,997 B1 | 2/2003 | Narayanaswami et al. | |
| 6,535,461 B1 | 3/2003 | Karhu | |
| 6,556,222 B1 | 4/2003 | Narayanaswami | |
| 6,570,557 B1 | 5/2003 | Westerman et al. | |
| 6,570,583 B1 | 5/2003 | Kung et al. | |
| 6,590,595 B1 | 7/2003 | Wagner et al. | |
| 6,597,374 B1 | 7/2003 | Baker et al. | |
| 6,600,936 B1 | 7/2003 | Kärkkäinen et al. | |
| 6,636,197 B1 | 10/2003 | Goldenberg et al. | |
| 6,636,246 B1 | 10/2003 | Gallo et al. | |
| 6,647,338 B1 | 11/2003 | Hamberger et al. | |
| 6,650,343 B1 | 11/2003 | Fujita et al. | |
| 6,661,438 B1 | 12/2003 | Shiraishi et al. | |
| 6,677,932 B1 | 1/2004 | Westerman | |
| 6,686,904 B1 | 2/2004 | Sherman et al. | |
| 6,686,911 B1 | 2/2004 | Levin et al. | |
| 6,690,387 B2 | 2/2004 | Zimmerman et al. | |
| 6,700,564 B2 | 3/2004 | McLoone et al. | |
| 6,720,860 B1 | 4/2004 | Narayanaswami | |
| 6,763,226 B1 | 7/2004 | Mczeal, Jr. | |
| 6,788,220 B2 | 9/2004 | Netzer | |
| 6,809,275 B1 | 10/2004 | Cheng et al. | |
| 6,809,724 B1 | 10/2004 | Shiraishi et al. | |
| 6,820,237 B1 | 11/2004 | Abu-Hakima et al. | |
| 6,842,169 B2 | 1/2005 | Griffin et al. | |
| 6,900,793 B2 | 5/2005 | Goh et al. | |
| 6,937,228 B2 | 8/2005 | Yu | |
| 6,967,642 B2 | 11/2005 | SanGiovanni | |
| 6,967,903 B2 | 11/2005 | Guanter | |
| 6,972,776 B2 | 12/2005 | Davis et al. | |
| 6,977,868 B2 | 12/2005 | Brewer et al. | |
| 6,985,178 B1 | 1/2006 | Morita et al. | |
| 7,002,558 B2 | 2/2006 | Keely et al. | |
| 7,024,625 B2 | 4/2006 | Shalit | |
| 7,036,090 B1 | 4/2006 | Nguyen | |
| 7,046,230 B2 | 5/2006 | Zadesky et al. | |
| 7,058,904 B1 | 6/2006 | Khan et al. | |
| 7,075,513 B2 | 7/2006 | Silfverberg et al. | |
| 7,081,905 B1 | 7/2006 | Raghunath | |
| 7,091,964 B2 | 8/2006 | Wong et al. | |
| 7,116,317 B2 | 10/2006 | Gregorio et al. | |
| 7,130,664 B1 | 10/2006 | Williams | |
| 7,143,355 B2 | 11/2006 | Yamaguchi et al. | |
| 7,146,005 B1 | 12/2006 | Anft et al. | |
| 7,168,047 B1 | 1/2007 | Huppi | |
| 7,227,963 B1 | 6/2007 | Yamada et al. | |
| 7,256,770 B2 | 8/2007 | Hinckley et al. | |
| 7,272,077 B2 | 9/2007 | Nobs | |
| 7,286,063 B2 | 10/2007 | Gauthey et al. | |

(56) References Cited

U.S. PATENT DOCUMENTS

| | | | |
|---|---|---|---|
| 7,286,119 B2 | 10/2007 | Yamaguchi et al. |
| 7,317,449 B2 | 1/2008 | Robbins et al. |
| 7,333,084 B2 | 2/2008 | Griffin |
| 7,339,573 B2 | 3/2008 | Andert et al. |
| 7,362,312 B2 | 4/2008 | Nurmi |
| 7,423,658 B1 | 9/2008 | Uomori et al. |
| 7,463,239 B2 | 12/2008 | Ledbetter et al. |
| 7,469,381 B2 | 12/2008 | Ording |
| 7,469,386 B2 | 12/2008 | Bear et al. |
| 7,477,890 B1 | 1/2009 | Narayanaswami |
| 7,489,303 B1 | 2/2009 | Pryor |
| 7,499,040 B2 | 3/2009 | Zadesky et al. |
| 7,506,269 B2 | 3/2009 | Lang |
| 7,519,468 B2 | 4/2009 | Orr et al. |
| 7,545,367 B2 | 6/2009 | Sunda et al. |
| 7,552,397 B2 | 6/2009 | Holecek et al. |
| 7,596,761 B2 | 9/2009 | Lemay et al. |
| 7,600,192 B1 | 10/2009 | Hashimoto et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,710,393 B2 | 5/2010 | Tsuk et al. |
| 7,710,409 B2 | 5/2010 | Robbin et al. |
| 7,720,552 B1 | 5/2010 | Lloyd |
| 7,738,911 B2 | 6/2010 | Kim |
| 7,794,138 B2 | 9/2010 | Hilfiker |
| 7,844,914 B2 | 11/2010 | Andre et al. |
| 7,844,915 B2 | 11/2010 | Platzer et al. |
| 7,856,255 B2 | 12/2010 | Tsuchiya et al. |
| 7,876,288 B1 | 1/2011 | Huang |
| 7,890,882 B1 | 2/2011 | Nelson |
| 7,903,115 B2 * | 3/2011 | Platzer ............. G06F 3/04883 |
| | | | 345/475 |
| 7,916,157 B1 | 3/2011 | Kelley et al. |
| 7,956,847 B2 | 6/2011 | Christie |
| 7,957,762 B2 | 6/2011 | Herz et al. |
| 7,965,276 B1 | 6/2011 | Martin et al. |
| 8,001,488 B1 | 8/2011 | Lam |
| 8,006,002 B2 | 8/2011 | Kalayjian et al. |
| 8,009,144 B2 | 8/2011 | Yajima |
| 8,040,331 B2 | 10/2011 | Hill et al. |
| 8,046,705 B2 | 10/2011 | Hunleth et al. |
| 8,130,205 B2 | 3/2012 | Forstall et al. |
| 8,140,996 B2 | 3/2012 | Tomkins |
| 8,191,011 B2 | 5/2012 | Abanami et al. |
| 8,194,036 B1 | 6/2012 | Braun et al. |
| 8,196,043 B2 | 6/2012 | Crow et al. |
| 8,201,102 B2 | 6/2012 | Lee et al. |
| 8,209,606 B2 | 6/2012 | Ording |
| 8,239,784 B2 | 8/2012 | Hotelling et al. |
| 8,255,798 B2 | 8/2012 | Ording |
| 8,266,550 B1 | 9/2012 | Cleron et al. |
| 8,279,180 B2 | 10/2012 | Hotelling et al. |
| 8,307,306 B2 | 11/2012 | Komatsu |
| 8,311,727 B2 | 11/2012 | Eckstein et al. |
| 8,312,371 B2 | 11/2012 | Ording |
| 8,365,090 B2 | 1/2013 | Ording |
| 8,375,326 B2 | 2/2013 | Bucher et al. |
| 8,381,135 B2 | 2/2013 | Hotelling et al. |
| 8,427,432 B2 | 4/2013 | Kim et al. |
| 8,448,083 B1 | 5/2013 | Migos et al. |
| 8,479,122 B2 | 7/2013 | Hotelling et al. |
| 8,487,882 B2 | 7/2013 | Inaba et al. |
| 8,533,623 B2 | 9/2013 | St, Jacques |
| 8,549,429 B2 | 10/2013 | Tsuruta et al. |
| 8,566,722 B2 | 10/2013 | Gordon et al. |
| 8,607,156 B1 * | 12/2013 | Jania ............. G06F 3/04855 |
| | | | 715/787 |
| 8,627,236 B2 | 1/2014 | Jung et al. |
| 8,656,311 B1 * | 2/2014 | Harper ............. G06F 3/0488 |
| | | | 715/854 |
| 8,665,209 B2 | 3/2014 | Rimas-Ribikauskas et al. |
| 8,669,944 B2 | 3/2014 | Klinghult et al. |
| 8,669,945 B2 | 3/2014 | Coddington |
| 8,677,283 B2 * | 3/2014 | Fong ............. G06F 3/04883 |
| | | | 715/863 |
| 8,686,944 B1 | 4/2014 | Charlton et al. |
| 8,717,302 B1 | 5/2014 | Qin et al. |
| 8,739,040 B2 | 5/2014 | Graham |
| 8,743,151 B2 | 6/2014 | Fulcher et al. |
| 8,799,816 B2 | 8/2014 | Wells et al. |
| 8,824,245 B2 | 9/2014 | Lau et al. |
| 8,854,318 B2 | 10/2014 | Borovsky et al. |
| 8,860,674 B2 | 10/2014 | Lee et al. |
| 8,868,338 B2 | 10/2014 | Lookingbill et al. |
| 8,952,886 B2 | 2/2015 | Tsuk et al. |
| 8,954,887 B1 | 2/2015 | Tseng et al. |
| 9,001,625 B2 | 4/2015 | Essery et al. |
| 9,007,057 B2 | 4/2015 | Villaret |
| 9,007,302 B1 | 4/2015 | Bandt-Horn |
| 9,007,323 B2 | 4/2015 | Araki |
| 9,011,292 B2 | 4/2015 | Weast et al. |
| 9,052,814 B2 | 6/2015 | Ording |
| 9,104,705 B2 | 8/2015 | Fujinaga |
| 9,158,440 B1 | 10/2015 | Lider et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,195,219 B2 | 11/2015 | Hong et al. |
| 9,223,483 B2 | 12/2015 | Thorsander et al. |
| 9,229,624 B2 | 1/2016 | Wei et al. |
| 9,268,400 B2 | 2/2016 | Gomez Sainz-Garcia |
| 9,395,867 B2 | 7/2016 | Griffin et al. |
| 9,395,905 B2 | 7/2016 | Wherry |
| 9,423,938 B1 | 8/2016 | Morris |
| 9,442,649 B2 | 9/2016 | Davis et al. |
| 9,448,691 B2 | 9/2016 | Suda |
| 9,503,402 B2 | 11/2016 | Cue et al. |
| D778,912 S | 2/2017 | Akana et al. |
| 9,582,187 B2 | 2/2017 | Gil et al. |
| 9,620,312 B2 | 4/2017 | Ely et al. |
| 9,651,922 B2 | 5/2017 | Hysek et al. |
| 9,666,178 B2 | 5/2017 | Loubiere et al. |
| 9,678,571 B1 | 6/2017 | Robert et al. |
| 9,684,398 B1 | 6/2017 | Samuel et al. |
| 9,696,809 B2 | 7/2017 | Temple |
| 9,729,695 B2 | 8/2017 | Seo et al. |
| 9,772,769 B2 | 9/2017 | Shimazu |
| 9,792,014 B2 | 10/2017 | Feiereisen et al. |
| 9,798,443 B1 | 10/2017 | Gray |
| 9,823,828 B2 | 11/2017 | Zambetti et al. |
| 9,841,874 B2 | 12/2017 | Gu |
| 9,860,200 B1 | 1/2018 | Braun et al. |
| 9,870,114 B1 | 1/2018 | Jones et al. |
| D813,239 S | 3/2018 | Akana et al. |
| 9,921,711 B2 | 3/2018 | Oh et al. |
| 9,965,144 B2 | 5/2018 | Nakamura et al. |
| 9,971,495 B2 | 5/2018 | Shetty et al. |
| 9,984,539 B2 | 5/2018 | Moussette et al. |
| 10,025,458 B2 | 7/2018 | Chaudhri et al. |
| 10,025,461 B2 | 7/2018 | Liu et al. |
| 10,048,802 B2 | 8/2018 | Shedletsky et al. |
| 10,057,470 B2 | 8/2018 | Kim et al. |
| 10,019,097 B2 | 9/2018 | Ely et al. |
| 10,097,496 B2 | 10/2018 | Dye et al. |
| 10,133,439 B1 | 11/2018 | Brichter et al. |
| 10,152,196 B2 | 12/2018 | Jeong et al. |
| 10,175,652 B2 | 1/2019 | Ely et al. |
| 10,216,147 B2 | 2/2019 | Ely et al. |
| 10,216,352 B2 | 2/2019 | Liang et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,389,675 B2 | 8/2019 | Grandhi |
| 10,417,879 B2 | 9/2019 | Moussette et al. |
| 10,504,340 B2 | 12/2019 | Moussette et al. |

(56) References Cited

U.S. PATENT DOCUMENTS

| | | | |
|---|---|---|---|
| 10,642,467 B2 | 5/2020 | Merminod et al. |
| 10,664,074 B2 | 5/2020 | Moussette et al. |
| 10,664,120 B1 | 5/2020 | Jones et al. |
| 10,852,700 B2 | 12/2020 | Abramov |
| 10,977,911 B2 | 4/2021 | Moussette et al. |
| 11,068,128 B2 | 7/2021 | Zambetti et al. |
| 11,140,255 B2 | 10/2021 | Seo et al. |
| 2001/0004337 A1 | 6/2001 | Paratte |
| 2001/0011991 A1 | 8/2001 | Wang et al. |
| 2001/0028369 A1 | 10/2001 | Gallo et al. |
| 2001/0041596 A1 | 11/2001 | Forlenzo et al. |
| 2001/0043514 A1 | 11/2001 | Kita et al. |
| 2002/0015024 A1 | 2/2002 | Westerman et al. |
| 2002/0019296 A1 | 2/2002 | Freeman et al. |
| 2002/0025084 A1 | 2/2002 | Yang et al. |
| 2002/0027547 A1 | 3/2002 | Kamijo et al. |
| 2002/0030665 A1* | 3/2002 | Ano .................... G06F 3/04855 345/168 |
| 2002/0030668 A1 | 3/2002 | Hoshino et al. |
| 2002/0036623 A1 | 3/2002 | Kano |
| 2002/0047860 A1 | 4/2002 | Ceulaer et al. |
| 2002/0054164 A1 | 5/2002 | Uemura |
| 2002/0063684 A1 | 5/2002 | Tran |
| 2002/0069071 A1* | 6/2002 | Knockeart ............... G06F 3/023 704/275 |
| 2002/0093578 A1 | 7/2002 | Kowno et al. |
| 2002/0101457 A1 | 8/2002 | Lang |
| 2002/0101458 A1 | 8/2002 | Sangiovanni |
| 2002/0118169 A1 | 8/2002 | Hinckley et al. |
| 2002/0126099 A1 | 9/2002 | Engholm |
| 2002/0140633 A1 | 10/2002 | Rafii et al. |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0186621 A1 | 12/2002 | Lai |
| 2003/0020671 A1 | 1/2003 | Santoro et al. |
| 2003/0025673 A1* | 2/2003 | Ledbetter ............... G06F 3/0312 345/163 |
| 2003/0052901 A1 | 3/2003 | Fukuchi |
| 2003/0076301 A1 | 4/2003 | Tsuk et al. |
| 2003/0098891 A1 | 5/2003 | Molander |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0117440 A1 | 6/2003 | Hellyar et al. |
| 2003/0122787 A1 | 7/2003 | Zimmerman et al. |
| 2003/0123329 A1 | 7/2003 | Guanter et al. |
| 2003/0128192 A1 | 7/2003 | Van Os |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |
| 2003/0179239 A1 | 9/2003 | Lira |
| 2003/0184525 A1 | 10/2003 | Tsai |
| 2003/0189598 A1 | 10/2003 | Lipstein et al. |
| 2003/0210259 A1 | 11/2003 | Liu et al. |
| 2003/0210286 A1 | 11/2003 | Gerpheide et al. |
| 2004/0013042 A1 | 1/2004 | Farine |
| 2004/0021676 A1 | 2/2004 | Chen et al. |
| 2004/0027398 A1 | 2/2004 | Jaeger |
| 2004/0027793 A1 | 2/2004 | Haraguchi et al. |
| 2004/0038667 A1 | 2/2004 | Vance |
| 2004/0047244 A1 | 3/2004 | Iino et al. |
| 2004/0056880 A1 | 3/2004 | Matsuoka et al. |
| 2004/0061678 A1 | 4/2004 | Goh et al. |
| 2004/0073935 A1 | 4/2004 | Kang |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0130580 A1 | 7/2004 | Howard et al. |
| 2004/0130581 A1 | 7/2004 | Howard et al. |
| 2004/0145595 A1 | 7/2004 | Bennett |
| 2004/0150621 A1 | 8/2004 | Bohn |
| 2004/0155888 A1 | 8/2004 | Padgitt et al. |
| 2004/0155907 A1 | 8/2004 | Yamaguchi et al. |
| 2004/0164973 A1 | 8/2004 | Nakano et al. |
| 2004/0170270 A1 | 9/2004 | Takashima et al. |
| 2004/0205624 A1 | 10/2004 | Lui et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |
| 2004/0233162 A1 | 11/2004 | Kobayashi |
| 2004/0239649 A1 | 12/2004 | Ludtke |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2005/0001815 A1 | 1/2005 | Tsunoda |
| 2005/0001849 A1 | 1/2005 | Arcas |
| 2005/0007884 A1 | 1/2005 | Lorenzato |
| 2005/0012723 A1 | 1/2005 | Pallakoff |
| 2005/0030279 A1* | 2/2005 | Fu ....................... G06F 3/03543 345/156 |
| 2005/0062729 A1 | 3/2005 | Hinckley et al. |
| 2005/0081164 A1 | 4/2005 | Hama et al. |
| 2005/0088418 A1 | 4/2005 | Nguyen |
| 2005/0097466 A1 | 5/2005 | Levi Montalcini |
| 2005/0099400 A1 | 5/2005 | Lee |
| 2005/0116941 A1 | 6/2005 | Wallington |
| 2005/0119031 A1 | 6/2005 | Spalink et al. |
| 2005/0122806 A1 | 6/2005 | Arakawa et al. |
| 2005/0136955 A1 | 6/2005 | Mumick et al. |
| 2005/0164623 A1* | 7/2005 | Huynh ................... H03K 17/941 454/69 |
| 2005/0168566 A1 | 8/2005 | Tada et al. |
| 2005/0183012 A1 | 8/2005 | Petro et al. |
| 2005/0183026 A1 | 8/2005 | Amano et al. |
| 2005/0190059 A1 | 9/2005 | Wehrenberg |
| 2005/0191994 A1 | 9/2005 | May et al. |
| 2005/0195216 A1 | 9/2005 | Kramer et al. |
| 2005/0195373 A1 | 9/2005 | Feigel et al. |
| 2005/0209051 A1 | 9/2005 | Santomassimo et al. |
| 2005/0215848 A1 | 9/2005 | Lorenzato |
| 2005/0231489 A1 | 10/2005 | Ladouceur et al. |
| 2005/0259077 A1* | 11/2005 | Adams .................. G06F 3/0312 345/163 |
| 2005/0275636 A1 | 12/2005 | Dehlin et al. |
| 2006/0007129 A1 | 1/2006 | Pletikosa |
| 2006/0010400 A1 | 1/2006 | Dehlin et al. |
| 2006/0017692 A1 | 1/2006 | Wehrenberg et al. |
| 2006/0020904 A1 | 1/2006 | Aaltonen et al. |
| 2006/0022956 A1 | 2/2006 | Lengeling et al. |
| 2006/0025091 A1 | 2/2006 | Buford |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0028446 A1 | 2/2006 | Liberty et al. |
| 2006/0033724 A1 | 2/2006 | Chaudhri et al. |
| 2006/0034042 A1 | 2/2006 | Hisano et al. |
| 2006/0054427 A1* | 3/2006 | Jasso ..................... G05G 1/10 188/72.1 |
| 2006/0064716 A1 | 3/2006 | Sull et al. |
| 2006/0069604 A1 | 3/2006 | Leukart et al. |
| 2006/0071918 A1 | 4/2006 | Mori et al. |
| 2006/0071949 A1 | 4/2006 | Sakuma et al. |
| 2006/0082554 A1 | 4/2006 | Caine et al. |
| 2006/0085751 A1 | 4/2006 | O'brien et al. |
| 2006/0085764 A1 | 4/2006 | Klementiev |
| 2006/0090090 A1 | 4/2006 | Perng |
| 2006/0092177 A1 | 5/2006 | Blasko |
| 2006/0095846 A1 | 5/2006 | Nurmi |
| 2006/0112350 A1 | 5/2006 | Kato |
| 2006/0136631 A1 | 6/2006 | Eid et al. |
| 2006/0139375 A1 | 6/2006 | Rasmussen et al. |
| 2006/0143574 A1 | 6/2006 | Ito et al. |
| 2006/0152480 A1* | 7/2006 | Senn .................... G06F 1/1684 345/156 |
| 2006/0161861 A1 | 7/2006 | Holecek et al. |
| 2006/0174213 A1* | 8/2006 | Kato .................... G01C 21/3682 715/800 |
| 2006/0181506 A1 | 8/2006 | Fyke |
| 2006/0197753 A1 | 9/2006 | Hotelling |
| 2006/0212905 A1 | 9/2006 | Matsuda et al. |
| 2006/0224945 A1 | 10/2006 | Khan et al. |

(56) References Cited

U.S. PATENT DOCUMENTS

| | | |
|---|---|---|
| 2006/0255683 A1 | 11/2006 | Suzuki et al. |
| 2006/0268019 A1 | 11/2006 | Wang et al. |
| 2006/0268020 A1 | 11/2006 | Han |
| 2006/0271870 A1 | 11/2006 | Anwar |
| 2006/0274053 A1 | 12/2006 | Kinouchi |
| 2006/0277454 A1 | 12/2006 | Chen |
| 2006/0279533 A1 | 12/2006 | Hsieh |
| 2006/0288313 A1 | 12/2006 | Hillis |
| 2006/0290671 A1 | 12/2006 | Bohn et al. |
| 2007/0002019 A1 | 1/2007 | Lane et al. |
| 2007/0030256 A1 | 2/2007 | Akaike et al. |
| 2007/0031119 A1 | 2/2007 | Iwanaga |
| 2007/0036346 A1 | 2/2007 | Kwon |
| 2007/0046635 A1* | 3/2007 | Nishiyama .............. G06F 1/162 345/168 |
| 2007/0050732 A1 | 3/2007 | Chapman et al. |
| 2007/0052712 A1 | 3/2007 | Saito et al. |
| 2007/0063995 A1 | 3/2007 | Bailey et al. |
| 2007/0070090 A1 | 3/2007 | Debettencourt et al. |
| 2007/0073917 A1 | 3/2007 | Larson et al. |
| 2007/0081726 A1 | 4/2007 | Westerman et al. |
| 2007/0085841 A1* | 4/2007 | Tsuk ...................... G06F 3/0362 345/173 |
| 2007/0087775 A1 | 4/2007 | Richardson et al. |
| 2007/0097151 A1 | 5/2007 | Rosenberg |
| 2007/0098395 A1 | 5/2007 | Battles et al. |
| 2007/0106949 A1 | 5/2007 | Narita et al. |
| 2007/0109277 A1 | 5/2007 | Lira |
| 2007/0120819 A1 | 5/2007 | Young et al. |
| 2007/0132733 A1 | 6/2007 | Ram |
| 2007/0132789 A1* | 6/2007 | Ording ................ G06F 3/04886 345/684 |
| 2007/0136286 A1 | 6/2007 | Webster et al. |
| 2007/0136679 A1 | 6/2007 | Yang |
| 2007/0137076 A1 | 6/2007 | Cowden, III |
| 2007/0146318 A1 | 6/2007 | Juh et al. |
| 2007/0146337 A1* | 6/2007 | Ording .................. G06F 3/0485 345/173 |
| 2007/0150830 A1* | 6/2007 | Ording .................. G06F 3/0488 715/784 |
| 2007/0157094 A1 | 7/2007 | Lemay et al. |
| 2007/0168369 A1 | 7/2007 | Bruns |
| 2007/0176910 A1 | 8/2007 | Simek et al. |
| 2007/0180379 A1 | 8/2007 | Osato |
| 2007/0182595 A1 | 8/2007 | Ghasabian |
| 2007/0182743 A1 | 8/2007 | Aguera Y Arcas |
| 2007/0182999 A1 | 8/2007 | Anthony et al. |
| 2007/0188460 A1 | 8/2007 | Bells et al. |
| 2007/0188518 A1 | 8/2007 | Vale et al. |
| 2007/0192692 A1 | 8/2007 | Chen et al. |
| 2007/0209017 A1 | 9/2007 | Gupta et al. |
| 2007/0211042 A1 | 9/2007 | Kim et al. |
| 2007/0216661 A1 | 9/2007 | Chen et al. |
| 2007/0226646 A1 | 9/2007 | Nagiyama et al. |
| 2007/0229458 A1* | 10/2007 | Moon ...................... G06F 3/038 345/157 |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0262964 A1 | 11/2007 | Zotov et al. |
| 2007/0277124 A1 | 11/2007 | Shin et al. |
| 2007/0279401 A1 | 12/2007 | Ramstein et al. |
| 2007/0290045 A1 | 12/2007 | Cisar |
| 2007/0291018 A1 | 12/2007 | Park et al. |
| 2007/0296711 A1* | 12/2007 | Yee ....................... G06F 3/0354 345/184 |
| 2008/0001915 A1 | 1/2008 | Pihlaja et al. |
| 2008/0004084 A1 | 1/2008 | Park |
| 2008/0019494 A1 | 1/2008 | Toda |
| 2008/0020810 A1 | 1/2008 | Park |
| 2008/0033779 A1 | 2/2008 | Coffman et al. |
| 2008/0040692 A1 | 2/2008 | Sunday et al. |
| 2008/0043028 A1 | 2/2008 | Tanaka |
| 2008/0052643 A1 | 2/2008 | Ike et al. |
| 2008/0052945 A1 | 3/2008 | Matas et al. |
| 2008/0055241 A1 | 3/2008 | Goldenberg et al. |
| 2008/0062127 A1 | 3/2008 | Brodersen et al. |
| 2008/0062141 A1 | 3/2008 | Chandhri |
| 2008/0066135 A1 | 3/2008 | Brodersen et al. |
| 2008/0096593 A1 | 4/2008 | Park |
| 2008/0098313 A1 | 4/2008 | Pollack |
| 2008/0104544 A1 | 5/2008 | Collins et al. |
| 2008/0109764 A1 | 5/2008 | Linnamaki |
| 2008/0123473 A1 | 5/2008 | Ozawa et al. |
| 2008/0125196 A1 | 5/2008 | Ryu |
| 2008/0129520 A1 | 6/2008 | Lee |
| 2008/0148177 A1 | 6/2008 | Lang et al. |
| 2008/0150901 A1 | 6/2008 | Lowles et al. |
| 2008/0155461 A1 | 6/2008 | Ozaki |
| 2008/0155475 A1 | 6/2008 | Duhig |
| 2008/0158149 A1 | 7/2008 | Levin |
| 2008/0163116 A1 | 7/2008 | Lee et al. |
| 2008/0163119 A1 | 7/2008 | Kim et al. |
| 2008/0163121 A1 | 7/2008 | Lee et al. |
| 2008/0163132 A1 | 7/2008 | Lee et al. |
| 2008/0165124 A1 | 7/2008 | Kim |
| 2008/0165140 A1 | 7/2008 | Christie et al. |
| 2008/0165152 A1 | 7/2008 | Forstall et al. |
| 2008/0165153 A1 | 7/2008 | Platzer et al. |
| 2008/0165161 A1* | 7/2008 | Platzer ................. G06F 1/1684 345/177 |
| 2008/0165210 A1* | 7/2008 | Platzer ................ G06F 3/04847 345/672 |
| 2008/0168349 A1 | 7/2008 | Lamiraux et al. |
| 2008/0168364 A1 | 7/2008 | Miller et al. |
| 2008/0168382 A1 | 7/2008 | Louch et al. |
| 2008/0168384 A1* | 7/2008 | Platzer ................ G06F 3/04845 715/784 |
| 2008/0168404 A1* | 7/2008 | Ording .................. G06F 3/0485 715/863 |
| 2008/0168478 A1* | 7/2008 | Platzer .................. G06F 3/0485 719/328 |
| 2008/0172634 A1 | 7/2008 | Choi et al. |
| 2008/0174570 A1 | 7/2008 | Jobs et al. |
| 2008/0184159 A1 | 7/2008 | Selig |
| 2008/0186808 A1 | 8/2008 | Lee |
| 2008/0201649 A1 | 8/2008 | Mattila et al. |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0224995 A1 | 9/2008 | Perkunder |
| 2008/0225014 A1 | 9/2008 | Kim |
| 2008/0257701 A1 | 10/2008 | Wlotzka |
| 2008/0259025 A1 | 10/2008 | Eom |
| 2008/0279475 A1 | 11/2008 | Lee et al. |
| 2008/0284799 A1 | 11/2008 | Hollemans et al. |
| 2008/0288880 A1 | 11/2008 | Reponen et al. |
| 2008/0318635 A1 | 12/2008 | Yoon et al. |
| 2008/0320391 A1 | 12/2008 | Lemay et al. |
| 2009/0002396 A1 | 1/2009 | Andrews et al. |
| 2009/0007019 A1 | 1/2009 | Kobayashi et al. |
| 2009/0015550 A1 | 1/2009 | Koski |
| 2009/0030800 A1 | 1/2009 | Grois |
| 2009/0046110 A1 | 2/2009 | Sadler et al. |
| 2009/0050465 A1 | 2/2009 | Asada |
| 2009/0051649 A1 | 2/2009 | Rondel |
| 2009/0059730 A1 | 3/2009 | Lyons et al. |
| 2009/0064031 A1 | 3/2009 | Bull et al. |
| 2009/0070675 A1 | 3/2009 | Li |
| 2009/0070705 A1 | 3/2009 | Ording |
| 2009/0070711 A1 | 3/2009 | Kwak et al. |
| 2009/0079695 A1 | 3/2009 | Tatehata et al. |
| 2009/0079698 A1 | 3/2009 | Takashima et al. |
| 2009/0098912 A1 | 4/2009 | Kim et al. |
| 2009/0100373 A1 | 4/2009 | Pixley et al. |
| 2009/0102817 A1 | 4/2009 | Bathiche et al. |
| 2009/0109069 A1 | 4/2009 | Takasaki et al. |
| 2009/0119678 A1 | 5/2009 | Shih et al. |
| 2009/0125811 A1 | 5/2009 | Bethurum |
| 2009/0141046 A1 | 6/2009 | Rathnam et al. |

(56) References Cited

U.S. PATENT DOCUMENTS

| | | |
|---|---|---|
| 2009/0143117 A1 | 6/2009 | Shin et al. |
| 2009/0144642 A1 | 6/2009 | Crystal |
| 2009/0144654 A1 | 6/2009 | Brouwer et al. |
| 2009/0152452 A1 | 6/2009 | Lee et al. |
| 2009/0153288 A1 | 6/2009 | Hope et al. |
| 2009/0156255 A1 | 6/2009 | Shin et al. |
| 2009/0164937 A1 | 6/2009 | Alviar et al. |
| 2009/0174677 A1 | 7/2009 | Gehani et al. |
| 2009/0177538 A1 | 7/2009 | Brewer et al. |
| 2009/0177966 A1 | 7/2009 | Chaudhri |
| 2009/0189915 A1 | 7/2009 | Mercer et al. |
| 2009/0193359 A1 | 7/2009 | Anthony et al. |
| 2009/0196124 A1 | 8/2009 | Mooring |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0213086 A1 | 8/2009 | Chae et al. |
| 2009/0228825 A1* | 9/2009 | Van Os .................. G06F 3/0488 715/780 |
| 2009/0231271 A1* | 9/2009 | Heubel ............... G06F 3/04883 345/156 |
| 2009/0237372 A1 | 9/2009 | Kim et al. |
| 2009/0241150 A1 | 9/2009 | White et al. |
| 2009/0280907 A1 | 11/2009 | Larsen et al. |
| 2009/0284478 A1 | 11/2009 | De la torre baltierra et al. |
| 2009/0288035 A1* | 11/2009 | Tunning .............. G06F 16/9574 715/784 |
| 2009/0288039 A1 | 11/2009 | Mail et al. |
| 2009/0289905 A1 | 11/2009 | Ahn |
| 2009/0295826 A1 | 12/2009 | Good et al. |
| 2009/0313299 A1 | 12/2009 | Bonev et al. |
| 2009/0315848 A1 | 12/2009 | Ku et al. |
| 2009/0315867 A1 | 12/2009 | Sakamoto et al. |
| 2009/0325563 A1 | 12/2009 | Horodezky et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0017748 A1 | 1/2010 | Taylor et al. |
| 2010/0017872 A1 | 1/2010 | Goertz et al. |
| 2010/0026640 A1 | 2/2010 | Kim et al. |
| 2010/0029327 A1* | 2/2010 | Jee ........................ G06F 1/163 455/556.1 |
| 2010/0058223 A1 | 3/2010 | Price et al. |
| 2010/0058226 A1* | 3/2010 | Flake ................... G06F 3/0481 715/786 |
| 2010/0058240 A1* | 3/2010 | Bull ..................... G06F 3/0482 715/830 |
| 2010/0070926 A1 | 3/2010 | Abanami et al. |
| 2010/0073692 A1 | 3/2010 | Waltman et al. |
| 2010/0079500 A1 | 4/2010 | O'sullivan et al. |
| 2010/0088634 A1 | 4/2010 | Tsuruta et al. |
| 2010/0093400 A1 | 4/2010 | Ju et al. |
| 2010/0099462 A1 | 4/2010 | Baek et al. |
| 2010/0100137 A1 | 4/2010 | Justis et al. |
| 2010/0110044 A1 | 5/2010 | Englund |
| 2010/0113101 A1 | 5/2010 | Tanada |
| 2010/0128570 A1 | 5/2010 | Smith et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1 | 7/2010 | Hill et al. |
| 2010/0169097 A1 | 7/2010 | Nachman et al. |
| 2010/0173678 A1* | 7/2010 | Kim ................. H04N 5/232935 455/566 |
| 2010/0175006 A1 | 7/2010 | Li |
| 2010/0187074 A1 | 7/2010 | Manni |
| 2010/0188268 A1 | 7/2010 | Grignani et al. |
| 2010/0199232 A1 | 8/2010 | Mistry et al. |
| 2010/0211498 A1 | 8/2010 | Aabye et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0235742 A1 | 9/2010 | Hsu et al. |
| 2010/0248778 A1 | 9/2010 | Biswas |
| 2010/0251168 A1 | 9/2010 | Fujita et al. |
| 2010/0259481 A1 | 10/2010 | Oh |
| 2010/0262928 A1 | 10/2010 | Abbott |
| 2010/0267424 A1 | 10/2010 | Kim et al. |
| 2010/0269038 A1 | 10/2010 | Tsuda |
| 2010/0269108 A1 | 10/2010 | Boudreau et al. |
| 2010/0271312 A1 | 10/2010 | Alameh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0283743 A1 | 11/2010 | Coddington |
| 2010/0302172 A1 | 12/2010 | Wilairat et al. |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2011/0004830 A1 | 1/2011 | Von kaenel et al. |
| 2011/0006980 A1 | 1/2011 | Taniguchi et al. |
| 2011/0014956 A1 | 1/2011 | Lee et al. |
| 2011/0022472 A1 | 1/2011 | Zon |
| 2011/0025311 A1 | 2/2011 | Chauvin et al. |
| 2011/0025624 A1 | 2/2011 | Goto |
| 2011/0037725 A1 | 2/2011 | Pryor |
| 2011/0047491 A1 | 2/2011 | Hwang et al. |
| 2011/0055752 A1* | 3/2011 | Rubinstein ............ G06F 3/0485 715/784 |
| 2011/0057877 A1 | 3/2011 | Nagashima et al. |
| 2011/0057886 A1 | 3/2011 | Ng et al. |
| 2011/0072345 A1 | 3/2011 | Lim |
| 2011/0074699 A1 | 3/2011 | Marr et al. |
| 2011/0074719 A1 | 3/2011 | Yeh et al. |
| 2011/0074828 A1 | 3/2011 | Capela et al. |
| 2011/0078025 A1 | 3/2011 | Shrivastav |
| 2011/0078560 A1 | 3/2011 | Weeldreyer et al. |
| 2011/0078622 A1 | 3/2011 | Missig et al. |
| 2011/0086613 A1 | 4/2011 | Doudkine et al. |
| 2011/0087982 A1 | 4/2011 | Mccann et al. |
| 2011/0090255 A1* | 4/2011 | Wilson .................. G06F 3/0485 345/647 |
| 2011/0093812 A1 | 4/2011 | Fong |
| 2011/0095993 A1 | 4/2011 | Zuverink |
| 2011/0099509 A1 | 4/2011 | Horagai |
| 2011/0102455 A1 | 5/2011 | Temple |
| 2011/0107264 A1* | 5/2011 | Akella .................. G06F 3/0482 715/830 |
| 2011/0119578 A1 | 5/2011 | Schwartz |
| 2011/0126097 A1 | 5/2011 | Isono |
| 2011/0126139 A1 | 5/2011 | Jeong et al. |
| 2011/0126155 A1 | 5/2011 | Krishnaraj et al. |
| 2011/0128226 A1 | 6/2011 | Jensen |
| 2011/0131494 A1 | 6/2011 | Ono et al. |
| 2011/0131531 A1 | 6/2011 | Russell et al. |
| 2011/0145759 A1 | 6/2011 | Leffert et al. |
| 2011/0157046 A1 | 6/2011 | Lee et al. |
| 2011/0161853 A1 | 6/2011 | Park |
| 2011/0164042 A1 | 7/2011 | Chaudhri |
| 2011/0167262 A1 | 7/2011 | Ross et al. |
| 2011/0167369 A1 | 7/2011 | van Os |
| 2011/0167382 A1 | 7/2011 | Van Os |
| 2011/0187355 A1 | 8/2011 | Dixon et al. |
| 2011/0197160 A1 | 8/2011 | Kim et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0202878 A1 | 8/2011 | Park et al. |
| 2011/0209104 A1 | 8/2011 | Hinckley et al. |
| 2011/0224967 A1 | 9/2011 | Van Schaik |
| 2011/0225543 A1 | 9/2011 | Arnold et al. |
| 2011/0231785 A1 | 9/2011 | Sunday |
| 2011/0234633 A1 | 9/2011 | Ogura et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252369 A1 | 10/2011 | Chaudhri |

(56) References Cited

U.S. PATENT DOCUMENTS

| | | |
|---|---|---|
| 2011/0270833 A1 | 11/2011 | von kaenel et al. |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0291945 A1 | 12/2011 | Ewing et al. |
| 2011/0296312 A1 | 12/2011 | Boyer et al. |
| 2011/0298830 A1 | 12/2011 | Lam |
| 2011/0300910 A1 | 12/2011 | Choi |
| 2011/0302493 A1 | 12/2011 | Runstedler et al. |
| 2011/0307842 A1 | 12/2011 | Chiang et al. |
| 2011/0316888 A1 | 12/2011 | Sachs et al. |
| 2012/0011437 A1 | 1/2012 | James et al. |
| 2012/0019513 A1 | 1/2012 | Fong et al. |
| 2012/0026198 A1 | 2/2012 | Maesaka |
| 2012/0030566 A1 | 2/2012 | Victor et al. |
| 2012/0030627 A1 | 2/2012 | Nurmi et al. |
| 2012/0032988 A1 | 2/2012 | Katayama |
| 2012/0038582 A1 | 2/2012 | Grant |
| 2012/0044267 A1 | 2/2012 | Fino |
| 2012/0050185 A1 | 3/2012 | Davydov et al. |
| 2012/0052921 A1 | 3/2012 | Lim et al. |
| 2012/0054670 A1 | 3/2012 | Rainisto |
| 2012/0056840 A1 | 3/2012 | Benko et al. |
| 2012/0056848 A1 | 3/2012 | Yamano et al. |
| 2012/0059787 A1 | 3/2012 | Brown et al. |
| 2012/0062398 A1* | 3/2012 | Durand ................. G06F 3/0362 341/35 |
| 2012/0066621 A1* | 3/2012 | Matsubara ............ G06F 3/0485 715/764 |
| 2012/0066629 A1 | 3/2012 | Lee et al. |
| 2012/0066638 A1 | 3/2012 | Ohri |
| 2012/0068925 A1 | 3/2012 | Wong et al. |
| 2012/0083260 A1 | 4/2012 | Arriola et al. |
| 2012/0084689 A1 | 4/2012 | Ledet et al. |
| 2012/0089951 A1 | 4/2012 | Cassidy |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0112859 A1* | 5/2012 | Park ..................... H01H 25/002 335/205 |
| 2012/0127071 A1 | 5/2012 | Jitkoff et al. |
| 2012/0131495 A1 | 5/2012 | Goossens et al. |
| 2012/0131504 A1 | 5/2012 | Fadell et al. |
| 2012/0133604 A1 | 5/2012 | Ishizuka et al. |
| 2012/0133677 A1 | 5/2012 | Suzuki et al. |
| 2012/0142414 A1 | 6/2012 | Murakami |
| 2012/0147052 A1 | 6/2012 | Homma et al. |
| 2012/0155223 A1 | 6/2012 | Hoover |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0169776 A1 | 7/2012 | Rissa et al. |
| 2012/0174005 A1* | 7/2012 | Deutsch .............. G06F 3/04883 715/764 |
| 2012/0174033 A1* | 7/2012 | Joo ....................... G06F 3/0485 715/831 |
| 2012/0179998 A1 | 7/2012 | Nesladek et al. |
| 2012/0185781 A1 | 7/2012 | Guzman et al. |
| 2012/0186951 A1 | 7/2012 | Wu et al. |
| 2012/0192110 A1 | 7/2012 | Wu |
| 2012/0197743 A1 | 8/2012 | Grigg et al. |
| 2012/0200689 A1 | 8/2012 | Friedman et al. |
| 2012/0204123 A1 | 8/2012 | Bauer et al. |
| 2012/0223971 A1 | 9/2012 | Hillis |
| 2012/0226977 A1 | 9/2012 | Lengeling et al. |
| 2012/0229521 A1 | 9/2012 | Hales et al. |
| 2012/0236037 A1 | 9/2012 | Lessing et al. |
| 2012/0256863 A1 | 10/2012 | Zhang et al. |
| 2012/0272145 A1 | 10/2012 | Ryan et al. |
| 2012/0272181 A1* | 10/2012 | Rogers ................. G06F 3/0482 715/784 |
| 2012/0278725 A1 | 11/2012 | Gordon et al. |
| 2012/0278755 A1* | 11/2012 | Lehmann ................ G09G 5/34 715/784 |
| 2012/0284674 A1 | 11/2012 | Geng et al. |
| 2012/0289290 A1 | 11/2012 | Chae et al. |
| 2012/0290472 A1 | 11/2012 | Mullen et al. |
| 2012/0297324 A1 | 11/2012 | Dollar et al. |
| 2012/0297342 A1 | 11/2012 | Jang et al. |
| 2012/0304111 A1* | 11/2012 | Queru .................. G06F 3/0482 715/781 |
| 2012/0304113 A1 | 11/2012 | Patten et al. |
| 2012/0306765 A1 | 12/2012 | Moore |
| 2012/0306930 A1* | 12/2012 | Decker ............... G06F 3/04883 345/667 |
| 2012/0311055 A1 | 12/2012 | Adams et al. |
| 2012/0324357 A1 | 12/2012 | Viegers et al. |
| 2012/0324390 A1 | 12/2012 | Tao |
| 2012/0327006 A1 | 12/2012 | Israr et al. |
| 2012/0327009 A1 | 12/2012 | Fleizach |
| 2013/0019182 A1 | 1/2013 | Gil et al. |
| 2013/0021362 A1 | 1/2013 | Sakurada et al. |
| 2013/0024780 A1 | 1/2013 | Sutedja et al. |
| 2013/0024808 A1* | 1/2013 | Rainisto ............... G06F 3/0488 715/810 |
| 2013/0024811 A1 | 1/2013 | Gleadall et al. |
| 2013/0027412 A1 | 1/2013 | Roddy |
| 2013/0031507 A1 | 1/2013 | George |
| 2013/0031514 A1 | 1/2013 | Gabbert |
| 2013/0036005 A1 | 2/2013 | Rappe |
| 2013/0038636 A1 | 2/2013 | Fujiwaka |
| 2013/0046397 A1 | 2/2013 | Fadell et al. |
| 2013/0055160 A1 | 2/2013 | Yamada et al. |
| 2013/0063383 A1 | 3/2013 | Anderssonreimer et al. |
| 2013/0067390 A1 | 3/2013 | Kwiatkowski et al. |
| 2013/0070573 A1 | 3/2013 | Oshio |
| 2013/0073932 A1 | 3/2013 | Migos et al. |
| 2013/0097526 A1 | 4/2013 | Stovicek et al. |
| 2013/0097556 A1 | 4/2013 | Louch et al. |
| 2013/0097566 A1 | 4/2013 | Berglund |
| 2013/0104039 A1 | 4/2013 | Ormin et al. |
| 2013/0111342 A1 | 5/2013 | Alameh et al. |
| 2013/0111384 A1 | 5/2013 | Kim et al. |
| 2013/0111396 A1* | 5/2013 | Brid .................... G06F 3/04855 715/784 |
| 2013/0111407 A1 | 5/2013 | Mullen |
| 2013/0117689 A1 | 5/2013 | Lessing et al. |
| 2013/0117698 A1 | 5/2013 | Park et al. |
| 2013/0120295 A1 | 5/2013 | Kim et al. |
| 2013/0120301 A1 | 5/2013 | Lira |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0141342 A1 | 6/2013 | Bokma et al. |
| 2013/0142016 A1 | 6/2013 | Pozzo di borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-nainar |
| 2013/0159941 A1 | 6/2013 | Langlois et al. |
| 2013/0169579 A1 | 7/2013 | Havnor |
| 2013/0174031 A1 | 7/2013 | Constantinou |
| 2013/0176020 A1 | 7/2013 | Chauvin et al. |
| 2013/0191220 A1* | 7/2013 | Dent ..................... G06Q 30/02 705/14.64 |
| 2013/0205210 A1 | 8/2013 | Jeon et al. |
| 2013/0205939 A1 | 8/2013 | Meerovitsch |
| 2013/0208013 A1 | 8/2013 | Yuu et al. |
| 2013/0218517 A1 | 8/2013 | Ausserlechner |
| 2013/0222301 A1 | 8/2013 | Lee et al. |
| 2013/0226444 A1 | 8/2013 | Johansson et al. |
| 2013/0227412 A1 | 8/2013 | Ornstein et al. |
| 2013/0227419 A1 | 8/2013 | Lee et al. |
| 2013/0227470 A1 | 8/2013 | Thorsander et al. |
| 2013/0227483 A1 | 8/2013 | Thorsander et al. |
| 2013/0227490 A1 | 8/2013 | Thorsander et al. |
| 2013/0254708 A1 | 9/2013 | Dorcey |
| 2013/0258819 A1 | 10/2013 | Hoover |
| 2013/0262564 A1 | 10/2013 | Wall et al. |
| 2013/0275899 A1 | 10/2013 | Schubert et al. |

(56) References Cited

U.S. PATENT DOCUMENTS

| | | |
|---|---|---|
| 2013/0282360 A1 | 10/2013 | Shimota et al. |
| 2013/0282459 A1 | 10/2013 | Smets et al. |
| 2013/0283204 A1* | 10/2013 | Pasquero ............ G06F 3/0484 715/784 |
| 2013/0290116 A1 | 10/2013 | Hepworth et al. |
| 2013/0303087 A1 | 11/2013 | Hauser et al. |
| 2013/0305184 A1 | 11/2013 | Kim et al. |
| 2013/0305187 A1 | 11/2013 | Phillips et al. |
| 2013/0318437 A1 | 11/2013 | Jung et al. |
| 2013/0324093 A1 | 12/2013 | Santamaria et al. |
| 2013/0328786 A1 | 12/2013 | Hinckley |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2014/0002502 A1* | 1/2014 | Han ............ G06T 11/60 345/646 |
| 2014/0028554 A1 | 1/2014 | De los reyes et al. |
| 2014/0028688 A1 | 1/2014 | Houjou et al. |
| 2014/0028735 A1 | 1/2014 | Williams et al. |
| 2014/0036639 A1 | 2/2014 | Boni et al. |
| 2014/0040742 A1 | 2/2014 | Park et al. |
| 2014/0074717 A1 | 3/2014 | Evans |
| 2014/0075311 A1 | 3/2014 | Boettcher et al. |
| 2014/0075368 A1 | 3/2014 | Kim et al. |
| 2014/0092037 A1 | 4/2014 | Kim |
| 2014/0092143 A1* | 4/2014 | VanBlon ............ G09G 5/363 345/684 |
| 2014/0105278 A1 | 4/2014 | Bivolarsky |
| 2014/0106734 A1 | 4/2014 | Lee |
| 2014/0108936 A1 | 4/2014 | Khosropour et al. |
| 2014/0109002 A1 | 4/2014 | Kimball et al. |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0143683 A1 | 5/2014 | Underwood et al. |
| 2014/0143737 A1 | 5/2014 | Mistry et al. |
| 2014/0149921 A1 | 5/2014 | Hauser et al. |
| 2014/0152585 A1 | 6/2014 | Andersson Reimer |
| 2014/0157160 A1 | 6/2014 | Cudak et al. |
| 2014/0160078 A1 | 6/2014 | Seo et al. |
| 2014/0164945 A1 | 6/2014 | Junqua et al. |
| 2014/0164966 A1 | 6/2014 | Kim et al. |
| 2014/0189608 A1 | 7/2014 | Shuttleworth et al. |
| 2014/0204229 A1 | 7/2014 | Leung et al. |
| 2014/0215340 A1 | 7/2014 | Shetty et al. |
| 2014/0222916 A1 | 8/2014 | Foley et al. |
| 2014/0237382 A1 | 8/2014 | Grandhi |
| 2014/0245221 A1* | 8/2014 | Dougherty ............ G06F 3/0485 715/787 |
| 2014/0253487 A1 | 9/2014 | Bezinge et al. |
| 2014/0258935 A1 | 9/2014 | Nishida et al. |
| 2014/0260776 A1 | 9/2014 | Burleson |
| 2014/0267441 A1* | 9/2014 | Matas ............ G06F 3/0485 345/688 |
| 2014/0282005 A1 | 9/2014 | Gutowitz |
| 2014/0282016 A1 | 9/2014 | Hosier, Jr. |
| 2014/0282142 A1 | 9/2014 | Lin |
| 2014/0282214 A1 | 9/2014 | Shirzadi et al. |
| 2014/0289659 A1 | 9/2014 | Harrison et al. |
| 2014/0292668 A1 | 10/2014 | Fricklas et al. |
| 2014/0298233 A1 | 10/2014 | Pettey et al. |
| 2014/0304389 A1 | 10/2014 | Reavis |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Agnetta et al. |
| 2014/0337791 A1 | 11/2014 | Agnetta et al. |
| 2014/0347289 A1 | 11/2014 | Suh et al. |
| 2014/0362024 A1 | 12/2014 | Hicks |
| 2014/0365126 A1 | 12/2014 | Vulcano et al. |
| 2014/0372115 A1 | 12/2014 | Lebeau et al. |
| 2015/0007025 A1 | 1/2015 | Sassi et al. |
| 2015/0007048 A1 | 1/2015 | Dumans |
| 2015/0007052 A1 | 1/2015 | Dumans |
| 2015/0009784 A1 | 1/2015 | Cho et al. |
| 2015/0036555 A1 | 2/2015 | Shin et al. |
| 2015/0039494 A1 | 2/2015 | Sinton et al. |
| 2015/0046871 A1 | 2/2015 | Lewis |
| 2015/0049591 A1 | 2/2015 | Adams et al. |
| 2015/0058723 A1 | 2/2015 | Cieplinski et al. |
| 2015/0058744 A1 | 2/2015 | Dhingra et al. |
| 2015/0065821 A1 | 3/2015 | Conrad |
| 2015/0067495 A1 | 3/2015 | Bernstein et al. |
| 2015/0067497 A1 | 3/2015 | Cieplinski et al. |
| 2015/0067513 A1 | 3/2015 | Zambetti et al. |
| 2015/0067555 A1 | 3/2015 | Joo et al. |
| 2015/0074615 A1 | 3/2015 | Han et al. |
| 2015/0077398 A1 | 3/2015 | Yairi et al. |
| 2015/0085621 A1 | 3/2015 | Hong et al. |
| 2015/0121224 A1 | 4/2015 | Krasnahill, Jr. |
| 2015/0121311 A1 | 4/2015 | Lou et al. |
| 2015/0121405 A1 | 4/2015 | Ekselius et al. |
| 2015/0148927 A1 | 5/2015 | Georges et al. |
| 2015/0149899 A1 | 5/2015 | Bernstein et al. |
| 2015/0149956 A1 | 5/2015 | Kempinski et al. |
| 2015/0160856 A1 | 6/2015 | Jang et al. |
| 2015/0178041 A1 | 6/2015 | Uskoreit |
| 2015/0185845 A1 | 7/2015 | Nagara et al. |
| 2015/0193099 A1 | 7/2015 | Murphy |
| 2015/0193951 A1 | 7/2015 | Lee et al. |
| 2015/0199012 A1 | 7/2015 | Palmer |
| 2015/0199082 A1 | 7/2015 | Scholler et al. |
| 2015/0199110 A1 | 7/2015 | Nakazato |
| 2015/0205476 A1* | 7/2015 | Kuscher ............ G06F 3/04845 715/784 |
| 2015/0234518 A1 | 8/2015 | Teller et al. |
| 2015/0234562 A1 | 8/2015 | Ording |
| 2015/0261310 A1 | 9/2015 | Walmsley et al. |
| 2015/0269944 A1 | 9/2015 | Wang |
| 2015/0277559 A1 | 10/2015 | Vescovi et al. |
| 2015/0277563 A1 | 10/2015 | Huang et al. |
| 2015/0286391 A1 | 10/2015 | Jacobs et al. |
| 2015/0302301 A1 | 10/2015 | Petersen |
| 2015/0302774 A1 | 10/2015 | Dagar |
| 2015/0331589 A1 | 11/2015 | Kawakita |
| 2015/0346941 A1 | 12/2015 | Lin-Hendel |
| 2015/0363048 A1* | 12/2015 | Brown ............ G06F 3/0485 715/777 |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378555 A1 | 12/2015 | Ramanathan et al. |
| 2015/0379476 A1 | 12/2015 | Chaudhri et al. |
| 2016/0004393 A1 | 1/2016 | Faaborg et al. |
| 2016/0011758 A1 | 1/2016 | Dornbush et al. |
| 2016/0012018 A1 | 1/2016 | Do Ba |
| 2016/0018981 A1* | 1/2016 | Amerige ............ G06F 3/04817 715/863 |
| 2016/0028875 A1 | 1/2016 | Brown et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Wilson et al. |
| 2016/0034167 A1 | 2/2016 | Wilson et al. |
| 2016/0041702 A1 | 2/2016 | Wang |
| 2016/0054710 A1 | 2/2016 | Jo et al. |
| 2016/0062466 A1 | 3/2016 | Moussette et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062573 A1 | 3/2016 | Dascola et al. |
| 2016/0062608 A1 | 3/2016 | Foss et al. |
| 2016/0063828 A1 | 3/2016 | Moussette et al. |
| 2016/0063850 A1 | 3/2016 | Yang et al. |
| 2016/0065509 A1 | 3/2016 | Yang et al. |
| 2016/0065525 A1 | 3/2016 | Dye et al. |
| 2016/0071241 A1 | 3/2016 | Karunamuni et al. |
| 2016/0091971 A1 | 3/2016 | Burr |

(56) References Cited

U.S. PATENT DOCUMENTS

| | | |
|---|---|---|
| 2016/0098016 A1 | 4/2016 | Ely et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0198319 A1 | 7/2016 | Huang et al. |
| 2016/0202866 A1 | 7/2016 | Zambetti et al. |
| 2016/0209939 A1 | 7/2016 | Zambetti et al. |
| 2016/0231883 A1 | 8/2016 | Zambetti et al. |
| 2016/0259499 A1 | 9/2016 | Kocienda et al. |
| 2016/0259530 A1 | 9/2016 | Everitt et al. |
| 2016/0259535 A1 | 9/2016 | Fleizach et al. |
| 2016/0269540 A1* | 9/2016 | Butcher ............... G06F 3/0482 |
| 2016/0299912 A1 | 10/2016 | Acuna et al. |
| 2016/0327911 A1 | 11/2016 | Eim et al. |
| 2016/0357368 A1 | 12/2016 | Federighi et al. |
| 2017/0010678 A1 | 1/2017 | Tuli |
| 2017/0010751 A1 | 1/2017 | Shedletsky et al. |
| 2017/0017369 A1 | 1/2017 | Kanter et al. |
| 2017/0045958 A1 | 2/2017 | Battlogg |
| 2017/0053542 A1 | 2/2017 | Wilson et al. |
| 2017/0089735 A1 | 3/2017 | Ruh |
| 2017/0104902 A1 | 4/2017 | Kim et al. |
| 2017/0208466 A1 | 7/2017 | Seo et al. |
| 2017/0212674 A1 | 7/2017 | Ording |
| 2017/0220215 A1 | 8/2017 | Wu et al. |
| 2017/0220226 A1 | 8/2017 | Wu et al. |
| 2017/0242933 A1 | 8/2017 | Liu |
| 2017/0269692 A1 | 9/2017 | Eck et al. |
| 2017/0315716 A1 | 11/2017 | Zambetti et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357427 A1 | 12/2017 | Wilson et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0074690 A1 | 3/2018 | Zambetti et al. |
| 2018/0074693 A1 | 3/2018 | Jones et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0204425 A1 | 7/2018 | Moussette et al. |
| 2018/0210516 A1 | 7/2018 | Zambetti et al. |
| 2018/0210641 A1 | 7/2018 | Thelleerathu et al. |
| 2018/0260555 A1 | 9/2018 | Hardee et al. |
| 2018/0307363 A1 | 10/2018 | Ely et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |
| 2018/0336866 A1 | 11/2018 | Triverio et al. |
| 2018/0341344 A1 | 11/2018 | Foss et al. |
| 2018/0349583 A1 | 12/2018 | Turgeman et al. |
| 2018/0364815 A1 | 12/2018 | Moussette et al. |
| 2018/0367489 A1 | 12/2018 | Dye et al. |
| 2018/0369691 A1 | 12/2018 | Rihn et al. |
| 2019/0033862 A1 | 1/2019 | Groden et al. |
| 2019/0050055 A1 | 2/2019 | Chaudhri et al. |
| 2019/0056700 A1 | 2/2019 | Matsuno et al. |
| 2019/0072912 A1 | 3/2019 | Pandya et al. |
| 2019/0080066 A1 | 3/2019 | Van Os et al. |
| 2019/0080072 A1 | 3/2019 | Van Os et al. |
| 2019/0101870 A1 | 4/2019 | Pandya et al. |
| 2019/0163324 A1 | 5/2019 | Shedletsky et al. |
| 2019/0163329 A1 | 5/2019 | Yang et al. |
| 2019/0172016 A1 | 6/2019 | Chaudhri et al. |
| 2019/0212885 A1 | 7/2019 | Zambetti et al. |
| 2019/0243471 A1 | 8/2019 | Foss et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0342622 A1 | 11/2019 | Carrigan et al. |
| 2019/0354268 A1 | 11/2019 | Everitt et al. |
| 2019/0369755 A1 | 12/2019 | Roper et al. |
| 2019/0369838 A1 | 12/2019 | Josephson et al. |
| 2020/0050332 A1 | 2/2020 | Yang et al. |
| 2020/0081538 A1 | 3/2020 | Moussette et al. |
| 2020/0081539 A1 | 3/2020 | Moussette et al. |
| 2020/0145361 A1 | 5/2020 | Dye et al. |
| 2020/0167047 A1 | 5/2020 | Dascola et al. |
| 2020/0192473 A1 | 6/2020 | Wang et al. |
| 2020/0241741 A1 | 7/2020 | Ording |
| 2020/0272287 A1 | 8/2020 | Yang et al. |
| 2020/0272293 A1 | 8/2020 | Zambetti et al. |
| 2020/0333940 A1 | 10/2020 | Lee et al. |
| 2020/0341553 A1 | 10/2020 | Moussette et al. |
| 2020/0344439 A1 | 10/2020 | Choi et al. |
| 2020/0355463 A1 | 11/2020 | Piccioni |
| 2020/0356323 A1 | 11/2020 | Kawabata |
| 2020/0356341 A1 | 11/2020 | Satongar et al. |
| 2020/0356962 A1 | 11/2020 | Subramaniam et al. |
| 2020/0368616 A1 | 11/2020 | Delamont |
| 2020/0393957 A1 | 12/2020 | Wilson et al. |
| 2021/0055697 A1 | 2/2021 | Abramov |
| 2021/0073741 A1 | 3/2021 | Chaudhri et al. |
| 2021/0110014 A1 | 4/2021 | Turgeman et al. |
| 2021/0208750 A1 | 7/2021 | Zambetti et al. |
| 2021/0286511 A1 | 9/2021 | Ording |
| 2021/0342017 A1 | 11/2021 | Foss et al. |
| 2022/0129858 A1 | 4/2022 | Chaudhri et al. |
| 2022/0137759 A1 | 5/2022 | Yang et al. |
| 2022/0147242 A1 | 5/2022 | Ording |
| 2022/0244782 A1 | 8/2022 | Robert et al. |
| 2022/0413632 A1 | 12/2022 | Foss et al. |
| 2023/0004227 A1 | 1/2023 | Moussette et al. |
| 2023/0024225 A1 | 1/2023 | Zambetti et al. |
| 2023/0049771 A1 | 2/2023 | Dascola et al. |
| 2023/0214112 A1 | 7/2023 | Ording |
| 2023/0273690 A1 | 8/2023 | Foss et al. |
| 2023/0334432 A1 | 10/2023 | Chaudhri et al. |
| 2023/0362123 A1 | 11/2023 | Dye et al. |
| 2024/0036703 A1 | 2/2024 | Yang et al. |
| 2024/0061567 A1 | 2/2024 | Zambetti et al. |

FOREIGN PATENT DOCUMENTS

| | | |
|---|---|---|
| AU | 2009208103 A1 | 9/2009 |
| AU | 2012200689 A1 | 3/2012 |
| AU | 2014100584 A4 | 7/2014 |
| AU | 2016231505 A1 | 10/2016 |
| AU | 2018100429 A4 | 5/2018 |
| AU | 2018100429 B4 | 8/2018 |
| CN | 1207517 A | 2/1999 |
| CN | 1263425 A | 8/2000 |
| CN | 1330310 A | 1/2002 |
| CN | 1341889 A | 3/2002 |
| CN | 1398366 A | 2/2003 |
| CN | 1549998 A | 11/2004 |
| CN | 1620642 A | 5/2005 |
| CN | 1650251 A | 8/2005 |
| CN | 1668992 A | 9/2005 |
| CN | 1695105 A | 11/2005 |
| CN | 1757011 A | 4/2006 |
| CN | 1797295 A | 7/2006 |
| CN | 1811899 A | 8/2006 |
| CN | 2829257 Y | 10/2006 |
| CN | 1975652 A | 6/2007 |
| CN | 101042300 A | 9/2007 |
| CN | 101059730 A | 10/2007 |
| CN | 101101595 A | 1/2008 |
| CN | 101203821 A | 6/2008 |
| CN | 101232528 A | 7/2008 |
| CN | 101398741 A | 4/2009 |
| CN | 101431545 A | 5/2009 |
| CN | 101446802 A | 6/2009 |
| CN | 101529368 A | 9/2009 |
| CN | 101606123 A | 12/2009 |
| CN | 101611374 A | 12/2009 |
| CN | 101625620 A | 1/2010 |
| CN | 101634659 A | 1/2010 |

(56) References Cited

FOREIGN PATENT DOCUMENTS

| | | |
|---|---|---|
| CN | 101776968 A | 7/2010 |
| CN | 101872240 A | 10/2010 |
| CN | 101876877 A | 11/2010 |
| CN | 101893992 A | 11/2010 |
| CN | 101976171 A | 2/2011 |
| CN | 102033710 A | 4/2011 |
| CN | 101241407 B | 7/2011 |
| CN | 102144213 A | 8/2011 |
| CN | 102252126 A | 11/2011 |
| CN | 102402328 A | 4/2012 |
| CN | 102479053 A | 5/2012 |
| CN | 102508707 A | 6/2012 |
| CN | 102591579 A | 7/2012 |
| CN | 102612679 A | 7/2012 |
| CN | 102725724 A | 10/2012 |
| CN | 102750066 A | 10/2012 |
| CN | 102763066 A | 10/2012 |
| CN | 102812426 A | 12/2012 |
| CN | 102859482 A | 1/2013 |
| CN | 102890612 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102981727 A | 3/2013 |
| CN | 102981770 A | 3/2013 |
| CN | 103019083 A | 4/2013 |
| CN | 103034399 A | 4/2013 |
| CN | 103069378 A | 4/2013 |
| CN | 103154878 A | 6/2013 |
| CN | 202982930 U | 6/2013 |
| CN | 103212197 A | 7/2013 |
| CN | 103270486 A | 8/2013 |
| CN | 103460164 A | 12/2013 |
| CN | 103703437 A | 4/2014 |
| CN | 103782252 A | 5/2014 |
| CN | 103793138 A | 5/2014 |
| CN | 103858088 A | 6/2014 |
| CN | 103870255 A | 6/2014 |
| CN | 103914261 A | 7/2014 |
| CN | 103970413 A | 8/2014 |
| CN | 104166458 A | 11/2014 |
| CN | 104508618 A | 4/2015 |
| CN | 105955591 A | 9/2016 |
| CN | 107710135 A | 2/2018 |
| CN | 107797655 A | 3/2018 |
| CN | 107797657 A | 3/2018 |
| CN | 108139863 A | 6/2018 |
| CN | 108304106 A | 7/2018 |
| CN | 108334190 A | 7/2018 |
| CN | 108369455 A | 8/2018 |
| EP | 0622722 A2 | 11/1994 |
| EP | 0701220 A1 | 3/1996 |
| EP | 0536715 B1 | 7/2000 |
| EP | 1052566 A1 | 11/2000 |
| EP | 1168149 A2 | 1/2002 |
| EP | 1406158 A2 | 4/2004 |
| EP | 1486860 A1 | 12/2004 |
| EP | 1505484 A1 | 2/2005 |
| EP | 1571538 A1 | 9/2005 |
| EP | 1679879 A2 | 7/2006 |
| EP | 1847920 A2 | 10/2007 |
| EP | 1850213 A2 | 10/2007 |
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 1959337 A2 | 8/2008 |
| EP | 2124131 A2 | 11/2009 |
| EP | 2207084 A2 | 7/2010 |
| EP | 2224317 A1 | 9/2010 |
| EP | 2237140 A2 | 10/2010 |
| EP | 2284646 A1 | 2/2011 |
| EP | 2302492 A2 | 3/2011 |
| EP | 2302493 A2 | 3/2011 |
| EP | 2385451 A1 | 11/2011 |
| EP | 2547117 A1 | 1/2013 |
| EP | 2551784 A1 | 1/2013 |
| EP | 2610738 A2 | 7/2013 |
| EP | 2693382 A2 | 2/2014 |
| EP | 2733579 A2 | 5/2014 |
| EP | 2733598 A2 | 5/2014 |
| EP | 2741176 A2 | 6/2014 |
| EP | 3401770 A1 | 11/2018 |
| EP | 3410263 A1 | 12/2018 |
| GB | 2392773 A | 3/2004 |
| GB | 2489580 A | 10/2012 |
| JP | 55-80084 A | 6/1980 |
| JP | 3-271976 A | 12/1991 |
| JP | 5-88812 A | 4/1993 |
| JP | 6-348408 A | 12/1994 |
| JP | 7-152478 A | 6/1995 |
| JP | 8-76926 A | 3/1996 |
| JP | 8-202281 A | 8/1996 |
| JP | 9-152856 A | 6/1997 |
| JP | 10-240220 A | 9/1998 |
| JP | 11-110106 A | 4/1999 |
| JP | 11-126149 A | 5/1999 |
| JP | 11-289484 A | 10/1999 |
| JP | 11-327733 A | 11/1999 |
| JP | 2000-503153 A | 3/2000 |
| JP | 2000-163031 A | 6/2000 |
| JP | 2000-305760 A | 11/2000 |
| JP | 2001-5445 A | 1/2001 |
| JP | 2001-100905 A | 4/2001 |
| JP | 2001-202170 A | 7/2001 |
| JP | 2001-202178 A | 7/2001 |
| JP | 2001-202181 A | 7/2001 |
| JP | 2001-209827 A | 8/2001 |
| JP | 2002-175139 A | 6/2002 |
| JP | 2002-288690 A | 10/2002 |
| JP | 2002-373312 A | 12/2002 |
| JP | 2003-248544 A | 9/2003 |
| JP | 2003-256095 A | 9/2003 |
| JP | 2003-330586 A | 11/2003 |
| JP | 2003-330856 A | 11/2003 |
| JP | 2003-345491 A | 12/2003 |
| JP | 2004-21522 A | 1/2004 |
| JP | 2004-23581 A | 1/2004 |
| JP | 2004-178584 A | 6/2004 |
| JP | 2004-184396 A | 7/2004 |
| JP | 2004-259063 A | 9/2004 |
| JP | 2005-4891 A | 1/2005 |
| JP | 2005-108211 A | 4/2005 |
| JP | 2005-196077 A | 7/2005 |
| JP | 2005-284726 A | 10/2005 |
| JP | 2006-11690 A | 1/2006 |
| JP | 2006-11862 A | 1/2006 |
| JP | 2006-079312 A | 3/2006 |
| JP | 2006-140990 A | 6/2006 |
| JP | 2006-185273 A | 7/2006 |
| JP | 2006-311209 A | 11/2006 |
| JP | 2007-512635 A | 5/2007 |
| JP | 2007-170995 A | 7/2007 |
| JP | 2007-179544 A | 7/2007 |
| JP | 2008-508601 A | 3/2008 |
| JP | 2008-97057 A | 4/2008 |
| JP | 2008-518539 A | 5/2008 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-246553 A | 10/2009 |
| JP | 2009-265793 A | 11/2009 |
| JP | 2009-294526 A | 12/2009 |
| JP | 2010-515978 A | 5/2010 |
| JP | 2010-257051 A | 11/2010 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2012-27797 A | 2/2012 |
| JP | 2012-58979 A | 3/2012 |

(56) References Cited

FOREIGN PATENT DOCUMENTS

| | | |
|---|---|---|
| JP | 2012-115519 A | 6/2012 |
| JP | 2012-155698 A | 8/2012 |
| JP | 2012-168620 A | 9/2012 |
| JP | 2012-252384 A | 12/2012 |
| JP | 2012-531607 A | 12/2012 |
| JP | 2013-3718 A | 1/2013 |
| JP | 2013-114844 A | 6/2013 |
| JP | 2013-122738 A | 6/2013 |
| JP | 2013-137750 A | 7/2013 |
| JP | 2013-164700 A | 8/2013 |
| JP | 2013-168086 A | 8/2013 |
| JP | 2014-42164 A | 3/2014 |
| JP | 2014-222527 A | 11/2014 |
| JP | 2016-538653 A | 12/2016 |
| JP | 2017-500656 A | 1/2017 |
| JP | 2017-516163 A | 6/2017 |
| JP | 2018-508076 A | 3/2018 |
| JP | 2018-508900 A | 3/2018 |
| JP | 2019-512814 A | 5/2019 |
| KR | 2001-0013325 A | 2/2001 |
| KR | 10-2001-0040410 A | 5/2001 |
| KR | 2003-0016313 A | 2/2003 |
| KR | 10-2003-0088374 A | 11/2003 |
| KR | 10-2004-0107472 A | 12/2004 |
| KR | 10-2006-0014874 A | 2/2006 |
| KR | 10-2006-0085850 A | 7/2006 |
| KR | 10-0630154 B1 | 9/2006 |
| KR | 10-2007-0024702 A | 3/2007 |
| KR | 10-2008-0095085 A | 10/2008 |
| KR | 10-2010- 0003589 A | 1/2010 |
| KR | 10-0971452 B1 | 7/2010 |
| KR | 10-2010- 0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2013-0052751 A | 5/2013 |
| KR | 10-2015-0122810 A | 11/2015 |
| TW | I269202 B | 12/2006 |
| TW | D122820 S | 5/2008 |
| TW | 200843452 A | 11/2008 |
| TW | 201119339 A1 | 6/2011 |
| TW | I349212 B | 9/2011 |
| TW | I381305 B | 1/2013 |
| TW | I384394 B1 | 2/2013 |
| TW | I394410 B1 | 4/2013 |
| TW | I395498 B | 5/2013 |
| TW | I405106 B | 8/2013 |
| TW | 201403363 A | 1/2014 |
| TW | I426416 B | 2/2014 |
| TW | 201421340 A | 6/2014 |
| TW | I443547 B | 7/2014 |
| WO | 1993/08517 A1 | 4/1993 |
| WO | 1996/19872 A1 | 6/1996 |
| WO | 98/55939 A1 | 12/1998 |
| WO | 1999/38149 A1 | 7/1999 |
| WO | 2001/69369 A1 | 9/2001 |
| WO | 2002/01338 A1 | 1/2002 |
| WO | 2003/021568 A1 | 3/2003 |
| WO | 2003/036457 A2 | 5/2003 |
| WO | 2003/060622 A2 | 7/2003 |
| WO | 2003/060682 A1 | 7/2003 |
| WO | 2003/081458 A1 | 10/2003 |
| WO | 2005/008444 A2 | 1/2005 |
| WO | 2005/052773 A2 | 6/2005 |
| WO | 2005/055034 A1 | 6/2005 |
| WO | 2005/103863 A2 | 11/2005 |
| WO | 2006/003591 A2 | 1/2006 |
| WO | 2006/013485 A2 | 2/2006 |
| WO | 2006/020304 A2 | 2/2006 |
| WO | 2006/020305 A2 | 2/2006 |
| WO | 2006/037545 A2 | 4/2006 |
| WO | 2006/042309 A1 | 4/2006 |
| WO | 2006/045530 A2 | 5/2006 |
| WO | 2006/094308 A2 | 9/2006 |
| WO | 2006/094308 A3 | 12/2006 |
| WO | 2008/030779 A2 | 3/2008 |
| WO | 2008/030880 A1 | 3/2008 |
| WO | 2008/033853 A2 | 3/2008 |
| WO | 2008/085742 A2 | 7/2008 |
| WO | 2008/085855 A1 | 7/2008 |
| WO | 2008/086218 A2 | 7/2008 |
| WO | 2008/099251 A1 | 8/2008 |
| WO | 2008/106777 A1 | 9/2008 |
| WO | 2009/026508 A1 | 2/2009 |
| WO | 2009/084368 A1 | 7/2009 |
| WO | 2009/085378 A1 | 7/2009 |
| WO | 2009/097592 A1 | 8/2009 |
| WO | 2009/104064 A1 | 8/2009 |
| WO | 2009/114239 A1 | 9/2009 |
| WO | 2010/024969 A1 | 3/2010 |
| WO | 2010/150768 A1 | 12/2010 |
| WO | 2011/084859 A1 | 7/2011 |
| WO | 2011/126502 A1 | 10/2011 |
| WO | 2012/006494 A1 | 1/2012 |
| WO | 2012/080020 A1 | 6/2012 |
| WO | 2012/129359 A1 | 9/2012 |
| WO | 2013/051048 A1 | 4/2013 |
| WO | 2013/085580 A1 | 6/2013 |
| WO | 2013/105664 A1 | 7/2013 |
| WO | 2013/114844 A1 | 8/2013 |
| WO | 2013/133901 A2 | 9/2013 |
| WO | 2013/169842 A2 | 11/2013 |
| WO | 2013/169846 A1 | 11/2013 |
| WO | 2013/169849 A2 | 11/2013 |
| WO | 2013/169853 A1 | 11/2013 |
| WO | 2013/169875 A2 | 11/2013 |
| WO | 2014/105276 A1 | 7/2014 |
| WO | 2015/034969 A2 | 3/2015 |
| WO | 2015/057320 A1 | 4/2015 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Examiner-Initiated Interview Summary received for U.S. Appl. No. 14/913,349, mailed on Oct. 27, 2020, 3 pages.
Final Office Action received for U.S. Appl. No. 14/913,349, mailed on Oct. 30, 2020, 33 pages.
Office Action received for Australian Patent Application No. 2019257521, mailed on Oct. 21, 2020, 6 pages.
Office Action received for Chinese Patent Application No. 201910164962.3, mailed on Sep. 18, 2020, 19 pages (6 pages of English Translation and 13 pages of Official Copy).
Office Action received for Japanese Patent Application No. 2019-138053, mailed on Oct. 2, 2020, 6 pages (3 pages of English Translation and 3 pages of Official Copy).
Office Action received for Korean Patent Application No. 10-2018-7033888, mailed on Oct. 19, 2020, 10 pages (4 pages of English Translation and 6 pages of Official Copy).
Office Action received for Korean Patent Application No. 10-2019-7028736, mailed on Oct. 22, 2020, 6 pages (3 pages of English Translation and 3 pages of Official Copy).
Feng Lipeng, "Bound for computer lovers", Dec. 31, 2009, 2 pages (Official Copy Only) (See Communication under 37 CFR § 1.98(a) (3)).
Rev. Some Culture, "It's super easy for middle-aged and elderly people to learn compute", Jul. 31, 2013, 2 pages (Official Copy Only) (See Communication under 37 CFR § 1.98(a) (3)).
WZ Science Alliance, "Very simple geriatrics computer and Internet bestselling upgrade", Sep. 30, 2013, 3 pages (Official Copy Only) (See Communication under 37 CFR § 1.98(a) (3)).
Applicant Initiated Interview Summary received for U.S. Appl. No. 16/871,995, mailed on Jul. 16, 2021, 4 pages.

(56) References Cited

OTHER PUBLICATIONS

Final Office Action received for U.S. Appl. No. 16/734,173, mailed on Jul. 13, 2021, 12 pages.
Non-Final Office Action received for U.S. Appl. No. 15/818,500, mailed on Jul. 12, 2021, 18 pages.
Notice of Allowance received for Japanese Patent Application No. 2019-138053, mailed on Jul. 2, 2021, 4 pages (1 page of English Translation and 3 pages of Official Copy).
Office Action received for European Patent Application No. 19156614.0, mailed on Jul. 16, 2021, 10 pages.
Summons to Oral Proceedings received for German Patent Application No. 112008000144.8, mailed on Jun. 11, 2021, 18 pages (4 pages of English Translation and 14 pages of Official Copy).
Applicant-Initiated Interview Summary received for U.S. Appl. No. 16/734,173, mailed on Sep. 9, 2021, 2 pages.
Applicant-Initiated Interview Summary received for U.S. Appl. No. 16/775,528, mailed on Aug. 30, 2021, 4 pages.
Non-Final Office Action received for U.S. Appl. No. 16/775,528, mailed on Sep. 13, 2021, 14 pages.
Notice of Allowance received for Korean Patent Application No. 10-2021-7005523, mailed on Aug. 26, 2021, 4 pages (1 page of English Translation and 3 pages of Official Copy).
Minutes of the Oral Proceedings received for European Patent Application No. 11182963.6, mailed on Dec. 18, 2020, 4 pages.
Notice of Acceptance received for Australian Patent Application No. 2019206101, mailed on Dec. 11, 2020, 3 pages.
Notice of Allowance received for Korean Patent Application No. 10-2020-7024816, mailed on Nov. 27, 2020, 3 pages (1 page of English Translation and 2 pages of Official Copy).
Office Action received for Chinese Patent Application No. 201580077206.7, mailed on Nov. 11, 2020, 11 pages (5 pages of English Translation and 6 pages of Official Copy).
Applicant Initiated Interview Summary received for U.S. Appl. No. 16/871,995, mailed on Dec. 6, 2021, 4 pages.
Corrected Notice of Allowance received for U.S. Appl. No. 17/103,436, mailed on Dec. 22, 2021, 2 pages.
Corrected Notice of Allowance received for U.S. Appl. No. 17/200,672, mailed on Dec. 13, 2021, 4 pages.
Intention to Grant received for European Patent Application No. 19185318.3, mailed on Dec. 10, 2021, 12 pages.
Notice of Acceptance received for Australian Patent Application No. 2019337519, mailed on Dec. 15, 2021, 3 pages.
Notice of Allowance received for U.S. Appl. No. 17/103,436, mailed on Dec. 8, 2021, 12 pages.
Office Action received for European Patent Application No. 19217240.1, mailed on Dec. 17, 2021, 8 pages.
Non-Final Office Action received for U.S. Appl. No. 16/734,173, mailed on Nov. 2, 2021, 13 pages.
Notice of Allowance received for Taiwanese Patent Application No. 104107318, mailed on Oct. 19, 2021, 5 pages (2 page of English Translation and 3 pages of Official Copy).
Office Action received for Indian Patent Application No. 202018012249, mailed on Nov. 1, 2021, 6 pages.
Office Action received for Japanese Patent Application No. 2021-510409, mailed on Oct. 8, 2021, 9 pages (5 pages of English Translation and 4 pages of Official Copy).
Applicant Initiated Interview Summary received for U.S. Appl. No. 16/144,950, mailed on Jan. 29, 2020, 5 pages.
Applicant Initiated Interview Summary received for U.S. Appl. No. 15/818,500, mailed on Jan. 30, 2020, 5 pages.
Decision on Appeal received for Korean Patent Application No. 10-2018-7010872, mailed on Jan. 20, 2020, 20 pages (3 pages of English Translation and 17 pages of Official Copy).
Decision to Grant received for European Patent Application No. 17186896.1, mailed on Jan. 23, 2020, 3 pages.
Final Office Action received for U.S. Appl. No. 15/655,253, mailed on Feb. 4, 2020, 20 pages.
International Search Report and Written Opinion received for PCT Patent Application No. PCT/US2019/049237, mailed on Jan. 8, 2020, 21 pages.
Notice of Allowance received for U.S. Appl. No. 14/913,345, mailed on Feb. 10, 2020, 10 pages.
Office Action received for European Patent Application No. 19206249.5, mailed on Jan. 20, 2020, 8 pages.
Office Action received for Indian Patent Application No. 201617009216, mailed on Jan. 24, 2020, 6 pages.
Decision to Grant received for European Patent Application No. 19199004.3, mailed on Jan. 21, 2021, 2 pages.
Notice of Allowance received for Chinese Patent Application No. 201810074876.9, mailed on Jan. 12, 2021, 2 pages (1 page of English Translation and 1 page of Official Copy).
Notice of Allowance received for U.S. Appl. No. 16/358,483, mailed on Jan. 19, 2021, 9 pages.
Notice of Allowance received for U.S. Appl. No. 16/794,111, mailed on Jan. 22, 2021, 7 pages.
Office Action received for European Patent Application No. 19206249.5, mailed on Jan. 11, 2021, 8 pages.
Android Central, "Gmail on iOS versus Android", Online Available at: https://www.youtube.com/watch?v=w2aVeZLxU5Q&t=80s, Nov. 2, 2011, 3 pages.
Final Office Action received for U.S. Appl. No. 16/871,995, mailed on Aug. 20, 2021, 25 pages.
Summons to Oral Proceedings received for German Patent Application No. 112008000144.8, mailed on Jul. 31, 2021, 2 pages (1 page of English Translation and 1 page of Official Copy).
Applicant-Initiated Interview Summary received for U.S. Appl. No. 16/263,280, mailed on Apr. 26, 2021, 2 pages.
Non-Final Office Action received for U.S. Appl. No. 16/871,995, mailed on Apr. 26, 2021, 14 pages.
Office Action received for Australian Patent Application No. 2019257521, mailed on Apr. 8, 2021, 6 pages.
Office Action received for Korean Patent Application No. 10-2021-7001482, mailed on Apr. 9, 2021, 10 pages (4 pages of English Translation and 6 pages of Official Copy).
Applicant-Initiated Interview Summary received for U.S. Appl. No. 16/525,082, mailed on Jul. 28, 2020, 4 pages.
Decision to Grant received for European Patent Application No. 14772494.2, mailed on Jul. 23, 2020, 2 pages.
Non-Final Office Action received for U.S. Appl. No. 16/263,280, mailed on Jul. 27, 2020, 11 pages.
Non-Final Office Action received for U.S. Appl. No. 16/734,173, mailed on Jul. 23, 2020, 16 pages.
Notice of Allowance received for U.S. Appl. No. 15/930,300, mailed on Aug. 5, 2020, 14 pages.
Notice of Allowance received for U.S. Appl. No. 14/641,308, mailed on Jan. 15, 2020, 7 pages.
Office Action received for Canadian Patent Application No. 3,028,777, mailed on Dec. 30, 2019, 6 pages.
Office Action received for Chinese Patent Application No. 201910454076.4, mailed on Dec. 18, 2019, 14 pages (7 pages of English Translation and 7 pages of Official Copy).
Office Action received for Danish Patent Application No. PA201970259, mailed on Jan. 15, 2020, 4 pages.
Office Action received for Indian Patent Application No. 201617008291, mailed on Jan. 14, 2020, 7 pages.
Office Action received for Indian Patent Application No. 201617008296, mailed on Jan. 14, 2020, 7 pages.
Applicant-Initiated Interview Summary received for U.S. Appl. No. 15/818,500, mailed on Aug. 9, 2021, 6 pages.
Corrected Notice of Allowance received for U.S. Appl. No. 16/263,280, mailed on Aug. 5, 2021, 4 pages.
FTScroller v0.2.2, Online available at: https://github.com/ftlabs/ftscroller/tree/v0.2.2, Mar. 18, 2013, 9 pages.
Narayanaswami et al., "Challenges and considerations for the design and production of a purpose-optimized body-worn wristwatch computer", Online available at: https://www.spiedigitallibrary.org/conference-proceedings-of-spie/5443/0000/Challenges-and-considerations-for-the-design-and-production-of-a/10.1117/12.561263.short?SSO=1, Defense and Security, Florida, United States, Sep. 15, 2004, 13 pages.
Office Action received for Australian Patent Application No. 2019257521, mailed on Jul. 27, 2021, 6 pages.

(56) References Cited

OTHER PUBLICATIONS

Office Action received for Korean Patent Application No. 10-2021-7017259, mailed on Jul. 19, 2021, 10 pages (4 pages of English Translation and 6 pages of Official Copy).
Office Action received for Taiwanese Patent Application No. 104107318, mailed on Jul. 9, 2021, 5 pages (2 pages of English Translation and 3 pages of Official Copy).
Board Opinion received for Chinese Patent Application No. 201580046339.8, mailed on Mar. 19, 2021, 11 pages (3 pages of English Translation and 8 pages of Official Copy).
European Search Report received for European Patent Application No. 20217518.8, mailed on Apr. 16, 2021, 4 pages.
Office Action received for Japanese Patent Application No. 2019-116590, mailed on Mar. 15, 2021, 6 pages (3 pages of English Translation and 3 pages of Official Copy).
Office Action received for Korean Patent Application No. 10-2021-7005523, mailed on Mar. 31, 2021, 8 pages (3 pages of English Translation and 5 pages of Official Copy).
Non-Final Office Action received for U.S. Appl. No. 16/525,082, mailed on Jul. 9, 2020, 20 pages.
Non-Final Office Action received for U.S. Appl. No. 16/794,111, mailed on Jul. 9, 2020, 6 pages.
Office Action received for Chinese Patent Application No. 201580046339.8, mailed on Jun. 3, 2020, 19 pages (10 pages of English Translation and 9 pages of Official Copy).
Advisory Action received for U.S. Appl. No. 16/144,950, mailed on Feb. 20, 2020, 5 pages.
Corrected Notice of Allowance received for U.S. Appl. No. 15/483,743, mailed on Feb. 21, 2020, 5 pages.
Decision on Appeal received for Korean Patent Application No. 10-2016-7008474, mailed on Jan. 29, 2020, 21 pages (2 pages of English Translation and 19 pages of Official Copy).
Decision to Grant received for European Patent Application No. 14772002.3, mailed on Feb. 20, 2020, 2 pages.
Notice of Allowance received for Korean Patent Application No. 10-2018-7010872, mailed on Feb. 10, 2020, 6 pages (2 pages of English Translation and 4 pages of Official Copy).
Office Action received for Indian Patent Application No. 201617009428, mailed on Feb. 26, 2020, 7 pages.
Office Action received for Korean Patent Application No. 10-2017-7024506, mailed on Feb. 19, 2020, 12 pages (5 pages of English Translation and 7 pages of Official Copy).
"A truly Inventive Invention", Dec. 23, 2014, 4 pages.
Advisory Action received for U.S. Appl. No. 14/624,518, mailed on Sep. 27, 2016, 3 pages.
Advisory Action received for U.S. Appl. No. 15/049,058, mailed on Oct. 18, 2017, 3 pages.
Advisory Action received for U.S. Appl. No. 15/049,064, mailed on May 10, 2017, 3 Pages.
"*Apple Inc.* Vs. *Samsung Electronics Co. Ltd.*", Case No. 11-CV-01846-LHK, Aug. 9, 2011, 85 pages.
"*Apple Inc.* Vs. *Samsung Electronics GmbH*", Jul. 26, 2012, 27 pages.
"*Apple Inc.* Vs. *Samsung Electronics GmbH*", Landgericht Mannheim 7. Zivilkammer Beschluss, Feb. 8, 2013, 13 pages.
"*Apple* Vs. *Samsung Electronics GmbH*", Landgericht Munchen 1, 21 O 26022/11, Feb. 27, 2012, 16 pages.
Applicant Initiated Interview Summary received for U.S. Appl. No. 14/913,345, mailed on Nov. 4, 2019, 5 pages.
Applicant Initiated Interview Summary received for U.S. Appl. No. 15/655,253, mailed on Nov. 12, 2019, 3 pages.
Auxiliary request in the Opposition Proceedings against the European Patent No. 08713567.9, filed on Dec. 5, 2014, 77 pages.
Bederson et al., "Photo Mesa 3.1.2 Screen Shots", Windsor Interfaces. Inc., 2004-2006, 5 pages.
Brinkmann, Martin, "How To Zoom In Firefox", Ghacks, Available at <https://web.archive.org/web/20130804034728/https://www.ghacks.net/2009/02/23/how-to-zoom-in-firefox/>, Feb. 23, 2009, 11 pages.
Butz, Andreas, "Expert Statement Regarding European Patent No. 2126678", Sep. 21, 2013, 31 pages.

Corrected Notice of Allowance received for U.S. Appl. No. 14/624,518, mailed on Feb. 13, 2017, 5 Pages.
Corrected Notice of Allowance received for U.S. Appl. No. 14/624,518, mailed on Jan. 20, 2017, 5 pages.
Corrected Notice of Allowance received for U.S. Appl. No. 14/841,656, mailed on Apr. 11, 2018, 2 pages.
Corrected Notice of Allowance received for U.S. Appl. No. 14/841,656, mailed on May 7, 2018, 14 pages.
Decision on Appeal received for European Patent Application No. 08713567.9, mailed on Sep. 10, 2018, 36 pages.
Decision on Appeal received for Korean Patent Application No. 10-2015-7022918, mailed on Oct. 29, 2018, 20 pages.
Decision on Appeal received for Korean Patent Application No. 10-2016-7008488, mailed on Oct. 18, 2019, 33 pages.
Decision to Grant received for Danish Patent Application No. PA201770181, mailed on Mar. 7, 2018, 2 pages.
Decision to Grant received for European Patent Application No. 11182954.5, mailed on Aug. 10, 2017, 3 pages.
Decision to Grant received for European Patent Application No. 11182959.4, mailed on Feb. 2, 2017, 3 pages.
Decision to Grant received for European Patent Application No. 18157131.6, mailed on May 16, 2019, 2 pages.
Decision to Grant received for European Patent Application No. 11182962.8, mailed on Jun. 22, 2017, 3 pages.
Decision to Refuse received for European Patent Application No. 11182963.6, mailed on Mar. 28, 2017, 17 pages.
Decision to Revoke Patent received for European Patent Application No. 08713567.9. mailed on Jun. 23, 2015, 50 pages.
"Declaration of Benjamin B. Bederson", *Apple Inc.* vs. *Samsung Electronics Co., Ltd.*, Case No. 11-cv-01846-LHK, Document 165, Filed on Aug. 22, 2011, 12 pages.
Extended European Search Report received for European Patent Application No. 11182954.5, mailed on Nov. 29, 2011, 6 pages.
Extended European Search Report received for European Patent Application No. 11182959.4, mailed on Nov. 30, 2011, 7 pages.
Extended European Search Report received for European Patent Application No. 11182962.8, mailed on Dec. 1, 2011, 8 pages.
Extended European Search Report received for European Patent Application No. 11182963.6, mailed on Dec. 1, 2011, 7 pages.
Extended European Search Report received for European Patent Application No. 17186896.1, mailed on Dec. 15, 2017, 9 pages.
Final Office Action received for U.S. Appl. No. 12/270,815, mailed on Feb. 14, 2013, 12 pages.
Final Office Action received for U.S. Appl. No. 14/624,518, mailed on Jul. 13, 2016, 10 pages.
Final Office Action received for U.S. Appl. No. 14/913,345, mailed on Oct. 26, 2018, 20 pages.
Final Office Action received for U.S. Appl. No. 15/049,049 mailed on Jul. 12, 2018, 24 pages.
Final Office Action received for U.S. Appl. No. 15/049,049, mailed on May 23, 2017, 23 pages.
Final Office Action received for U.S. Appl. No. 15/049,058, mailed on Aug. 8, 2018, 23 pages.
Final Office Action received for U.S. Appl. No. 15/049,058, mailed on May 8, 2017, 21 pages.
Final Office Action received for U.S. Appl. No. 15/049,064, mailed on Feb. 27, 2017, 13 Pages.
Grounds of appeal against revocation of European Patent No. EP 2126678, Nov. 3, 2015, 41 pages.
Han, Jeff, "Jeff Han Demos his Breakthrough Touchscreen", TED, Ideas Worth Spreading, available at <http://www.ted.com/talks/jeff_han_demos_his_breakthrough_touchscreen.html>, retrieved on May 8, 2012, 12 pages.
Han, Jeff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, Aug. 2006, 2 pages.
Intention to Grant received for European Patent Application No. 11182954.5, mailed on Mar. 31, 2017, 10 pages.
Intention to Grant received for European Patent Application No. 11182959.4, mailed on Dec. 9, 2016, 9 pages.
Intention to Grant received for European Patent Application No. 14772002.3, mailed on Jun. 24, 2019, 9 pages.

(56) References Cited

OTHER PUBLICATIONS

Intention to Grant received for European Patent Application No. 14772002.3, mailed on Nov. 6, 2019, 9 pages.
Intention to Grant received for European Patent Application No. 17186896.1, mailed on Jul. 25, 2019, 9 pages.
Intention to Grant received for European Patent Application No. 18157131.6, mailed on Jan. 9, 2019, 9 pages.
Intention to Grant received for European Patent Application No. 11182962.8, mailed on Feb. 6, 2017, 9 Pages.
International Preliminary Report on Patentability received for PCT Patent Application No. PCT/US2008/050292, mailed on Mar. 26, 2013, 17 pages.
International Preliminary Report on Patentability received for PCT Patent Application No. PCT/US2014/053951, mailed on Mar. 17, 2016, 9 pages.
International Preliminary Report on Patentability received for PCT Patent Application No. PCT/US2014/053958, mailed on Mar. 17, 2016, 8 pages.
International Preliminary Report on Patentability received for PCT Patent Application No. PCT/US2014/053961, mailed on Jul. 21, 2016, 24 pages.
International Preliminary Report on Patentability received for PCT Patent Application No. PCT/US2016/019637, mailed on Sep. 21, 2017, 12 pages.
International Search Report and Written Opinion received for PCT Patent Application No. PCT/US2008/050292, mailed on Sep. 19, 2008, 19 pages.
International Search Report and Written Opinion received for PCT Patent Application No. PCT/US2014/053951, mailed on Dec. 8, 2014, 11 pages.
International Search Report and Written Opinion received for PCT Patent Application No. PCT/US2014/053958, mailed on Feb. 19, 2015, 10 pages.
International Search Report and Written Opinion received for PCT Patent Application No. PCT/US2016/019637, mailed on Aug. 18, 2016, 18 pages.
International Search Report received for PCT Patent Application No. PCT/US2014/053961, mailed on Jul. 11, 2016, 10 pages.
International Written Opinion received for PCT Patent Application No. PCT/US2014/053961, mailed on Jul. 11, 2016, 22 pages.
Invitation to Pay Additional Fees received for PCT Patent Application No. PCT/US2008/050292, mailed on Jul. 18, 2008, 4 pages.
Invitation to Pay Additional Fees received for PCT Patent Application No. PCT/US2014/053961, mailed on Aug. 3, 2015, 6 pages.
Invitation to Pay Additional Fees received for PCT Patent Application No. PCT/US2016/019637, mailed on Jun. 1, 2016, 6 pages.
"IOS Security", White Paper, Available online at <https://web.archive.org/web/20150526223200/http://www.apple.com/business/docs/iOS_Security_Guide.pdf>, Apr. 2015, 55 pages.
"iPhone", Wikipedia, the free Encyclopedia, retrieved on Aug. 18, 2017, 46 pages.
Kamijo, Noboru, "Next Generation Mobile System—WatchPad1.5", Available at <http://researcher.ibm.com/researcher/view_group_subpage.php?id=5617>, retrieved on Jul. 4, 2015, 2 pages.
Karlson et al., "Applens and Launch Tile: Two Designs for One-Handed Thumb Use on Small Devices", CHI 2005, Apr. 2-7, 2005, 10 pages.
Klemmer, Scott, "Declaration of Scott Klemmer", in the matter of European Patent No. EP21266788, Nov. 1, 2015, 3 pages.
Koren, J., "Including Images in Web Pages", http://unsco.org/webworld/infotraining/inline.html, 1998, 4 pages.
"Landgericht Dusseldorf Geschaftsstelle", Jun. 18, 2014, 2 pages.
"Microsoft Word 2003 Screenshots", 1983-2003, 2 pages.
Minutes of the Oral Proceedings received for European Application No. 08713567.9, mailed on Jun. 29, 2018, 6 pages.
"Motorola Mobility Germany GmbH Vs. Samsung Electronics GmbH", Bundespatentgericht, Sep. 26, 2013, 50 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.

Non-Final Office Action received for U.S. Appl. No. 14/624,518, mailed on Nov. 23, 2015, 10 pages.
Non-Final Office Action received for U.S. Appl. No. 12/270,805, mailed on Oct. 11, 2011, 27 pages.
Non-Final Office Action received for U.S. Appl. No. 12/270,807, mailed on Oct. 11, 2011, 26 pages.
Non-Final Office Action received for U.S. Appl. No. 12/270,810, mailed on Oct. 12, 2011, 12 pages.
Non-Final Office Action received for U.S. Appl. No. 12/270,812, mailed on May 17, 2012, 14 pages.
Non-Final Office Action received for U.S. Appl. No. 12/270,812, mailed on Oct. 13, 2011, 12 pages.
Non-Final Office Action received for U.S. Appl. No. 12/270,815, mailed on Aug. 23, 2013, 12 pages.
Non-Final Office Action received for U.S. Appl. No. 12/270,815, mailed on Jul. 11, 2014, 12 pages.
Non-Final Office Action received for U.S. Appl. No. 12/270,815, mailed on May 17, 2012, 13 pages.
Non-Final Office Action received for U.S. Appl. No. 12/270,815, mailed on Oct. 11, 2011, 12 pages.
Non-Final Office Action received for U.S. Appl. No. 14/841,656, mailed on Jul. 26, 2017, 20 pages.
Non-Final Office Action received for U.S. Appl. No. 14/913,345, mailed on Apr. 5, 2018, 15 pages.
Non-Final Office Action received for U.S. Appl. No. 14/913,350, mailed on May 14, 2018, 30 pages.
Non-Final Office Action received for U.S. Appl. No. 15/049,049, mailed on Dec. 15, 2017, 23 pages.
Non-Final Office Action received for U.S. Appl. No. 15/049,049, mailed on Feb. 6, 2019, 21 pages.
Non-Final Office Action received for U.S. Appl. No. 15/049,049, mailed on Nov. 9, 2016, 21 pages.
Non-Final Office Action received for U.S. Appl. No. 15/049,058, mailed on Feb. 20, 2018, 21 pages.
Non-Final Office Action received for U.S. Appl. No. 15/049,058, mailed on Jun. 5, 2019, 25 pages.
Non-Final Office Action received for U.S. Appl. No. 15/049,058, mailed on Nov. 16, 2016, 19 pages.
Non-Final Office Action received for U.S. Appl. No. 15/049,064, mailed on Oct. 27, 2016, 15 pages.
Non-Final Office Action received for U.S. Appl. No. 15/483,743, mailed on Mar. 21, 2019, 10 pages.
Non-Final Office Action received for U.S. Appl. No. 15/655,253, mailed on Jul. 10, 2019, 16 pages.
Non-Final Office Action received for U.S. Appl. No. 14/624,518, mailed on Mar. 25, 2016, 8 pages.
Non-Final Office Action received for U.S. Appl. No. 14/913,345, mailed on Jun. 26, 2019, 23 pages.
Notice of Acceptance received for Australian Patent Application No. 2012200689, mailed on Jun. 9, 2015, 2 pages.
Notice of Acceptance received for Australian Patent Application No. 2014315319, mailed on Oct. 12, 2017, 3 pages.
Notice of Acceptance received for Australian Patent Application No. 2014315325, mailed on Apr. 19, 2017, 3 pages.
Notice of Acceptance received for Australian Patent Application No. 2015201905, mailed on Jan. 13, 2017, 3 pages.
Notice of Acceptance received for Australian Patent Application No. 2017202917, mailed on Jun. 7, 2019, 3 pages.
Notice of Acceptance received for Australian Patent Application No. 2018200289, mailed on Jul. 23, 2019, 3 pages.
Notice of Acceptance received for Australian Patent Application No. 2019201628, mailed on Sep. 10, 2019, 3 pages.
Notice of Allowance received for Canadian Patent Application No. 2,759,066, mailed on Nov. 4, 2014, 1 page.
Notice of Allowance received for Canadian Patent Application No. 2,759,090, mailed on Jun. 23, 2015, 1 page.
Notice of Allowance received for Canadian Patent Application No. 2,759,091, mailed on Apr. 8, 2016, 1 page.
Notice of Allowance received for Canadian Patent Application No. 2,890,732, mailed on Apr. 19, 2017, 1 page.
Notice of Allowance received for Canadian Patent Application No. 2,915,678, mailed on Dec. 27, 2017, 1 page.

(56) References Cited

OTHER PUBLICATIONS

Notice of Allowance received for Canadian Patent Application No. 2,944,195, mailed on Jun. 27, 2018, 1 page.
Notice of Allowance received for Chinese Patent Application No. 201210573107.6, mailed on Oct. 30, 2017, 3 pages.
Notice of Allowance received for Chinese Patent Application No. 201210570519.4, issued on Jan. 20, 2017, 4 pages.
Notice of Allowance received for Chinese Patent Application No. 201310024905.8, mailed on Jul. 11, 2017, 2 pages.
Notice of Allowance received for Chinese Patent Application No. 201480059543.9, mailed on Sep. 4, 2019, 2 pages.
Notice of Allowance received for Chinese Patent Application No. 201480060082.7, mailed on Mar. 12, 2019, 2 pages.
Notice of Allowance received for Danish Patent Application No. PA201670118, mailed on Mar. 30, 2017, 2 pages.
Notice of Allowance received for Japanese Patent Application No. 2013-102576, mailed on Dec. 8, 2014, 3 pages.
Notice of Allowance received for Japanese Patent Application No. 2014-140817, mailed on Mar. 31, 2017, 3 pages.
Notice of Allowance received for Japanese Patent Application No. 2016-537945, mailed on Aug. 3, 2018, 4 pages.
Notice of Allowance received for Japanese Patent Application No. 2016-537947, mailed on Jun. 5, 2017, 3 pages.
Notice of Allowance received for Japanese Patent Application No. 2016-537948, mailed on Nov. 11, 2019, 3 pages.
Notice of Allowance received for Japanese Patent Application No. 2017-090133, mailed on Jul. 27, 2018, 4 pages.
Notice of Allowance received for Japanese Patent Application No. 2017-545561, mailed on Jul. 12, 2019, 4 pages.
Notice of Allowance received for Japanese Patent Application No. 2018-090084, mailed on May 24, 2019, 4 pages.
Notice of Allowance received for Japanese Patent Application No. 2018-143982, mailed on Apr. 8, 2019, 4 pages.
Notice of Allowance received for Korean Patent Application No. 10-2013-7034633, mailed on Oct. 31, 2016, 3 pages.
Notice of Allowance received for Korean Patent Application No. 10-2015-7022918, mailed on Nov. 27, 2018, 4 pages.
Notice of Allowance received for Korean Patent Application No. 10-2016-7008488, mailed on Oct. 25, 2019, 4 pages.
Notice of Allowance received for Korean Patent Application No. 10-2017-7002923, mailed on Feb. 28, 2018, 3 pages.
Notice of Allowance received for Korean Patent Application No. 10-2018-7002695, mailed on Oct. 8, 2018, 5 pages.
Notice of Allowance received for Korean Patent Application No. 10-2018-7010593, mailed on Jan. 30, 2019, 3 pages.
Notice of Allowance received for Korean Patent Application No. 10-2018-7032106, mailed on Jun. 28, 2019, 5 pages.
Notice of Allowance received for Taiwanese Patent Application No. 103130518, mailed on May 19, 2016, 2 pages.
Notice of Allowance received for Taiwanese Patent Application No. 103130519, mailed on Oct. 27, 2016, 3 pages.
Notice of Allowance received for Taiwanese Patent Application No. 103130520, mailed on Apr. 25, 2018, 4 pages.
Notice of Allowance received for U.S. Appl. No. 11/956,969, mailed on Oct. 29, 2008, 6 pages.
Notice of Allowance received for U.S. Appl. No. 12/270,805, mailed on May 17, 2012, 14 pages.
Notice of Allowance received for U.S. Appl. No. 12/270,807, mailed on May 11, 2012, 12 pages.
Notice of Allowance received for U.S. Appl. No. 12/270,810, mailed on Jul. 11, 2012, 17 pages.
Notice of Allowance received for U.S. Appl. No. 12/270,812, mailed on Sep. 19, 2012, 20 pages.
Notice of Allowance received for U.S. Appl. No. 12/270,815, mailed on Jan. 28, 2015, 12 pages.
Notice of Allowance received for U.S. Appl. No. 14/624,518, mailed on Dec. 30, 2016, 8 pages.
Notice of Allowance received for U.S. Appl. No. 14/841,656, mailed on Feb. 12, 2018, 9 pages.
Notice of Allowance received for U.S. Appl. No. 14/841,656, mailed on Mar. 5, 2018, 3 pages.
Notice of Allowance received for U.S. Appl. No. 14/913,350, mailed on Dec. 19, 2018, 27 pages.
Notice of Allowance received for U.S. Appl. No. 15/049,049, mailed on Jul. 25, 2019, 8 pages.
Notice of Allowance received for U.S. Appl. No. 15/049,064, mailed on Jul. 18, 2017, 24 pages.
Notice of Allowance received for U.S. Appl. No. 15/483,743, mailed on Nov. 18, 2019, 7 pages.
Notice of Intent to Issue a Reexam Certificate received for U.S. Appl. No. 90/010,963, mailed on Jan. 13, 2011, 9 pages.
Notice of Intent to Issue a Reexam Certificate received for U.S. Appl. No. 90/012,304, mailed on Jun. 12, 2013, 12 pages.
Office Action and Search Report received for Danish Patent Application No. PA201670118, mailed on Jul. 1, 2016, 7 pages.
Office Action received for Australian Patent Application No. 2012200689, mailed on Sep. 9, 2013, 3 pages.
Office Action received for Australian Patent Application No. 2014315234, mailed on Jul. 12, 2017, 4 pages.
Office Action received for Australian Patent Application No. 2014315234, mailed on Nov. 2, 2016, 3 pages.
Office Action received for Australian Patent Application No. 2014315319, mailed on Aug. 3, 2017, 3 pages.
Office Action received for Australian Patent Application No. 2014315319, mailed on Oct. 17, 2016, 3 pages.
Office Action received for Australian Patent Application No. 2014315325, mailed on Nov. 3, 2016, 3 pages.
Office Action received for Australian Patent Application No. 2015201905, issued on May 9, 2016, 3 pages.
Office Action received for Australian Patent Application No. 2016229407, mailed on Aug. 15, 2018, 4 pages.
Office Action received for Australian Patent Application No. 2016229407, mailed on May 27, 2019, 4 pages.
Office Action received for Australian Patent Application No. 2017202917, mailed on Jul. 20, 2018, 3 pages.
Office Action received for Australian Patent Application No. 2017254897, mailed on Aug. 29, 2018, 4 pages.
Office Action received for Australian Patent Application No. 2017254897, mailed on Jun. 28, 2019, 4 pages.
Office Action received for Australian Patent Application No. 2018200289, mailed on Apr. 9, 2019, 5 pages.
Office Action received for Australian Patent Application No. 2018200289, mailed on Dec. 4, 2018, 4 pages.
Office Action received for Australian Patent Application No. 2018200998, mailed on Jan. 30, 2019, 4 pages.
Office Action received for Australian Patent Application No. 2018200998, mailed on Mar. 9, 2018, 5 pages.
Office Action received for Australian Patent Application No. 2019201628, mailed on May 13, 2019, 2 pages.
Office Action received for Australian Patent Application No. 2019216614, mailed on Aug. 22, 2019, 3 pages.
Office Action received for Australian Patent Application No. 2014315234, mailed on Apr. 19, 2017, 4 pages.
Office Action received for Canadian Patent Application No. 2,759,091, mailed on Oct. 8, 2015, 3 pages.
Office Action received for Canadian Patent Application No. 2,759,066, mailed on Nov. 4, 2013, 3 pages.
Office Action received for Canadian Patent Application No. 2,759,090, mailed on Nov. 4, 2013, 3 pages.
Office Action received for Canadian Patent Application No. 2,759,090, mailed on Oct. 29, 2014, 4 pages.
Office Action received for Canadian Patent Application No. 2,759,091, mailed on Oct. 31, 2014, 6 pages.
Office Action received for Canadian Patent Application No. 2,890,732, mailed on May 12, 2016, 5 pages.
Office Action received for Canadian Patent Application No. 2,915,678, mailed on Aug. 6, 2018, 4 pages.
Office Action received for Canadian Patent Application No. 2,915,678, mailed on Aug. 19, 2019, 4 pages.
Office Action received for Canadian Patent Application No. 2,915,678, mailed on Jan. 23, 2017, 5 pages.

(56) References Cited

OTHER PUBLICATIONS

Office Action received for Canadian Patent Application No. 2,944,195, mailed on Jul. 26, 2017, 3 pages.
Office Action received for Chinese Patent Application No. 201210570519.4, mailed on Dec. 23, 2014, 15 pages.
Office Action received for Chinese Patent Application No. 201210570519.4, mailed on Jul. 6, 2016, 6 pages.
Office Action received for Chinese Patent Application No. 201210570519.4, mailed on Oct. 23, 2015, 11 pages.
Office Action received for Chinese Patent Application No. 201210570760.7, mailed on Dec. 2, 2014, 7 pages.
Office Action received for Chinese Patent Application No. 201210573107.6, mailed on Apr. 21, 2015, 9 pages.
Office Action received for Chinese Patent Application No. 201210573107.6, mailed on Mar. 3, 2016, 14 pages.
Office Action received for Chinese Patent Application No. 2012105731076, mailed on Jan. 25, 2017, 10 pages.
Office Action received for Chinese Patent Application No. 201310024905.8 mailed on Apr. 30, 2015, 21 pages.
Office Action received for Chinese Patent Application No. 201310024905.8, mailed on Feb. 6, 2016, 9 pages.
Office Action received for Chinese Patent Application No. 201310024905.8, mailed on Oct. 21, 2016, 12 pages.
Office Action received for Chinese Patent Application No. 201480059543.9, mailed on Feb. 28, 2019, 16 pages.
Office Action received for Chinese Patent Application No. 201480059543.9, mailed on Jan. 26, 2018, 17 pages.
Office Action received for Chinese Patent Application No. 201480059543.9, mailed on Sep. 19, 2018, 18 pages.
Office Action received for Chinese Patent Application No. 201480060082.7, mailed on Jan. 26, 2018, 15 pages.
Office Action received for Chinese Patent Application No. 201480060082.7, mailed on Sep. 25, 2018, 6 pages.
Office Action received for Chinese Patent Application No. 201480060083.1, mailed on Aug. 13, 2019, 6 pages.
Office Action received for Chinese Patent Application No. 201480060083.1, mailed on Dec. 5, 2018, 11 pages.
Office Action received for Danish Patent Application No. PA201670118, mailed on Feb. 2, 2017, 2 pages.
Office Action received for Danish Patent Application No. PA201670118, mailed on Oct. 25, 2016, 3 pages.
Office Action received for Danish Patent Application No. PA201770181, mailed on Jan. 3, 2018, 2 pages.
Office Action received for Danish Patent Application No. PA201770181, mailed on Jun. 13, 2017, 6 pages.
Office Action received for European Application No. 08713567.9, mailed on Dec. 29, 2009, 5 pages.
Office Action received for European Patent Application No. 11182954.5, mailed on Nov. 19, 2014, 5 pages.
Office Action received for European Patent Application No. 11182959.4, mailed on Nov. 21, 2014, 3 pages.
Office Action received for European Patent Application No. 11182962.8, mailed on Nov. 21, 2014, 4 pages.
Office Action received for European Patent Application No. 11182963.6, mailed on Nov. 21, 2014, 4 pages.
Office Action received for European Patent Application No. 14771688.0, mailed on Jan. 21, 2019, 8 pages.
Office Action received for European Patent Application No. 14771688.0, mailed on May 31, 2018, 6 pages.
Office Action received for European Patent Application No. 14771688.0, mailed on Nov. 30, 2017, 15 pages.
Office Action received for European Patent Application No. 14771688.0, mailed on Sep. 16, 2019, 7 pages.
Office Action received for European Patent Application No. 14772002.3, mailed on Jul. 4, 2017, 8 pages.
Office Action received for European Patent Application No. 14772494.2, mailed on Jun. 20, 2017, 7 pages.
Office Action received for European Patent Application No. 14772494.2, mailed on Oct. 2, 2018, 9 pages.
Office Action received for European Patent Application No. 16710372.0, mailed on Feb. 22, 2019, 7 pages.
Office Action received for European Patent Application No. 17186896.1, mailed on Oct. 12, 2018, 5 pages.
Office Action received for European Patent Application No. 18157131.6, mailed on May 8, 2018, 12 pages.
Office Action received for Japanese Patent Application No. 2013-102576, mailed on Mar. 10, 2014, 4 pages.
Office Action received for Japanese Patent Application No. 2016-537945, mailed on Apr. 7, 2017, 6 pages.
Office Action received for Japanese Patent Application No. 2016-537945, mailed on Jan. 9, 2018, 5 pages.
Office Action received for Japanese Patent Application No. 2016-537947, mailed on Feb. 24, 2017, 6 pages.
Office Action received for Japanese Patent Application No. 2016-537948, mailed on Apr. 6, 2018, 5 pages.
Office Action received for Japanese Patent Application No. 2016-537948, mailed on Jun. 9, 2017, 10 pages.
Office Action received for Japanese Patent Application No. 2016-537948, mailed on Sep. 3, 2018, 4 pages.
Office Action received for Japanese Patent Application No. 2017-090133, mailed on Jan. 22, 2018, 14 pages.
Office Action received for Japanese Patent Application No. 2017-545561, mailed on Aug. 6, 2018, 8 pages.
Office Action received for Japanese Patent Application No. 2018-090084, mailed on Feb. 15, 2019, 6 pages.
Office Action received for Japanese Patent Application No. 2018-143982, mailed on Dec. 7, 2018, 10 pages.
Office Action received for Japanese Patent Application No. 2018-158547, mailed on Jul. 26, 2019, 7 pages.
Office Action received for Japanese Patent Application No. 2014-140817, mailed on Aug. 19, 2016, 8 pages.
Office Action received for Japanese Patent Application No. 2014-140817, mailed on Oct. 2, 2015, 6 pages.
Office Action received for Korean Patent Application No. 10-2013-7000337, mailed on Apr. 28, 2014, 7 pages.
Office Action received for Korean Patent Application No. 10-2013-7000337, mailed on Jun. 25, 2013, 7 pages.
Office Action received for Korean Patent Application No. 10-2013-7034633, mailed on Apr. 8, 2014, 4 pages.
Office Action received for Korean Patent Application No. 10-2013-7034633, mailed on Dec. 29, 2015, 10 pages.
Office Action received for Korean Patent Application No. 10-2013-7034633, mailed on Feb. 24, 2015, 3 pages.
Office Action received for Korean Patent Application No. 10-2015-7022918, mailed on Nov. 29, 2016, 6 pages.
Office Action received for Korean Patent Application No. 10-2016-7008474, mailed on Aug. 6, 2018, 10 pages.
Office Action received for Korean Patent Application No. 10-2016-7008474, mailed on Dec. 30, 2016, 10 pages.
Office Action received for Korean Patent Application No. 10-2016-7008474, mailed on May 15, 2018, 7 pages.
Office Action received for Korean Patent Application No. 10-2016-7008474, mailed on Nov. 27, 2017, 6 pages.
Office Action received for Korean Patent Application No. 10-2016-7008488, mailed on Feb. 8, 2018, 8 pages.
Office Action received for Korean Patent Application No. 10-2016-7008488, mailed on Jan. 12, 2017, 14 pages.
Office Action received for Korean Patent Application No. 10-2016-7008488, mailed on Nov. 27, 2017, 6 pages.
Office Action received for Korean Patent Application No. 10-2016-7008682, mailed on Dec. 30, 2016, 11 pages.
Office Action received for Korean Patent Application No. 10-2016-7008682, mailed on Feb. 8, 2018., 7 pages.
Office Action received for Korean Patent Application No. 10-2016-7008682, mailed on Nov. 27, 2017, 7 pages.
Office Action received for Korean Patent Application No. 10-2017-7002923, mailed on Apr. 28, 2017, 5 pages.
Office Action received for Korean Patent Application No. 10-2017-7024506, mailed on Aug. 12, 2019, 6 pages.
Office Action received for Korean Patent Application No. 10-2017-7024506, mailed on Sep. 28, 2018, 11 pages.

(56) References Cited

OTHER PUBLICATIONS

Office Action received for Korean Patent Application No. 10-2018-7002695, mailed on Feb. 27, 2018, 12 pages.
Office Action received for Korean Patent Application No. 10-2018-7002695, mailed on Jun. 19, 2018, 8 pages.
Office Action received for Korean Patent Application No. 10-2018-7010593, mailed on Jul. 11, 2018, 5 pages.
Office Action received for Korean Patent Application No. 10-2018-7013265, mailed on Aug. 10, 2018, 12 pages.
Office Action received for Korean Patent Application No. 10-2018-7013265, mailed on Jun. 14, 2019, 6 pages.
Office Action received for Korean Patent Application No. 10-2018-7032106, mailed on Dec. 26, 2018, 10 pages.
Office Action received for Korean Patent Application No. 10-2019-7012617, mailed on Jun. 29, 2019, 5 pages.
Office Action received for Korean Patent Application No. 10-2015-7022918, mailed on Dec. 17, 2015, 7 pages.
Office Action received for Taiwanese Patent Application No. 103130519, mailed on Mar. 25, 2016, 14 pages.
Office Action received for Taiwanese Patent Application No. 103130520, issued on Apr. 17, 2017, 8 pages.
Office Action received for Taiwanese Patent Application No. 103130520, issued on Jan. 23, 2018, 05 pages.
Office Action received for Taiwanese Patent Application No. 103130520, mailed on May 23, 2016, 38 pages.
Office Action received for Taiwanese Patent Application No. 103130520, mailed on Oct. 1, 2015, 58 pages.
Office Action received for Taiwanese Patent Application No. 103130520, mailed on Sep. 29, 2016, 39 pages.
Office communication received for the European Patent Application No. 08713567.9, mailed on Mar. 9, 2015, 4 pages.
"Oxford English Dictionary—The definitive Record of The English Language", Oxford University Press, Jun. 2015, 11 pages.
Raghunath et al., "User Interfaces for Applications on a Wrist Watch", Journal of Personal and Ubiquitous Computing, vol. 6, 2002, pp. 17-30.
Reexam Final Office Action received for U.S. Appl. No. 90/012,304, mailed on Mar. 29, 2013, 87 pages.
Reexam Non-Final Office Action received for U.S. Appl. No. 90/012,304, mailed on Oct. 15, 2012, 11 pages.
Search Report received for European Patent Application No. 18157131.6, mailed on Apr. 19, 2018, 4 pages.
Statement of appeal for the European Patent Application No. 08713567.9, filed on Mar. 10, 2016, 54 pages.
Summons to Attend Oral Proceedings received for European Patent Application No. 08713567.9, mailed on Feb. 27, 2018, 13 pages.
Summons to Attend Oral Proceedings received for European Patent Application No. 11182954.5, mailed on Aug. 12, 2016, 5 pages.
Summons to Attend Oral Proceedings received for European Patent Application No. 11182959.4, mailed on Jun. 23, 2016, 6 pages.
Summons to Attend Oral Proceedings received for European Patent Application No. 11182962.8, mailed on Jul. 4, 2016, 7 pages.
Summons to Attend Oral Proceedings received for European Patent Application No. 11182963.6, mailed on Jul. 14, 2016, 4 pages.
"The interview with a key person. IBM and Citizen met and applied Linux to a watch", ASCII Corporation, vol. 25, No. 12., Dec. 12, 2001, pp. 136-143.
Tidwell, Jenifer, "Designing Interfaces", Section 85, magnetism, Nov. 21, 2005, 2 pages.
"watchpad 1.5 demo", YouTube.com, Online Available at <https://www.youtube.com/watch?v=7xjvVbeUn80>, Uploaded on Jun. 20 2010, 2 pages.
"WatchPad 1.5", Online Available at http://web.archive.org/web/20011205071448/http://www.trl.IBM.com:80/projects/ngm/index_e.htm, Dec. 5, 2001, 2 pages.
Wikipedia, "Rotary encoder", Online Available at <https://en.wikipedia.org/wiki/Rotary_encoder>, Retrieved on May 17, 2017, 17 pages.
Notice of Allowance received for Korean Patent Application No. 10-2020-7022802, mailed on Mar. 4, 2021, 6 pages (2 pages of English Translation and 4 pages of Official Copy).
Notice of Allowance received for U.S. Appl. No. 16/384,726, mailed on Mar. 17, 2021, 9 pages.
Office Action received for European Patent Application No. 11182963.6, mailed on Mar. 15, 2021, 4 pages.
Office Action received for European Patent Application No. 19173371.6, mailed on Mar. 15, 2021, 6 pages.
Office Action received for European Patent Application No. 19173886.3, mailed on Mar. 16, 2021, 6 pages.
Office Action received for Indian Patent Application No. 201818001531, mailed on Mar. 12, 2021, 6 pages.
Intention to Grant received for European Patent Application No. 19199004.3, mailed on Sep. 14, 2020, 9 pages.
Intention to Grant received for Indian Patent Application No. 201617009216, mailed on Aug. 27, 2020, 2 pages.
Notice of Allowance received for U.S. Appl. No. 16/147,413, mailed on Sep. 17, 2020, 7 pages.
Office Action received for Australian Patent Application No. 2019272034, mailed on Sep. 14, 2020, 4 pages.
Advisory Action received for U.S. Appl. No. 15/655,253, mailed on May 11, 2021, 6 pages.
Extended European Search Report received for European Patent Application No. 20212893.0, mailed on May 3, 2021, 9 pages.
Notice of Allowance received for U.S. Appl. No. 16/358,483, mailed on May 17, 2021, 5 pages.
Office Action received for European Patent Application No. 20217518.8, mailed on Apr. 30, 2021, 8 pages.
Office Action received for Japanese Patent Application No. 2019-088503, mailed on Apr. 2, 2021, 6 pages (3 pages of English Translation and 3 pages of Official Copy).
Office Action received for Korean Patent Application No. 10-2021-7001918, mailed on May 7, 2021, 5 pages (2 pages of English Translation and 3 pages of Official Copy).
Extended European Search Report received for European Patent Application No. 19217240.1, mailed on May 25, 2020, 7 pages.
Non-Final Office Action received for U.S. Appl. No. 16/384,726, mailed on May 14, 2020, 16 pages.
Notice of Allowance received for Korean Patent Application No. 10-2019-7007748, mailed on May 6, 2020, 5 pages (1 page of English Translation and 4 pages of Official Copy).
Office Action received for Korean Patent Application No. 10-2019-7028736, mailed on May 7, 2020, 8 pages (3 pages of English Translation and 5 pages of Official Copy).
Corrected Notice of Allowance received for U.S. Appl. No. 16/358,483, mailed on Feb. 12, 2021, 4 pages.
Corrected Notice of Allowance received for U.S. Appl. No. 16/794,111, mailed on Feb. 16, 2021, 4 pages.
Decision of Board of Appeal received for European Patent Application No. 11182963.6, mailed on Feb. 4, 2021, 12 pages.
Final Office Action received for U.S. Appl. No. 15/655,253, mailed on Feb. 9, 2021, 16 pages.
Notice of Allowance received for Canadian Patent Application No. 3,028,777, mailed on Jan. 13, 2021, 1 page.
Notice of Allowance received for Chinese Patent Application No. 201580077206.7, mailed on Feb. 3, 2021, 2 pages (1 page of English Translation and 1 page of Official Copy).
Notice of Allowance received for Chinese Patent Application No. 201910454076.4, mailed on Feb. 4, 2021, 2 pages (1 page of English Translation and 1 page of Official Copy).
Applicant-Initiated Interview Summary received for U.S. Appl. No. 15/818,500, mailed on Oct. 13, 2020, 4 pages.
Applicant-Initiated Interview Summary received for U.S. Appl. No. 16/358,483, mailed on Sep. 28, 2020, 6 pages.
Summons to Attend Oral Proceedings received for European Patent Application No. 11182963.6, mailed on Sep. 17, 2020, 2 pages.
Applicant-Initiated Interview Summary received for U.S. Appl. No. 16/147,413, mailed on Jun. 2, 2020, 4 pages.
Notice of Allowance received for Korean Patent Application No. 10-2019-7012617, mailed on May 27, 2020, 3 pages (1 page of English Translation and 2 pages of Official Copy).

(56) References Cited

OTHER PUBLICATIONS

Board Decision received for Chinese Patent Application No. 201580046339.8, mailed on Jun. 22, 2021, 12 pages (1 page of English Translation and 11 pages of Official Copy).
Notice of Allowance received for Korean Patent Application No. 10-2020-7019035, mailed on Jun. 18, 2021, 4 pages (1 page of English Translation and 3 pages of Official Copy).
Pedersen, Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.
Tong et al., "Discussion About the Influence of Wearable Device on Mobile Operators' Service", Telecom science, Oct. 31, 2014, pp. 134-142 (Official Copy Only) (See Communication under 37 CFR § 1.98(a) (3)).
Office Action received for Australian Patent Application No. 2019257521, mailed on Aug. 7, 2020, 5 pages.
Office Action received for Canadian Patent Application No. 2,915,678, mailed on Jul. 21, 2020, 5 pages.
Office Action received for Chinese Patent Application No. 201680012759.9, mailed on Jun. 19, 2020, 20 pages (9 pages of English Translation and 11 pages of Official Copy).
Office Action received for Chinese Patent Application No. 201910454069.4, mailed on Jul. 24, 2020, 8 pages (5 pages of English Translation and 3 pages of Official Copy).
Applicant Initiated Interview Summary received for U.S. Appl. No. 15/655,253, mailed on Mar. 31, 2020, 5 pages.
Intention to Grant received for European Patent Application No. 14772494.2, mailed on Mar. 16, 2020, 10 pages.
Office Action received for Taiwanese Patent Application No. 104107318, mailed on Feb. 18, 2020, 10 pages (4 pages of English Translation and 6 pages of Official Copy).
Decision on Appeal received for Korean Patent Application No. 10-2018-7033888, mailed on Oct. 27, 2021, 34 pages (4 pages of English Translation and 30 pages of Official Copy).
Final Office Action received for U.S. Appl. No. 15/818,500, mailed on Nov. 30, 2021, 14 pages.
Notice of Allowance received for U.S. Appl. No. 17/200,672, mailed on Nov. 29, 2021, 9 pages.
Office Action received for Indian Patent Application No. 202018015998, mailed on Nov. 17, 2021, 6 pages.
Office Action received for Indian Patent Application No. 202018016000, mailed on Nov. 16, 2021, 6 pages.
Office Action received for Korean Patent Application No. 10-2021-7001918, mailed on Nov. 16, 2021, 12 pages (5 pages of English Translation and 7 pages of Official Copy).
Corrected Notice of Allowance received for U.S. Appl. No. 15/930,300, mailed on Dec. 24, 2020, 3 pages.
Corrected Notice of Allowance received for U.S. Appl. No. 16/147,413, mailed on Jan. 8, 2021, 7 pages.
Non-Final Office Action received for U.S. Appl. No. 16/734,173, mailed on Jan. 6, 2021, 14 pages.
Notice of Acceptance received for Australian Patent Application No. 2019272034, mailed on Dec. 14, 2020, 3 pages.
Advisory Action received for U.S. Appl. No. 16/734,173, mailed on Oct. 14, 2021, 3 pages.
Decision to Grant received for German Patent Application No. 112008000144.8, mailed on Sep. 28, 2021, 11 pages (1 page of English Translation and 10 pages of Official Copy).
Office Action received for Australian Patent Application No. 2019337519, mailed on Oct. 8, 2021, 7 pages.
Non-Final Office Action received for U.S. Appl. No. 14/913,349, mailed on Apr. 22, 2020, 20 pages.
Non-Final Office Action received for U.S. Appl. No. 16/358,483, mailed on May 1, 2020, 37 pages.
Office Action received for Chinese Patent Application No. 201910164962.3, mailed on Apr. 8, 2020, 25 pages (13 pages of English Translation and 12 pages of Official Copy).
Office Action received for Taiwanese Patent Application No. 103130518, mailed on Oct. 15, 2015, 7 pages (3 pages of English Translation and 4 pages of Official Copy).
Notice of Allowance received for Japanese Patent Application No. 2018-158547, mailed on Jul. 3, 2020, 4 pages (1 page of English Translation and 3 pages of Official Copy).
Notice of Allowance received for U.S. Appl. No. 16/147,413, mailed on Jul. 20, 2020, 11 pages.
Office Action received for Australian Patent Application No. 2019206101, mailed on Jul. 14, 2020, 4 pages.
Office Action received for Korean Patent Application No. 10-2017-7024506, mailed on Jul. 8, 2020, 6 pages (3 pages of English Translation and 3 pages of Official Copy).
Office Action received for Korean Patent Application No. 10-2018-7033888, mailed on Jul. 7, 2020, 7 pages (3 pages of English Translation and 4 pages of Official Copy).
Applicant-Initiated Interview Summary received for U.S. Appl. No. 16/734,173, mailed on Sep. 27, 2021, 2 pages.
Decision to Grant received for Danish Patent Application No. PA201970259, mailed on Sep. 17, 2021, 2 pages.
Examiner-Initiated Interview Summary received for U.S. Appl. No. 14/913,349, mailed on Sep. 22, 2021, 2 pages.
Notice of Allowance received for U.S. Appl. No. 16/263,280, mailed on Sep. 17, 2021, 8 pages.
Office Action received for Canadian Patent Application No. 2,915,678, mailed on Aug. 31, 2021, 6 pages.
Askabouttech, "How to Change Android Smartwatch Wallpaper", also online available at: https://www.youtube.com/watch?v=SBYrsyuHqBA (Year: 2014), Jul. 12, 2014, 5 pages.
Applicant-Initiated Interview Summary received for U.S. Appl. No. 15/655,253, mailed on Nov. 30, 2020, 5 pages.
Applicant-Initiated Interview Summary received for U.S. Appl. No. 16/263,280, mailed on Nov. 25, 2020, 3 pages.
Communication of the Board of Appeal received for European Patent Application No. 11182963.6, mailed on Nov. 6, 2020, 10 pages.
Corrected Notice of Allowance received for U.S. Appl. No. 16/147,413, mailed on Nov. 25, 2020, 7 pages.
Non-Final Office Action received for U.S. Appl. No. 16/775,528, mailed on Nov. 20, 2020, 15 pages.
Office Action received for Danish Patent Application No. PA201970259, mailed on Nov. 23, 2020, 3 pages.
Applicant-Initiated Interview Summary received for U.S. Appl. No. 15/655,253, mailed on Mar. 29, 2021, 4 pages.
Corrected Notice of Allowance received for U.S. Appl. No. 16/384,726, mailed on Apr. 2, 2021, 2 pages.
Corrected Notice of Allowance received for U.S. Appl. No. 16/794,111, mailed on Mar. 26, 2021, 4 pages.
Intention to Grant received for Danish Patent Application No. PA201970259, mailed on Mar. 23, 2021, 2 pages.
International Preliminary Report on Patentability received for PCT Patent Application No. PCT/US2019/049237, mailed on Mar. 25, 2021, 15 pages.
Office Action received for Australian Patent Application No. 2019337519, mailed on Mar. 18, 2021, 5 pages.
Advisory Action received for U.S. Appl. No. 14/641,308, mailed on Nov. 14, 2019, 4 pages.
Advisory Action received for U.S. Appl. No. 14/839,912, mailed on Nov. 14, 2019, 6 pages.
Advisory Action received for U.S. Appl. No. 14/841,646, mailed on Nov. 21, 2018, 5 pages.
Advisory Action received for U.S. Appl. No. 14/913,349, mailed on Oct. 29, 2019, 4 pages.
Advisory Action received for U.S. Appl. No. 15/049,052, mailed on Sep. 11, 2017, 2 pages.
Advisory Action received for U.S. Appl. No. 16/147,413, mailed on Nov. 25, 2019, 2019, 6 pages.
Agarwal, Deepesh, "DexClock—Live Clock and Date Blended into Beautiful Artwork As Your Desktop Wallpaper", Available at: https://www.megaleecher.net/DexCiock_Wallpaper_Designs, Jul. 6, 2013, 4 pages.

(56) References Cited

OTHER PUBLICATIONS

Apple, "iPhone User's Guide", Available at: http://mesnotices.20minutes.fr/manuel-notice-mode-emploi/APPLE/IPHONE%2D%5FE#, Jun. 2007, 137 pages.
Applicant Initiated Interview Summary received for U.S. Appl. No. 14/913,349, mailed on Oct. 7, 2019, 4 pages.
Applicant Initiated Interview Summary received for U.S. Appl. No. 16/147,413, mailed on Oct. 28, 2019, 5 pages.
Applicant Initiated Interview Summary received for U.S. Appl. No. 14/839,912, mailed on Nov. 5, 2019, 5 pages.
Applicant-Initiated Interview Summary received for U.S. Appl. No. 14/641,308, mailed on Oct. 10, 2019, 5 pages.
Colt, Sam, "Here's One Way Apple's Smartwatch Could Be Better Than Anything Else, Business Insider", Aug. 21, 2014, pp. 1-4.
Corrected Notice of Allowance received for U.S. Appl. No. 14/641,252, mailed on Aug. 28, 2018, 2 pages.
Corrected Notice of Allowance received for U.S. Appl. No. 14/641,252, mailed on Jul. 9, 2018, 25 pages.
Corrected Notice of Allowance received for U.S. Appl. No. 14/641,252, mailed on May 10, 2018, 10 pages.
Corrected Notice of Allowance received for U.S. Appl. No. 14/829,573, mailed on Aug. 9, 2018, 3 pages.
Corrected Notice of Allowance received for U.S. Appl. No. 14/829,573, mailed on Sep. 11, 2018, 3 pages.
Corrected Notice of Allowance received for U.S. Appl. No. 14/830,629, mailed on Feb. 13, 2019, 3 pages.
Corrected Notice of Allowance received for U.S. Appl. No. 15/927,768, mailed on Aug. 7, 2019, 2 pages.
Corrected Notice of Allowance received for U.S. Appl. No. 15/927,768, mailed on Jul. 9, 2019, 2 pages.
Corrected Notice of Allowance received for U.S. Appl. No. 16/055,489, mailed on Feb. 26, 2019, 2 pages.
Corrected Notice of Allowance received for U.S. Appl. No. 16/109,120, mailed on Nov. 12, 2019, 2 pages.
Decision on Appeal received for Korean Patent Application No. 10-2016-7008449, mailed on Jul. 30, 2019, 29 pages (7 pages of English Translation and 22 pages of Official Copy).
Decision to Grant received for Danish Patent Application No. PA201570781, mailed on Jul. 17, 2017, 2 pages.
Decision to Grant received for Danish Patent Application No. PA201670117, mailed on Nov. 20, 2017, 2 pages.
Decision to Grant received for Danish Patent Application No. PA201770794, mailed on Nov. 11, 2019, 2 pages.
Decision to Grant received for Danish Patent Application No. PA201870631, mailed on May 15, 2019, 2 pages.
Decision to Grant received for Danish Patent Application No. PA201870632, mailed on May 14, 2019, 2 pages.
Decision to Grant received for European Patent Application No. 14772001.5, mailed on Dec. 5, 2019, 2 pages.
Decision to Grant received for European Patent Application No. 15782209.9, mailed on Feb. 14, 2019, 2 pages.
Dewsberry, Victor, "Designing for Small Screens, AVA Publishing", 2005, 27 pages.
European Search Report received for European Patent Application No. 19173371.6, mailed on Oct. 30, 2019, 7 pages.
European Search Report received for European Patent Application No. 19173886.3, mailed on Oct. 30, 2019, 8 pages.
European Search Report received for European Patent Application No. 19199004.3, mailed on Nov. 12, 2019, 6 pages.
European Search Report received for European Patent Application No. 19206249.5, mailed on Dec. 19, 2019, 4 pages.
Extended European Search Report received for European Patent Application No. 19156614.0, mailed on May 28, 2019, 9 pages.
Final Office Action received for U.S. Appl. No. 13/038,276, mailed on Mar. 27, 2014, 24 pages.
Final Office Action received for U.S. Appl. No. 13/038,276, mailed on Mar. 11, 2016, 36 pages.
Final Office Action received for U.S. Appl. No. 14/641,308, mailed on Jul. 1, 2019, 46 pages.
Final Office Action received for U.S. Appl. No. 14/641,308, mailed on Mar. 14, 2018, 42 pages.
Final Office Action received for U.S. Appl. No. 14/830,629, mailed on Apr. 16, 2018, 27 pages.
Final Office Action received for U.S. Appl. No. 14/841,646, mailed on Aug. 2, 2018, 22 pages.
Final Office Action received for U.S. Appl. No. 14/913,349, mailed on Jul. 22, 2019, 20 pages.
Final Office Action received for U.S. Appl. No. 14/913,349, mailed on Jul. 30, 2018, 18 pages.
Final Office Action received for U.S. Appl. No. 15/049,052, mailed on Mar. 1, 2018, 15 pages.
Final Office Action received for U.S. Appl. No. 15/049,052, mailed on May 17, 2017, 13 pages.
Final Office Action received for U.S. Appl. No. 15/049,052, mailed on Oct. 2, 2018, 16 pages.
Final Office Action received for U.S. Appl. No. 16/144,950, mailed on Nov. 25, 2019, 24 pages.
Final Office Action received for U.S. Appl. No. 16/147,413, mailed on Sep. 3, 2019, 19 pages.
Final Office Action received for U.S. Appl. No. 14/839,912, mailed on Jul. 30, 2019, 42 pages.
Final Office Action received for U.S. Appl. No. 14/839,912, mailed on Sep. 13, 2018, 31 pages.
"Headset Button Controller v7.3 APK Full App Download for android, Blackberry, iPhone", Jan. 27, 2014, 11 pages.
Intention to Grant received for Danish Patent Application No. PA201570781, mailed on Dec. 8, 2016, 2 pages.
Intention to Grant received for Danish Patent Application No. PA201670117, mailed on Apr. 21, 2017, 2 pages.
Intention to Grant received for Danish Patent Application No. PA201770794, mailed on Aug. 15, 2019, 2 pages.
Intention to Grant received for Danish Patent Application No. PA201870631, mailed on Apr. 5, 2019, 2 pages.
Intention to Grant received for Danish Patent Application No. PA201870632, mailed on Apr. 5, 2019, 2 pages.
Intention to Grant received for European Patent Application No. 14772001.5, mailed on Jul. 18, 2019, 16 pages.
Intention to Grant received for European Patent Application No. 14772001.5, mailed on Mar. 22, 2019, 17 pages.
Intention to Grant received for European Patent Application No. 15782209.9, mailed on Sep. 28, 2018, 8 pages.
Intention to Grant received for European Patent Application No. 17186896.1, mailed on Dec. 20, 2019, 6 pages.
International Preliminary Report on Patentability received for PCT Patent Application No. PCT/US2012/025519, mailed on Sep. 12, 2013, 6 pages.
International Preliminary Report on Patentability received for PCT Patent Application No. PCT/US2014/053957, mailed on Mar. 17, 2016, 8 pages.
International Preliminary Report on Patentability received for PCT Patent Application No. PCT/US2015/019322, mailed on Mar. 16, 2017, 11 pages.
International Preliminary Report on Patentability received for PCT Patent Application No. PCT/US2015/045936, mailed on Mar. 16, 2017, 9 pages.
International Preliminary Report on Patentability received for PCT Patent Application No. PCT/US2015/045965, mailed on Dec. 27, 2016, 10 pages.
International Preliminary Report on Patentability received for PCT Patent Application No. PCT/US2015/047704, mailed on Mar. 16, 2017, 19 pages.
International Preliminary Report on Patentability received for PCT Patent Application No. PCT/US2015/054310, mailed on Sep. 14, 2017, 7 pages.
International Preliminary Report on Patentability received for PCT Patent Application No. PCT/US2015/019320, mailed on Mar. 16, 2017, 10 pages.
International Preliminary Report on Patentability received for PCT Patent Application No. PCT/US2015/019321, mailed on Mar. 16, 2017, 8 pages.

(56) References Cited

OTHER PUBLICATIONS

International Search Report and Written Opinion received for PCT Patent Application No. PCT/US2012/025519, mailed on Jun. 11, 2012, 7 pages.
International Search Report and Written Opinion received for PCT Patent Application No. PCT/US2014/053957, mailed on Feb. 19, 2015, 11 pages.
International Search Report and Written Opinion received for PCT Patent Application No. PCT/US2015/019320, mailed on Jul. 2, 2015, 14 pages.
International Search Report and Written Opinion received for PCT Patent Application No. PCT/US2015/019321, mailed on Jun. 3, 2015, 11 pages.
International Search Report and Written Opinion received for PCT Patent Application No. PCT/US2015/019322, mailed on Jun. 18, 2015, 16 pages.
International Search Report and Written Opinion received for PCT Patent Application No. PCT/US2015/045936, mailed on Nov. 4, 2015, 12 pages, 12 pages.
International Search Report and Written Opinion received for PCT Patent Application No. PCT/US2015/045965, mailed on Feb. 1, 2016, 20 pages.
International Search Report and Written Opinion received for PCT Patent Application No. PCT/US2015/047704, mailed on Feb. 22, 2016, 25 pages.
International Search Report and Written Opinion received for PCT Patent Application No. PCT/US2015/054310, mailed on Jan. 20, 2016, 10 pages.
Invitation to Pay Additional Fees received for PCT Patent Application No. PCT/US2015/047704, mailed on Dec. 16, 2015, 10 pages.
Invitation to Pay Additional Fees received for PCT Patent Application No. PCT/US2019/049237, mailed on Oct. 31, 2019, 18 pages.
Non-Final Office Action received for U.S. Appl. No. 13/038,276, mailed on Jul. 29, 2015, 31 pages.
Non-Final Office Action received for U.S. Appl. No. 13/038,276, mailed on Sep. 12, 2013, Sep. 12, 2013, 24 pages.
Non-Final Office Action received for U.S. Appl. No. 14/641,308, mailed on Dec. 20, 2018, 43 pages.
Non-Final Office Action received for U.S. Appl. No. 14/641,308, mailed on Jun. 23, 2017, 53 pages.
Non-Final Office Action received for U.S. Appl. No. 14/829,573, mailed on Jan. 22, 2018, 26 pages.
Non-Final Office Action received for U.S. Appl. No. 14/830,629, mailed on Dec. 1, 2016, 20 pages.
Non-Final Office Action received for U.S. Appl. No. 14/830,629, mailed on Jun. 15, 2017, 24 pages.
Non-Final Office Action received for U.S. Appl. No. 14/839,912, mailed on Feb. 26, 2019, 36 pages.
Non-Final Office Action received for U.S. Appl. No. 14/839,914, mailed on Oct. 19, 2017, 46 pages.
Non-Final Office Action received for U.S. Appl. No. 14/841,646, mailed on Dec. 1, 2017, 23 pages.
Non-Final Office Action received for U.S. Appl. No. 14/913,349, mailed on Apr. 2, 2019, 15 pages.
Non-Final Office Action received for U.S. Appl. No. 14/913,349, mailed on Jan. 2, 2020, 25 pages.
Non-Final Office Action received for U.S. Appl. No. 14/913,349, mailed on Jan. 11, 2018, 6 pages.
Non-Final Office Action received for U.S. Appl. No. 15/049,052, mailed on May 31, 2018, 15 pages.
Non-Final Office Action received for U.S. Appl. No. 15/049,052, mailed on Nov. 29, 2016, 13 pages.
Non-Final Office Action received for U.S. Appl. No. 15/049,052, mailed on Sep. 21, 2017, 14 pages.
Non-Final Office Action received for U.S. Appl. No. 15/818,500, mailed on Aug. 30, 2019, 17 pages.
Non-Final Office Action received for U.S. Appl. No. 16/144,950, mailed on Mar. 6, 2019, 24 pages.
Non-Final Office Action received for U.S. Appl. No. 16/147,413, mailed on Feb. 7, 2019, 18 pages.
Non-Final Office Action received for U.S. Appl. No. 14/839,912, mailed on Feb. 12, 2018, 30 pages.
Non-Final Office Action received for U.S. Appl. No. 14/839,912, mailed on Jun. 8, 2017, 26 pages.
Notice of Acceptance received for Australian Patent Application No. 2014315324, mailed on Sep. 28, 2017, 3 pages.
Notice of Acceptance received for Australian Patent Application No. 2017276285, mailed on Apr. 3, 2019, 3 pages.
Notice of Allowance and Search Report received for Taiwanese Patent Application No. 104128687, mailed on Jun. 7, 2016, 4 pages (1 page of English Translation and 3 pages of Official copy).
Notice of Allowance received for Chinese Patent Application No. 201480060044.1, mailed on Mar. 29, 2019, 3 pages (1 page of English Translation and 2 pages of Official Copy).
Notice of Allowance received for Danish Patent Application No. PA201570776, mailed on Feb. 8, 2017, 2 pages.
Notice of Allowance received for Japanese Patent Application No. 2016-537946, mailed on Mar. 26, 2018, 4 pages (1 page of English Translation and 3 pages of Official Copy).
Notice of Allowance received for Japanese Patent Application No. 2018-083313, mailed on Jul. 1, 2019, 4 pages (1 page of English Translation and 3 pages of Official Copy).
Notice of Allowance received for Korean Patent Application No. 10-2016-7008449, mailed on Aug. 9, 2019, 6 pages (2 pages of English Translation and 4 pages of Official Copy).
Notice of Allowance received for Taiwanese Patent Application No. 103130517, issued on May 14, 2018, 5 pages (2 pages of English Translation and 3 pages of Official Copy).
Notice of Allowance received for Taiwanese Patent Application No. 104107327, mailed on Jul. 19, 2019, 5 pages (2 pages of English Translation and 3 pages of Official copy).
Notice of Allowance received for Taiwanese Patent Application No. 104107333, mailed on Nov. 8, 2016, 2 pages (Official Copy Only) {See Communication under 37 CFR § 1.98(a) (3)}.
Notice of Allowance received for Taiwanese Patent Application No. 104107334, mailedon Jan. 26, 2017, 3 pages. (Official Copy Only) {See Communication under 37 CFR § 1.98(a) (3)}.
Notice of Allowance received for Taiwanese Patent Application No. 104133281, mailed on Mar. 29, 2018, 4 pages (1 page of English Translation and 3 pages of Official copy).
Notice of Allowance received for U.S. Appl. No. 13/038,276, mailed on Nov. 3, 2016, 10 pages.
Notice of Allowance received for U.S. Appl. No. 13/038,276, mailed on Nov. 30, 2016, 2 pages.
Notice of Allowance received for U.S. Appl. No. 14/641,241, mailed on Apr. 13, 2017, 2 pages.
Notice of Allowance received for U.S. Appl. No. 14/641,241, mailed on Jan. 31, 2017, 13 pages.
Notice of Allowance received for U.S. Appl. No. 14/641,241, mailed on Mar. 24, 2017, 3 pages.
Notice of Allowance received for U.S. Appl. No. 14/641,252, mailed on Apr. 11, 2018, 14 pages.
Notice of Allowance received for U.S. Appl. No. 14/641,252, mailed on Jul. 18, 2018, 9 pages.
Notice of Allowance received for U.S. Appl. No. 14/829,573, mailed on Apr. 25, 2018, 6 pages.
Notice of Allowance received for U.S. Appl. No. 14/830,629, mailed on Oct. 17, 2018, 8 pages.
Notice of Allowance received for U.S. Appl. No. 14/839,914, mailed on Jun. 22, 2018, 12 pages.
Notice of Allowance received for U.S. Appl. No. 14/841,646, mailed on Apr. 18, 2019, 7 pages.
Notice of Allowance received for U.S. Appl. No. 15/049,052, mailed on Sep. 16, 2019, 5 pages.
Notice of Allowance received for U.S. Appl. No. 15/927,768, mailed on May 31, 2019, 13 pages.
Notice of Allowance received for U.S. Appl. No. 16/055,489, mailed on Jan. 9, 2019, 24 pages.
Notice of Allowance received for U.S. Appl. No. 16/055,489, mailed on Jan. 25, 2019, 8 pages.

(56) References Cited

OTHER PUBLICATIONS

Notice of Allowance received for U.S. Appl. No. 16/055,489, mailed on Nov. 8, 2018, 28 pages.
Notice of Allowance received for U.S. Appl. No. 16/109,120, mailed on Sep. 11, 2019, 12 pages.
Office Action received for Danish Patent Application No. PA201770794, mailed on Dec. 19, 2017, 8 pages.
Office Action received for Korean Patent Application No. 10-2018-7010872, mailed on Dec. 21, 2018, 7 pages (3 pages of English Translation and 4 pages of Official Copy).
Office Action received for Australian Patent Application No. 2014315324, mailed on Aug. 8, 2017, 3 pages.
Office Action received for Australian Patent Application No. 2014315324, mailed on Oct. 21, 2016, 3 pages.
Office Action received for Australian Patent Application No. 2017276285, mailed on Nov. 26, 2018, 2 pages.
Office Action received for Chinese Patent Application No. 201480060044.1, mailed on Jan. 26, 2018, 15 pages (5 pages of English Translation and 10 pages of Official Copy).
Office Action received for Chinese Patent Application No. 201480060044.1, mailed on Sep. 25, 2018, 6 pages (3 pages of English Translation and 3 pages of official copy).
Office Action received for Chinese Patent Application No. 201580046339.8, mailed on Feb. 26, 2019, 18 pages (6 pages of English Translation and 12 pages of Official Copy).
Office Action received for Chinese Patent Application No. 201580046339.8, mailed on Oct. 31, 2019, 9 pages (3 pages of English Translation and 6 pages of Official Copy).
Office Action received for Chinese Patent Application No. 201910454069.4, mailed on Dec. 20, 2019, 6 pages (1 page of English Translation and 5 pages of Official Copy).
Office Action received for Danish Patent Application No. PA201570776, mailed on Aug. 19, 2016, 3 pages.
Office Action received for Danish Patent Application No. PA201570781, mailed on Aug. 19, 2016, 3 pages.
Office Action received for Danish Patent Application No. PA201670117, mailed on Jan. 12, 2017, 3 pages.
Office Action received for Danish Patent Application No. PA201670117, mailed on Jun. 13, 2016, 10 pages.
Office Action received for Danish Patent Application No. PA201770794, mailed on Apr. 5, 2018, 4 pages.
Office Action received for Danish Patent Application No. PA201770794, mailed on Jun. 13, 2019, 2 pages.
Office Action received for Danish Patent Application No. PA201770794, mailed on Oct. 30, 2018, 3 pages.
Office Action received for European Patent Application No. 14772001.5, mailed on Feb. 14, 2018, 5 pages.
Office Action received for European Patent Application No. 14772001.5, mailed on May 30, 2017, 10 pages.
Office Action received for European Patent Application No. 19173371.6, mailed on Nov. 12, 2019, 11 pages.
Office Action received for European Patent Application No. 19173886.3, mailed on Nov. 12, 2019, 9 pages.
Office Action received for European Patent Application No. 19199004.3, mailed on Nov. 22, 2019, 10 pages.
Office Action received for Japanese Patent Application No. 2016-537946, mailed on Aug. 7, 2017, 8 pages (4 pages of English Translation and 4 pages of Official Copy).
Office Action received for Japanese Patent Application No. 2016-537946, mailed on Jan. 30, 2017, 12 pages (6 pages of English Translation and 6 pages of Official Copy).
Office Action received for Japanese Patent Application No. 2018-083313, mailed onFebruary 12, 2019, 4 pages (2 pages of English Translation and 2 pages of Official Copy).
Office Action received for Korean Patent Application No. 10-2016-7008449, mailed on Jan. 12, 2017, 15 pages (6 pages of English Translation and 9 pages of official copy).
Office Action received for Korean Patent Application No. 10-2016-7008449, mailed on Jan. 16, 2018, 10 pages (5 pages of English Translation and 5 pages of Official Copy).
Office Action received for Korean Patent Application No. 10-2016-7008449, mailed on Nov. 27, 2017, 6 pages (3 pages of English Translation and 3 pages of Official Copy).
Office Action received for Korean Patent Application No. 10-2018-7010872, mailed on May 21, 2018, 10 pages (4 pages of English Translation and 6 pages of Official Copy).
Office Action received for Korean Patent Application No. 10-2018-7033888, mailed on Nov. 28, 2019, 10 pages (4 pages of English Translation and 6 pages of Official Copy).
Office Action received for Korean Patent Application No. 10-2019-7007748, mailed on Nov. 15, 2019, 9 pages (3 pages of English Translation and 6 pages of Official Copy).
Office Action received for Korean Patent Application No. 10-2019-7028736, mailed on Nov. 28, 2019, 8 pages (3 pages of English Translation and 5 pages of Official Copy).
Office Action received for Korean Patent Application No. 10-2018-7010872, mailed onFebruary 13, 2019, 7 pages (3 pages of English Translation and 4 pages of Official Copy).
Office Action received for Taiwan Patent Application No. 103130517, mailed onFebruary 22, 2016, 7 pages (3 pages of English Translation and 4 pages of Official Copy).
Office Action received for Taiwanese Patent Application No. 103130517, issued on Jul. 29, 2016, 7 pages (3 pages of English Translation and 4 pages of Official Copy).
Office Action received for Taiwanese Patent Application No. 103130517, mailed on Feb. 6, 2018, 5 pages (2 pages of English Translation and 3 pages of Official Copy).
Office Action received for Taiwanese Patent Application No. 104107318, mailed on Dec. 26, 2018, 33 pages (9 pages of English Translation and 24 pages of Official Copy).
Office Action received for Taiwanese Patent Application No. 104107327, issued on Sep. 28, 2018, 7 pages (3 pages of English Translation and 4 pages of Official Copy).
Office Action received for Taiwanese Patent Application No. 104107333, mailed on May 17, 2016, 6 pages (3 pages of English Translation and 3 pages of Official Copy).
Office Action received for Taiwanese Patent Application No. 104107334, mailed on Sep. 19, 2016, 15 pages (6 pages of English Translation and 9 pages of Official Copy).
Office Action received for Taiwanese Patent Application No. 104128701, issued on Jul. 22, 2016, 25 pages (9 pages of English Translation and 16 pages of Official Copy).
Office Action received for Taiwanese Patent Application No. 104128701, mailed on Mar. 16, 2017, 8 pages (3 pages of English Translation and 5 pages of Official Copy).
Office Action received for Taiwanese Patent Application No. 104133281, issued on Mar. 30, 2017, 10 Pages (4 pages of English translation and 6 pages of official Copy).
Office Action received for Taiwanese Patent Application No. 104133281, mailed on Sep. 1, 2016, 10 pages (4 pages of English Translation and 6 pages of Official Copy).
Office Action received for Danish Patent Application No. PA201570776, mailed on Jan. 26, 2016, 12 pages.
Partial European Search Report received for European Patent Application No. 19173371.6, mailed on Jul. 18, 2019, 17 pages.
Partial European Search Report received for European Patent Application No. 19173886.3, mailed on Jul. 18, 2019, 15 pages.
Search Report and opinion received for Danish Patent Application No. PA201870631, mailed on Dec. 6, 2018, 8 pages.
Search Report and Opinion received for Danish Patent Application No. PA201870632, mailed on Dec. 3, 2018, 8 pages.
Search Report and Opinion received for Danish Patent Application No. PA201970259, mailed on Jul. 19, 2019, 10 pages.
Search Report received for Danish Patent Application No. PA201570781, mailed on Mar. 8, 2016, 10 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
The Window Club, "How to Set GIF as Background Windows 7", Online Available at: https://www.youtube.com/watch?v=tUec42Qd7ng, Dec. 24, 2012, pp. 1-5.

(56) References Cited

OTHER PUBLICATIONS

Accepted Outlook Meetings Move to Deleted Folder, Available online at:—https://social.technet.microsoft.com/Forums/office/en-US/f3301c9a-a93f-49f7-be13-c642e285f150/accepted-outlook-meetings-move-to-deleted-folder?forum=outlook, Jan. 13, 2011, 4 pages.
Advisory Action received for U.S. Appl. No. 14/752,776, mailed on Aug. 31, 2018, 3 pages.
Android 2.3.4 User's Guide, Online available at: https://static.googleusercontent.com/media/www.google.com/en//help/hc/pdfs/mobile/AndroidUsersGuide-2.3.4.pdf, May 20, 2011, 384 pages.
Applicant Initiated Interview Summary received for U.S. Appl. No. 16/265,938, mailed on Mar. 11, 2020, 5 pages.
Applicant-Initiated Interview Summary received for U.S. Appl. No. 16/265,938, mailed on May 28, 2020, 5 pages.
Applicant-Initiated Interview Summary received for U.S. Appl. No. 17/103,436, mailed on Sep. 22, 2021, 2 pages.
Board Opinion received for Chinese Patent Application No. 201910164962.3, mailed on Sep. 16, 2021, 16 pages (6 pages of English Translation and 10 pages of Official Copy).
Decision to Grant received for European Patent Application No. 15739110.3, mailed on Sep. 19, 2019, 2 pages.
Examiner's Answer to Appeal Brief received for U.S. Appl. No. 14/913,349, mailed on Sep. 30, 2021, 23 pages.
Extended European Search Report (includes Partial European Search Report and European Search Opinion) received for European Patent Application No. 16190252.3, mailed on Mar. 1, 2017, 10 pages.
Extended European Search Report for European Application No. 19185318.3, mailed on Nov. 20, 2019, 8 pages.
Final Office Action received for U.S. Appl. No. 14/752,776, mailed on May 29, 2018, 36 pages.
Final Office Action received for U.S. Appl. No. 16/265,938, mailed on Apr. 7, 2020, 45 pages.
Intention to Grant received for European Patent Application No. 15739110.3, mailed on Mar. 7, 2019, 8 pages.
Intention to Grant received for European Patent Application No. 15739110.3, mailed on Sep. 11, 2019, 6 pages.
International Preliminary Report on Patentability received for PCT Patent Application No. PCT/US2015/038173, mailed on Jan. 5, 2017, 10 pages.
International Preliminary Report on Patentability received for PCT Patent Application No. PCT/US2015/038174, mailed on Jan. 5, 2017, 27 pages.
Microsoft Outlook 2010(TM) A Beginners Guide, Available online at:—http://www.reading.ac.uk/web/files/its/outlook2010.pdf, Apr. 1, 2012, 24 pages.
Non-Final Office Action received for U.S. Appl. No. 14/752,776, mailed on Jan. 2, 2018., 30 pages.
Non-Final Office Action received for U.S. Appl. No. 14/752,776, mailed on Nov. 5, 2018, 48 Pages.
Non-Final Office Action received for U.S. Appl. No. 16/265,938, mailed on Nov. 4, 2019, 28 pages.
Non-Final Office Action received for U.S. Appl. No. 17/103,436, mailed on Aug. 18, 2021, 16 pages.
Non-Final Office Action received for U.S. Appl. No. 17/212,850, mailed on Oct. 8, 2021, 14 pages.
Notice of Acceptance received for Australian Patent Application No. 2015279544, mailed on Mar. 1, 2018, 3 pages.
Notice of Acceptance received for Australian Patent Application No. 2016231598, mailed on Mar. 1, 2018., 3 Pages.
Notice of Acceptance received for Australian Patent Application No. 2018204286, mailed on Feb. 27, 2020, 3 pages.
Notice of Acceptance received for Australian Patent Application No. 2020203919, mailed on Sep. 3, 2021, 3 pages.
Notice of Acceptance received for Australian Patent Application No. 2015279545, mailed on Feb. 9, 2018, 3 Pages.
Notice of Allowance received for Chinese Patent Application No. 201580029054.3, mailed on Jul. 19, 2019, 2 pages (1 page of English Translation and 1 page of Official Copy).
Notice of Allowance received for Japanese Patent Application No. 2020-131857, mailed on Oct. 1, 2021, 4 pages (1 page of English Translation and 3 pages of Official Copy).
Notice of Allowance received for U.S. Appl. No. 16/265,938, mailed on Oct. 15, 2020, 8 pages.
Office Action received for Australian Patent Application No. 2015279544, mailed on Apr. 18, 2017, 4 pages.
Office Action received for Australian Patent Application No. 2015279544, mailed on Feb. 13, 2018, 5 pages.
Office Action received for Australian Patent Application No. 2016231598, mailed on Apr. 7, 2017., 5 Pages.
Office Action received for Australian Patent Application No. 2018204286, mailed on Apr. 17, 2019, 5 pages.
Office Action received for Australian Patent Application No. 2018204286, mailed on Nov. 12, 2019, 5 pages.
Office Action received for Australian Patent Application No. 2018204286, mailed on Sep. 5, 2019, 5 pages.
Office Action received for Australian Patent Application No. 2020203919, mailed on Dec. 23, 2020, 5 pages.
Office Action received for Australian Patent Application No. 2020203919, mailed on Jul. 19, 2021, 7 pages.
Office Action received for Australian Patent Application No. 2020203919, mailed on Mar. 30, 2021, 5 pages.
Office Action received for Australian Patent Application No. 2020203919, mailed on Oct. 19, 2020, 5 pages.
Office Action received for Australian Patent Application No. 2015279545, mailed on Apr. 13, 2017, 3 pages.
Office Action received for Chinese Patent Application No. 201580029054.3, mailed on Dec. 5, 2018, 12 pages (6 pages of English Translation and 6 pages of Official Copy).
Office Action Received for European Patent Application No. 15739109.5, mailed on Jan. 31, 2018, 7 pages.
Office Action Received for European Patent Application No. 15739110.3, mailed on Jan. 31, 2018, 8 pages.
Office Action received for European Patent Application No. 16190252.3, mailed on Feb. 19, 2018, 7 pages.
Remote Phone Call, Available online at: <https://web.archive.org/web/20140625104844/https://www.justremotephone.com/>, Jun. 25, 2014, 22 pages.
Responding to a meeting invitation, Available online at:—https://web.archive.org/web/20121128174157/https://www.zimbra.com/desktop7/help/en_US/Calendar/Responding_to_an_invitation.htm, Nov. 28, 2012, 1 page.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 Pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Office Action received for Taiwanese Patent Application No. 104120843, mailed on Jan. 30, 2016, 5 pages (1 page of English Translation of Search Report and 4 pages of Official Copy).
Ellis Benus, "Use a Phone Number in the Google Calendar Where Line for One Click Calling", Available online at: https://ellisbenus.com/ellis-benus/use-a-phone-number-in-the-google-calender-where-line-for-one-click-calling, Ellis Benus-Small Business Web Guru, Oct. 3, 2012, 2 pages.
Jepson Tom, "How to auto-forward specific emails in gmail?", Available online at: <http://www.tomjepson.co.uk/how-to-auto-forward-specific-emails-in-gmail/>, May 19, 2013, 7 pages.
Lyons et al., "Facet: A Multi-Segment Wrist Worn System", Online available at: <http://fetlab.io/publications/2012Faceta%20multisegment%20wrist%20worn%20system.pdf>, Oct. 7-10, 2012, pp. 123-129.
Netsapiens, "Click to Call in MS Outlook", Available online at: <https://netsapiens.com/click-to-call-in-ms-outlook-windows-apps/>, May 4, 2012, 8 pages.

(56) References Cited

OTHER PUBLICATIONS

International Search Report and Written Opinion received for PCT Patent Application No. PCT/US2015/038173 mailed on Sep. 25, 2015, 13 pages.
International Search Report and Written Opinion received for PCT Patent Application No. PCT/US2015/038174, mailed on Jan. 18, 2016, 38 pages.
Invitation to Pay Additional Fees received for PCT Patent Application No. PCT/US2015/038174, mailed on Oct. 5, 2015, 5 pages.
Clock & Calendar for Smart Watch 2, Available online at: https://www.youtube.com/watch?v=Uj-K2vMnrj8, Nov. 20, 2013, 2 Pages.
Tablet Talk, "Tablet Talk App: Frequently Asked Questions—Tablet Talk.", available at https://web.archive.org/web/20140625102903/http://1www.tablettal app.com/faq, Jun. 25, 2014, pp. 1-6.
Notice of Allowance received for U.S. Appl. No. 16/525,082, mailed on Aug. 20, 2020, 5 pages.
Office Action received for Australian Patent Application No. 2019216614, mailed on Aug. 13, 2020, 4 pages.
Office Action received for Chinese Patent Application No. 201810074876.9, mailed on Jul. 31, 2020, 11 pages (5 pages of English Translation and 6 pages of Official Copy).
Office Action received for Japanese Patent Application No. 2019-088503, mailed on Jul. 31, 2020, 7 pages (4 pages of English Translation and 3 pages of Official Copy).
Applicant-Initiated Interview Summary received for U.S. Appl. No. 16/734,173, mailed on Feb. 25, 2021, 3 pages.
Applicant-Initiated Interview Summary received for U.S. Appl. No. 16/775,528, mailed on Feb. 23, 2021, 4 pages.
Final Office Action received for U.S. Appl. No. 16/263,280, mailed on Mar. 4, 2021, 13 pages.
Notice of Allowance received for U.S. Appl. No. 15/818,500, mailed on Feb. 22, 2021, 11 pages.
Office Action received for Chinese Patent Application No. 201910164962.3, mailed on Jan. 12, 2021, 14 pages (7 pages of English Translation and 7 pages of Official Copy).
Office Action received for Chinese Patent Application No. 201911127193.6, mailed on Dec. 17, 2020, 21 pages (10 pages of English Translation and 11 pages of Official Copy).
Supplemental Notice of Allowance received for U.S. Appl. No. 15/818,500, mailed on Mar. 5, 2021, 2 pages.
Decision of Appeal received for Korean Patent Application No. 10-2019-7028736, mailed on May 24, 2021, 16 pages (2 pages of English Translation and 14 pages of Official Copy).
Notice of Allowance received for U.S. Appl. No. 16/263,280, mailed on Jun. 8, 2021, 8 pages.
Corrected Notice of Allowance received for U.S. Appl. No. 14/641,308, mailed on Mar. 10, 2020, 4 pages.
Extended European Search Report received for European Patent Application No. 19195247.2, mailed on Mar. 9, 2020, 7 pages.
Non-Final Office Action received for U.S. Appl. No. 16/147,413, mailed on Mar. 11, 2020, 22 pages.
Notice of Allowance received for U.S. Appl. No. 16/144,950, mailed on Mar. 19, 2020, 14 pages.
Office Action received for Chinese Patent Application No. 201580077206.7, mailed on Feb. 3, 2020, 29 pages (8 pages of English Translation and 21 pages of Official Copy).
Applicant Initiated Interview Summary received for U.S. Appl. No. 16/384,726, mailed on Nov. 5, 2020, 3 pages.
Extended European Search Report received for European Patent Application No. 20190670.8, mailed on Nov. 2, 2020, 10 pages.
Notice of Allowance received for Chinese Patent Application No. 201910454069.4, mailed on Nov. 2, 2020, 7 pages (3 pages of English Translation and 4 pages of Official Copy).
Notice of Allowance received for U.S. Appl. No. 16/147,413, mailed on Nov. 5, 2020, 10 pages.
Notice of Allowance received for U.S. Appl. No. 16/525,082, mailed on Nov. 17, 2020, 7 pages.
Office Action received for Chinese Patent Application No. 201580046339.8, mailed on Oct. 19, 2020, 12 pages (4 pages of English Translation and 8 pages of Official Copy).

Office Action received for Chinese Patent Application No. 201910454076.4, mailed on Oct. 16, 2020, 14 pages (8 pages of English Translation and 6 pages of Official Copy).
Office Action received for Japanese Patent Application No. 2019-116590, mailed on Oct. 5, 2020, 6 pages (3 pages of English Translation and 3 pages of Official Copy).
Final Office Action received for U.S. Appl. No. 16/775,528, mailed on May 25, 2021, 15 pages.
Notice of Allowance received for Chinese Patent Application No. 201911127193.6, mailed on May 8, 2021, 4 pages (1 page of English Translation and 3 pages of Official Copy).
Corrected Notice of Allowance received for U.S. Appl. No. 14/913,345, mailed on Apr. 13, 2020, 4 pages.
Final Office Action received for U.S. Appl. No. 15/818,500, mailed on Apr. 6, 2020, 15 pages.
Notice of Allowance received for Korean Patent Application No. 10-2018-7013265, mailed on Apr. 1, 2020, 4 pages (1 pages of English Translation and 3 pages of Official Copy).
Office Action received for Australian Patent Application No. 2019216614, mailed on Apr. 1, 2020, 4 pages.
Office Action received for Taiwanese Patent Application No. 104107329, mailed on Mar. 5, 2020, 22 pages (9 pages of English Translation and 13 pages of Official Copy).
Office Action received for Chinese Patent Application No. 202110396782.5, mailed on Nov. 11, 2021, 10 pages (4 pages of English Translation and 6 pages of Official Copy).
Non-Final Office Action received for U.S. Appl. No. 15/655,253, mailed on Sep. 10, 2020, 17 pages.
Office Action received for Korean Patent Application No. 10-2020-7019035, mailed on Aug. 28, 2020, 6 pages (2 pages of English Translation and 4 pages of Official Copy).
Office Action received for Korean Patent Application No. 10-2020-7022802, mailed on Aug. 28, 2020, 7 pages (2 pages of English Translation and 5 pages of Official Copy).
Office Action received for Taiwanese Patent Application No. 104107329, mailed on Jul. 24, 2020, 7 pages (3 pages of English Translation and 4 pages of Official Copy).
101634659, CN, A, Chinese Patent Office in an Office Action for related Patent Application No. 201910438645.6 on Mar. 2, 2022.
102812426, CN, A, Chinese Patent Office in an Office Action for related Patent Application No. 201910446753.8 on Mar. 2, 2022.
Notice of Allowance received for U.S. Appl. No. 16/775,528, mailed on Jun. 15, 2022, 6 pages.
Office Action received for Korean Patent Application No. 10-2021-7039120, mailed on May 30, 2022, 7 pages (3 pages of English Translation and 4 pages of Official Copy).
Corrected Notice of Allowance received for U.S. Appl. No. 17/378,451, mailed on May 4, 2022, 2 pages.
Decision to Grant received for European Patent Application No. 11182963.6, mailed on May 12, 2022, 3 pages.
Notice of Allowance received for U.S. Appl. No. 16/926,512, mailed on May 18, 2022, 9 pages.
Notice of Allowance received for U.S. Appl. No. 17/582,692, mailed on Apr. 29, 2022, 8 pages.
Office Action received for Korean Patent Application No. 10-2021-7001918, mailed on Apr. 28, 2022, 7 pages (3 pages of English Translation and 4 pages of Official Copy).
Applicant-Initiated Interview Summary received for U.S. Appl. No. 16/775,528, mailed on Jan. 13, 2022, 4 pages.
Applicant-Initiated Interview Summary received for U.S. Appl. No. 17/212,850, mailed on Jan. 13, 2022, 5 pages.
Intention to Grant received for European Patent Application No. 11182963.6, mailed on Jan. 5, 2022, 8 pages.
Office Action received for Chinese Patent Application No. 201910447678.7, mailed on Nov. 29, 2021, 17 pages (7 pages of English Translation and 10 pages of Official Copy).
Applicant-Initiated Interview Summary received for U.S. Appl. No. 16/734,173, mailed on Mar. 21, 2022, 3 pages.
Examiner's Answer to Appeal Brief received for U.S. Appl. No. 15/655,253, mailed on Mar. 10, 2022, 16 pages.
Office Action received for Indian Patent Application No. 202018014953, mailed on Mar. 7, 2022, 7 pages.

(56) References Cited

OTHER PUBLICATIONS

Office Action received for Korean Patent Application No. 10-2021-7017259, mailed on Mar. 3, 2022, 8 pages (4 pages of English Translation and 4 pages of Official Copy).
Advisory Action received for U.S. Appl. No. 15/818,500, mailed on Feb. 18, 2022, 4 pages.
Final Office Action received for U.S. Appl. No. 16/734,173, mailed on Feb. 22, 2022, 16 pages.
Notice of Allowance received for Japanese Patent Application No. 2019-088503, mailed on Feb. 18, 2022, 4 pages (1 page of English Translation and 3 pages of Official Copy).
Notice of Allowance received for U.S. Appl. No. 16/775,528, mailed on Feb. 24, 2022, 18 pages.
Office Action received for Indian Patent Application No. 202018011347, mailed on Mar. 2, 2022, 6 pages.
Corrected Notice of Allowance received for U.S. Appl. No. 17/582,692, mailed on Jul. 1, 2022, 4 pages.
Extended European Search Report received for European Patent Application No. 22157106.0, mailed on Jun. 27, 2022, 8 pages.
Final Office Action received for U.S. Appl. No. 16/871,995, mailed on Jul. 5, 2022, 17 pages.
Notice of Acceptance received for Australian Patent Application No. 2021201748, mailed on Jun. 23, 2022, 3 pages.
Notice of Allowance received for Chinese Patent Application No. 201910447678.7, mailed on Jun. 20, 2022, 2 pages (1 page of English Translation and 1 page of Official Copy).
Office Action received for Japanese Patent Application No. 2019-116590, mailed on Feb. 4, 2022, 17 pages (8 pages of English Translation and 9 pages of Official Copy).
Office Action received for Korean Patent Application No. 10-2021-7001482, mailed on Jan. 24, 2022, 9 pages (4 pages of English Translation and 5 pages of Official Copy).
Applicant-Initiated Interview Summary received for U.S. Appl. No. 15/818,500, mailed on Jan. 24, 2022, 4 pages.
Applicant-Initiated Interview Summary received for U.S. Appl. No. 16/734,173, mailed on Jan. 25, 2022, 4 pages.
Non-Final Office Action received for U.S. Appl. No. 16/871,995, mailed on Feb. 1, 2022, 18 pages.
Non-Final Office Action received for U.S. Appl. No. 16/926,512, mailed on Jan. 21, 2022, 20 pages.
Office Action received for Korean Patent Application No. 10-2021-7017259, mailed on Jan. 10, 2022, 6 pages (3 pages of English Translation and 3 pages of Official Copy).
Advisory Action received for U.S. Appl. No. 16/734,173, mailed on Apr. 4, 2022, 5 pages.
Applicant-Initiated Interview Summary received for U.S. Appl. No. 16/871,995, mailed on Apr. 5, 2022, 5 pages.
Corrected Notice of Allowance received for U.S. Appl. No. 16/775,528, mailed on Mar. 25, 2022, 2 pages.
Decision to Grant received for European Patent Application No. 19185318.3, mailed on Mar. 31, 2022, 3 pages.
Notice of Allowance received for U.S. Appl. No. 17/378,451, mailed on Apr. 4, 2022, 8 pages.
Office Action received for Australian Patent Application No. 2021201748, mailed on Mar. 18, 2022, 6 pages.
Office Action received for Australian Patent Application No. 2021201780, mailed on Mar. 22, 2022, 3 pages.
Office Action received for Canadian Patent Application No. 3111850, mailed on Mar. 23, 2022, 3 pages.
Notice of Allowance received for Chinese Patent Application No. 202110396782.5, mailed on Mar. 30, 2022, 5 pages (1 page of English Translation and 4 pages of Official Copy).
Office Action received for Chinese Patent Application No. 201910438645.6, mailed on Mar. 2, 2022, 11 pages (5 pages of English Translation and 6 pages of Official Copy).
Office Action received for Chinese Patent Application No. 201910446753.8, mailed on Mar. 2, 2022, 11 pages (5 pages of English Translation and 6 pages of Official Copy).
Applicant-Initiated Interview Summary received for U.S. Appl. No. 16/926,512, mailed on Apr. 21, 2022, 4 pages.
Decision on Appeal received for U.S. Appl. No. 14/913,349, mailed on Apr. 20, 2022, 13 pages.
Office Action received for Australian Patent Application No. 2022202044, mailed on Apr. 6, 2022, 3 pages.
Office Action received for Chinese Patent Application No. 201910447678.7, mailed on Mar. 21, 2022, 14 pages (6 pages of English Translation and 8 pages of Official Copy).
Office Action received for Japanese Patent Application No. 2021-510409, mailed on Apr. 8, 2022, 5 pages (2 pages of English Translation and 3 pages of Official Copy).
Decision on Appeal received for Korean Patent Application No. 10-2021-7001482, mailed on Jul. 20, 2022, 27 pages (1 page of English Translation and 26 pages of Official Copy).
Non-Final Office Action received for U.S. Appl. No. 15/818,500, mailed on Jul. 27, 2022, 15 pages.
Notice of Acceptance received for Australian Patent Application No. 2021201780, mailed on Aug. 2, 2022, 3 pages.
Notice of Acceptance received for Australian Patent Application No. 2022202044, mailed on Aug. 4, 2022, 3 pages.
Notice of Allowance received for Japanese Patent Application No. 2019-116590, mailed on Jul. 25, 2022, 15 pages (1 page of English Translation and 14 pages of Official Copy).
Office Action received for Australian Patent Application No. 2021212114, mailed on Jul. 29, 2022, 7 pages.
Supplemental Notice of Allowance received for U.S. Appl. No. 16/926,512, mailed on Aug. 8, 2022, 3 pages.
Decision of Appeal received for Korean Patent Application No. 10-2021-7001918, mailed on Aug. 23, 2022, 14 pages (2 pages of English Translation and 12 pages of Official Copy).
Applicant-Initiated Interview Summary received for U.S. Appl. No. 17/212,850, mailed on Jul. 20, 2022, 5 pages.
Decision of Appeal received for Korean Patent Application No. 10-2021-7017259, mailed on Jun. 29, 2022, 28 pages (04 pages of English Translation and 24 pages of Official Copy).
Notice of Allowance received for Chinese Patent Application No. 201910446753.8, mailed on Jun. 29, 2022, 2 pages (1 page of English Translation and 1 page of Official Copy).
Notice of Allowance received for U.S. Appl. No. 14/913,349, mailed on Jul. 15, 2022, 6 pages.
Notice of Allowance received for U.S. Appl. No. 17/378,451, mailed on Jul. 7, 2022, 8 pages.
Office Action received for European Patent Application No. 20217518.8, mailed on Jul. 6, 2022, 5 pages.
Corrected Notice of Allowance received for U.S. Appl. No. 17/582,692, mailed on May 26, 2022, 4 pages.
Final Office Action received for U.S. Appl. No. 17/212,850, mailed on Jun. 1, 2022, 14 pages.
Office Action received for European Patent Application No. 20190670.8, mailed on Sep. 14, 2022, 6 pages.
Office Action received for Japanese Patent Application No. 2021-111630, mailed on Aug. 5, 2022, 8 pages (4 pages of English Translation and 4 pages of Official Copy).
Office Action received for Australian Patent Application No. 2021212114, mailed on Oct. 28, 2022, 3 pages.
Advisory Action received for U.S. Appl. No. 16/734,173, mailed on Mar. 13, 2023, 6 pages.
Applicant-Initiated Interview Summary received for U.S. Appl. No. 14/913,349, mailed on Oct. 12, 2022, 2 pages.
Applicant-Initiated Interview Summary received for U.S. Appl. No. 15/818,500, mailed on Oct. 21, 2022, 4 pages.
Applicant-Initiated Interview Summary received for U.S. Appl. No. 16/734,173, mailed on Mar. 3, 2023, 4 pages.
Applicant-Initiated Interview Summary received for U.S. Appl. No. 16/734,173, mailed on Nov. 22, 2022, 4 pages.
Applicant-Initiated Interview Summary received for U.S. Appl. No. 16/871,995, mailed on May 2, 2023, 4 pages.
Applicant-Initiated Interview Summary received for U.S. Appl. No. 16/871,995, mailed on Oct. 18, 2022, 4 pages.
Applicant-Initiated Interview Summary received for U.S. Appl. No. 17/212,850, mailed on Jul. 17, 2023, 5 pages.
Applicant-Initiated Interview Summary received for U.S. Appl. No. 17/212,850, mailed on Nov. 2, 2022, 5 pages.

(56) References Cited

OTHER PUBLICATIONS

Applicant-Initiated Interview Summary received for U.S. Appl. No. 17/506,197, mailed on Oct. 25, 2023, 2 pages.
Applicant-Initiated Interview Summary received for U.S. Appl. No. 17/572,117, mailed on Feb. 1, 2023, 4 pages.
Applicant-Initiated Interview Summary received for U.S. Appl. No. 17/572,117, mailed on Nov. 17, 2022, 4 pages.
Applicant-Initiated Interview Summary received for U.S. Appl. No. 17/878,792, mailed on Mar. 8, 2024, 3 pages.
Applicant-Initiated Interview Summary received for U.S. Appl. No. 17/878,792, mailed on Sep. 8, 2023, 4 pages.
Applicant-Initiated Interview Summary received for U.S. Appl. No. 17/901,559, mailed on Jun. 30, 2023, 4 pages.
Applicant-Initiated Interview Summary received for U.S. Appl. No. 17/950,823, mailed on Feb. 9, 2024, 4 pages.
Corrected Notice of Allowance received for U.S. Appl. No. 14/913,349, mailed on Nov. 3, 2022, 2 pages.
Corrected Notice of Allowance received for U.S. Appl. No. 14/913,349, mailed on Oct. 3, 2022, 3 pages.
Corrected Notice of Allowance received for U.S. Appl. No. 14/913,349, mailed on Sep. 1, 2022, 2 pages.
Corrected Notice of Allowance received for U.S. Appl. No. 17/378,451, mailed on Aug. 12, 2022, 2 pages.
Corrected Notice of Allowance received for U.S. Appl. No. 17/506,197, mailed on Feb. 7, 2024, 4 pages.
Corrected Notice of Allowance received for U.S. Appl. No. 17/902,191, mailed on Jan. 10, 2023, 2 pages.
Corrected Notice of Allowance received for U.S. Appl. No. 17/959,239, mailed on Aug. 17, 2023, 4 pages.
Corrected Notice of Allowance received for U.S. Appl. No. 17/959,239, mailed on Dec. 6, 2023, 4 pages.
Corrected Notice of Allowance received for U.S. Appl. No. 17/959,239, mailed on Jun. 20, 2023, 4 pages.
Corrected Notice of Allowance received for U.S. Appl. No. 17/959,239, mailed on Nov. 8, 2023, 4 pages.
Corrected Notice of Allowance received for U.S. Appl. No. 18/144,108, mailed on Dec. 14, 2023, 2 pages.
Corrected Notice of Allowance received for U.S. Appl. No. 18/144,108, mailed on Feb. 12, 2024, 3 pages.
Craciunoiu Marius, "Hide header on scroll down, show on scroll up", https://medium.com/@mariusc23/hide-header-on-scroll-down-show-on-scroll-up-67bbaae9a78c, Nov. 27, 2013, 5 pages.
Decision on Appeal received for U.S. Appl. No. 15/655,253, mailed on Sep. 22, 2022, 12 pages.
Decision to Grant received for German Patent Application No. 112008004302.7, mailed on Nov. 29, 2023, 9 pages (1 page of English Translation and 8 pages of Official Copy).
Decision to Refuse received for Japanese Patent Application No. 2022-045923, mailed on Jan. 29, 2024, 9 pages (4 pages of English Translation and 5 pages of Official Copy).
Final Office Action received for U.S. Appl. No. 16/734,173, mailed on Jan. 5, 2023, 15 pages.
Final Office Action received for U.S. Appl. No. 16/871,995, mailed on Jul. 3, 2023, 18 pages.
Final Office Action received for U.S. Appl. No. 17/212,850, mailed on May 9, 2023, 15 pages.
Final Office Action received for U.S. Appl. No. 17/572,117, mailed on Dec. 22, 2022, 16 pages.
Final Office Action received for U.S. Appl. No. 17/878,792, mailed on Jan. 8, 2024, 23 pages.
Intention to Grant received for European Patent Application No. 19217240.1, mailed on Dec. 14, 2023, 10 pages.
Non-Final Office Action received for U.S. Appl. No. 16/734,173, mailed on Sep. 23, 2022, 17 pages.
Non-Final Office Action received for U.S. Appl. No. 16/871,995, mailed on Jan. 31, 2023, 19 pages.
Non-Final Office Action received for U.S. Appl. No. 17/212,850, mailed on Sep. 21, 2022, 13 pages.
Non-Final Office Action received for U.S. Appl. No. 17/506,197, mailed on Sep. 14, 2023, 13 pages.
Non-Final Office Action received for U.S. Appl. No. 17/572,117, mailed on Oct. 6, 2022, 15 pages.
Non-Final Office Action received for U.S. Appl. No. 17/878,792, mailed on Jun. 23, 2023, 19 pages.
Non-Final Office Action received for U.S. Appl. No. 17/901,559, mailed on May 22, 2023, 25 pages.
Non-Final Office Action received for U.S. Appl. No. 17/950,823, mailed on Dec. 18, 2023, 13 pages.
Non-Final Office Action received for U.S. Appl. No. 18/211,150, mailed on Feb. 14, 2024, 11 pages.
Notice of Acceptance received for Australian Patent Application No. 2021212114, mailed on Jul. 7, 2023, 3 pages.
Notice of Acceptance received for Australian Patent Application No. 2021277718, mailed on Mar. 3, 2023, 3 pages.
Notice of Acceptance received for Australian Patent Application No. 2022235609, mailed on Nov. 14, 2023, 3 pages.
Notice of Acceptance received for Australian Patent Application No. 2023202432, mailed on Nov. 6, 2023, 3 pages.
Notice of Acceptance received for Australian Patent Application No. 2024200347, mailed on Feb. 6, 2024, 3 pages.
Notice of Allowance received for Canadian Patent Application No. 2,915,678, mailed on Jun. 21, 2023, 1 page.
Notice of Allowance received for Canadian Patent Application No. 3,111,850, mailed on Feb. 27, 2023, 1 page.
Notice of Allowance received for Chinese Patent Application No. 201910438645.6, mailed on Dec. 28, 2022, 7 pages (3 pages of English Translation and 4 pages of Official Copy).
Notice of Allowance received for Chinese Patent Application No. 201910875660.7, mailed on Jan. 4, 2024, 2 pages (1 page of English Translation and 1 page of Official Copy).
Notice of Allowance received for Chinese Patent Application No. 201911023176.8, mailed on Aug. 15, 2023, 2 pages (1 page of English Translation and 1 page of Official Copy).
Notice of Allowance received for Chinese Patent Application No. 201911129908.1, mailed on Dec. 8, 2023, 4 pages (1 page of English Translation and 3 pages of Official Copy).
Notice of Allowance received for Japanese Patent Application No. 2021-126843, mailed on Jan. 6, 2023, 4 pages (1 page of English Translation and 3 pages of Official Copy).
Notice of Allowance received for Japanese Patent Application No. 2021-175701, mailed on May 19, 2023, 4 pages (1 page of English Translation and 3 pages of Official Copy).
Notice of Allowance received for Japanese Patent Application No. 2021-510409, mailed on Sep. 12, 2022, 4 pages (1 page of English Translation and 3 pages of Official Copy).
Notice of Allowance received for Japanese Patent Application No. 2022-126562, mailed on Sep. 29, 2023, 4 pages (1 page of English Translation and 3 pages of Official Copy).
Notice of Allowance received for Korean Patent Application No. 10-2021-7006176, mailed on Apr. 25, 2023, 7 pages (2 pages of English Translation and 5 pages of Official Copy).
Notice of Allowance received for Korean Patent Application No. 10-2021-7039120, mailed on Sep. 22, 2022, 7 pages (2 pages of English Translation and 5 pages of Official Copy).
Notice of Allowance received for U.S. Appl. No. 15/655,253, mailed on Oct. 19, 2022, 9 pages.
Notice of Allowance received for U.S. Appl. No. 15/818,500, mailed on Jan. 17, 2023, 17 pages.
Notice of Allowance received for U.S. Appl. No. 16/734,173, mailed on Apr. 11, 2023, 17 pages.
Notice of Allowance received for U.S. Appl. No. 17/212,850, mailed on Sep. 5, 2023, 18 pages.
Notice of Allowance received for U.S. Appl. No. 17/506,197, mailed on Jan. 29, 2024, 8 pages.
Notice of Allowance received for U.S. Appl. No. 17/572,117, mailed on Apr. 4, 2023, 9 pages.
Notice of Allowance received for U.S. Appl. No. 17/582,692, mailed on Aug. 17, 2022, 8 pages.
Notice of Allowance received for U.S. Appl. No. 17/901,559, mailed on Dec. 26, 2023, 3 pages.
Notice of Allowance received for U.S. Appl. No. 17/901,559, mailed on Nov. 24, 2023, 3 pages.

(56) References Cited

OTHER PUBLICATIONS

Notice of Allowance received for U.S. Appl. No. 17/901,559, mailed on Oct. 19, 2023, 9 pages.
Notice of Allowance received for U.S. Appl. No. 17/902,191, mailed on Jan. 3, 2023, 8 pages.
Notice of Allowance received for U.S. Appl. No. 17/959,239, mailed on May 30, 2023, 8 pages.
Notice of Allowance received for U.S. Appl. No. 17/959,239, mailed on Sep. 11, 2023, 7 pages.
Notice of Allowance received for U.S. Appl. No. 18/144,108, mailed on Nov. 22, 2023, 8 pages.
Notice of Hearing received for Indian Patent Application No. 201617008291, mailed on Jul. 4, 2023, 3 pages.
Notice of Hearing received for Indian Patent Application No. 201617008296, mailed on Sep. 11, 2022, 3 pages.
Notice of Hearing received for Indian Patent Application No. 202018015998, mailed on Dec. 15, 2023, 3 pages.
Notice of Hearing received for Indian Patent Application No. 202018016000, mailed on Dec. 15, 2023, 3 pages.
Office Action received for Australian Patent Application No. 2021212114, mailed on Feb. 14, 2023, 4 pages.
Office Action received for Australian Patent Application No. 2021277718, mailed on Dec. 5, 2022, 3 pages.
Office Action received for Australian Patent Application No. 2021277718, mailed on Jan. 23, 2023, 4 pages.
Office Action received for Australian Patent Application No. 2021277718, mailed on Oct. 17, 2022, 4 pages.
Office Action received for Australian Patent Application No. 2022235585, mailed on Feb. 27, 2024, 5 pages.
Office Action received for Australian Patent Application No. 2022235585, mailed on Jul. 27, 2023, 4 pages.
Office Action received for Australian Patent Application No. 2022235609, mailed on Jul. 12, 2023, 4 pages.
Office Action received for Australian Patent Application No. 2023202432, mailed on Sep. 18, 2023, 4 pages.
Office Action received for Canadian Patent Application No. 2,915,678, mailed on Apr. 6, 2023, 18 pages.
Office Action received for Chinese Patent Application No. 201910875660.7, mailed on Aug. 12, 2023, 15 pages (6 pages of English Translation and 9 pages of Official Copy).
Office Action received for Chinese Patent Application No. 201910875660.7, mailed on Dec. 26, 2022, 7 pages (3 pages of English Translation and 4 pages of Official Copy).
Office Action received for Chinese Patent Application No. 201910875660.7, mailed on Oct. 18, 2023, 6 pages (3 pages of English Translation and 3 pages of Official Copy).
Office Action received for Chinese Patent Application No. 201911022448.2, mailed on Jan. 28, 2023, 16 pages (7 pages of English Translation and 9 pages of Official Copy).
Office Action received for Chinese Patent Application No. 201911022448.2, mailed on Jul. 14, 2023, 13 pages (5 pages of English Translation and 8 pages of Official Copy).
Office Action received for Chinese Patent Application No. 201911022448.2, mailed on Nov. 13, 2023, 13 pages (5 pages of English Translation and 8 pages of Official Copy).
Office Action received for Chinese Patent Application No. 201911023176.8, mailed on Apr. 15, 2023, 6 pages (3 pages of English Translation and 3 pages of Official Copy).
Office Action received for Chinese Patent Application No. 201911023176.8, mailed on Oct. 25, 2022, 12 pages (6 pages of English Translation and 6 pages of Official Copy).
Office Action received for Chinese Patent Application No. 201911127810.2, mailed on Feb. 23, 2023, 12 pages (4 pages of English Translation and 8 pages of Official Copy).
Office Action received for Chinese Patent Application No. 201911127810.2, mailed on Jul. 26, 2023, 11 pages (5 pages of English Translation and 6 pages of Official Copy).
Office Action received for Chinese Patent Application No. 201911127810.2, mailed on May 18, 2023, 12 pages (6 pages of English Translation and 6 pages of Official Copy).

Office Action received for Chinese Patent Application No. 201911129908.1, mailed on Mar. 1, 2023, 17 pages (7 pages of English Translation and 10 pages of Official Copy).
Office Action received for Chinese Patent Application No. 202110902807.4, mailed on Dec. 15, 2023, 12 pages (5 pages of English Translation and 7 pages of Official Copy).
Office Action received for Chinese Patent Application No. 202110902807.4, mailed on Jul. 4, 2023, 15 pages (6 pages of English Translation and 9 pages of Official Copy).
Office Action received for Chinese Patent Application No. 202211502699.2, mailed on Jan. 18, 2024, 14 pages (8 pages of English Translation and 6 pages of Official Copy).
Office Action received for Chinese Patent Application No. 202211502699.2, mailed on Jul. 1, 2023, 21 pages (9 pages of English Translation and 12 pages of Official Copy).
Office Action received for Chinese Patent Application No. 202211502699.2, mailed on Nov. 16, 2023, 17 pages (10 pages of English Translation and 7 pages of Official Copy).
Office Action received for European Patent Application No. 19156614.0, mailed on Apr. 24, 2023, 10 pages.
Office Action received for European Patent Application No. 19173371.6, mailed on Oct. 9, 2023, 21 pages.
Office Action received for European Patent Application No. 19173371.6, mailed on Sep. 13, 2022, 16 pages.
Office Action received for European Patent Application No. 19173886.3, mailed on Sep. 13, 2022, 13 pages.
Office Action received for European Patent Application No. 19206249.5, mailed on Jun. 16, 2023, 6 pages.
Office Action received for European Patent Application No. 20190670.8, mailed on Dec. 22, 2023, 7 pages.
Office Action received for European Patent Application No. 20212893.0, mailed on Jan. 4, 2023, 4 pages.
Office Action received for European Patent Application No. 20217518.8, mailed on Feb. 22, 2024, 7 pages.
Office Action received for European Patent Application No. 22157106.0, mailed on Dec. 21, 2023, 6 pages.
Office Action received for German Patent Application No. 112008004302.7, mailed on Sep. 9, 2023, 18 pages (6 pages of English Translation and 12 pages of Official Copy).
Office Action received for Indian Patent Application No. 202018015999, mailed on Feb. 21, 2023, 8 pages.
Office Action received for Japanese Patent Application No. 2021-111630, mailed on Feb. 10, 2023, 9 pages (4 pages of English Translation and 5 pages of Official Copy).
Office Action received for Japanese Patent Application No. 2021-126843, mailed on Aug. 29, 2022, 6 pages (3 pages of English Translation and 3 pages of Official Copy).
Office Action received for Japanese Patent Application No. 2021-175701, mailed on Dec. 2, 2022, 9 pages (5 pages of English Translation and 4 pages of Official Copy).
Office Action received for Japanese Patent Application No. 2022-045923, mailed on Apr. 3, 2023, 8 pages (4 pages of English Translation and 4 pages of Official Copy).
Office Action received for Japanese Patent Application No. 2022-045923, mailed on Sep. 8, 2023, 8 pages (4 pages of English Translation and 4 pages of Official Copy).
Office Action received for Korean Patent Application No. 10-2021-7006176, mailed on Oct. 7, 2022, 7 pages (3 pages of English Translation and 4 pages of Official Copy).
Office Action received for Korean Patent Application No. 10-2022-7045500, mailed on Apr. 24, 2023, 9 pages (4 pages of English Translation and 5 pages of Official copy).
Office Action received for Korean Patent Application No. 10-2022-7045500, mailed on Dec. 28, 2023, 5 pages (2 pages of English Translation and 3 pages of Official Copy).
Record of Oral Hearing received for U.S. Appl. No. 14/913,349 mailed on Sep. 23, 2022, 12 pages.
Record of Oral Hearing received for U.S. Appl. No. 15/655,253, mailed on Sep. 26, 2022, 14 pages.
Summons to Attend Oral Proceedings received for European Patent Application No. 19173886.3, mailed on Oct. 20, 2023, 18 pages.

(56) References Cited

OTHER PUBLICATIONS

Summons to Attend Oral Proceedings received for German Patent Application No. 112008004302.7, mailed on Oct. 11, 2023, 8 pages (2 pages of English Translation and 6 pages of Official Copy).
Supplemental Notice of Allowance received for U.S. Appl. No. 15/818,500, mailed on Mar. 24, 2023, 2 pages.
Supplemental Notice of Allowance received for U.S. Appl. No. 17/901,559, mailed on Dec. 11, 2023, 7 pages.
Supplemental Notice of Allowance received for U.S. Appl. No. 17/901,559, mailed on Jan. 16, 2024, 3 pages.
Supplemental Notice of Allowance received for U.S. Appl. No. 17/901,559, mailed on Nov. 3, 2023, 2 pages.
102252126, CN, A, Chinese Patent Office in an Office Action for related Patent Application No. 201911023176.8 on Oct. 25, 2022.
102890612, CN, A, Chinese Patent Office in an Office Action for related Patent Application 201911127810.2 on Feb. 23, 2023.
103034399, CN, A, Chinese Patent Office in an Office Action for related Patent Application No. 201910438645.6 on Dec. 28, 2022.
202982930, CN, U, Chinese Patent Office in an Office Action for related Patent Application 201911129908.1 on Mar. 1, 2023.
2001-5445, JP, A, Japanese Patent Office in an Office Action for related Patent Application No. 2022-045923 on Apr. 3, 2023.
2001-202170, JP, A, Japanese Patent Office in an Office Action for related Patent Application No. 2021-126843 on Aug. 29, 2022.
2003-256095, JP, A, Japanese Patent Office in an Office Action for related Patent Application No. 2022-045923 on Apr. 3, 2023.
2004-23581, JP, A, Japanese Patent Office in an Office Action for related Patent Application No. 2021-175701 on Dec. 2, 2022.
2006-311209, JP, A, Japanese Patent Office in an Office Action for related Patent Application No. 2021-175701 on Dec. 2, 2022.
2012-168620, JP, A, Japanese Patent Office in an Office Action for related Patent Application 2022-126562 on Sep. 29, 2023.
2013-168086, JP, A, Japanese Patent Office in an Office Action for related Patent Application 2022-126562 on Sep. 29, 2023.
2013-3718, JP, A, Japanese Patent Office in an Office Action for related Patent Application No. 2021-111630 on Aug. 5, 2022.
Notice of Allowance received for Japanese Patent Application No. 2021-111630, mailed on Mar. 15, 2024, 23 pages (1 page of English Translation and 22 pages of Official Copy).

\* cited by examiner

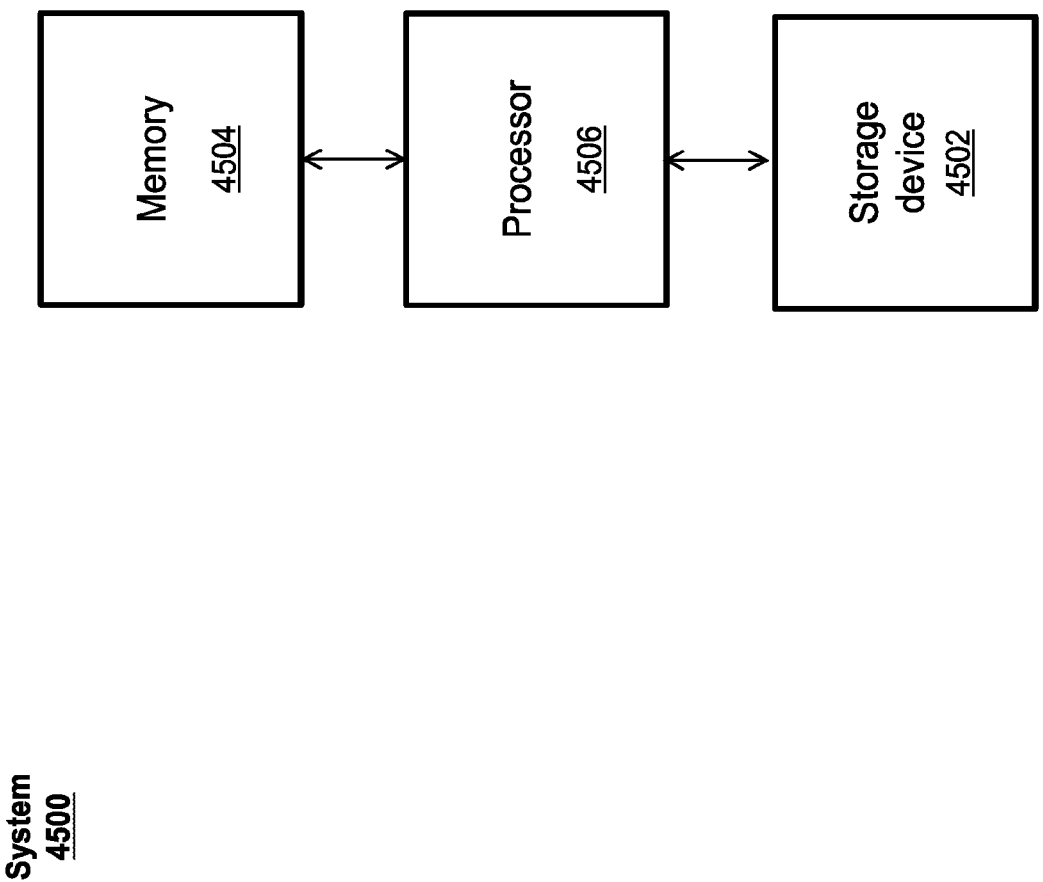

CROWN INPUT FOR A WEARABLE ELECTRONIC DEVICE

CROSS-REFERENCE TO RELATED APPLICATIONS

This application is a continuation of U.S. patent application Ser. No. 15/049,049, filed Feb. 20, 2016, entitled "CROWN INPUT FOR A WEARABLE ELECTRONIC DEVICE," which is a continuation of U.S. patent application Ser. No. 14/913,345, filed Feb. 19, 2016, entitled "CROWN INPUT FOR A WEARABLE ELECTRONIC DEVICE," which is a national stage application of International Patent Application Serial Number PCT/US2014/053951, filed Sep. 3, 2014, entitled "CROWN INPUT FOR A WEARABLE ELECTRONIC DEVICE", which claims priority to: U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES. International Patent Application Serial Number PCT/US2014/053951, filed Sep. 3, 2014, entitled "CROWN INPUT FOR WEARABLE A ELECTRONIC DEVICE," is also a continuation-in-part of U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES". The content of these applications is hereby incorporated by reference in its entirety for all purposes.

This application is related to International Patent Application Serial Number PCT/US2014/053961, filed Sep. 3, 2014, entitled "USER INTERFACE FOR MANIPULATING USER INTERFACE OBJECTS WITH MAGNETIC PROPERTIES"; International Patent Application Serial Number PCT/US2014/053957, filed Sep. 3, 2014, entitled "USER INTERFACE FOR MANIPULATING USER INTERFACE OBJECTS"; and International Patent Application Serial Number PCT/US2014/053958 filed Sep. 3, 2014, entitled "USER INTERFACE OBJECT MANIPULATIONS IN A USER INTERFACE".

FIELD

The following disclosure relates generally to wearable electronic devices and, more specifically, to interfaces for wearable electronic devices.

BACKGROUND

Advanced personal electronic devices can have small form factors. These personal electronic devices can include, but are not limited to, tablets and smart phones. Use of such personal electronic devices involves manipulation of user interface objects on display screens that also have small form factors to complement the design of the personal electronic devices.

Exemplary manipulations that users can perform on personal electronic devices can include navigating a hierarchy, selecting a user interface object, adjusting the position, size, and zoom of user interface objects, or otherwise manipulating the user interfaces. Exemplary user interface objects can include digital images, video, text, icons, maps, control elements, such as buttons, and other graphics. A user can perform such manipulations in image management software, video editing software, word processing software, software execution platforms, such as an operating system's desktop, website browsing software, and other environments.

Existing methods for manipulating user interface objects on reduced-size touch-sensitive displays can be inefficient. Further, existing methods generally provide less precision than is preferable.

SUMMARY

The present disclosure relates to manipulating a user interface on a wearable electronic device using a mechanical crown. In some examples, the user interface can be scrolled or scaled in response to a rotation of the crown. The direction of the scrolling or scaling and the amount of scrolling or scaling can depend on the direction and amount of rotation of the crown, respectively. In some examples, the amount of scrolling or scaling can be proportional to the change in rotation angle of the crown. In other examples, a velocity of scrolling or a velocity of scaling can depend on a velocity of angular rotation of the crown. In these examples, a greater velocity of rotation can cause a greater velocity of scrolling or scaling to be performed on the displayed view.

BRIEF DESCRIPTION OF THE DRAWINGS

FIG. 45 illustrates an exemplary computing system for modifying a user interface in response to a rotation of a crown according to various examples.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

The present disclosure relates to manipulating a user interface on a wearable electronic device using a mechanical crown. In some examples, the user interface can be scrolled or scaled in response to a rotation of the crown. The direction of the scrolling or scaling and the amount of scrolling or scaling can depend on the direction and amount of rotation of the crown, respectively. In some examples, the amount of scrolling or scaling can be proportional to the change in rotation angle of the crown. In other examples, a velocity of scrolling or a velocity of scaling can depend on a velocity of angular rotation of the crown. In these examples, a greater velocity of rotation can cause a greater velocity of scrolling or scaling to be performed on the displayed view.

Figure 1:
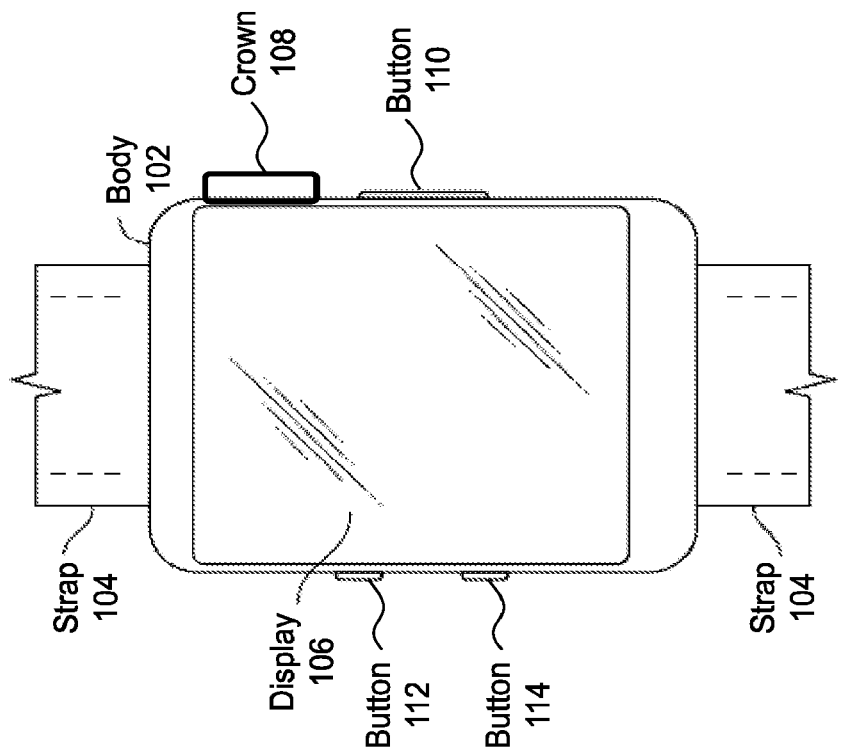
FIG. 1 illustrates an exemplary wearable electronic device according to various examples.

FIG. 1 illustrates exemplary personal electronic device 100. In the illustrated example, device 100 is a watch that generally includes body 102 and strap 104 for affixing device 100 to the body of a user. That is, device 100 is wearable. Body 102 can be designed to couple with straps 104. Device 100 can have touch-sensitive display screen (hereafter touchscreen) 106 and crown 108. Device 100 can also have buttons 110, 112, and 114.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 108 can be mechanical meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be rocked in one or more directions or translated along a track along an edge or at least partially around a perimeter of body 102. In some examples, more than one crown 108 can be used. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching over hovering near the touch sensor panel using one or more fingers or other object.

In some examples, device 100 can further include one or more pressure sensors (not shown) for detecting an amount of force or pressure applied to the display. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position that the force is being applied to display 106.

Figure 2:
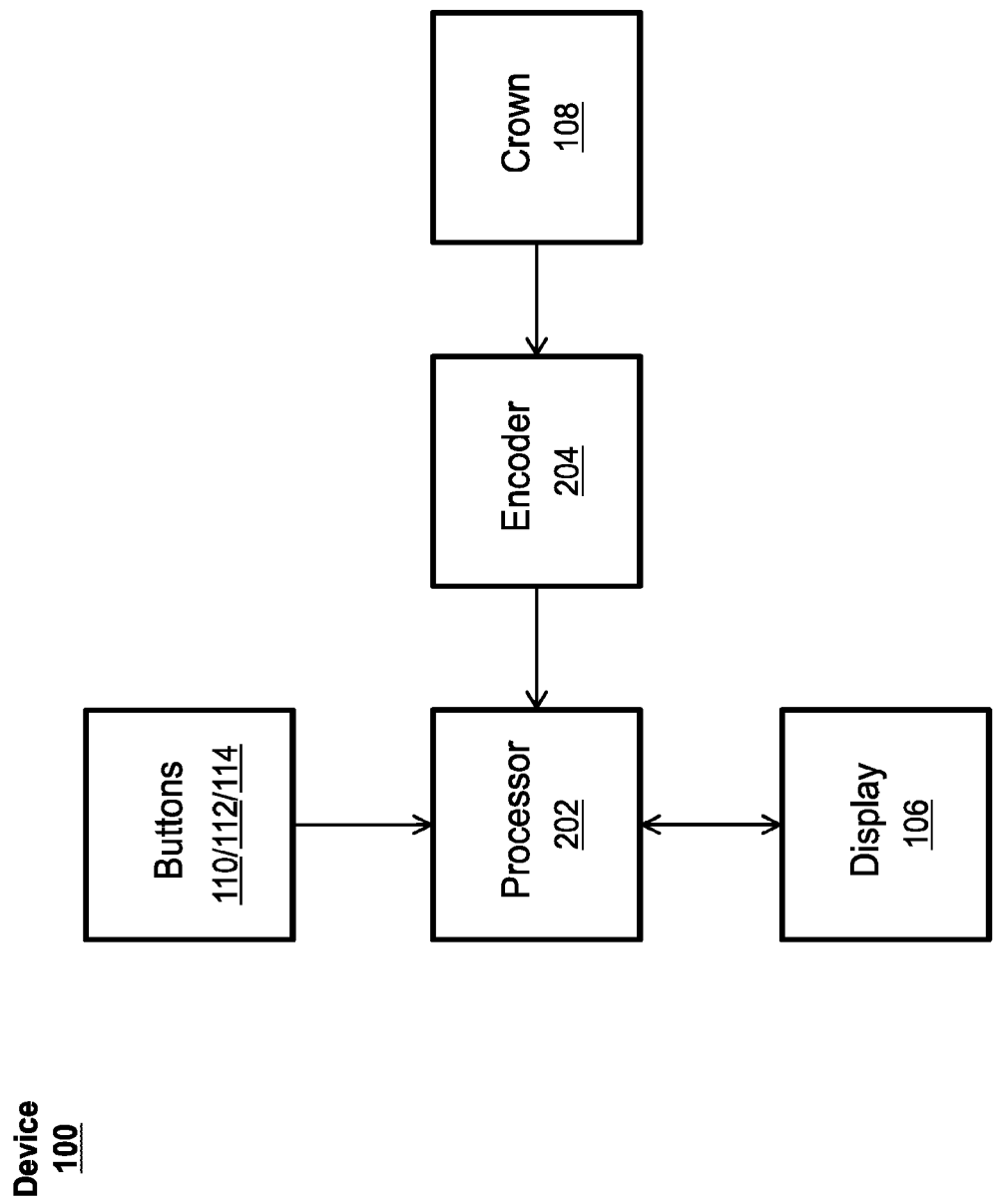
FIG. 2 illustrates a block diagram of an exemplary wearable electronic device according to various examples.

FIG. 2 illustrates a block diagram of some of the components of device 100. As shown, crown 108 can be coupled to encoder 204, which can be configured to monitor a physical state or change of physical state of crown 108 (e.g., the position of the crown), convert it to an electrical signal (e.g., convert it to an analog or digital signal representation of the position or change in position of crown 108), and provide the signal to processor 202. For instance, in some examples, encoder 204 can be configured to sense the absolute rotational position (e.g., an angle between 0-360°) of crown 108 and output an analog or digital representation of this position to processor 202. Alternatively, in other examples, encoder 204 can be configured to sense a change in rotational position (e.g., a change in rotational angle) of crown 108 over some sampling period and to output an analog or digital representation of the sensed change to processor 202. In these examples, the crown position information can further indicate a direction of rotation of the crown (e.g., a positive value can correspond to one direction and a negative value can correspond to the other). In yet other examples, encoder 204 can be configured to detect a rotation of crown 108 in any desired manner (e.g., velocity, acceleration, or the like) and can provide the crown rotational information to processor 202. The rotational velocity can be expressed in numerous ways. For example, the rotational velocity can be expressed in a direction and a speed of rotation, such as hertz, as rotations per unit of time, as rotations per frame, as revolutions per unit of time, as revolutions per frame, as a change in angle per unit of time, and the like. In alternative examples, instead of providing information to processor 202, this information can be provided to other components of device 100. While the examples described herein refer to the use of rotational position of crown 108 to control scrolling or scaling of a view, it should be appreciated that any other physical state of crown 108 can be used.

In some examples, the physical state of the crown can control physical attributes of display 106. For example, if crown 108 is in a particular position (e.g., rotated forward), display 106 can have limited z-axis traversal ability. In other words, the physical state of the crown can represent physical modal functionality of display 106. In some examples, a temporal attribute of the physical state of crown 108 can be used as an input to device 100. For example, a fast change in physical state can be interpreted differently than a slow change in physical state.

Processor 202 can be further coupled to receive input signals from buttons 110, 112, and 114, along with touch signals from touch-sensitive display 106. Processor 202 can be configured to interpret these input signals and output appropriate display signals to cause an image to be produced by touch-sensitive display 106. While a single processor 202 is shown, it should be appreciated that any number of processors or other computational devices can be used to perform the general functions discussed above.

Figure 3:
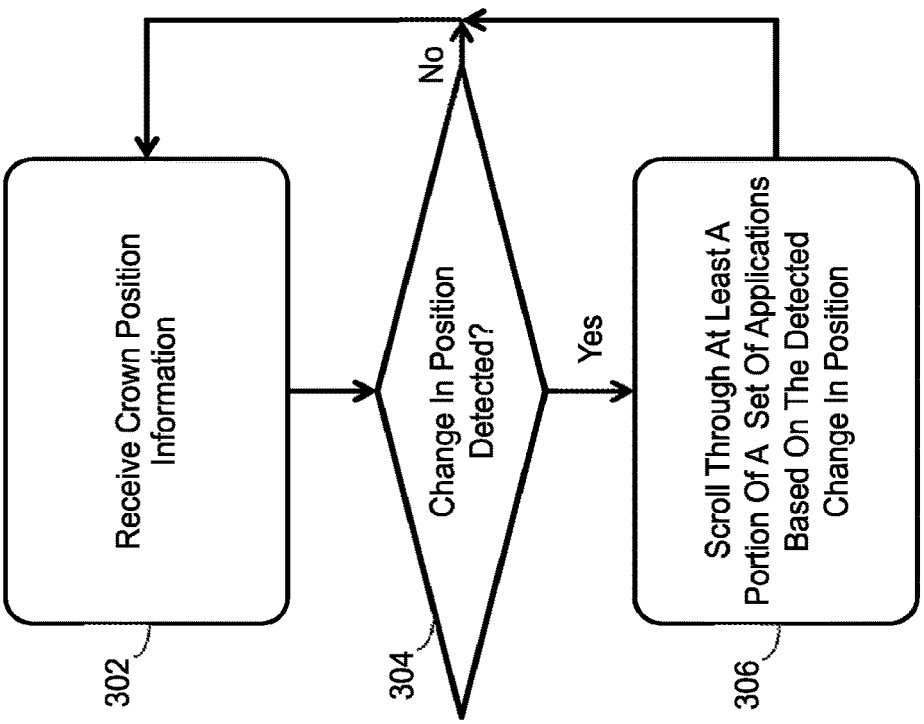
FIG. 3 illustrates an exemplary process for scrolling through applications using a crown according to various examples.

FIG. 3 illustrates an exemplary process 300 for scrolling through a set of displayed applications using a crown according to various examples. In some examples, process 300 can be performed by a wearable electronic device similar to device 100. In these examples, a visual representation (e.g., icons, graphical images, textual images, and the like) of one or more applications of a set of applications can be displayed on display 106 of device 100 and process 300 can be performed to visually scroll through the set of applications by sequentially displaying the applications in response to a turning of crown 108. In some examples, the scrolling can be performed by translating the displayed contents along a fixed axis.

At block 302, crown position information can be received. In some examples, the crown position information can include an analog or digital representation of the absolute position of the crown, such as an angle between 0-360°. In other examples, the crown position information can include an analog or digital representation of a change in rotational position of the crown, such as a change in rotational angle. For example, an encoder similar to encoder 204 can be coupled to a crown similar to crown 108 to monitor and measure its position. The encoder can convert the position of crown 108 into crown position information that can be transmitted to a processor similar to processor 202.

At block 304, it can be determined if a change in position has been detected. In some examples, where the crown position information includes an absolute position of the crown, determining whether a change in position has occurred can be performed by comparing the position of the crown at two different instances in time. For example, the processor (e.g., processor 202) can compare the most recent position of the crown (e.g., crown 108) as indicated by the crown position information to an earlier (e.g., immediately preceding) position of the crown as indicated by previously received crown position information. If the positions are the same or within a threshold value (e.g., a value corresponding to a tolerance of the encoder), it can be determined that no change in position has occurred. If, however, the positions are not the same or are different by at least the threshold value, it can be determined that a change in position has occurred. In other examples, where the crown position information includes a change in position over some length of time, determining whether a change in position has occurred can be performed by determining whether the absolute value of the change in position is equal to zero or is less than a threshold value (e.g., a value corresponding to a tolerance of the encoder). If the absolute value of the change in position is equal to zero or is less than the threshold value, it can be determined that no change in position has occurred. If, however, the absolute value of the change in position is greater than zero or the threshold value, it can be determined that a change in position has occurred.

If it is determined at block 304 that no change in position of the crown has been detected, the process can return to block 302 where new crown position information can be received. If, however, it is instead determined at block 304 that that a change in position of the crown has been detected, the process can proceed to block 306. As described herein, a positive determination at block 304 can cause the process to proceed to block 306, while a negative determination can cause the process to return to block 302. However, it should be appreciated that the determination performed at block 304 can be reversed such that a positive determination can cause the process to return to block 302, while a negative determination can cause the process to proceed to block 306. For example, block 304 can alternatively determine if no change in position is detected.

At block 306, at least a portion of a set of applications can be scrolled through based on the detected change in position. The set of applications can include any ordered or unordered set of applications. For example, the set of applications can include all applications stored on the wearable electronic device, all open applications on the wearable electronic device, a user-selected set of applications, or the like. Additionally, the applications can be ordered based on frequency of use, a user-defined ordering, relevance, or any other desired ordering.

In some examples, block 306 can include visually scrolling through the set of applications by sequentially displaying the applications in response to the detected change in position of the crown. For example, the display (e.g., display 106) can be displaying one or more applications of the set of applications. In response to detecting a change in position of the crown (e.g., crown 108), the currently displayed one or more applications can be translated off the display to make room for one or more other applications to be translated onto the display. In some examples, the one or more other applications being translated onto the display can be selected for display based on their relative ordering within the set of applications corresponding to the direction opposite the direction of translation. The direction of the translation can depend on the direction of the change in position of the crown. For example, turning the crown clockwise can cause a scrolling of the display in one direction, while turning the crown counter-clockwise can cause a scrolling of the display in a second (e.g., opposite) direction. Additionally, the distance or speed of scrolling can depend on the amount of detected change in the position of the crown. The distance of scrolling can refer to the on-screen distance that the content is scrolled. The speed of scrolling can refer to the distance that the content is scrolled over a length of time. In some examples, the distance or speed of the scrolling can be proportional to the amount of detected rotation. For instance, the amount of scroll corresponding to a half-turn of the crown can be equal to 50% of the amount of scroll corresponding to a full turn of the crown. In some examples where the set of applications includes an ordered list of applications, the scrolling can stop in response to reaching the end of the list. In other examples, the scrolling can continue by looping around to the opposite end of the list of applications. The process can then return to block 302 where new crown position information can be received.

It should be appreciated that the actual values used to linearly map the change in crown position to the distance or speed of scrolling can be varied depending on the desired functionality of the device. Moreover, it should be appreciated that other mappings between the scroll amount or speed and the change in the position of the crown can be used. For example, acceleration, velocity (described in greater detail below with respect to FIGS. 21-44), or the like, can be used to determine the distance or speed of scrolling. Additionally, non-linear mappings between the crown characteristic (e.g., position, velocity, acceleration, etc.) and the scroll amount or scroll speed can be used.

Figure 4:
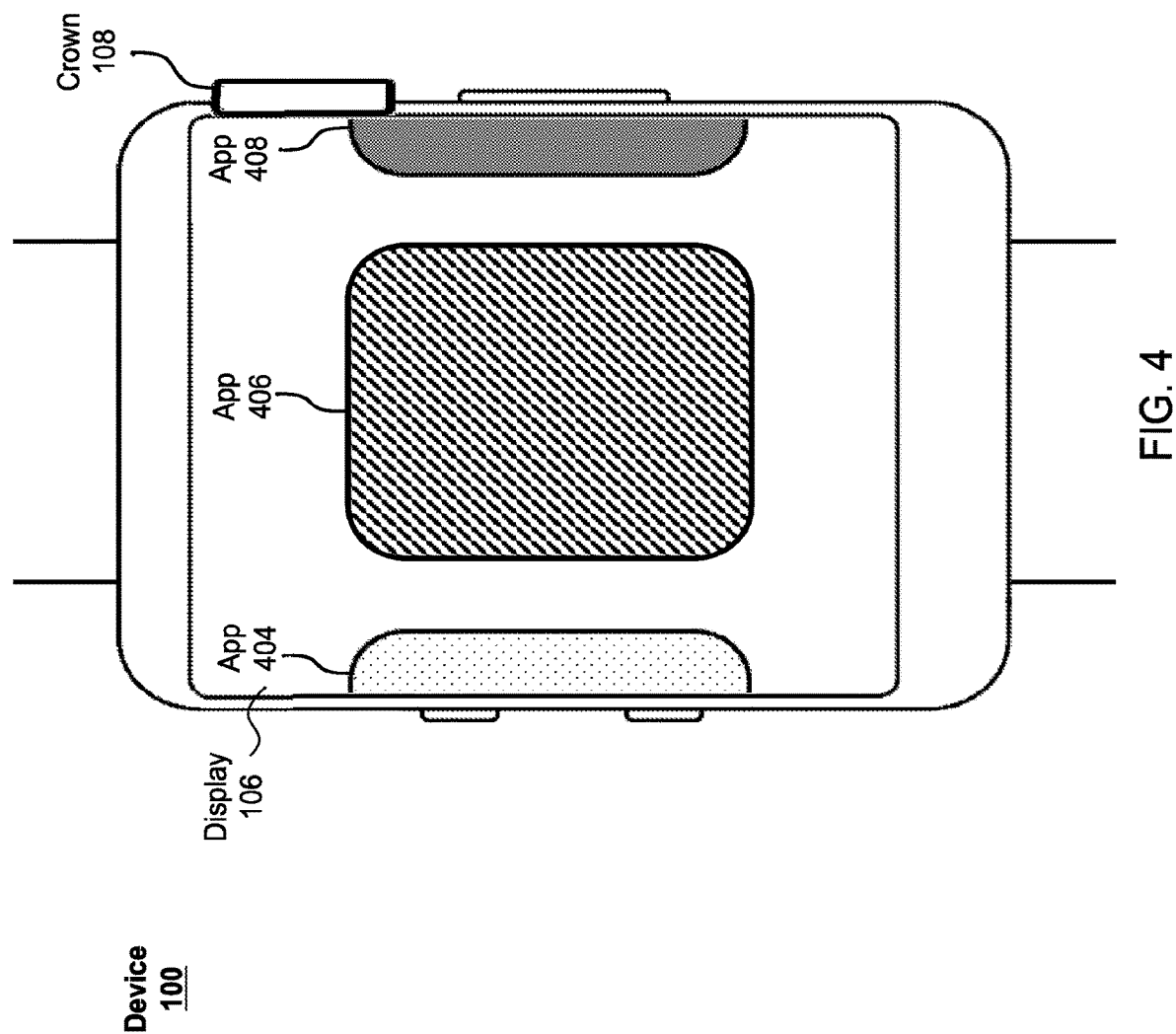
FIGS. 4-8 illustrate screens showing the scrolling of applications using the process of FIG. 3.

To further illustrate the operation of process 300, FIG. 4 depicts an example interface of device 100 having a visual representation (e.g., icons, graphical images, textual images, and the like) of application 406 and portions of the visual representations of applications 404 and 408. Applications 404, 406, and 408 can be part of a set of applications that includes any group of any number of ordered or unordered applications (e.g., all applications on device 100, all open applications on device 100, user favorites, or the like). At block 302 of process 300, processor 202 of device 100 can receive crown position information from encoder 204. Since crown 108 is not being rotated in FIG. 4, a negative determination can be made by processor 202 at block 304, causing the process to return to block 302.

Figure 5:
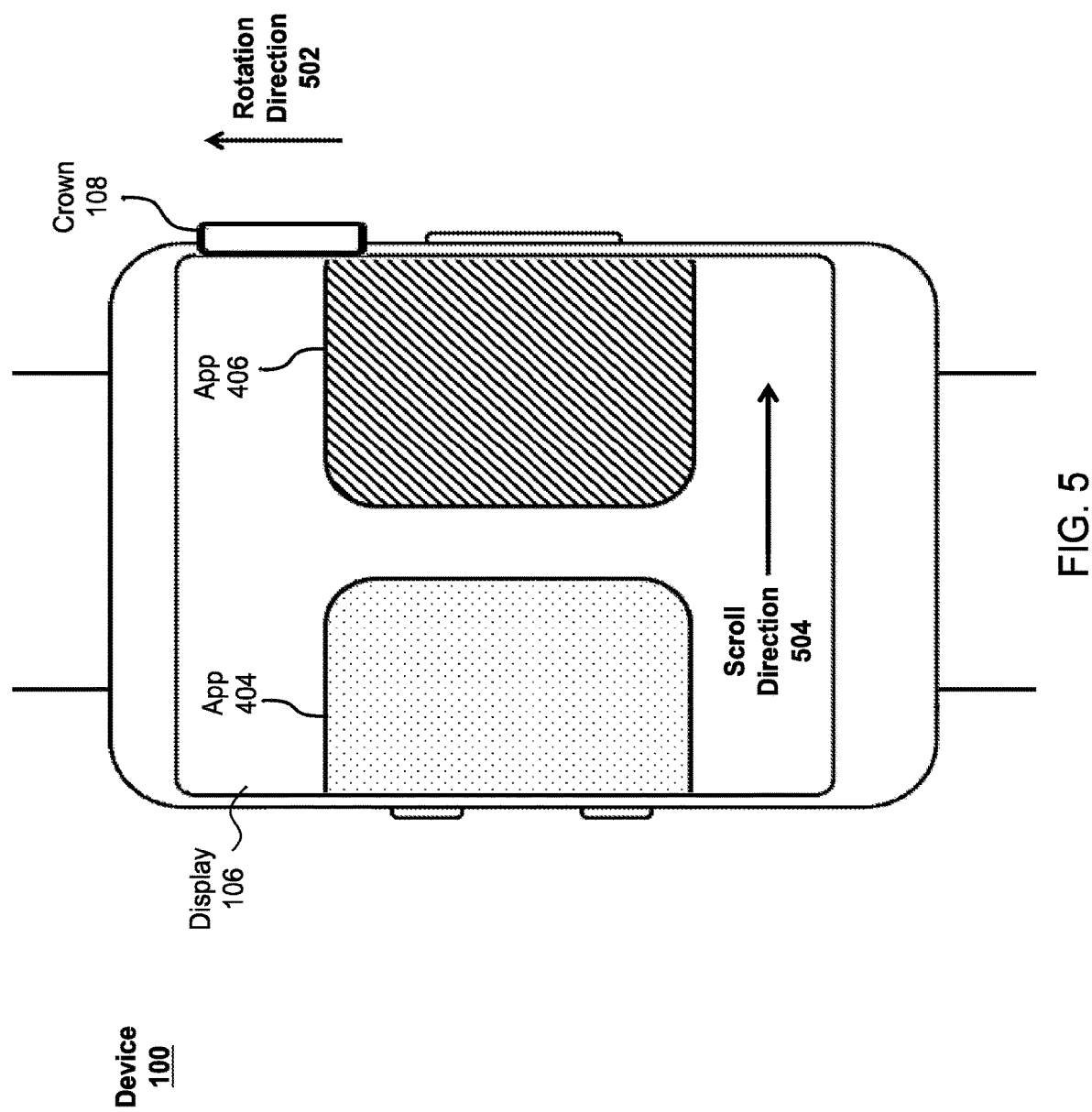
Figure 6:
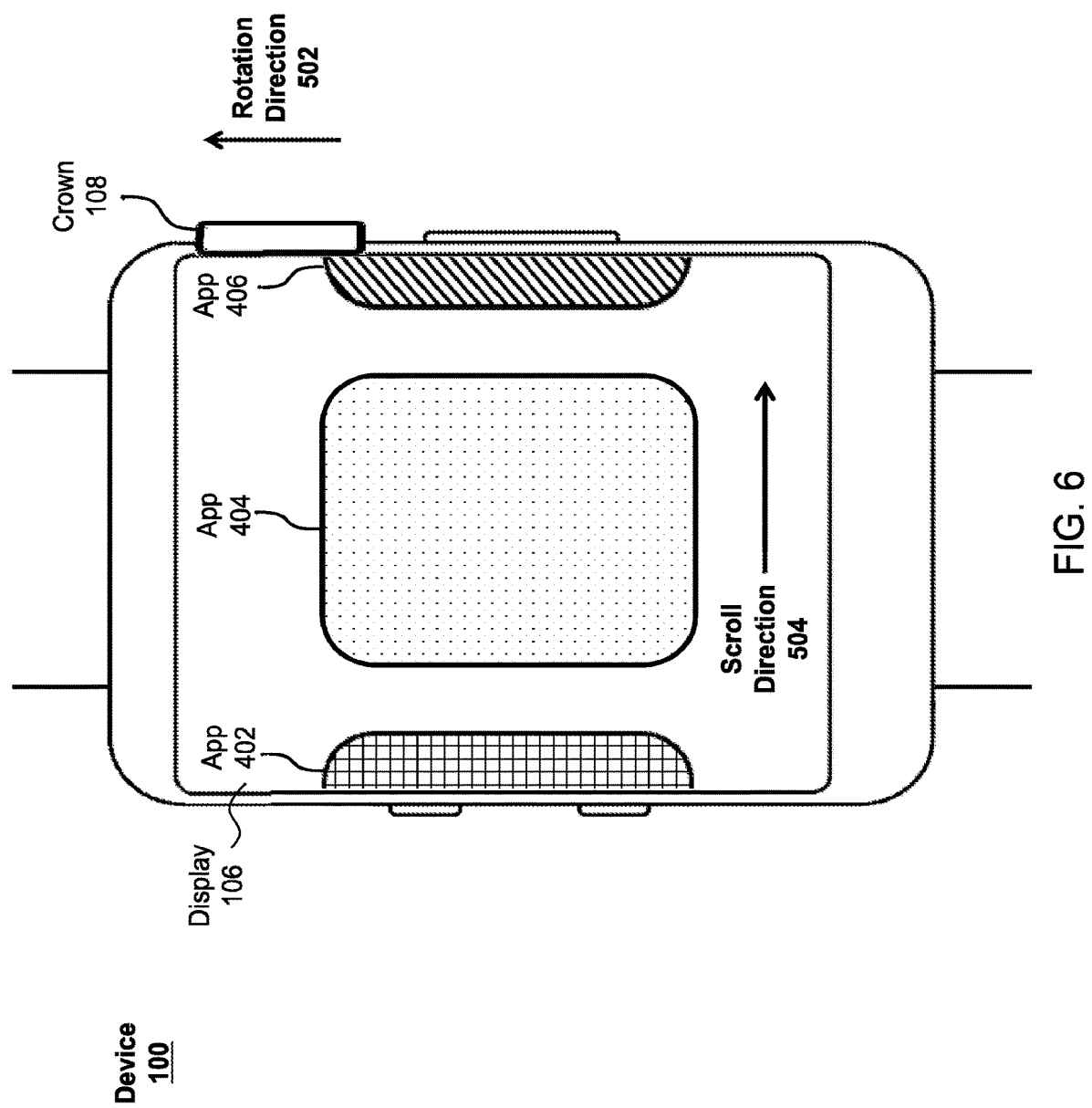

Referring now to FIG. 5, crown 108 is being rotated in the upward direction as indicated by rotation direction 502. Processor 202 can again receive crown position information that reflects this rotation from encoder 204 at block 302 of process 300. Thus, processor 202 can make a positive determination at block 304, causing the process to proceed to block 306. At block 306, processor 202 can cause display 106 to scroll through at least a portion of the set of applications on device 100. The scrolling can have a scroll direction 504 corresponding to the rotation direction 502 of crown 108 and a scroll amount or speed based on a characteristic (e.g., distance, velocity, acceleration, or the like) of the rotation of crown 108. In the illustrated example, the scroll distance can be proportional to the amount of rotation of crown 108. As shown, display 106 can scroll through the set of applications by causing the visual representations of the applications to translate in scroll direction 504. As a result, application 408 has been completely removed from display 106, a portion of application 406 has been removed from display 106, and a greater portion of application 404 is displayed on display 106. As the user continues to rotate crown 108 in rotation direction 502, processor 202 can continue to cause display 106 to scroll the view of the set of applications in scroll direction 504, as shown in FIG. 6. In FIG. 6, application 406 is barely visible on the right side of display 106, application 404 is centered within display 106, and a newly displayed application 402 is displayed on the left side of display 106. In this example, application 402 can be another application within the set of applications and can have an ordered position to the left or previous to application 404. In some examples, if application 402 is the first application in the list of applications and the user continues to rotate crown 108 in rotation direction 502, processor 202 can limit the scrolling of display 106 to stop scrolling once application 402 is centered within the display. Alternatively, in other examples, processor 202 can continue the scrolling of display 106 by looping to the end of the set of applications to cause the last application (e.g., application 408) of the set of applications to be displayed to the left of application 402.

Figure 7:
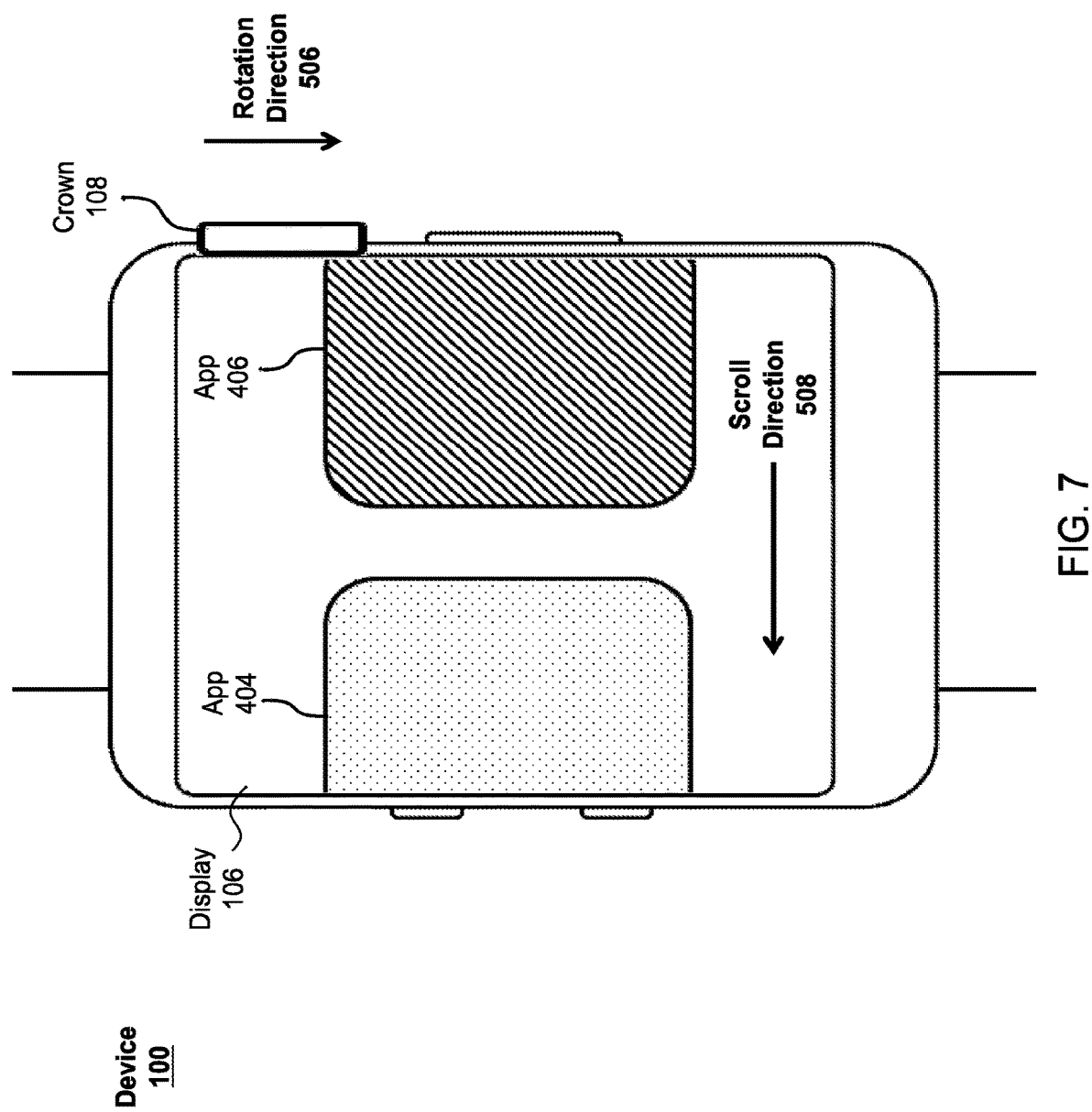
Figure 8:
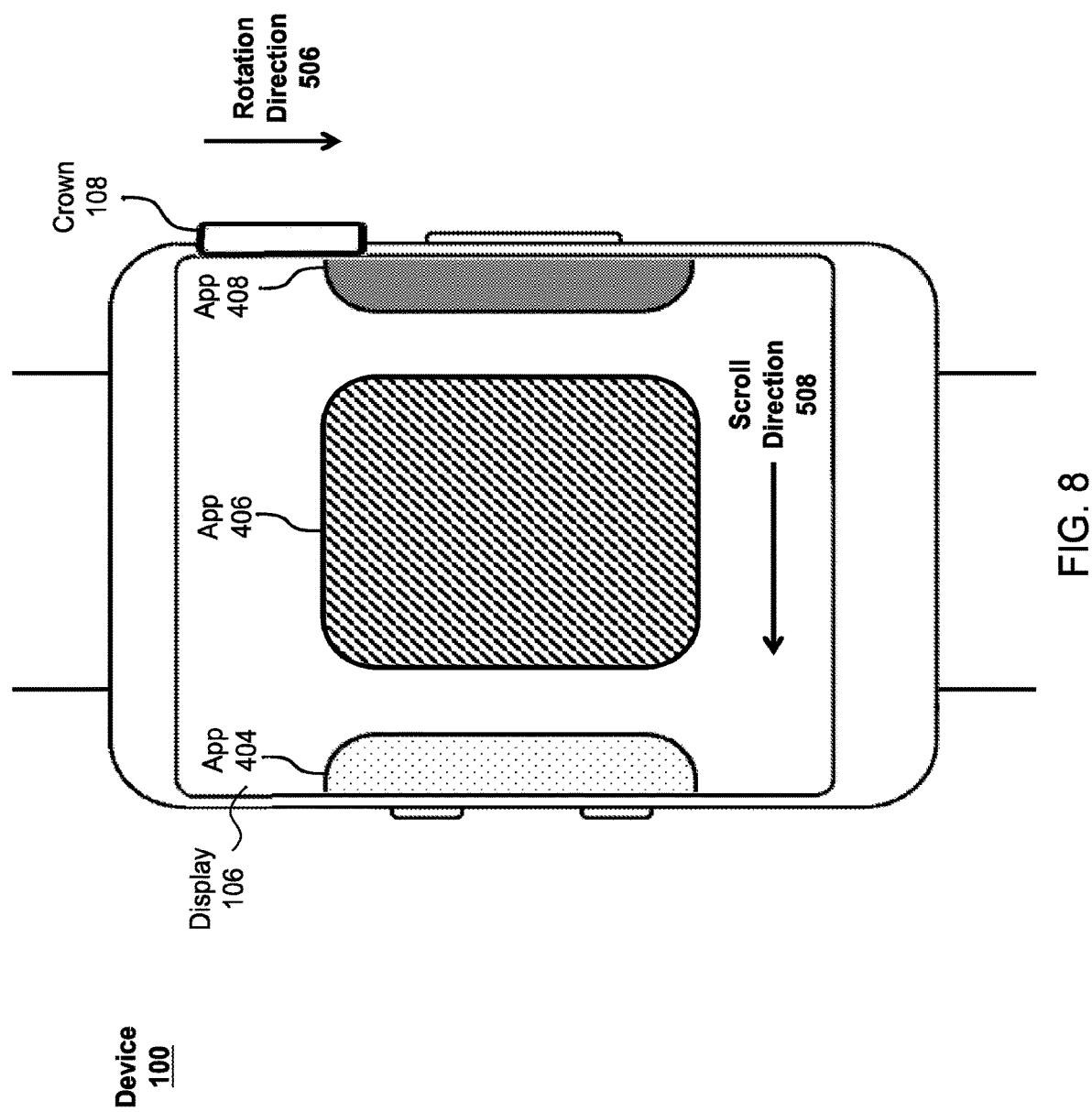

Referring now to FIG. 7, crown 108 is being rotated in the downward rotation direction 506. Processor 202 can again receive crown position information that reflects this rotation from encoder 204 at block 302 of process 300. Thus, processor 202 can make a positive determination at block 304, causing the process to proceed to block 306. At block 306, processor 202 can cause display 106 to scroll the view of applications in scroll direction 508 corresponding to rotation direction 506. In this example, scroll direction 508 is in the opposite direction of scroll direction 504. However, it should be appreciated that scroll direction 508 can be in any desired direction. Similar to the scrolling performed in response to rotation of crown 108 in rotation direction 502, the scrolling performed in response to the rotation of crown 108 in rotation direction 506 can depend on a characteristic (e.g., distance, velocity, acceleration, or the like) of the rotation of crown 108. In the illustrated example, the scroll distance can be proportional to the amount of rotation of crown 108. As shown, display 106 can scroll through the set of applications by causing the visual representations of the applications to translate in scroll direction 508. As a result, application 402 has been completely removed from display 106, a portion of application 404 has been removed from display 106, and a greater portion of application 406 is displayed on display 106. As the user continues to rotate crown 108 in rotation direction 506, processor 202 can continue to cause display 106 to scroll the view of the set of applications in scroll direction 508, as shown in FIG. 8. In FIG. 8, application 404 is barely visible on the left side of display 106, application 406 is centered within display 106, and application 408 is again displayed on the right side of display 106. In some examples, if application 408 is the last application in the list of applications and the user were to continue to rotate crown 108 in rotation direction 508, processor 202 can limit the scrolling of display 106 to stop scrolling once application 408 is centered within the display. Alternatively, in other examples, processor 202 can continue the scrolling of display 106 by looping to the start of the set of applications to cause the first application (e.g., application 402) of the set of applications to be displayed to the right of application 408.

While a specific scrolling example is provided, it should be appreciated that other displays of applications can similarly be scrolled using a mechanical crown of a wearable electronic device in a similar manner. Additionally, the distance or speed of scrolling can be configured to depend on any characteristic of the crown.

Figure 9:
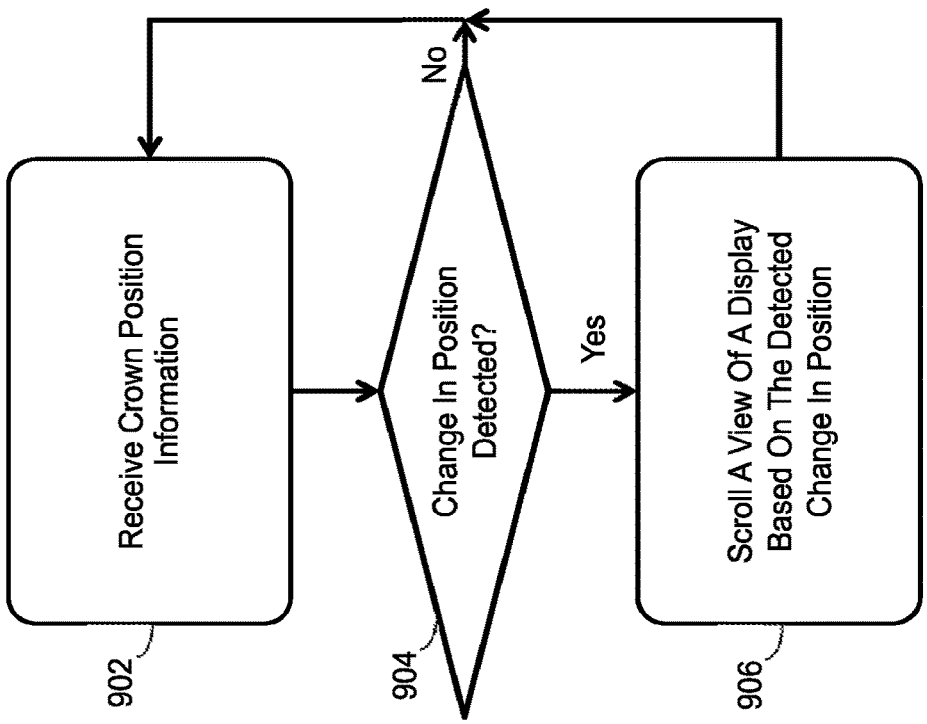
FIG. 9 illustrates an exemplary process for scrolling a view of a display using a crown according to various examples.

FIG. 9 illustrates an exemplary process 900 for scrolling a view of a display using a crown according to various examples. The view can include a visual representation of any type of data being displayed. For example, the view can include a display of a text, a media item, a webpage, a map, or the like. Process 900 can be similar to process 300, except that it can be more generally applied to any type of content or view being displayed on the display of a device. In some examples, process 900 can be performed by a wearable electronic device similar to device 100. In these examples, content or any other view can be displayed on display 106 of device 100 and process 900 can be performed to visually scroll the view in response to a turning of crown 108. In some examples, the scrolling can be performed by translating the displayed contents along a fixed axis.

At block 902, crown position information can be received in a manner similar or identical to that described above with respect to block 302. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 904, it can be determined if a change in position has been detected in a manner similar or identical to that described above with respect to block 304. For instance, block 904 can include comparing the position of the crown at two different instances in time, or can include determining if an absolute value of a change in crown position is equal to zero or below a threshold value. If no change in position is detected, the process can return to block 902. Alternatively, if a change in position is detected, the process can proceed to block 906. As described herein, a positive determination at block 904 can cause the process to proceed to block 906, while a negative determination can cause the process to return to block 902. However, it should be appreciated that the determination performed at block 904 can be reversed such that a positive determination can cause the process to return to block 902, while a negative determination can cause the process to proceed to block 906. For example, block 904 can alternatively determine if no change in position is detected.

At block 906, a view of a display can be scrolled based on the detected change in position. Similar to block 306 of process 300, block 906 can include visually scrolling a view by translating the view of the display in response to the detected change in position of the crown. For example, the display (e.g., display 106) can be displaying a portion of some content. In response to detecting a change in position of the crown (e.g., crown 108), the currently displayed portion of the content can be translated off the display to make room for other portions of the content that were not previously displayed. The direction of the translation can depend on the direction of the change in position of the crown. For example, turning the crown clockwise can cause a scrolling of the display in one direction, while turning the crown counter-clockwise can cause a scrolling of the display in a second (e.g., opposite) direction. Additionally, the distance or speed of scrolling can depend on the amount of detected change in the position of the crown. In some examples, the distance or speed of the scrolling can be proportional to the amount of detected rotation. For instance, the amount of scroll corresponding to a half-turn of the crown can be equal to 50% of the amount of scroll corresponding to a full turn of the crown. The process can then return to block 902 where new crown position information can be received.

It should be appreciated that the actual values used to linearly map the change in crown position to the distance or speed of scrolling can be varied depending on the desired functionality of the device. Moreover, it should be appreciated that other mappings between the scroll amount and change in position can be used. For example, acceleration, velocity (described in greater detail below with respect to FIGS. 21-44), or the like, can be used to determine the distance or speed of scrolling. Additionally, non-linear mappings between the crown characteristic (e.g., position, velocity, acceleration, etc.) and the scroll amount or scroll speed can be used.

Figure 10:
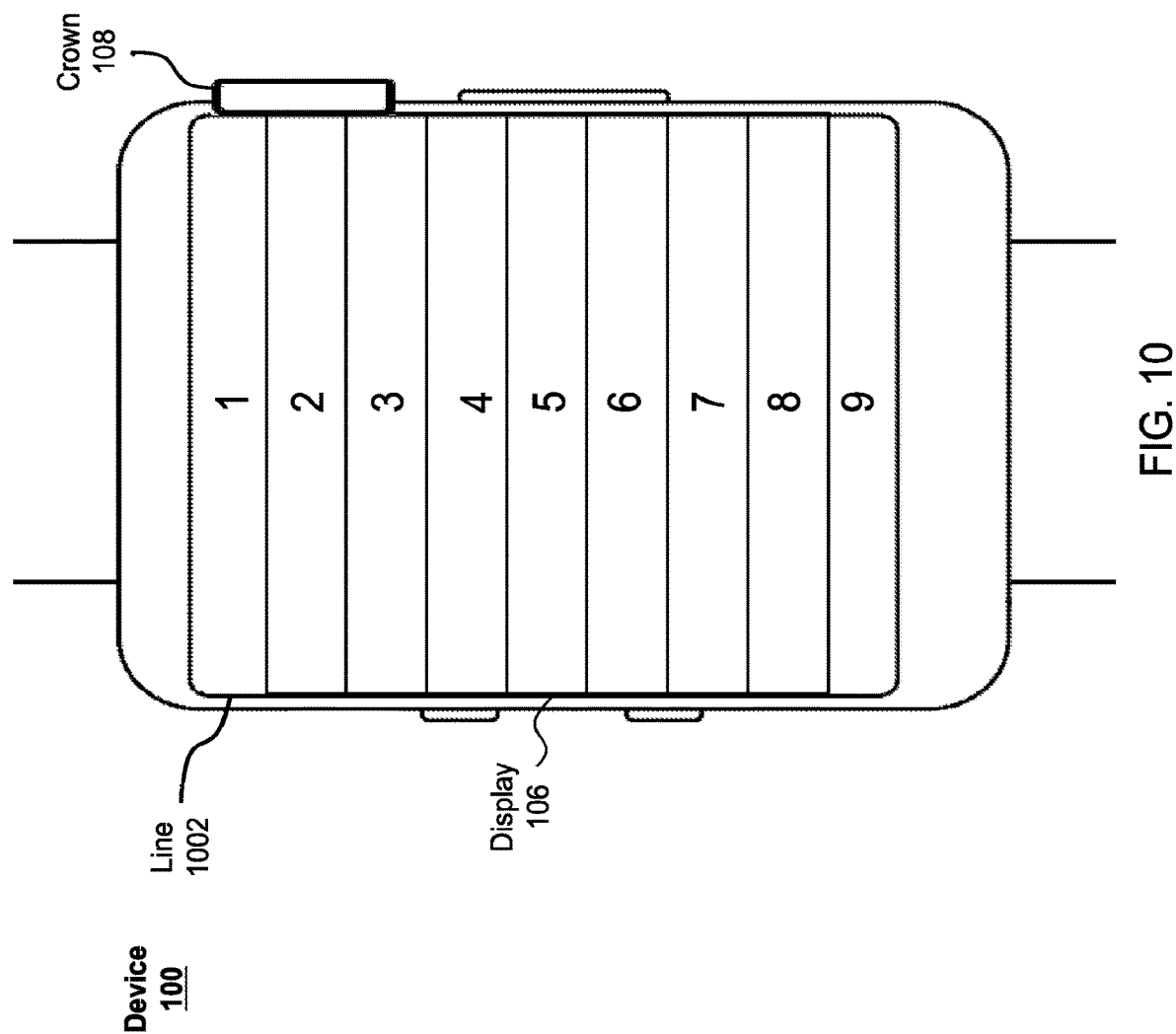
FIGS. 10-14 illustrate screens showing the scrolling of a view of a display using the process of FIG. 9.

To further illustrate the operation of process 900, FIG. 10 depicts an example interface of device 100 having a visual representation of lines of text containing numbers 1-9. At block 902 of process 900, processor 202 of device 100 can receive crown position information from encoder 204. Since crown 108 is not being rotated in FIG. 10, a negative determination can be made by processor 202 at block 904, causing the process to return to block 902.

Figure 11:
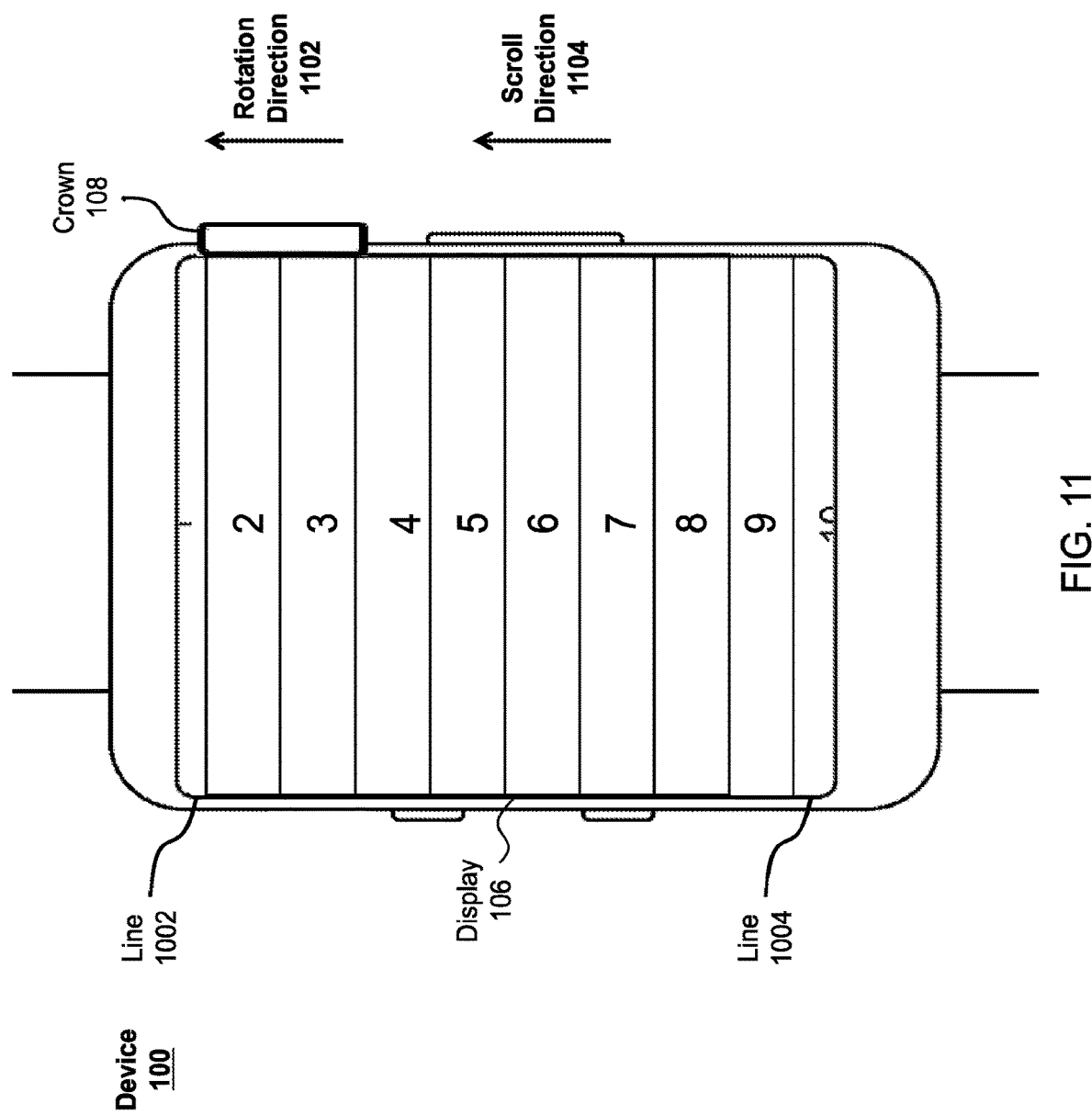
Figure 12:
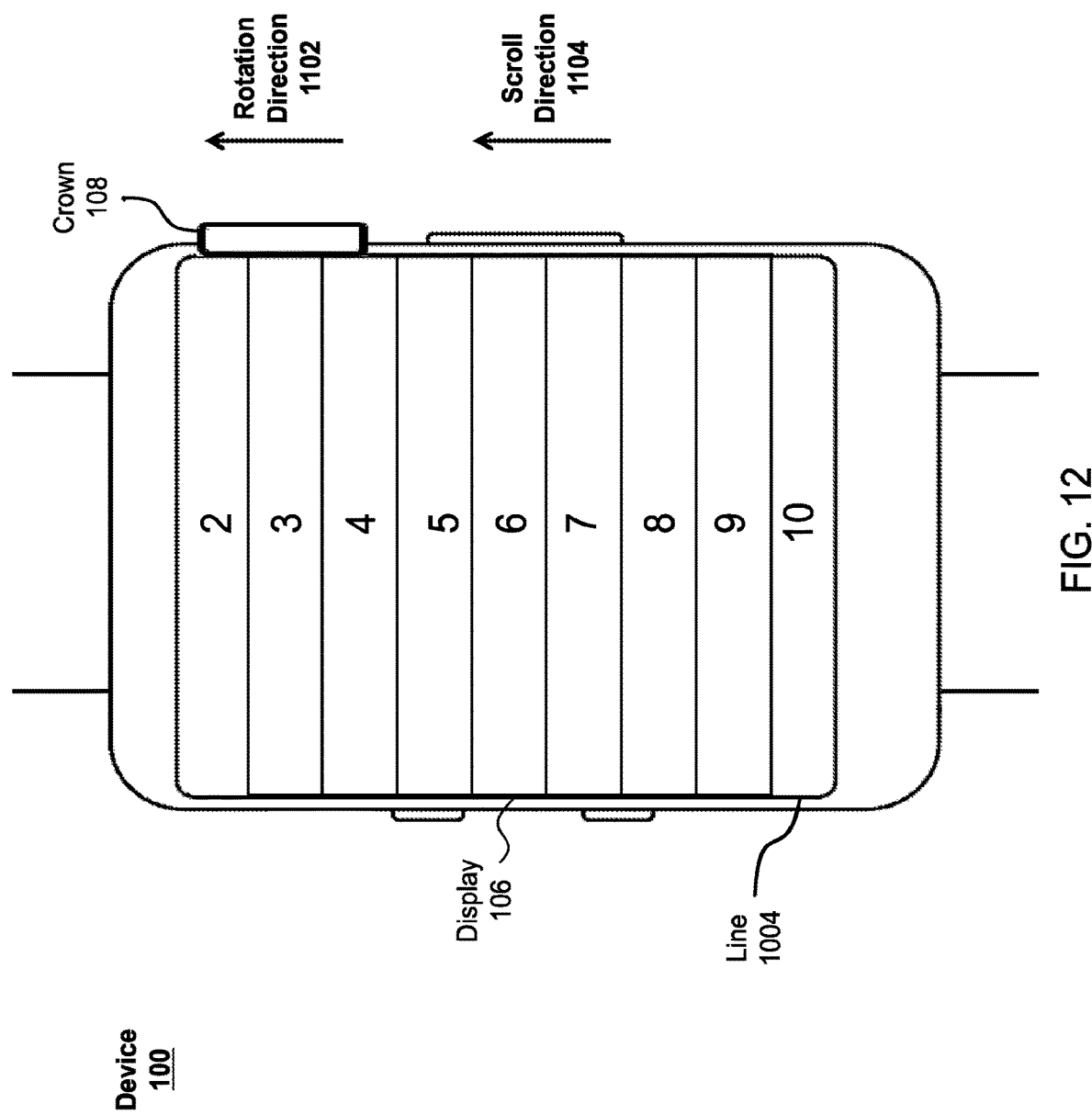

Referring now to FIG. 11, crown 108 is being rotated in the upward rotation direction 1102. Processor 202 can again receive crown position information that reflects this rotation from encoder 204 at block 902 of process 900. Thus, processor 202 can make a positive determination at block 904, causing the process to proceed to block 906. At block 906, processor 202 can cause display 106 to scroll through the lines of text being displayed on display 106. The scrolling can have a scroll direction 1104 corresponding to the rotation direction 1102 of crown 108 and a scroll amount or speed based on a characteristic (e.g., distance, velocity, acceleration, or the like) of the rotation of crown 108. In the illustrated example, the scroll distance can be proportional to the amount of rotation of crown 108. As shown, display 106 can scroll through the lines of text by causing the text to translate in scroll direction 1104. As a result, a portion of line 1002 has been removed from display 106, while a portion of line 1004 is newly displayed on the bottom of display 106. The lines of text between lines 1002 and 1004 have similarly been translated in scroll direction 1104. As the user continues to rotate crown 108 in rotation direction 1102, processor 202 can continue to cause display 106 to scroll the lines of text in scroll direction 1104, as shown in FIG. 12. In FIG. 12, line 1002 is no longer visible within display 106 and line 1004 is now completely in view of display 106. In some examples, if line 1004 is the last line of text and the user continues to rotate crown 108 in rotation direction 1102, processor 202 can limit the scrolling of display 106 to stop scrolling once line 1004 is fully displayed within display 106. In other examples, processor 202 can continue the scrolling of display 106 by looping to the start of the lines of text to cause the first line of text (e.g., line 1002) to be displayed below line 1004. In yet other examples, a rubberbanding effect can be performed by displaying a blank space below line 1004, and snapping the lines of text back to align line 1004 with the bottom of display 106 in response to a stop in rotation of crown 108. It should be appreciated that the action performed in response to reaching the end of content displayed within display 106 can be selected based on the type of data being displayed.

Figure 13:
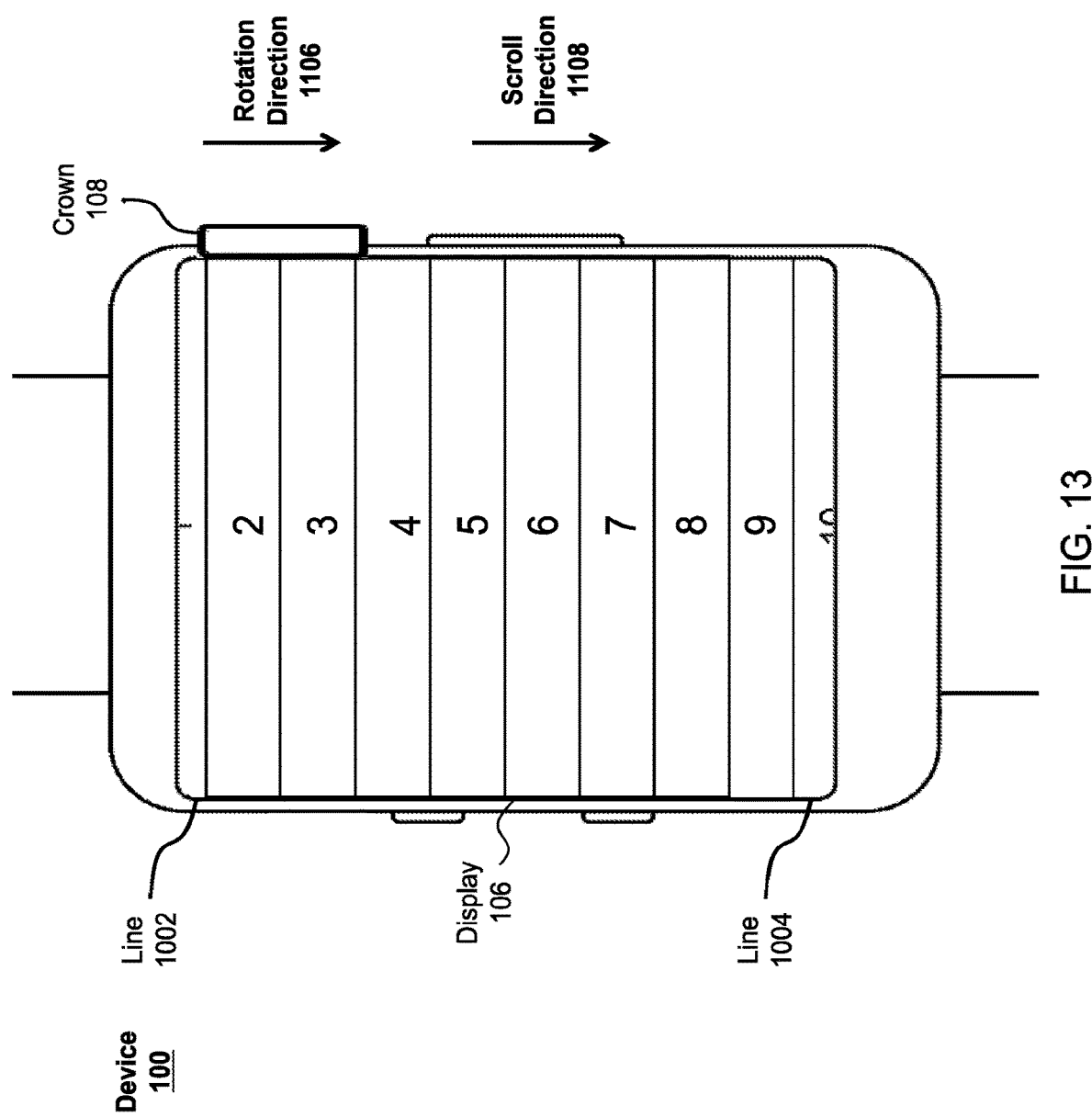
Figure 14:
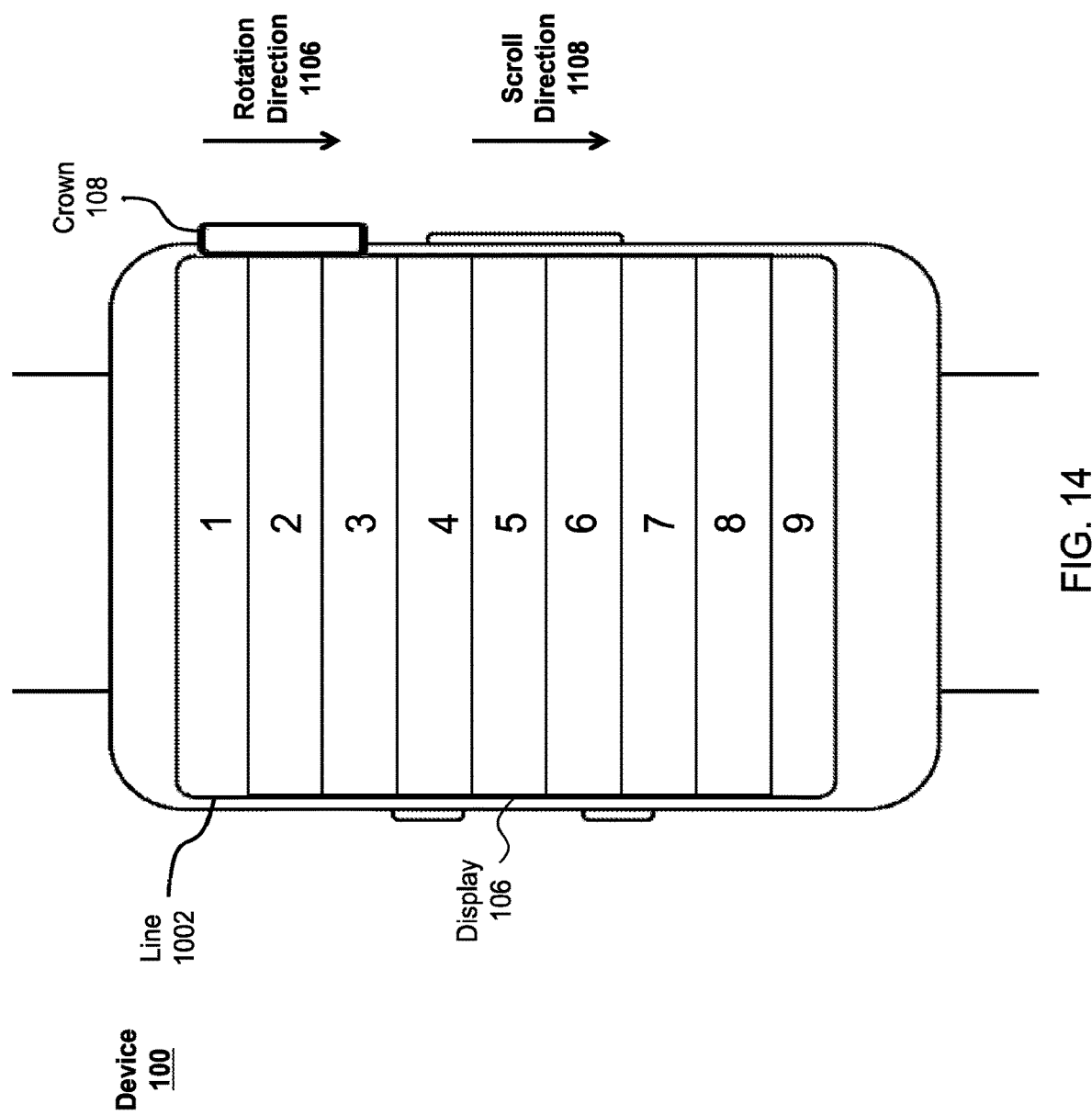

Referring now to FIG. 13, crown 108 is being rotated in the downward rotation direction 1106. Processor 202 can again receive crown position information that reflects this rotation from encoder 204 at block 902 of process 900. Thus, processor 202 can make a positive determination at block 904, causing the process to proceed to block 906. At block 906, processor 202 can cause display 106 to scroll the lines of text in scroll direction 1108 corresponding to rotation direction 1106. In this example, scroll direction 1108 is in the opposite direction of scroll direction 1104. However, it should be appreciated that scroll direction 1108 can be in any desired direction. Similar to the scrolling performed in response to rotation of crown 108 in rotation direction 1102, the scrolling performed in response to the rotation of crown 108 in rotation direction 1106 can depend on a characteristic (e.g., distance, velocity, acceleration, or the like) of the rotation of crown 108. In the illustrated example, the scroll distance can be proportional to the amount of rotation of crown 108. As shown, display 106 can scroll through the lines of text by causing the lines of text to translate in scroll direction 1108. As a result, a portion of line 1004 can be removed from display 106, while a portion of line 1002 can again be displayed at the top of display 106. As the user continues to rotate crown 108 in rotation direction 1106, processor 202 can continue to cause display 106 to scroll the lines of text in scroll direction 1108, as shown in FIG. 14. As shown in FIG. 14, line 1004 has been translated off of display 106, while line 1002 is now fully visible. In some examples, if line 1002 is the first line of text and the user continues to rotate crown 108 in rotation direction 1106, processor 202 can limit the scrolling of display 106 to stop scrolling once line 1002 is at the top of display 106. In other examples, processor 202 can continue the scrolling of display 106 by looping to the end of the lines of text to cause the last line of text (e.g., line 1004) to be displayed above line 1002. In yet other examples, a rubberbanding effect can be performed by displaying a blank space above line 1002, and snapping the lines of text back to align line 1002 with the top of display 106 in response to a stop in rotation of crown 108. It should be appreciated that the action performed in response to reaching the end of content displayed within display 106 can be selected based on the type of data being displayed.

While a specific scrolling example is provided, it should be appreciated that other types of data, such as media items, webpages, or the like, can similarly be scrolled using a mechanical crown of a wearable electronic device in a similar manner. Additionally, the distance or speed of scrolling can be configured to depend on any characteristic of the crown.

Figure 15:
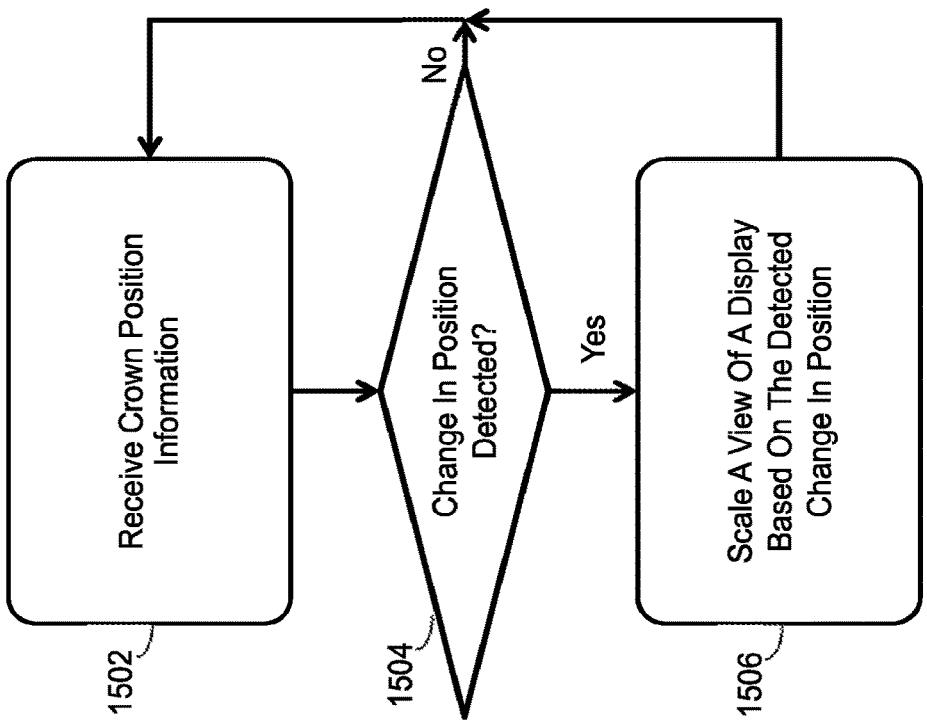
FIG. 15 illustrates an exemplary process for scaling a view of a display using a crown according to various examples.

FIG. 15 illustrates an exemplary process 1500 for scaling a view (e.g., zooming in or out) of a display using a crown according to various examples. The view can include a visual representation of any type of data being displayed.

For example, the view can include a display of a text, a media item, a webpage, a map, or the like. Process 1500 can be similar to processes 300 and 900, except that instead of scrolling between applications or scrolling a view of a device, the view can be scaled positively or negatively in response to rotation of the crown. In some examples, process 1500 can be performed by a wearable electronic device similar to device 100. In these examples, content or any other view can be displayed on display 106 of device 100 and process 1500 can be performed to visually scale the view in response to a turning of crown 108.

At block 1502, crown position information can be received in a manner similar or identical to that described above with respect to block 302 or 902. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 1504, it can be determined if a change in position has been detected in a manner similar or identical to that described above with respect to block 304 or 904. For instance, block 1504 can include comparing the position of the crown at two different instances in time, or can include determining if an absolute value of a change in crown position is equal to zero or below a threshold value. If no change in position is detected, the process can return to block 1502. Alternatively, if a change in position is detected, the process can proceed to block 1506. As described herein, a positive determination at block 1504 can cause the process to proceed to block 1506, while a negative determination can cause the process to return to block 1502. However, it should be appreciated that the determination performed at block 1504 can be reversed such that a positive determination can cause the process to return to block 1502, while a negative determination can cause the process to proceed to block 1506. For example, block 1504 can alternatively determine if no change in position is detected.

At block 1506, a view of a display can be scaled based on the detected change in position. Block 1506 can include visually scaling a view (e.g., zooming in/out) in response to the detected change in position of the crown. For example, the display (e.g., display 106) can be displaying a portion of some content. In response to detecting a change in position of the crown (e.g., crown 108), the view can be scaled by increasing or decreasing the size of the currently displayed portion of the content in the view depending on the direction of the change in position of the crown. For example, turning the crown clockwise can cause the contents within a view of the display to increase in size (e.g., zooming in), while turning the crown counter-clockwise can cause the contents within the view of the display to decrease in size (e.g., zooming out). Additionally, the amount or speed of scaling can depend on the amount of detected change in the position of the crown. In some examples, the amount or speed of the scaling can be proportional to the amount of detected rotation of the crown. For instance, the amount of scaling corresponding to a half-turn of the crown can be equal to 50% of the amount of scaling corresponding to a full turn of the crown. The process can then return to block 1502 where new crown position information can be received.

It should be appreciated that the actual values used to linearly map the change in crown position to the amount or speed of scaling can be varied depending on the desired functionality of the device. Moreover, it should be appreciated that other mappings between the scale amount and change in position can be used. For example, acceleration, velocity (described in greater detail below with respect to FIGS. 21-44), or the like, can be used to determine the amount or speed of scaling. Additionally, non-linear mappings between the crown characteristic (e.g., position, velocity, acceleration, etc.) and the scale amount or scale speed can be used.

Figure 16:
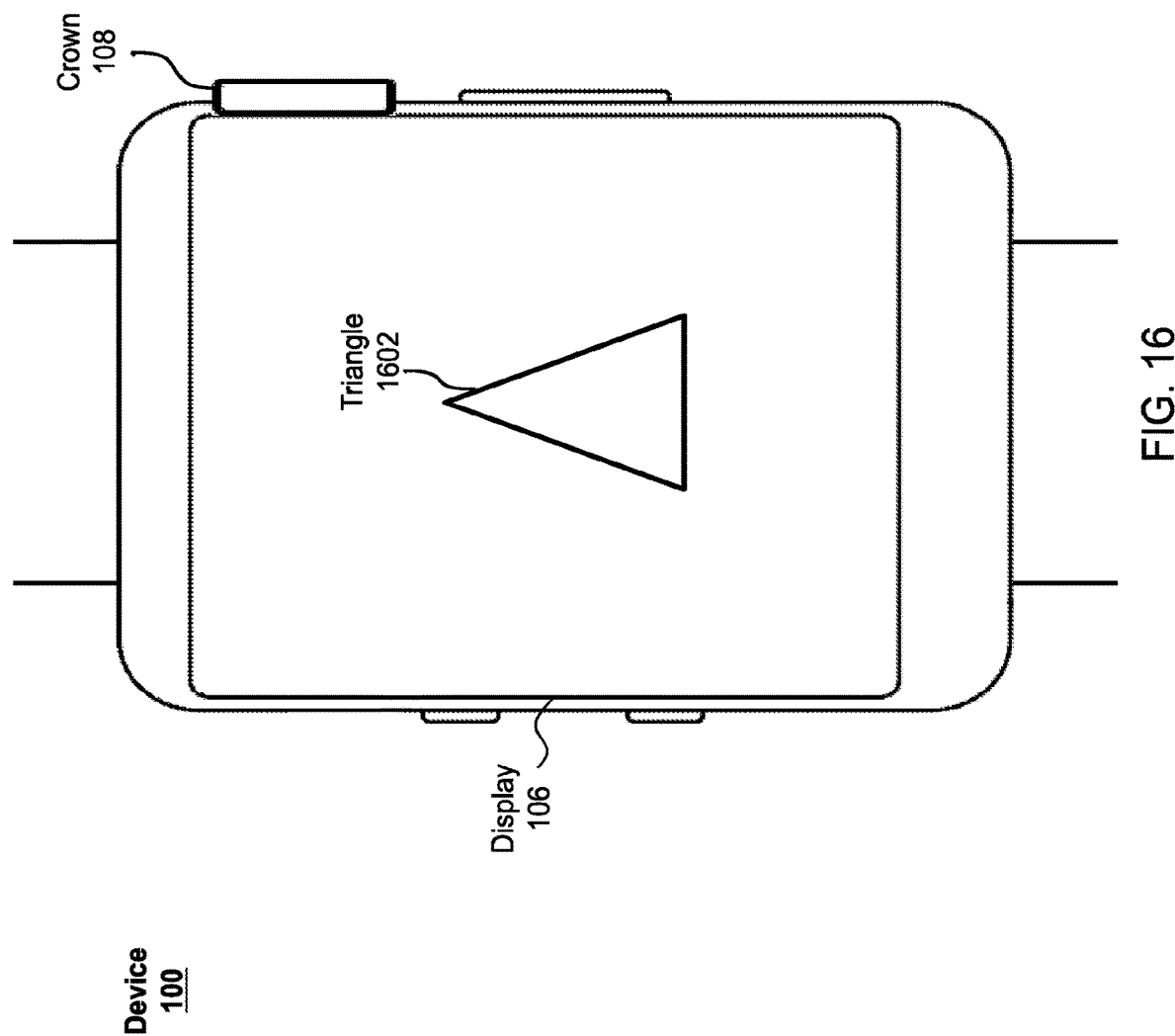
FIGS. 16-20 illustrate screens showing the scaling of a view of a display using the process of FIG. 15.

To further illustrate the operation of process 1500, FIG. 16 depicts an example interface of device 100 showing a triangle 1602. At block 1502 of process 1500, processor 202 of device 100 can receive crown position information from encoder 204. Since crown 108 is not being rotated in FIG. 16, a negative determination can be made by processor 202 at block 1504, causing the process to return to block 1502.

Figure 17:
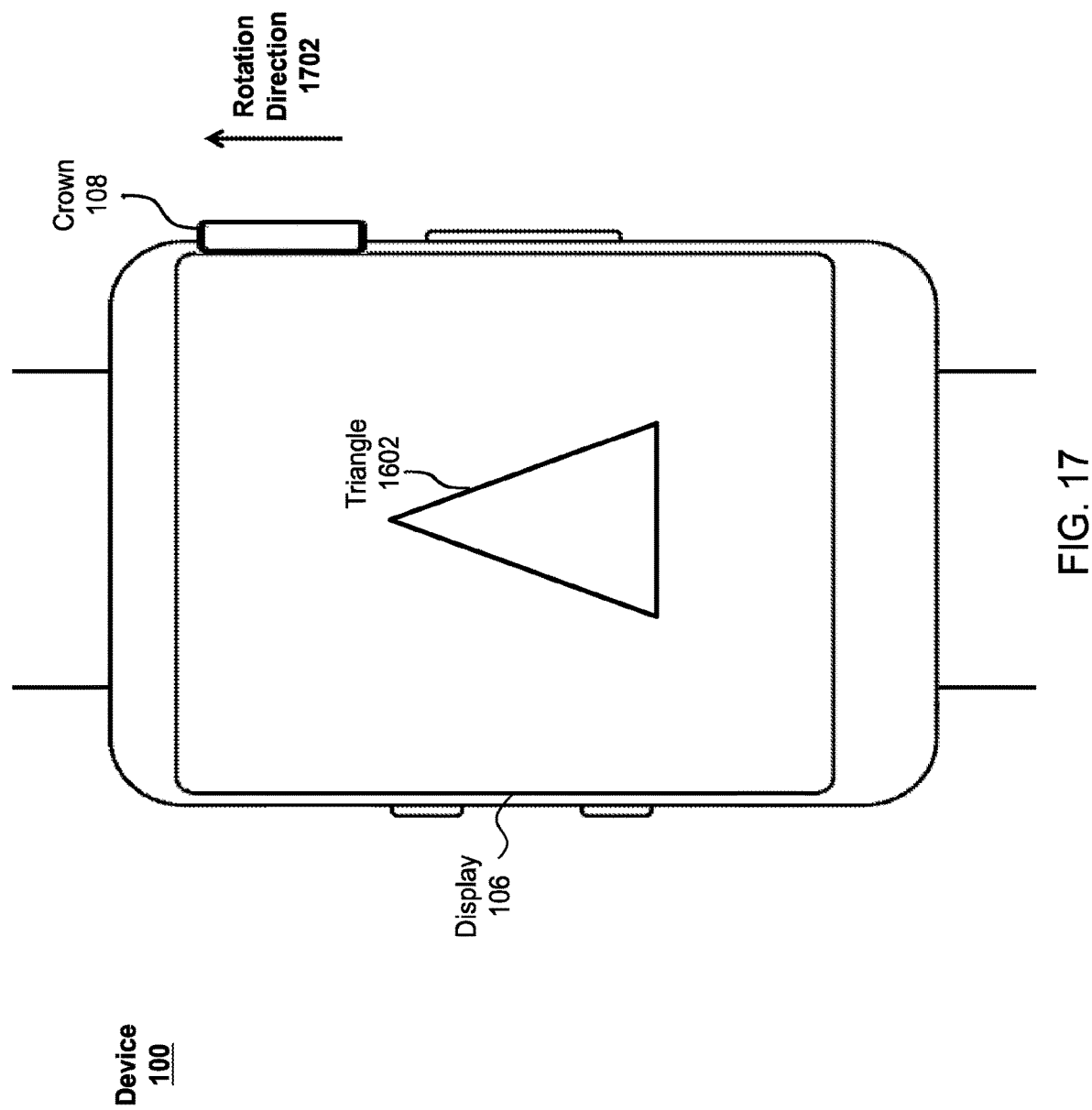
Figure 18:
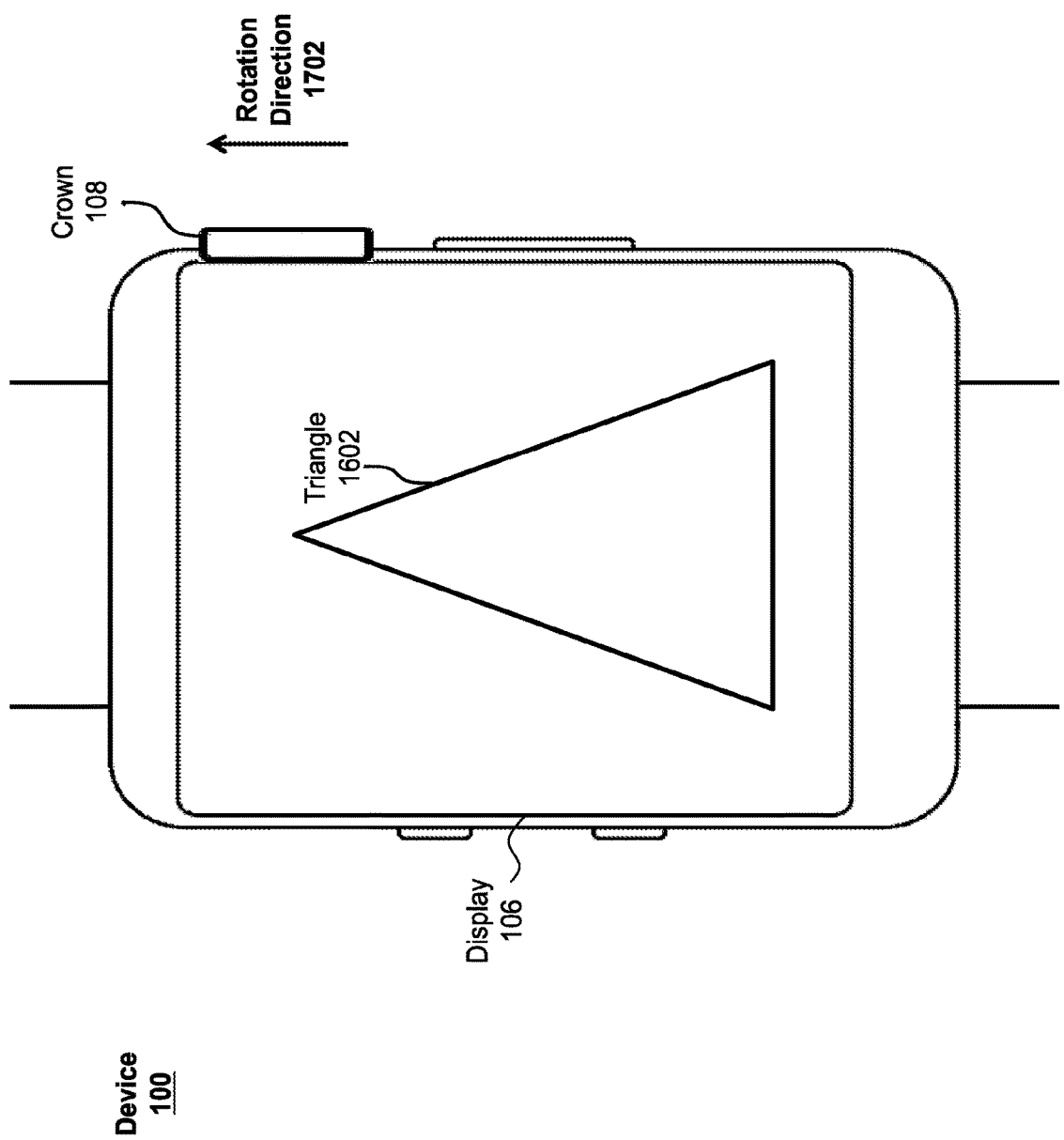

Referring now to FIG. 17, crown 108 is being rotated in the upward rotation direction 1702. Processor 202 can again receive crown position information that reflects this rotation from encoder 204 at block 1502 of process 1500. Thus, processor 202 can make a positive determination at block 1504, causing the process to proceed to block 1506. At block 1506, processor 202 can cause display 106 to scale the view being displayed on display 106. The scaling can increase or decrease the size of the view depending on the rotation direction of crown 108 and can have a scale amount or speed based on a characteristic (e.g., distance, velocity, acceleration, or the like) of the rotation of crown 108. In the illustrated example, the scale amount can be proportional to the amount of rotation of crown 108. As shown, display 106 can scale the view containing triangle 1602 using a positive scaling factor. As a result, triangle 1602 in FIG. 17 appears larger than that shown in FIG. 16. As the user continues to rotate crown 108 in rotation direction 1702, processor 202 can continue to cause display 106 to scaling the view containing the image of triangle 1602 using a positive scaling factor, as shown in FIG. 18. In FIG. 18, triangle 1602 appears larger than those shown in FIGS. 16 and 17. When the rotation of crown 108 stops, the scaling of the view containing triangle 1602 can similarly stop. In some examples, if the view of triangle 1602 has been scaled to its maximum amount and the user continues to rotate crown 108 in rotation direction 1702, processor 202 can limit the scaling of display 106. In yet other examples, a rubberbanding effect can be performed by allowing the view containing triangle 1602 to increase in size to a rubberbanding limit that is greater than the maximum scaling amount for the view and then snapping the size of the view back to its maximum scaling amount in response to a stop in rotation of crown 108. It should be appreciated that the action performed in response to reaching the scaling limit of display 106 can be configured in any desired manner.

Figure 19:
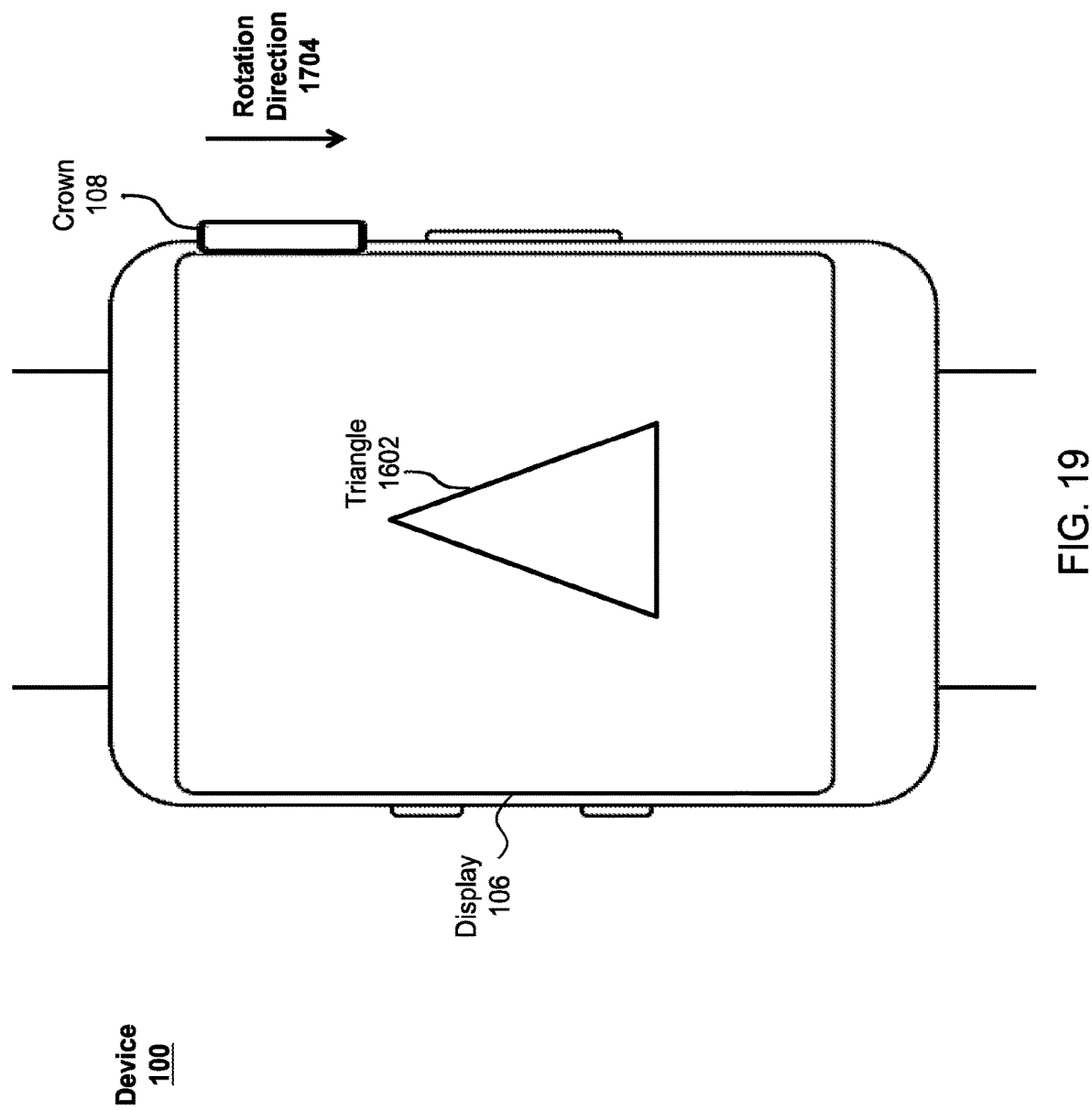
Figure 20:
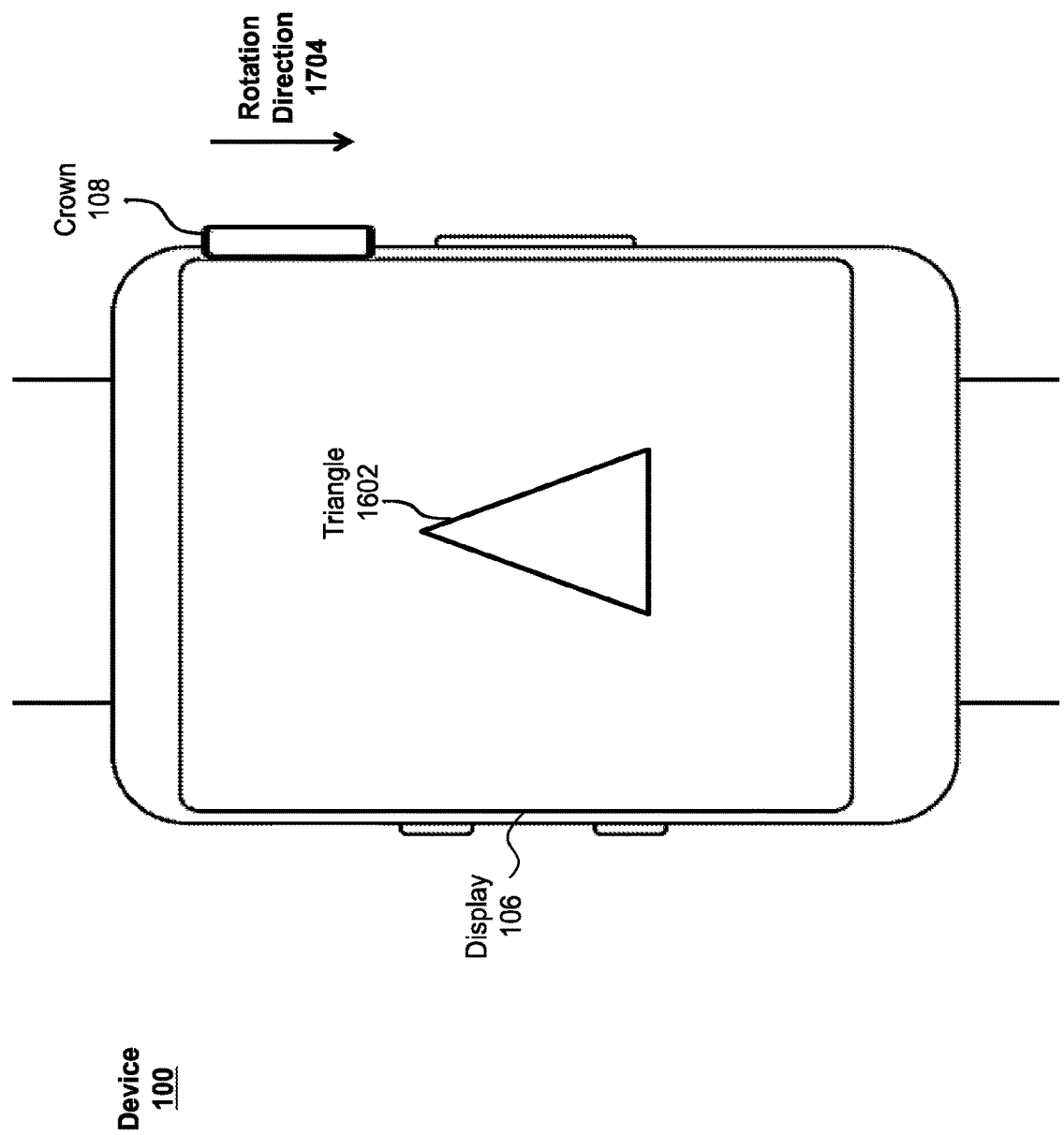

Referring now to FIG. 19, crown 108 is being rotated in the downward rotation direction 1704. Processor 202 can again receive crown position information that reflects this rotation from encoder 204 at block 1502 of process 1500. Thus, processor 202 can make a positive determination at block 1504, causing the process to proceed to block 1506. At block 1506, processor 202 can cause display 106 to scale the view using a negative scaling factor corresponding to rotation direction 1704. Similar to the scaling performed in response to rotation of crown 108 in rotation direction 1702, the scaling performed in response to the rotation of crown 108 in rotation direction 1704 can depend on a characteristic (e.g., distance, velocity, acceleration, or the like) of the rotation of crown 108. In the illustrated example, the scaling amount can be proportional to the amount of rotation of crown 108. As shown, display 106 can scale the view containing the image of triangle 1602 using a negative scaling factor. As a result, triangle 1602 in FIG. 19 is smaller than that shown in FIG. 18. As the user continues to rotate crown 108 in rotation direction 1704, processor 202 can continue to cause display 106 to scale the view of containing image of triangle 1602 using a negative scaling factor, as shown in FIG. 20. In FIG. 20, triangle 1602 is smaller than those shown in FIGS. 18 and 19. When the rotation of crown 108 stops, the scaling of the view containing triangle 1602 can similarly stop. In some examples, if the view containing triangle 1602 has been scaled to its minimum amount and the user continues to rotate crown 108 in rotation direction 1704, processor 202 can limit the scaling of display 106. In yet other examples, a rubberbanding effect can be performed by allowing the view containing triangle 1602 to decrease in size to a rubberbanding limit that is less than the minimum scaling amount for the view, and then snapping the size of the view back to its minimum scaling amount in response to a stop in rotation of crown 108. It should be appreciated that the action performed in response to reaching the scaling limit of display 106 can be configured in any desired manner.

While a specific scaling example is provided, it should be appreciated that views of other types of data, such as media items, webpages, or the like, can similarly be scaled using a mechanical crown of a wearable electronic device in a similar manner. Additionally, the amount or speed of scaling can be configured to depend on any characteristic of the crown. Moreover, in some examples, when reaching a minimum or maximum scaling of a view, continued rotation of the crown in the same direction can cause the scaling to reverse direction. For example, an upward rotation of the crown can cause a view to zoom-in. However, upon reaching a scaling limit, the upward rotation of the crown can then cause the view to scale in the opposite direction (e.g., zoom-out).

Figure 21:
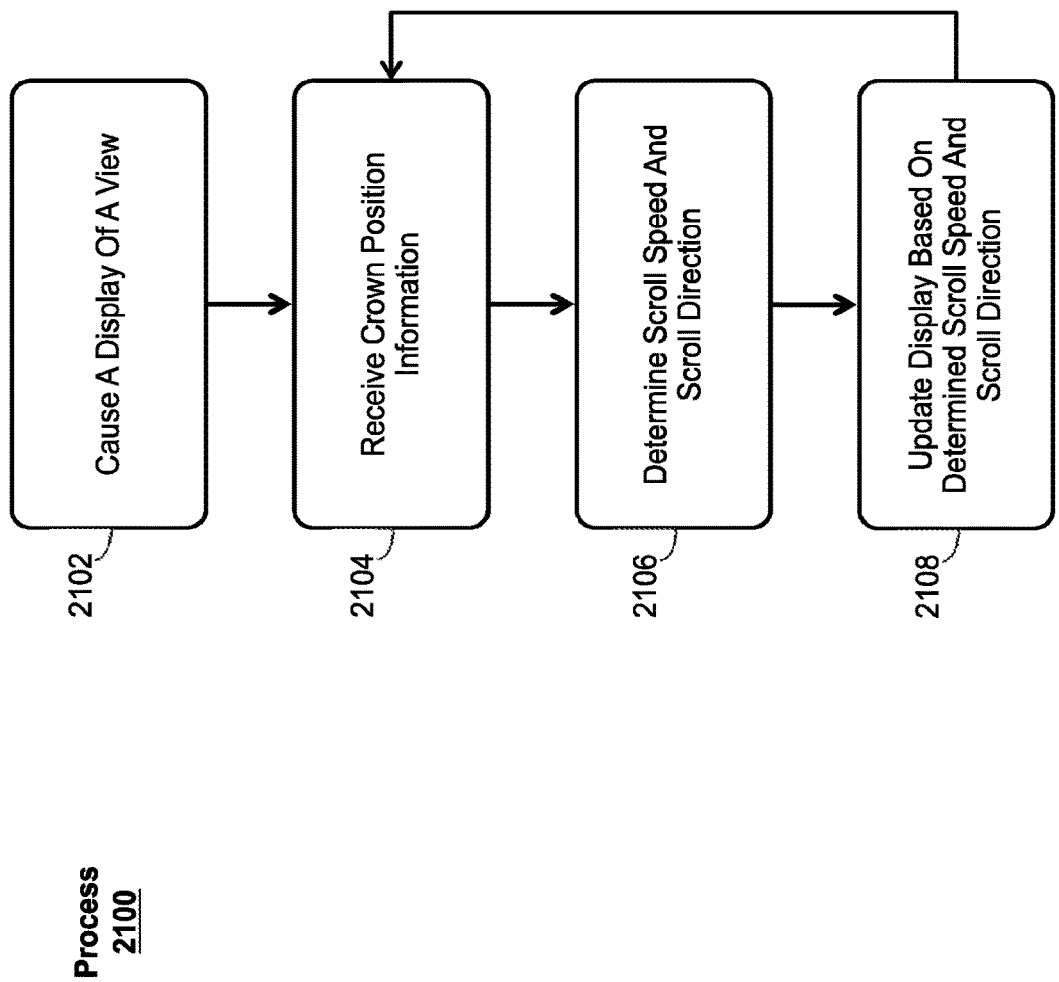
FIG. 21 illustrates an exemplary process for scrolling a view of a display based on a angular velocity of rotation of a crown according to various examples.

FIG. 21 illustrates an exemplary process 2100 for scrolling a view of a display based on an angular velocity of rotation of a crown according to various examples. The view can include a visual representation of any type of data being displayed. For example, the view can include a display of a text, a media item, a webpage, or the like. Process 2100 can be similar to process 900, except that it can scroll the view based on a scrolling velocity that depends on the angular velocity of rotation of the crown. In some examples, process 2100 can be performed by a wearable electronic device similar to device 100. In these examples, content or any other view can be displayed on display 106 of device 100 and process 2100 can be performed to visually scroll the view in response to a turning of crown 108. In some examples, the scrolling can be performed by translating the displayed contents along a fixed axis.

At block 2102, a view of the display of the wearable electronic device can be displayed. As mentioned above, the view can include any visual representation of any type of data that is displayed by a display of the device.

At block 2104, crown position information can be received in a manner similar or identical to that described above with respect to block 902 of process 900. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 2106, the scroll velocity (e.g., speed and scroll direction) can be determined. In some examples, the scrolling of a view can be determined using a physics-based modeling of the motion. For example, the view can be treated as an object having a movement velocity that corresponds to the velocity of scrolling across the display of the device. The rotation of the crown can be treated as a force being applied to the view in a direction corresponding to the direction of rotation of the crown, where the amount of force depends on the speed of angular rotation of the crown. For example, a greater speed of angular rotation can correspond to a greater amount of force being applied to the view. Any desired linear or non-linear mapping between the speed of angular rotation of the crown and the force being applied to the view can be used. In addition, a drag force can be applied in a direction opposite the direction of scroll. This can be used to cause the velocity of scrolling to decay over time, allowing the scrolling to stop absent additional input from the user. Thus, the velocity of scrolling at discrete moments in time can take the general form of:

$$V_T = V_{(T-1)} + \Delta V_{CROWN} - \Delta V_{DRAG}. \quad (1.1)$$

In equation 1.1, $V_T$ represents the determined scroll velocity (speed and direction) at time T, $V_{(T-1)}$ represents the previous scroll velocity (speed and direction) at time T−1, $\Delta V_{CROWN}$ represents the change in velocity caused by the force applied to the view in response to the rotation of the crown, and $\Delta V_{DRAG}$ represents the change in velocity of the view caused by the drag force opposing the motion of the view (scrolling of the view). As mentioned above, the force applied to the view by the crown can depend on the speed of angular rotation of the crown. Thus, $\Delta V_{CROWN}$ can also depend on the speed of angular rotation of the crown. Typically, the greater the speed of angular rotation of the crown, the greater the value of $\Delta V_{CROWN}$ will be. However, the actual mapping between the speed of angular rotation of the crown and $\Delta V_{CROWN}$ can be varied depending on the desired user feel of the scrolling effect. For example, various linear or non-linear mappings between the speed of angular rotation of the crown and $\Delta V_{CROWN}$ can be used. In some examples, $\Delta V_{DRAG}$ can depend on the velocity of scrolling such that at greater velocities, a greater opposing change in velocity can be produced. In other examples, $\Delta V_{DRAG}$ can have a constant value. However, it should be appreciated that any constant or variable amount of opposing change in velocity can be used to produce a desired scrolling effect. Note, typically, in the absence of user input in the form of $\Delta V_{CROWN}$, $V_T$ will approach (and become) zero based on $\Delta V_{DRAG}$ in accordance with equation 1.1, but $V_T$ would not change signs without user input in the form of crown rotation ($\Delta V_{CROWN}$).

As can be seen from equation 1.1, the velocity of scrolling can continue to increase as long as $\Delta V_{CROWN}$ is greater than $\Delta V_{DRAG}$. Additionally, the velocity of scrolling can have non-zero values even when no $\Delta V_{CROWN}$ input is being received. Thus, if the view is scrolling with a non-zero velocity, it can continue to scroll without the user rotating the crown. The scroll distance and time until the scrolling stops can depend on the scroll velocity at the time the user stops rotating the crown and the $\Delta V_{DRAG}$ component.

In some examples, when the crown is rotated in a direction corresponding to a scroll direction that is opposite the direction that the view is currently being scrolled, the $V_{(T-1)}$ component can be reset to a value of zero, allowing the user to quickly change the direction of the scrolling without having to provide a force sufficient to offset the current scroll velocity of the view.

At block 2108, the display can be updated based on the scroll speed and direction determined at block 2106. This can include translating the displayed view by an amount corresponding to the determined scroll speed and in a direction corresponding to the determined scroll direction. The process can then return to block 2104, where additional crown position information can be received.

It should be appreciated that blocks 2104, 2106, and 2108 can be repeatedly performed at any desired frequency to continually determine the velocity of scrolling and to update the display accordingly.

Figure 22:
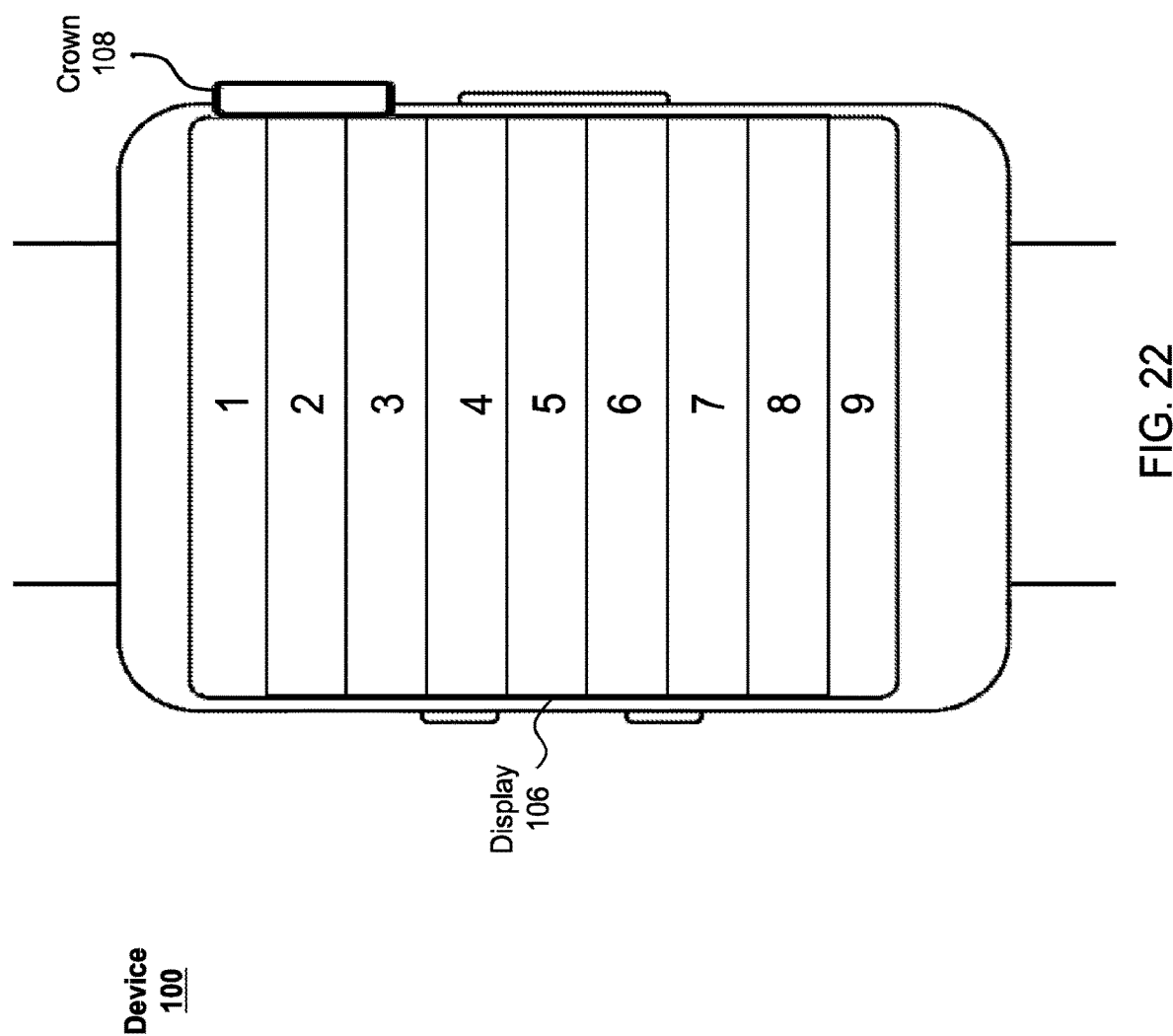
FIGS. 22-40 illustrate screens showing the scrolling of a view of a display using the process of FIG. 21.

To further illustrate the operation of process 2100, FIG. 22 depicts an example interface of device 100 having a visual representation of lines of text containing numbers 1-9. At block 2102 of process 2100, processor 202 of device 100 can cause display 106 to display the illustrated interface. At block 2104, processor 202 can receive crown position information from encoder 204. At block 2106, a scroll speed and scroll direction can be determined. Since the current scroll speed is zero and since crown 108 is not currently being rotated, it can be determined using equation 1.1 that the new velocity of scrolling is zero. At block 2108, processor 202 can cause display 106 to update the display using the speed and direction determined at block 2106. However, since the determined velocity was zero, no change to the display need be made. For purposes of explanation, FIGS. 23-29 depict subsequent views of the interface shown in FIG. 22 at different points of time, where the length of time between each view is equal.

Figure 23:
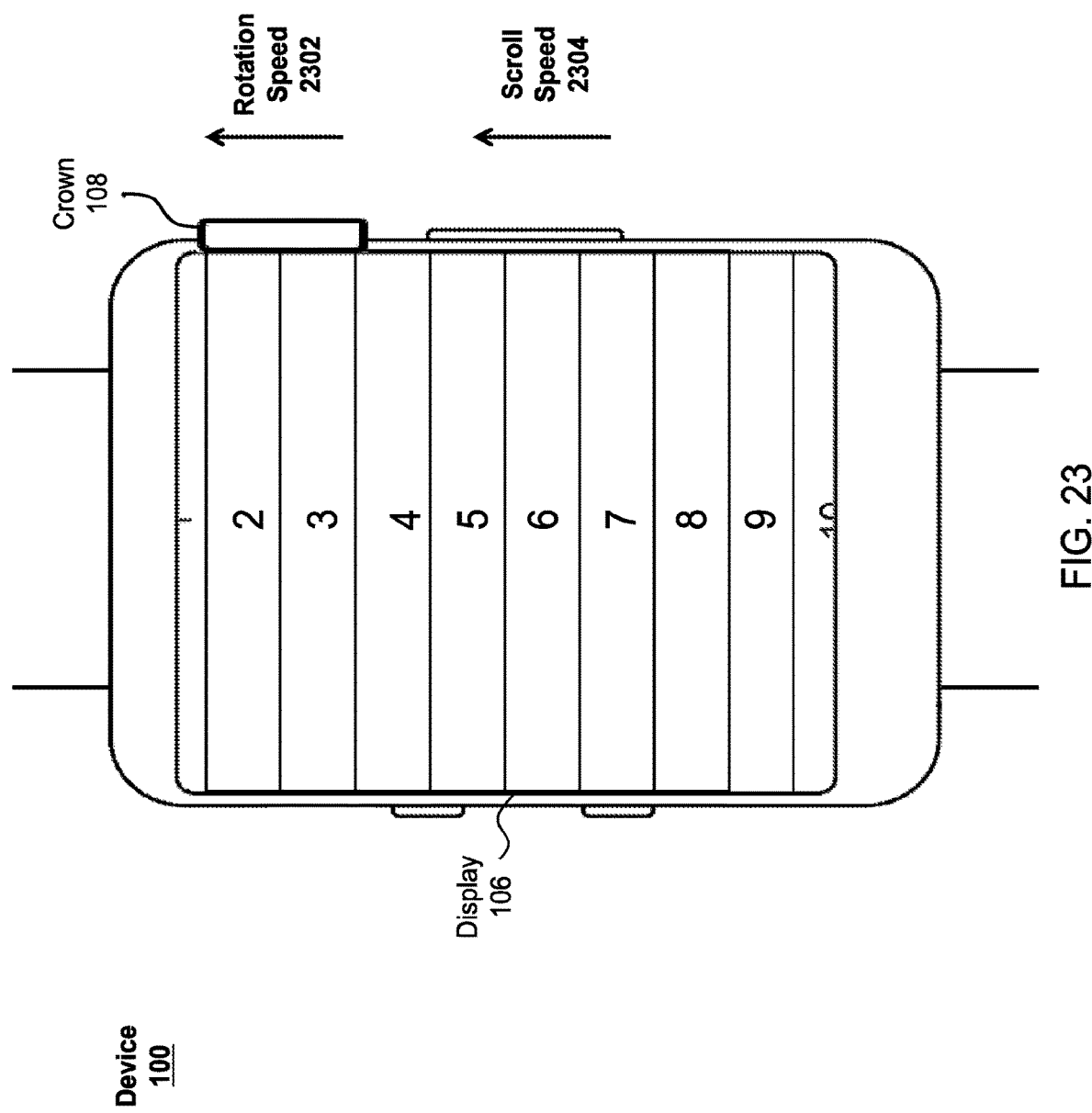

Referring now to FIG. 23, crown 108 is being rotated in the upward rotation direction with rotation speed 2302. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. In this example, rotation of crown 108 in the upward direction corresponds to an upward scroll direction. In other examples, other directions can be used. At block 2108, processor 202 can cause display 106 to update the display based on the determined scroll speed and direction. As shown in FIG. 23, this update has caused the lines of text to translate in the upward direction with scroll speed 2304. Since crown 108 has only begun to rotate, rotation speed 2302 can be relatively low compared to typical rotation speeds of the crown. Thus, scroll speed 2304 can similarly have a relatively low value compared to typical or maximum scroll speeds. As a result, only a portion of the line of text containing the value "1" has been translated off the display.

Figure 24:
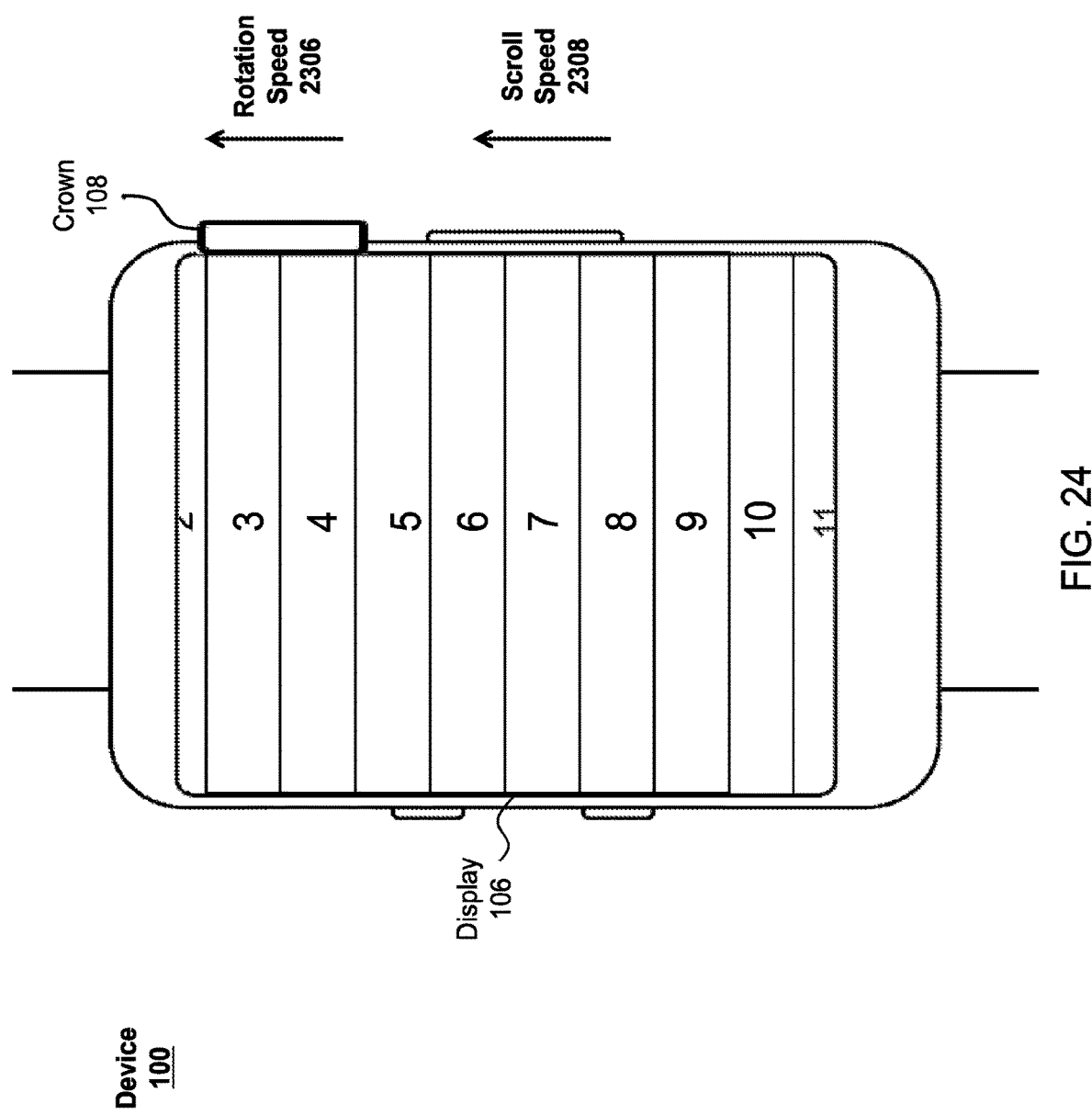

Referring now to FIG. 24, crown 108 is being rotated in the upward rotation direction with rotation speed 2306, which can be greater than rotation speed 2302. Processor 202 can again receive crown position information from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 23), the new $\Delta V_{CROWN}$ value corresponding to rotation speed 2306 can be added to the previous scroll velocity value $V_{(T-1)}$ (e.g., having scroll speed 2304). Thus, as long as the new $\Delta V_{CROWN}$ value is greater than the $\Delta V_{DRAG}$ value, the new scroll speed 2308 can be greater than scroll speed 2304. However, if the $\Delta V_{CROWN}$ value corresponding to rotation speed 2306 is less than the $\Delta V_{DRAG}$ value, the new scroll speed 2308 can be less than scroll speed 2304. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 24, this update has caused the lines of text to translate in the upward direction with scroll speed 2308. Since the $\Delta V_{CROWN}$ value corresponding to rotation speed 2306 is greater than the $\Delta V_{DRAG}$ value, scroll speed 2308 can be greater than scroll speed 2304. As a result, the lines of text have been translated a greater distance over the same length of time, causing a full line of text to be translated vertically off the display.

Figure 25:
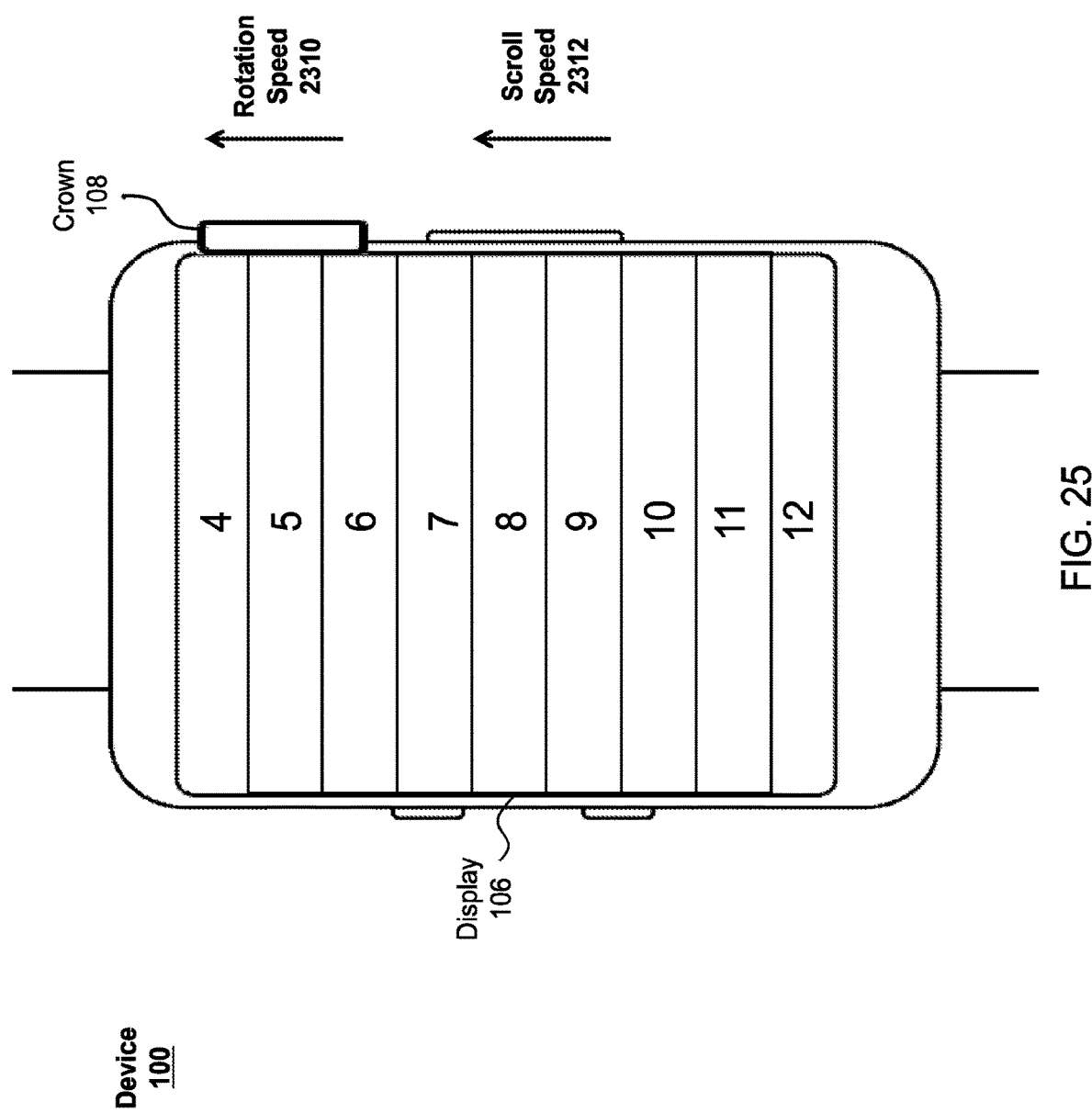

Referring now to FIG. 25, crown 108 is being rotated in the upward rotation direction with rotation speed 2310, which can be greater than rotation speed 2306. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 24), the new $\Delta V_{CROWN}$ value corresponding to rotation speed 2310 can be added to the previous scroll velocity value $V_{(T-1)}$ (e.g., having scroll speed 2308). Thus, as long as the new $\Delta V_{CROWN}$ value is greater than the $\Delta V_{DRAG}$ value, the new scroll speed 2312 can be greater than scroll speed 2308. However, if the $\Delta V_{CROWN}$ value corresponding to rotation speed 2310 is less than the $\Delta V_{DRAG}$ value, the new scroll speed 2312 can be less than scroll speed 2308. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 25, this update has caused the lines of text to translate in the upward direction with scroll speed 2312. Since the $\Delta V_{CROWN}$ value corresponding to rotation speed 2310 is greater than the $\Delta V_{DRAG}$ value, scroll speed 2312 can be greater than scroll speed 2308. As a result, the lines of text have been translated a greater distance over the same length of time, causing 1.5 lines of text to be translated vertically off the display.

Figure 26:
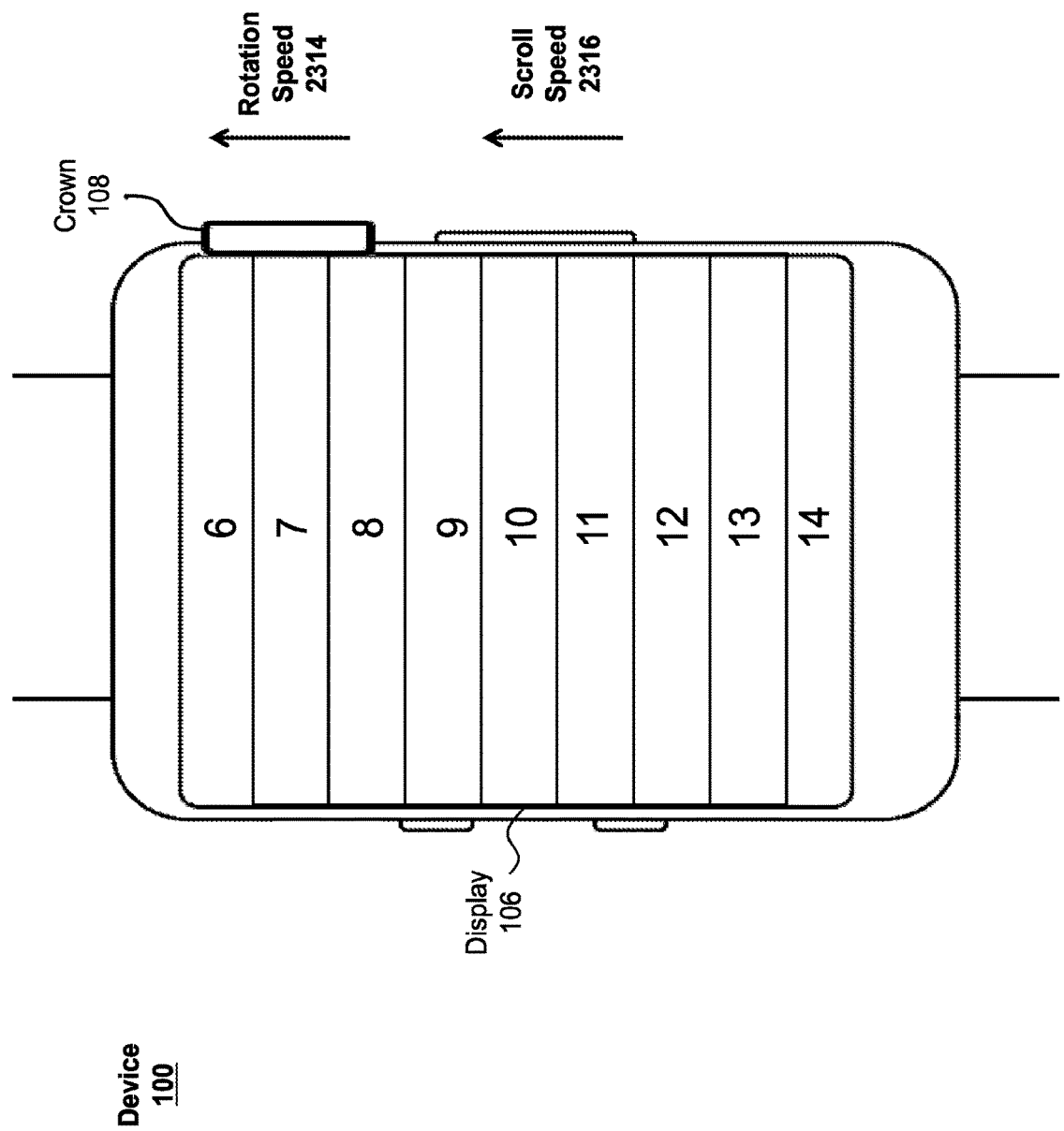

Referring now to FIG. 26, crown 108 is being rotated in the upward rotation direction with rotation speed 2314, which can be greater than rotation speed 2310. Processor 202 can again receive crown position information that reflects this rotation from encoder 204 at block 2104. Thus, at block 2110, processor 202 can convert this rotation speed into a $\Delta V_{CROWN}$ value to determine the new velocity of scrolling $V_T$. Since the display previously had a non-zero scroll speed value (e.g., as shown in FIG. 25), the new $\Delta V_{CROWN}$ value corresponding to rotation speed 2314 can be added to the previous scroll velocity value $V_{(T-1)}$ (e.g., having scroll speed 2312). Thus, as long as the new $\Delta V_{CROWN}$ value is greater than the $\Delta V_{DRAG}$ value, the new scroll speed 2316 can be greater than scroll speed 2312. However, if the $\Delta V_{CROWN}$ value corresponding to rotation speed 2314 is less than the $\Delta V_{DRAG}$ value, the new scroll speed 2316 can be less than scroll speed 2312. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 26, this update has caused the lines of text to translate in the upward direction with scroll speed 2316. Since the $\Delta V_{CROWN}$ value corresponding to rotation speed 2314 is greater than the $\Delta V_{DRAG}$ value, scroll speed 2316 can be greater than scroll speed 2312. As a result, the lines of text have been translated a greater distance over the same length of time, causing two lines of text to be translated vertically off the display.

Figure 27:
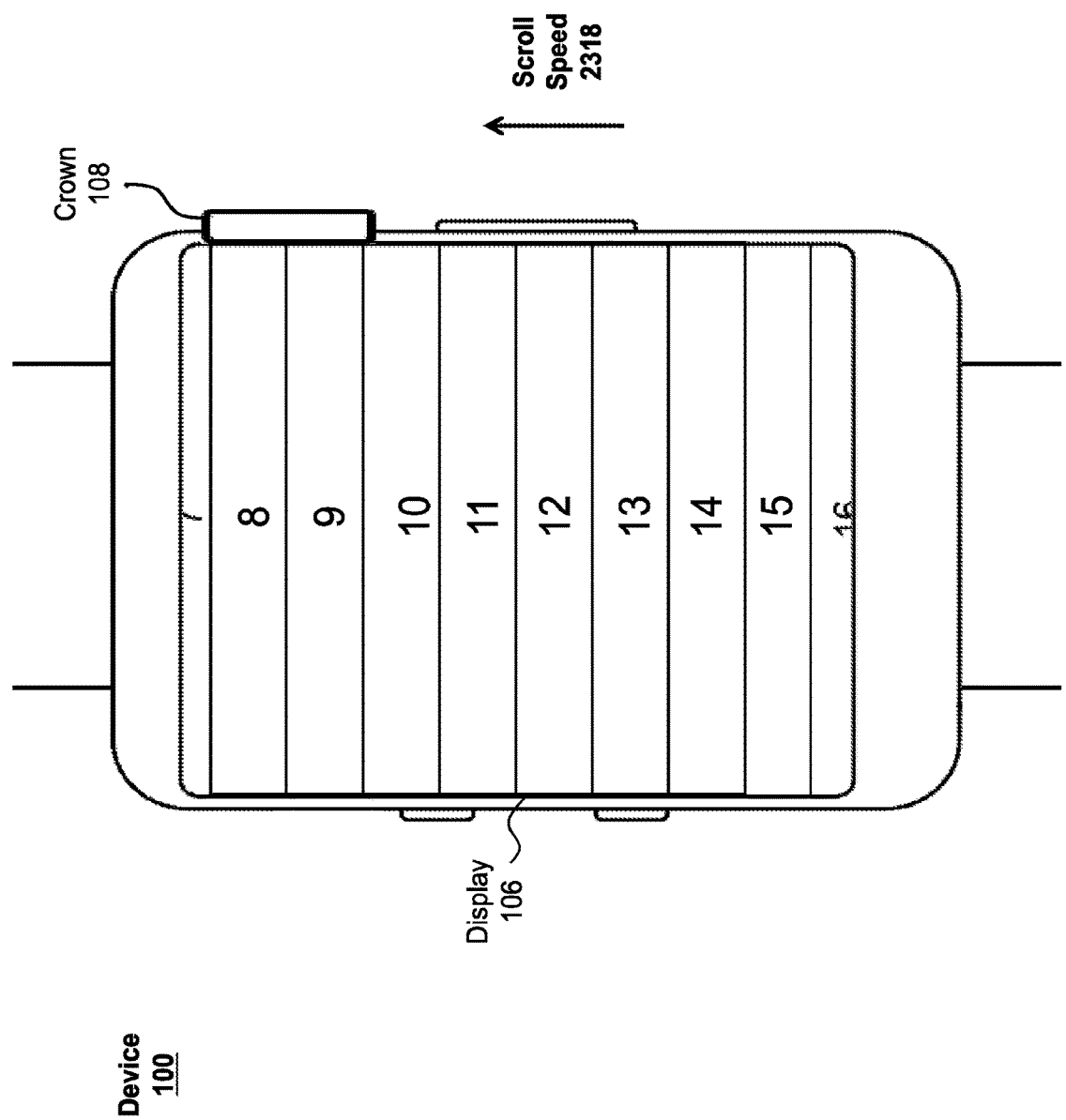

Referring now to FIG. 27, crown 108 is not being rotated in any direction. Processor 202 can again receive crown position information that reflects this rotation from encoder 204 at block 2104. Thus, at block 2110, processor 202 can determine the new velocity of scrolling $V_T$ based on the previous scroll velocity $V_{(T-1)}$ (e.g., having scroll speed 2316) and the $\Delta V_{DRAG}$ value. Thus, as long as the previous scroll speed 2316 is greater than the $\Delta V_{DRAG}$ value, the scroll speed can have a non-zero value even when no rotation of the crown is being performed. However, if the previous scroll velocity $V_{(T-1)}$ (e.g., having scroll speed 2316) is equal to the $\Delta V_{DRAG}$ value, the scroll speed can have a value of zero. In the illustrated example, the previous scroll velocity $V_{(T-1)}$ (e.g., having scroll speed 2316) is assumed to be greater than the $\Delta V_{DRAG}$ value. At block 2108, processor 202 can cause display 106 to update the display based on the determined scroll speed and direction. As shown in FIG. 27, this update has caused the lines of text to translate in the upward direction with scroll speed 2318. Since $\Delta V_{DRAG}$ can have a non-zero value and because the previous scroll velocity $V_{(T-1)}$ (e.g., having scroll speed 2316) can be greater than the $\Delta V_{DRAG}$ value, scroll speed 2318 can have a non-zero value that is less than scroll speed 2316. As a result, the lines of text have been translated a shorter distance over the same length of time, causing 1.5 lines of text to be translated vertically off the display.

Figure 28:
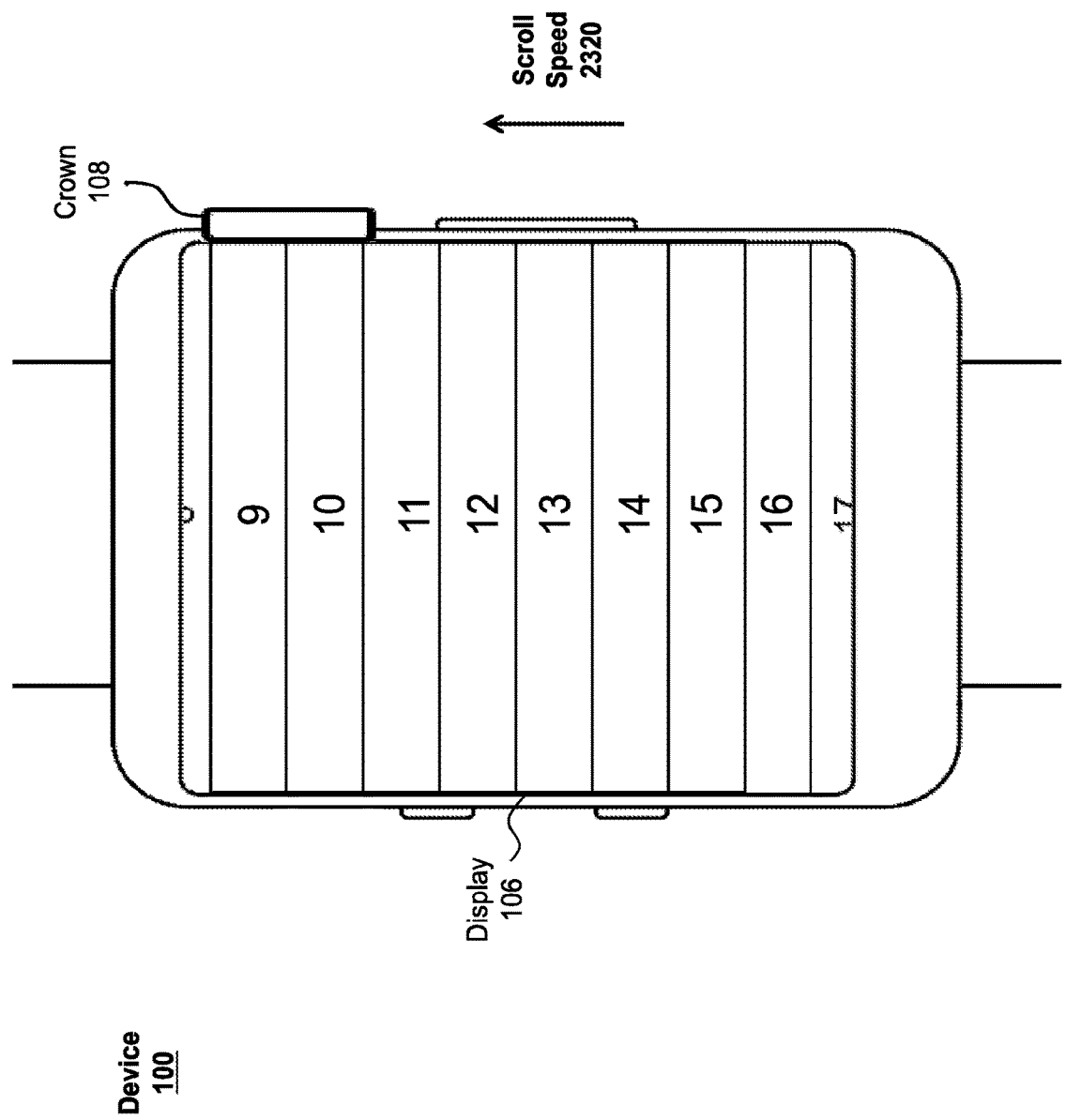

Referring now to FIG. 28, crown 108 is not being rotated in any direction. Processor 202 can again receive crown position information that reflects this rotation from encoder 204 at block 2104. Thus, at block 2110, processor 202 can determine the new velocity of scrolling $V_T$ based on the previous scroll velocity $V_{(T-1)}$ (e.g., having scroll speed 2318) and the $\Delta V_{DRAG}$ value. Thus, as long as the previous scroll speed 2318 is greater than the $\Delta V_{DRAG}$ value, the scroll speed can have a non-zero value even when no rotation of the crown is being performed. However, if the previous scroll velocity $V_{(T-1)}$ (e.g., having scroll speed 2318) is equal to the $\Delta V_{DRAG}$ value, the scroll speed can have a value of zero. In the illustrated example, the previous scroll velocity $V_{(T-1)}$ (e.g., having scroll speed 2318) is assumed to be greater than the $\Delta V_{DRAG}$ value. At block 2108, processor 202 can cause display 106 to update the display based on the determined scroll speed and direction. As shown in FIG. 28, this update has caused the lines of text to translate in the upward direction with scroll speed 2320. Since $\Delta V_{DRAG}$ can have a non-zero value and because the previous scroll velocity $V_{(T-1)}$ (e.g., having scroll speed 2318) can be greater than the $\Delta V_{DRAG}$ value, scroll speed 2320 can have a non-zero value that is less than scroll speed 2318. As a result, the lines of text have been translated a shorter distance over the same length of time, causing one line of text to be translated vertically off the display.

Figure 29:
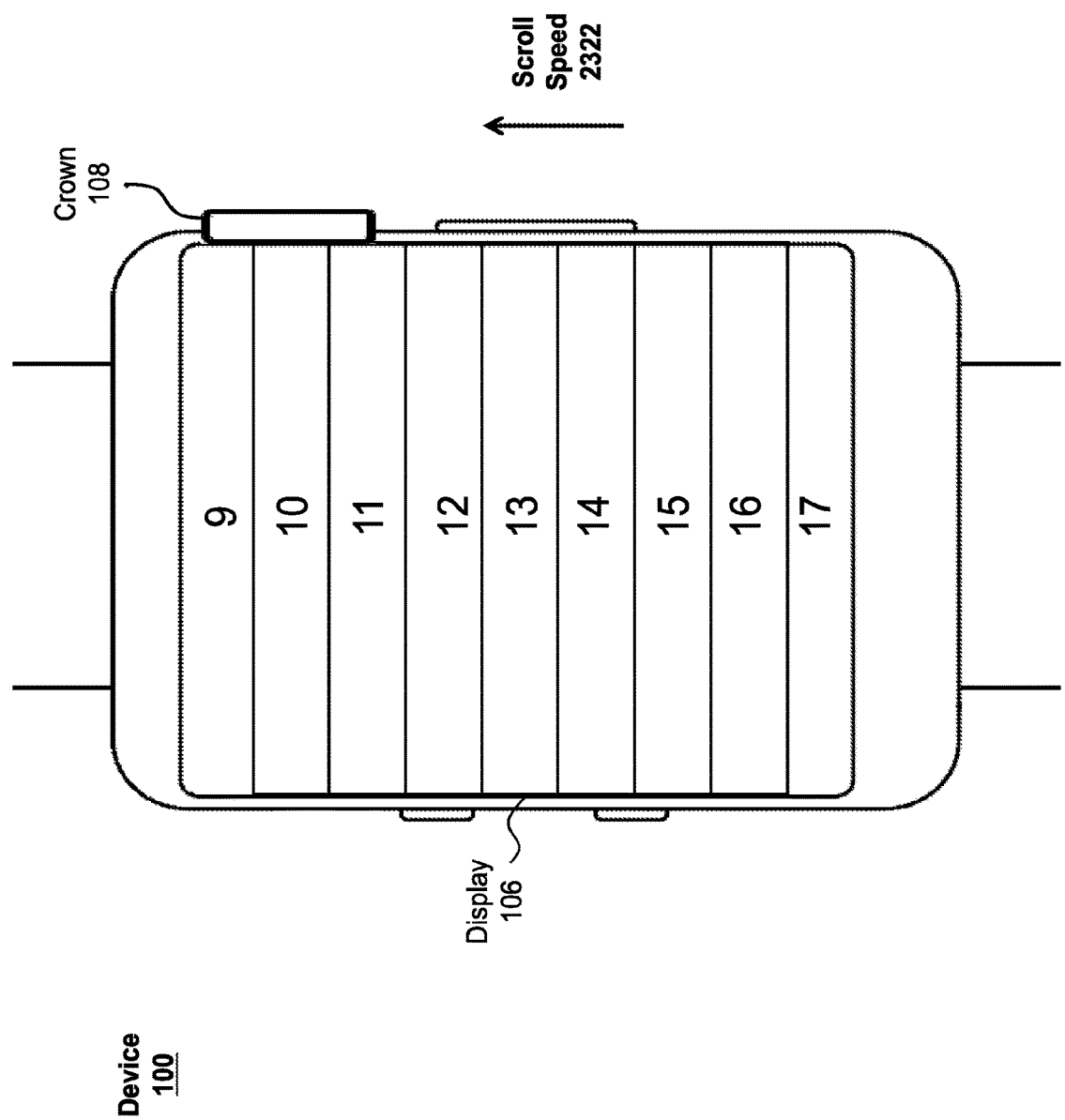

Referring now to FIG. 29, crown 108 is not being rotated in any direction. Processor 202 can again receive crown position information that reflects this rotation from encoder 204 at block 2104. Thus, at block 2110, processor 202 can determine the new velocity of scrolling $V_T$ based on the previous scroll velocity $V_{(T-1)}$ (e.g., having scroll speed 2320) and the $\Delta V_{DRAG}$ value. Thus, as long as the previous scroll speed 2320 is greater than the $\Delta V_{DRAG}$ value, the scroll speed can have a non-zero value even when no rotation of the crown is being performed. However, if the previous scroll velocity $V_{(T-1)}$ (e.g., having scroll speed 2320) is equal to the $\Delta V_{DRAG}$ value, the scroll speed can have a value of zero. In the illustrated example, the previous scroll velocity $V_{(T-1)}$ (e.g., having scroll speed 2320) is assumed to be greater than the $\Delta V_{DRAG}$ value. At block 2108, processor 202 can cause display 106 to update the display based on the determined scroll speed and direction. As shown in FIG. 29, this update has caused the lines of text to translate in the upward direction with scroll speed 2322. Since $\Delta V_{DRAG}$ can have a non-zero value and because the previous scroll velocity $V_{(T-1)}$ (e.g., having scroll speed 2320) can be greater than the $\Delta V_{DRAG}$ value, scroll speed 2322 can have a non-zero value that is less than scroll speed 2320. As a result, the lines of text have been translated a shorter distance over the same length of time, causing 0.5 lines of text to be translated vertically off the display. This decay in scroll velocity can continue until the previous scroll velocity $V_{(T-1)}$ is equal to the $\Delta V_{DRAG}$ value, causing the scroll velocity to fall to zero. Alternatively, the decay in scroll velocity can continue until the previous scroll velocity $V_{(T-1)}$ falls below a threshold value, after which it can be set to a value of zero.

Figure 30:
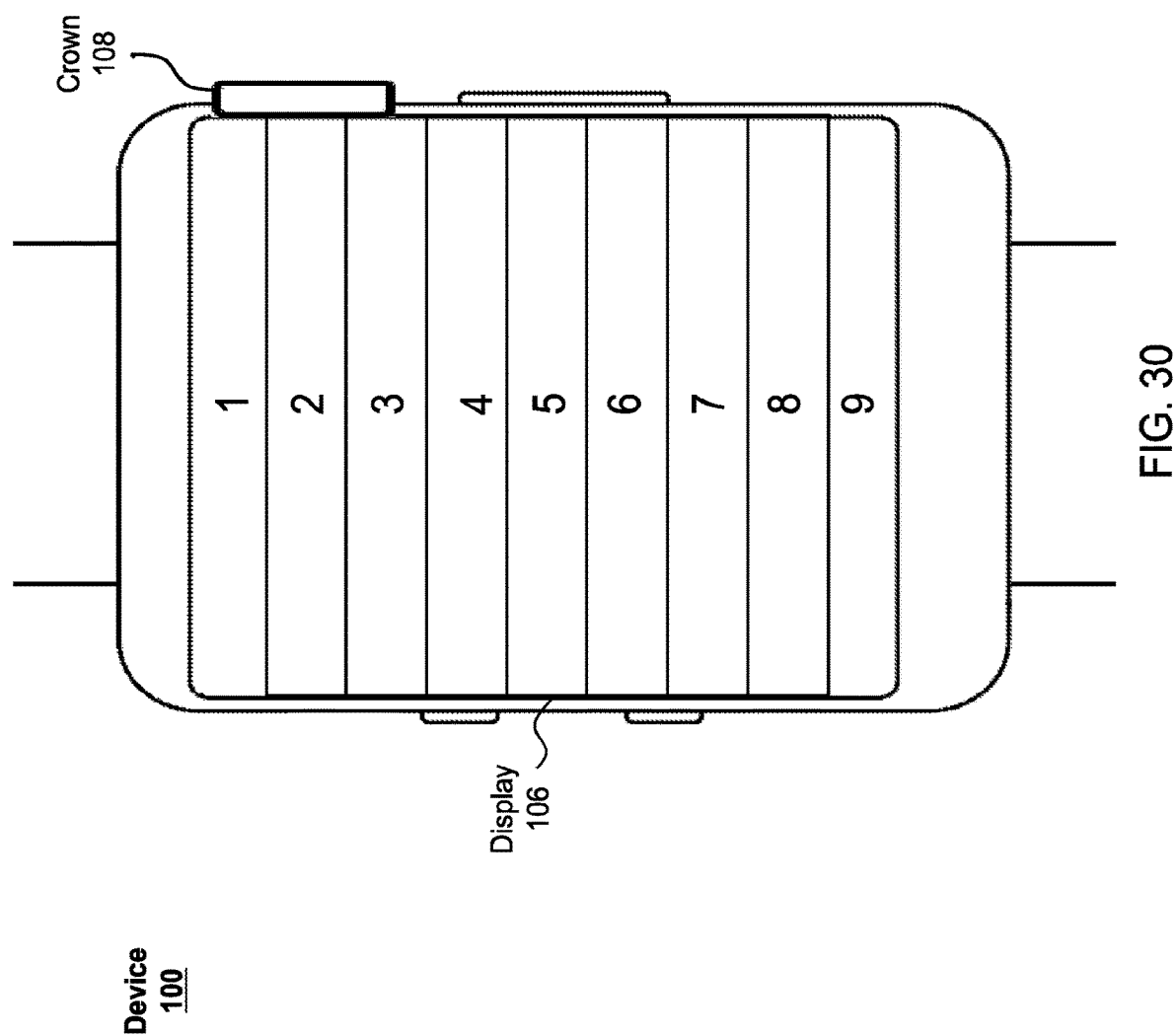
Figure 31:
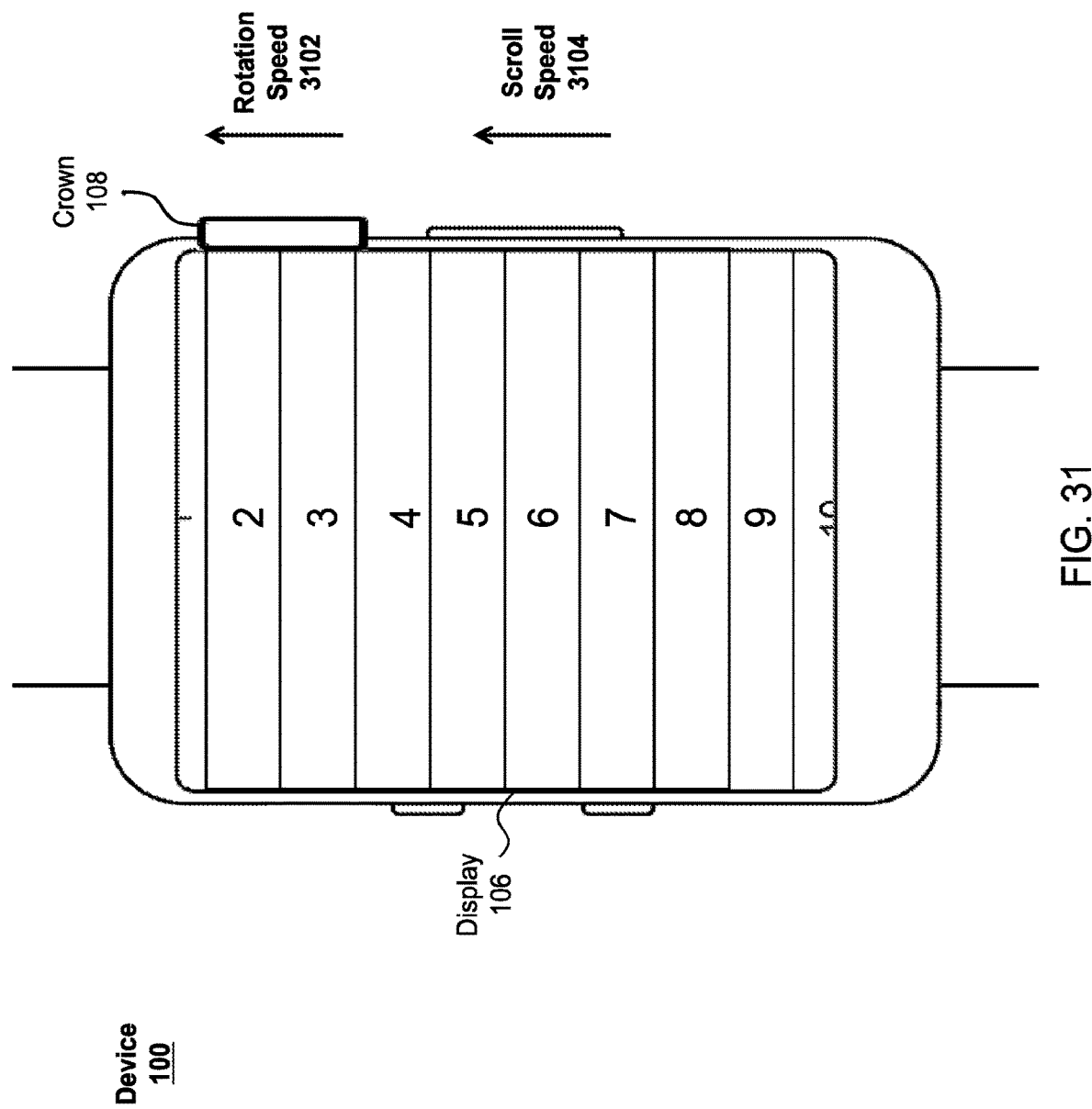
Figure 32:
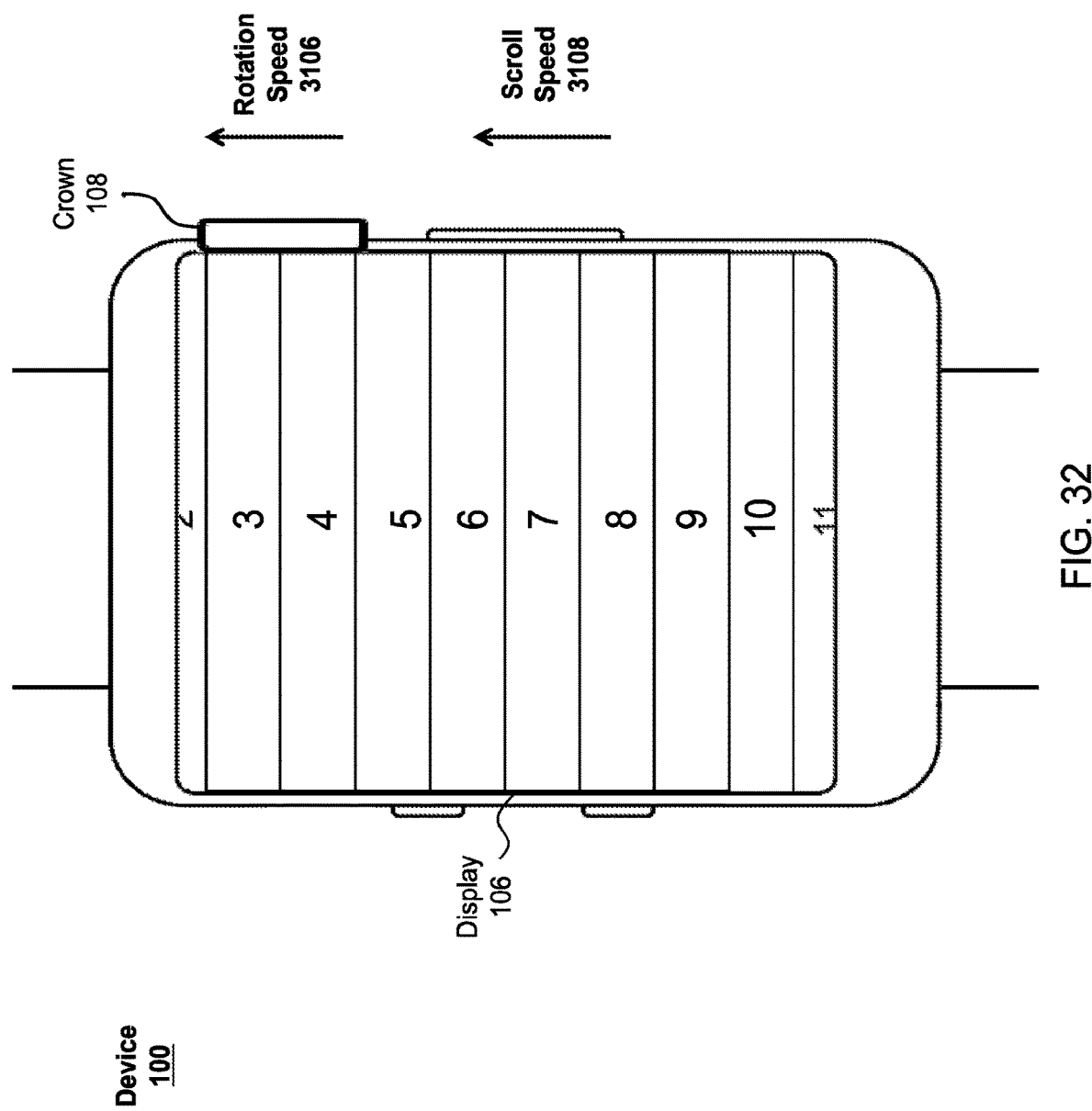
Figure 33:
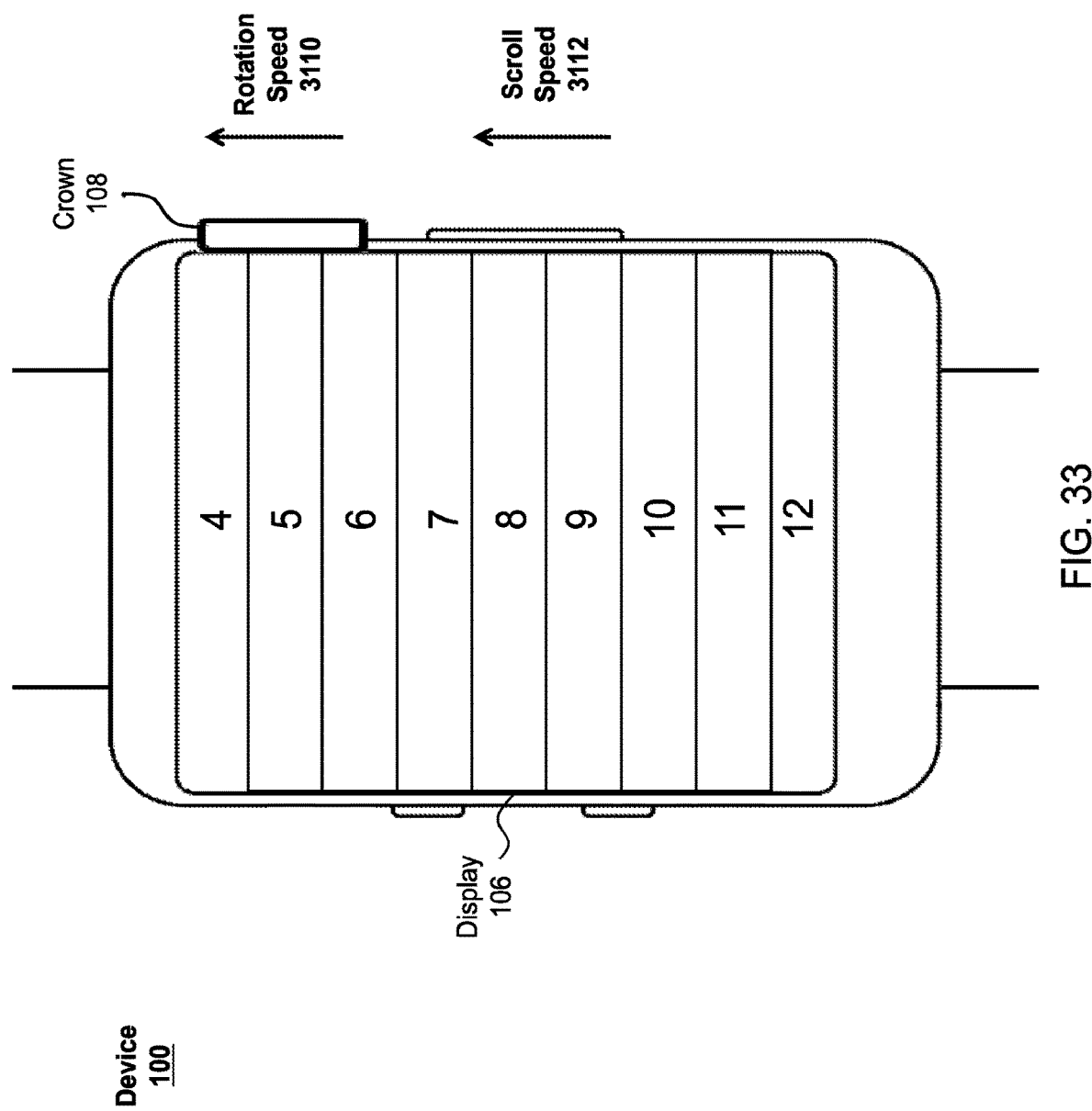
Figure 34:
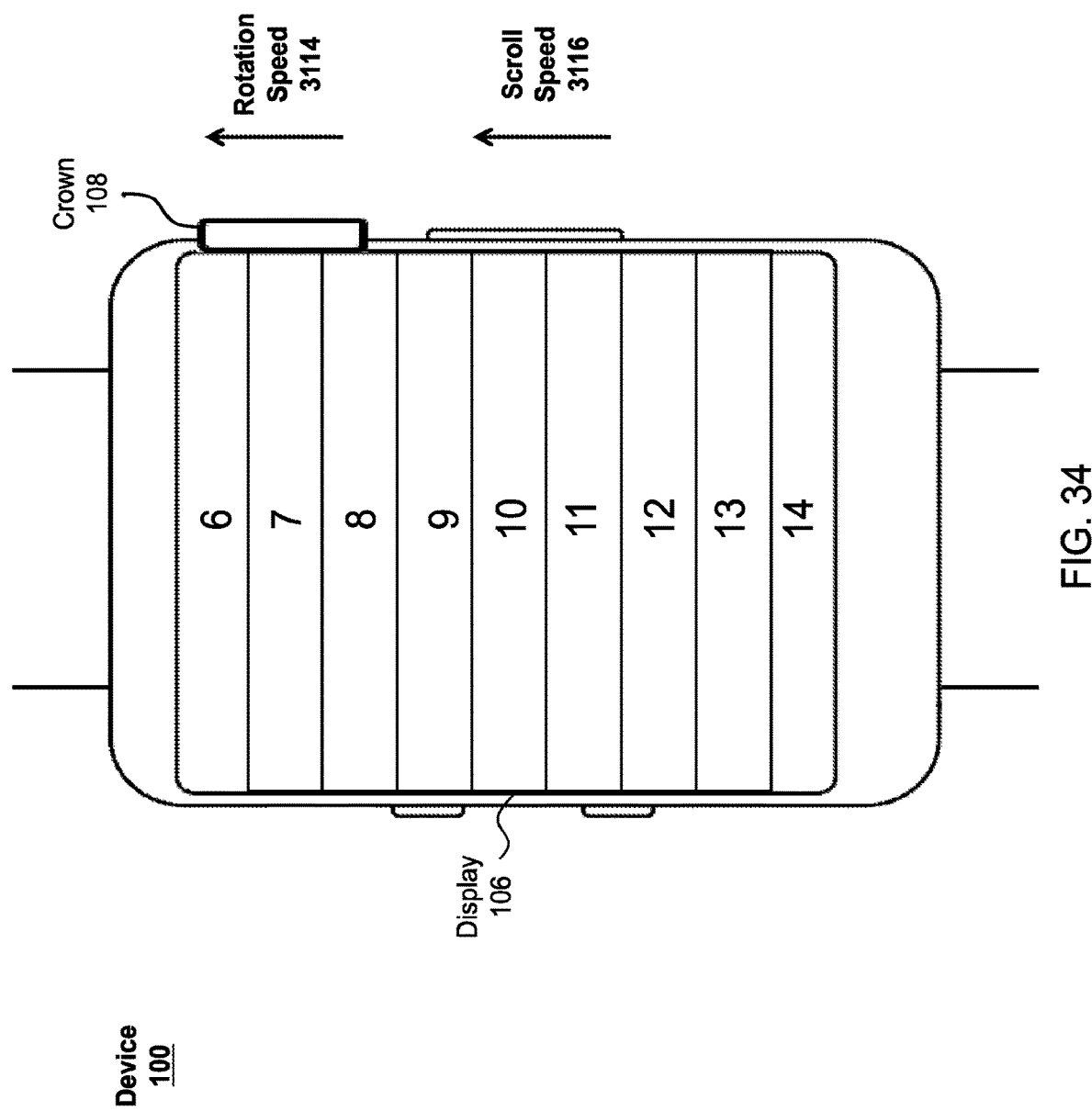
Figure 35:
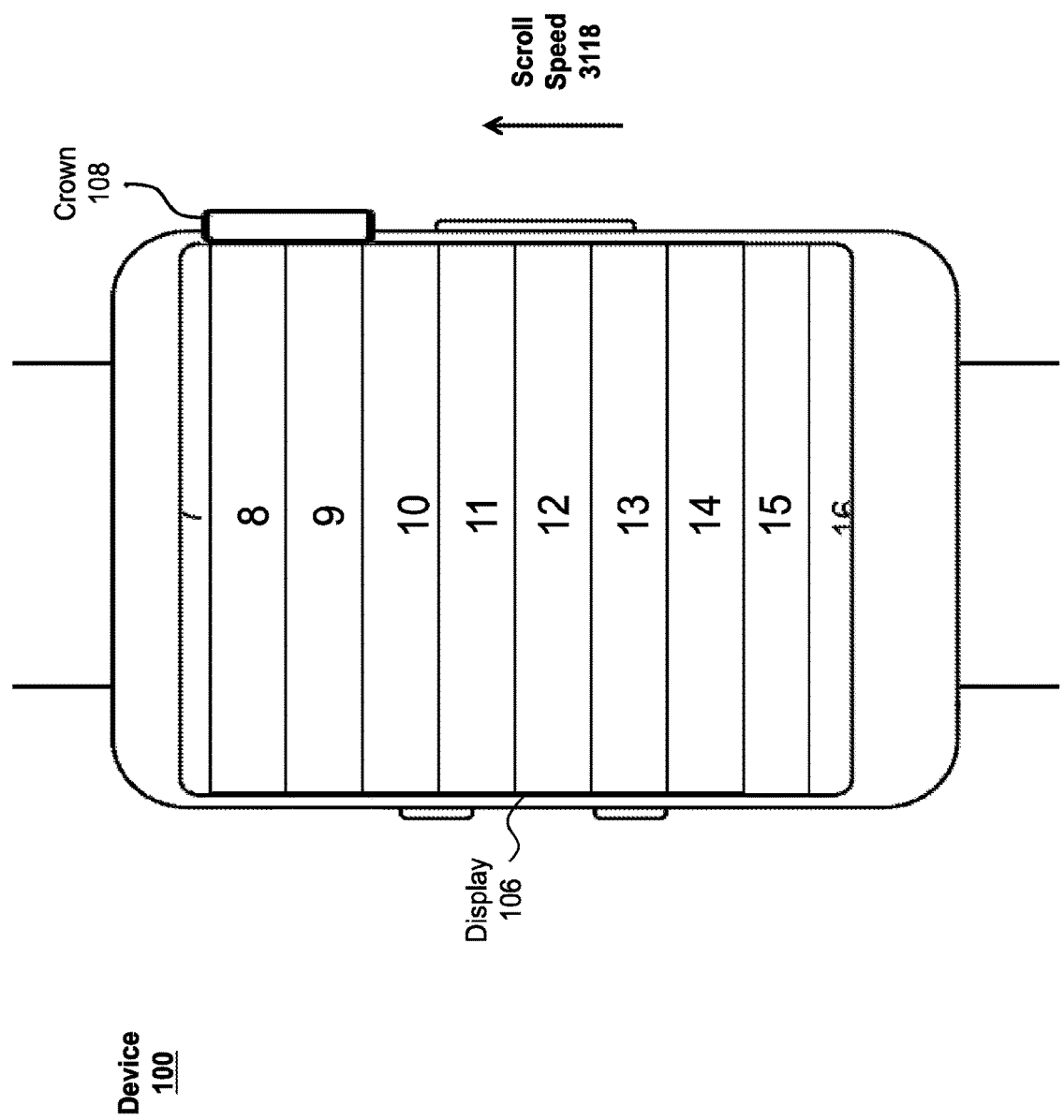
Figure 36:
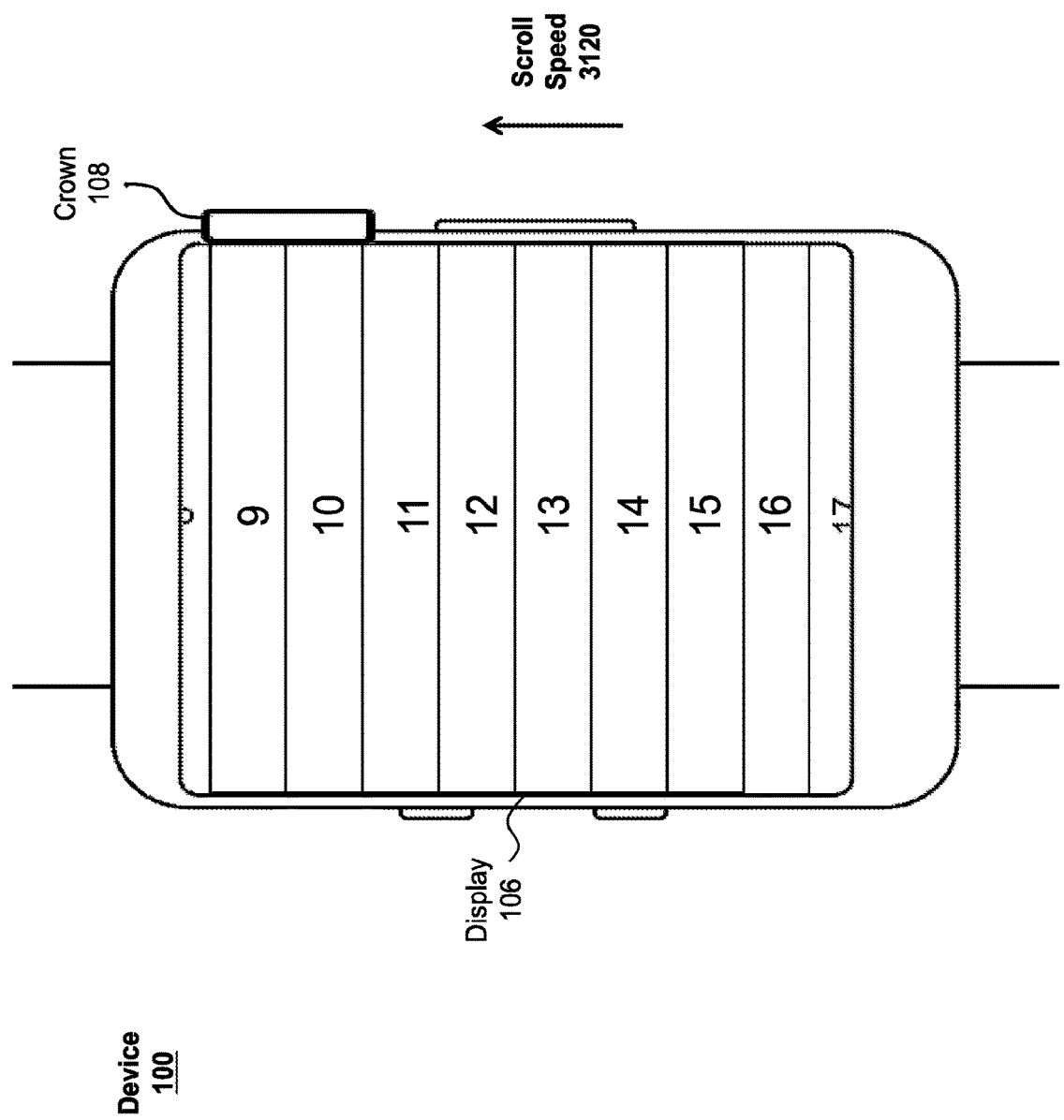

To further illustrate the operation of process 2100, FIG. 30 depicts an example interface of device 100 having a visual representation of lines of text containing numbers 1-9 similar to that shown in FIG. 22. FIGS. 31-36 illustrate the scrolling of the display at scroll speeds 3104, 3108, 3112, 3116, 3118, and 3120 based on input rotation speeds 3102, 3106, 3110, and 3114, in a similar manner as described above with respect to FIGS. 23-28. Thus, the lengths of time between subsequent views shown in FIGS. 31-36 are equal. For purposes of explanation, FIGS. 37-40 depict subsequent views of the interface shown in FIG. 36 at different points of time, where the length of time between each view is equal.

Figure 37:
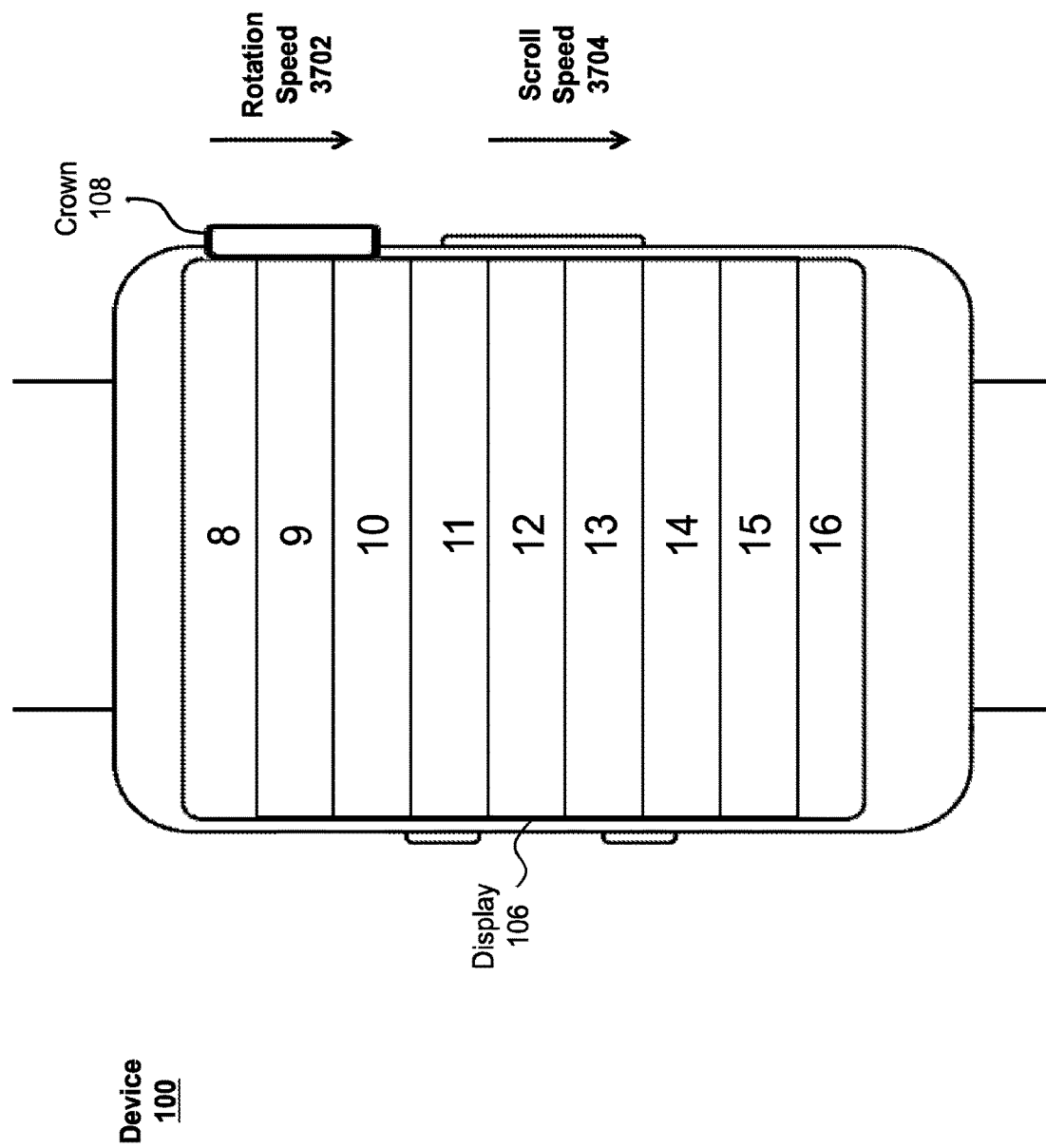

In contrast to FIG. 29 where no rotation input was received, a downward rotation having rotation speed 3702 can be performed at FIG. 37. In this instance, processor 202 can again receive crown position information from encoder 204 reflecting this downward rotation at block 2104. At block 2106, processor 202 can convert this rotation speed into a $\Delta V_{CROWN}$ value to determine the new velocity of scrolling $V_T$. Since the downward rotation of crown 108 is in the opposite direction of the scrolling shown in FIG. 36, the $\Delta V_{CROWN}$ value can have a polarity that is opposite that of the previous scroll velocity value $V_{(T-1)}$. In some examples, the new velocity of scrolling $V_T$ can be calculated by adding the new $\Delta V_{CROWN}$ value (having an opposite polarity) to the previous scroll velocity value $V_{(T-1)}$ and subtracting the $\Delta V_{DRAG}$ value. In other examples, such as that shown in FIG. 37, the previous scroll velocity value $V_{(T-1)}$ can be set to zero when rotation of crown 108 is in a direction opposite that of the previous scrolling (e.g., the polarity of $\Delta V_{CROWN}$ is opposite that of $V_{(T-1)}$). This can be performed to allow the user to quickly change the direction of scrolling without having to offset the previous velocity of scrolling. At block 2108, processor 202 can cause display 106 to update the display based on the determined scroll speed and direction. As shown in FIG. 37, this update has caused the lines of text to translate in the downward direction with scroll speed 3704. Since crown 108 has only begun to rotate, rotation speed 3702 can be relatively low compared to typical rotation speeds of the crown. Thus, scroll speed 3704 can similarly have a relatively low value compared to typical or maximum scroll speeds. As a result, a relatively slow scrolling can be performed, causing 0.5 lines of text to be translated vertically off the display.

Figure 38:
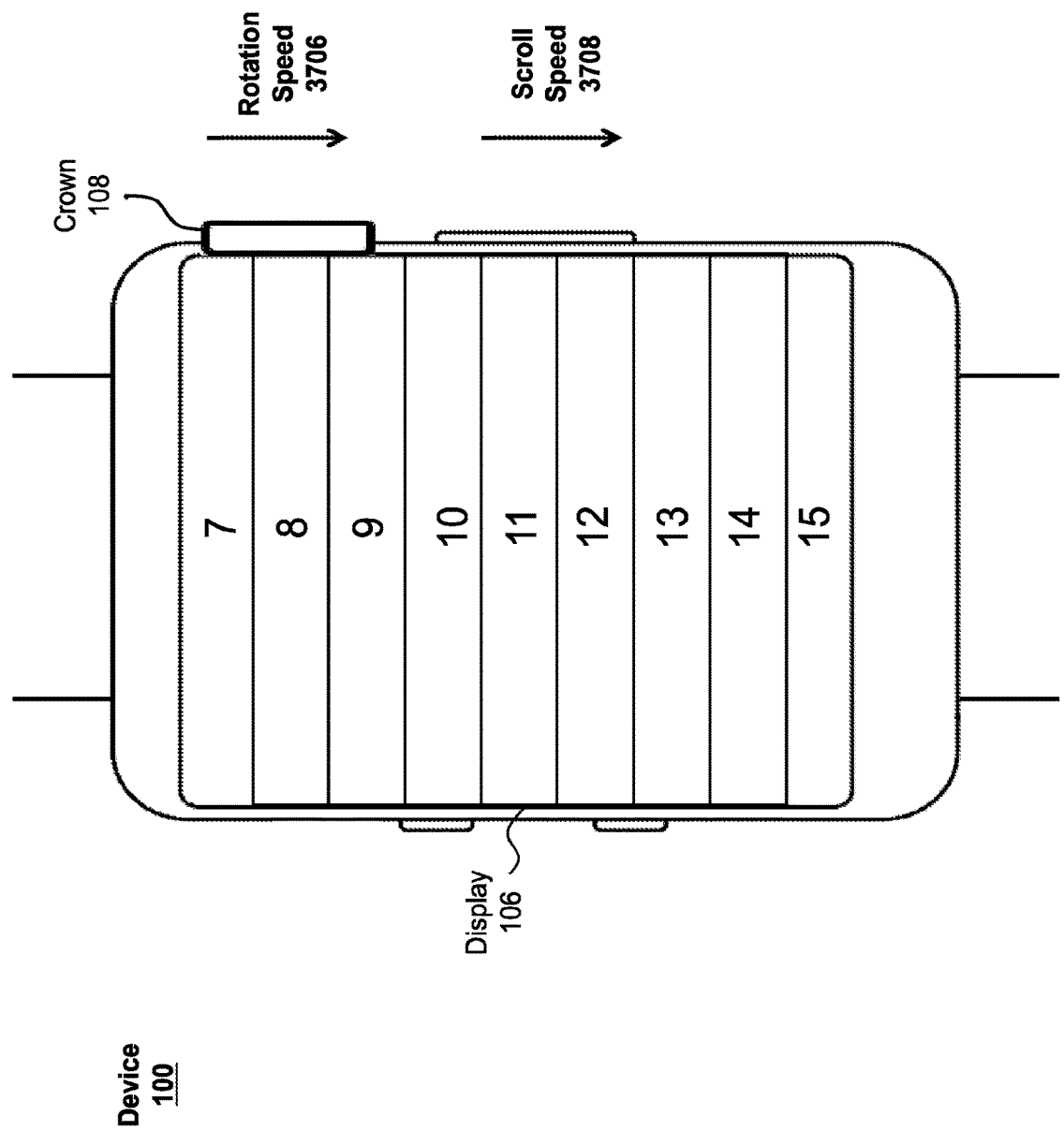

Referring now to FIG. 38, crown 108 is being rotated in the downward rotation direction with rotation speed 3706, which can be greater than rotation speed 3702. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 37), the new $\Delta V_{CROWN}$ value corresponding to rotation speed 3706 can be added to the previous scroll velocity value $V_{(T-1)}$ (e.g., having scroll speed 3704). Thus, as long as the new $\Delta V_{CROWN}$ value is greater than the $\Delta V_{DRAG}$ value, the new scroll speed 3708 can be greater than scroll speed 3704. However, if the $\Delta V_{CROWN}$ value corresponding to rotation speed 3706 is less than the $\Delta V_{DRAG}$ value, the new scroll speed 3708 can be less than scroll speed 3704. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 38, this update has caused the lines of text to translate in the downward direction with scroll speed 3708. Since the $\Delta V_{CROWN}$ value corresponding to rotation speed 3706 is greater than the $\Delta V_{DRAG}$ value, scroll speed 3708 can be greater than scroll speed 3704. As a result, the lines of text have been translated a greater distance over the same length of time, causing a full line of text to be translated vertically off the display.

Figure 39:
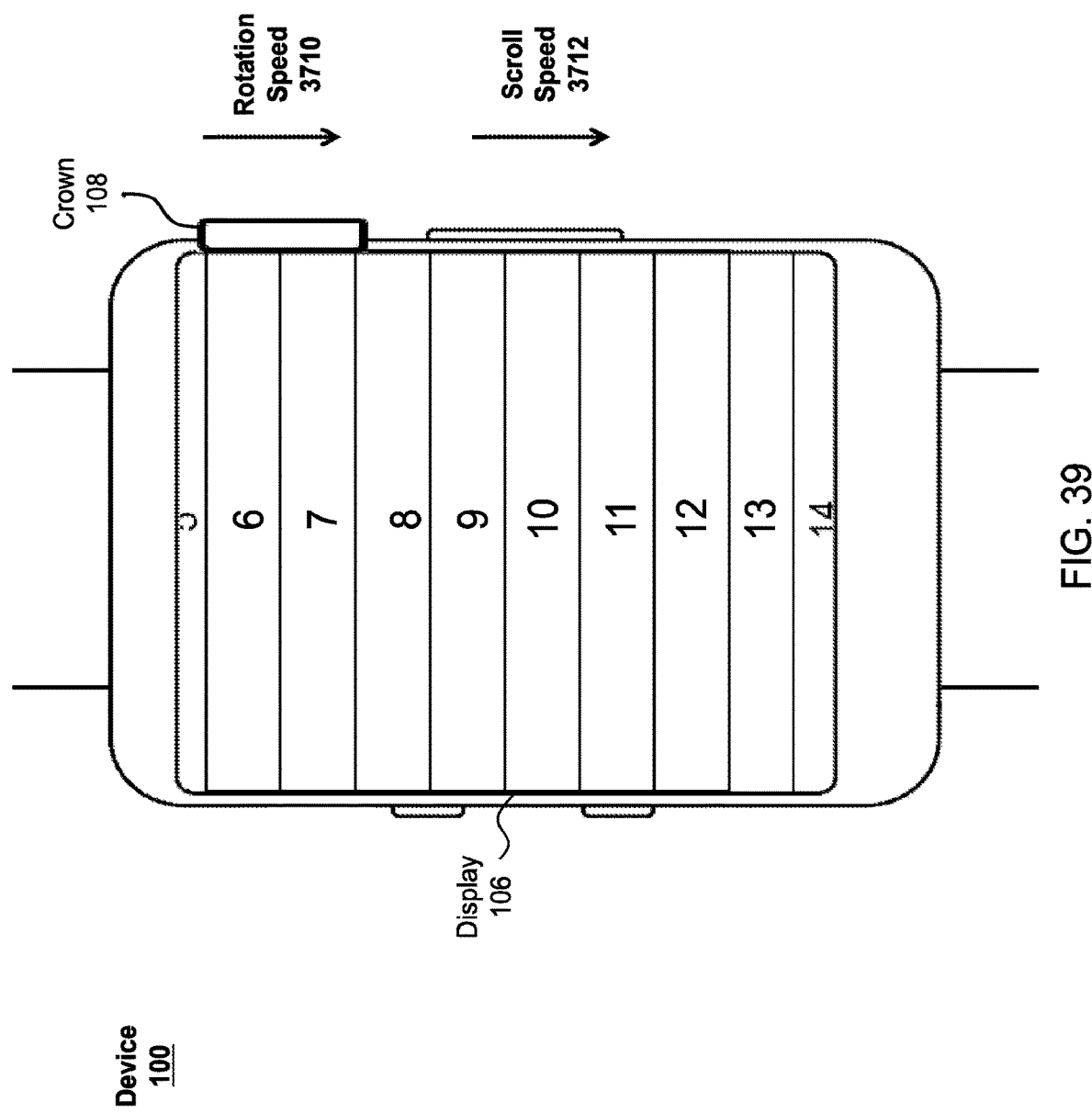

Referring now to FIG. 39, crown 108 is being rotated in the downward rotation direction with rotation speed 3710, which can be greater than rotation speed 3706. Processor 202 can again receive crown position information that reflects this rotation from encoder 204 at block 2104. Thus, at block 2106, processor 202 can convert this rotation speed into a $\Delta V_{CROWN}$ value to determine the new velocity of scrolling $V_T$. Since the display previously had a non-zero scroll speed value (e.g., as shown in FIG. 38), the new $\Delta V_{CROWN}$ value corresponding to rotation speed 3710 can be added to the previous scroll velocity value $V_{(T-1)}$ (e.g., having scroll speed 3708). Thus, as long as the new $\Delta V_{CROWN}$ value is greater than the $\Delta V_{DRAG}$ value, the new scroll speed 3712 can be greater than scroll speed 3708. However, if the $\Delta V_{CROWN}$ value corresponding to rotation speed 3710 is less than the $\Delta V_{DRAG}$ value, the new scroll speed 3712 can be less than scroll speed 3708. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 39, this update has caused the lines of text to translate in the downward direction with scroll speed 3712. Since the $\Delta V_{CROWN}$ value corresponding to rotation speed 3710 is greater than the $\Delta V_{DRAG}$ value, scroll speed 3712 can be greater than scroll speed 3708. As a result, the lines of text have been translated a greater distance over the same length of time, causing 1.5 lines of text to be translated vertically off the display.

Figure 40:
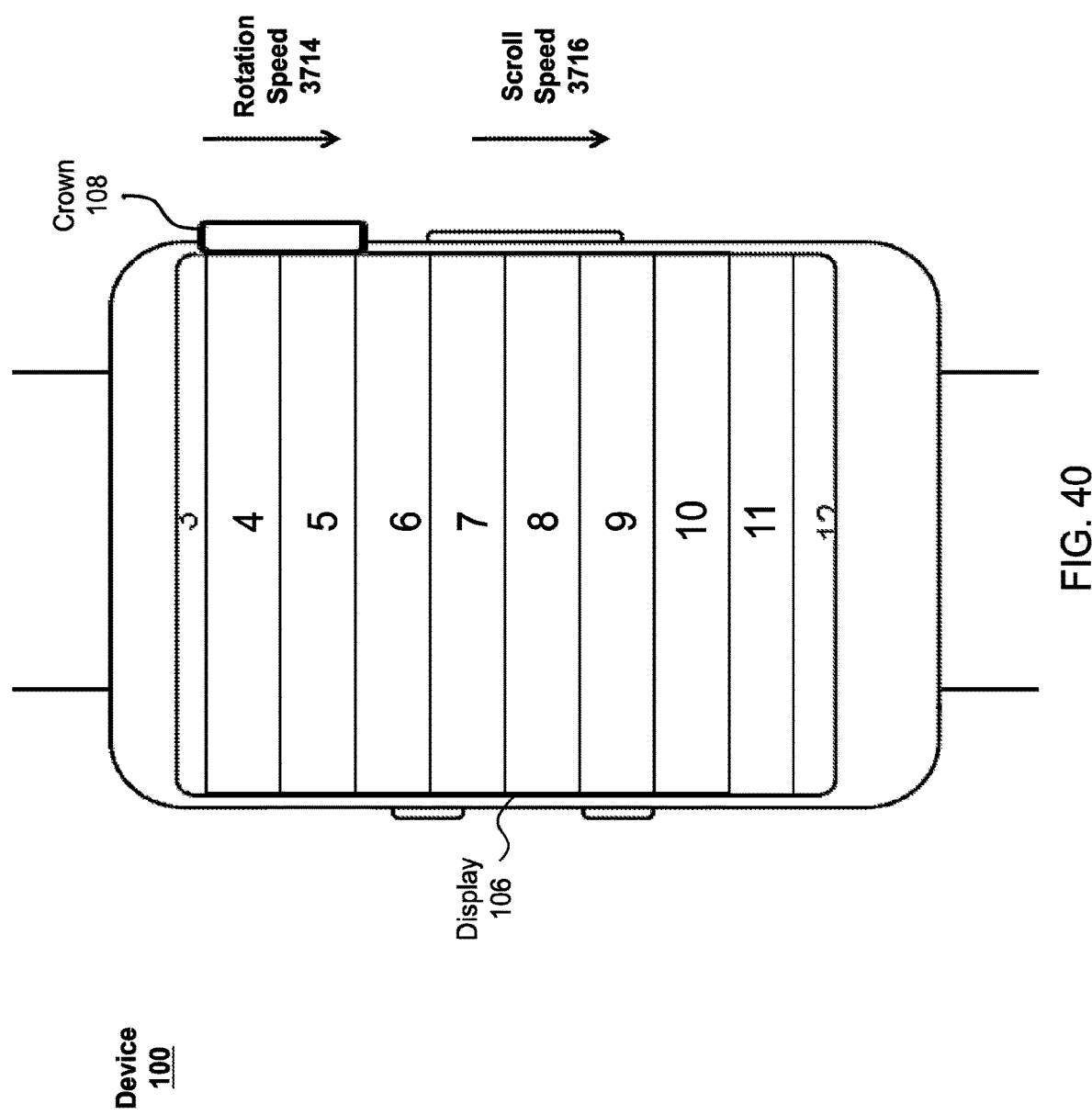

Referring now to FIG. 40, crown 108 is being rotated in the downward rotation direction with rotation speed 3714, which can be greater than rotation speed 3710. Processor 202 can again receive crown position information that reflects this rotation from encoder 204 at block 2104. Thus, at block 2110, processor 202 can convert this rotation speed into a $\Delta V_{CROWN}$ value to determine the new velocity of scrolling $V_T$. Since the display previously had a non-zero scroll speed value (e.g., as shown in FIG. 39), the new $\Delta V_{CROWN}$ value corresponding to rotation speed 3714 can be added to the previous scroll velocity value $V_{(T-1)}$ (e.g., having scroll speed 3712). Thus, as long as the new $\Delta V_{CROWN}$ value is greater than the $\Delta V_{DRAG}$ value, the new scroll speed 3716 can be greater than scroll speed 3712. However, if the $\Delta V_{CROWN}$ value corresponding to rotation speed 3714 is less than the $\Delta V_{DRAG}$ value, the new scroll speed 3716 can be less than scroll speed 3712. In the illustrated example, the new $\Delta V_{CROWN}$ value is assumed to be greater than the $\Delta V_{DRAG}$ value. At block 2108, processor 202 can cause display 106 to update the display based on the determined scroll speed and direction. As shown in FIG. 40, this update has caused the lines of text to translate in the downward direction with scroll speed 3716. Since the $\Delta V_{CROWN}$ value corresponding to rotation speed 3714 is greater than the $\Delta V_{DRAG}$ value, scroll speed 3716 can be greater than scroll speed 3712. As a result, the lines of text have been translated a greater distance over the same length of time, causing two lines of text to be translated vertically off the display.

While not shown, if the rotation of crown 108 stops, the view can continue to be scrolled in a downward direction in a manner similar to that described above with respect to FIGS. 35 and 36. The speed and amount of scroll that can be performed can depend on the scroll speed when the rotation of crown 108 stopped and the value used for $\Delta V_{DRAG}$.

While a specific scrolling example is provided, it should be appreciated that other types of data, such as media items, webpages, applications, or the like, can similarly be scrolled using process 2100 in a similar manner. For example, process 2100 can be performed to scroll through a list of applications in a manner similar to that described above with respect to process 300. However, the velocity of scrolling through the applications when using process 2100 can depend on the velocity of angular rotation of the crown.

Figure 41:
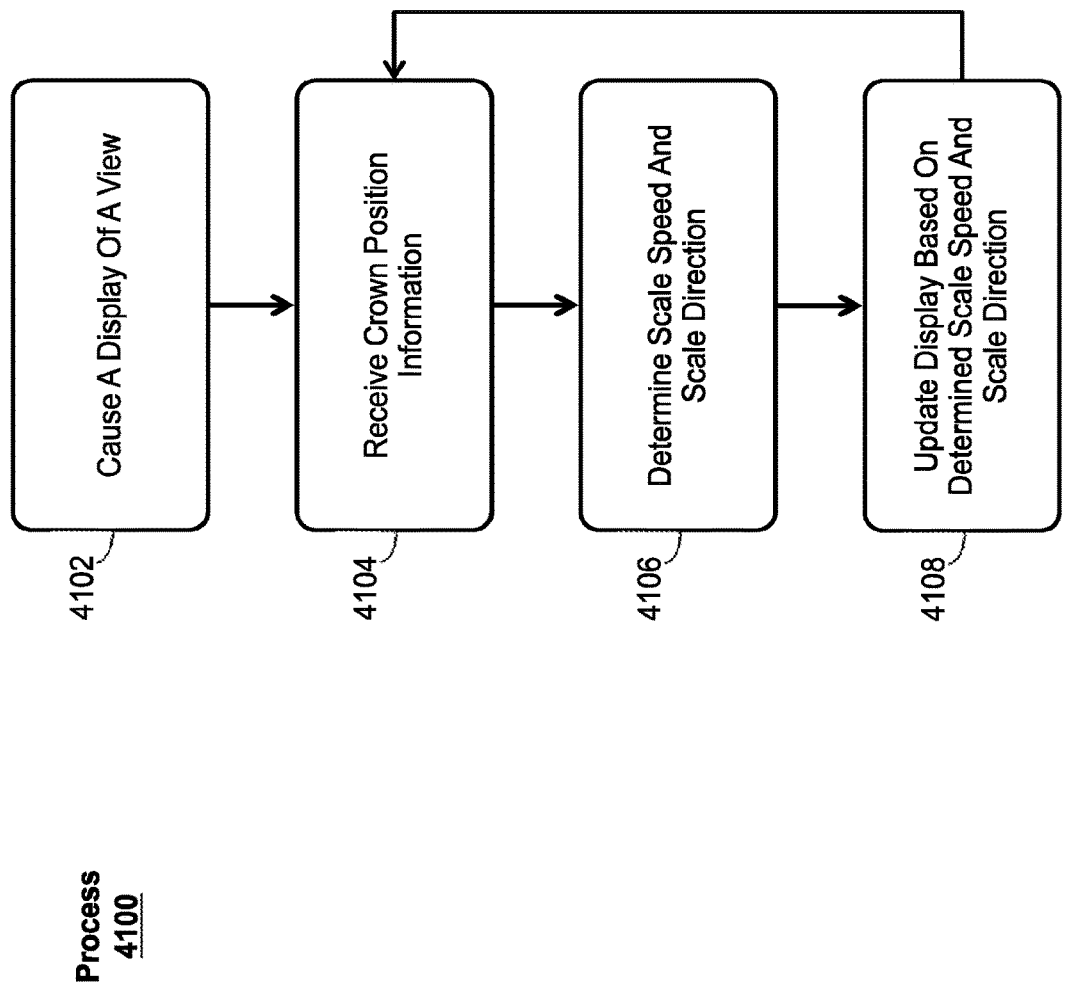
FIG. 41 illustrates an exemplary process for scaling a view of a display based on a angular velocity of rotation of a crown according to various examples.

FIG. 41 illustrates an exemplary process 4100 for scaling a view of a display based on an angular velocity of rotation of a crown according to various examples. The view can include a visual representation of any type of data being displayed. For example, the view can include a display of a text, a media item, a webpage, or the like. Process 4100 can be similar to process 2100, except that process 4100 can determine a scaling velocity (e.g., an amount and direction of change in size per unit time) rather than determine a scrolling velocity. While the quantities being determined are different, they can be determined in a similar manner. In some examples, process 4100 can be performed by a wearable electronic device similar to device 100. In these examples, content or any other view can be displayed on display 106 of device 100 and process 4100 can be performed to visually scale the view in response to a turning of crown 108.

At block 4102, a view of the display of the wearable electronic device can be displayed. As mentioned above, the view can include any visual representation of any type of data that is displayed by a display of the device.

At block 4104, crown position information can be received in a manner similar or identical to that described above with respect to block 902 of process 900. For instance, the crown position information can be received by a processor (e.g., processor 202) from an encoder (e.g., encoder 204) and can include an analog or digital representation of the absolute position of the crown, a change in rotational position of the crown, or other positional information of the crown.

At block 4106, the scale velocity (e.g., speed and positive/negative scaling direction) can be determined. In some examples, the scaling of a view can be determined using a physics-based modeling of motion. For example, the velocity of scaling can be treated as a velocity of a moving object. The rotation of the crown can be treated as a force being applied to the object in a direction corresponding to the direction of rotation of the crown, where the amount of force depends on the speed of angular rotation of the crown. As a result, the scaling velocity can increase or decrease and can move in different directions. For example, a greater speed of angular rotation can correspond to a greater amount of force being applied to the object. Any desired linear or non-linear mapping between speed of angular rotation and force being applied to the object can be used. In addition, a drag force can be applied in a direction opposite the direction of motion (e.g., scaling). This can be used to cause the velocity of scaling to decay over time, allowing the scaling to stop absent additional input from the user. Thus, the velocity of scaling at discrete moments in time can take the general form of:

$$V_T = V_{(T-1)} + \Delta V_{CROWN} - \Delta V_{DRAG}. \quad (1.2)$$

In equation 1.2, $V_T$ represents the determined scale velocity (speed and direction) at time T, $V_{(T-1)}$ represents the previous scale velocity (speed and direction) at time T−1, $\Delta V_{CROWN}$ represents the change in scale velocity caused by the force applied in response to the rotation of the crown, and $\Delta V_{DRAG}$ represents the change in scale velocity caused by the drag force opposing the motion of the scaling. As mentioned above, the force applied to the scaling by the crown can depend on the speed of angular rotation of the crown. Thus, $\Delta V_{CROWN}$ can also depend on the speed of angular rotation of the crown. Typically, the greater the speed of angular rotation of the crown, the greater the value of $\Delta V_{CROWN}$ will be. However, the actual mapping between the speed of angular rotation of the crown and $\Delta V_{CROWN}$ can be varied depending on the desired user feel of the scaling effect. In some examples, the $\Delta V_{DRAG}$ can depend on the velocity of scaling, such that at greater velocities, a greater opposing change in scaling can be produced. In other examples, $\Delta V_{DRAG}$ can have a constant value. However, it should be appreciated that any constant or variable amount of opposing change in velocity can be used to produce a desired scaling effect. Note, typically, in the absence of user input in the form of $\Delta V_{CROWN}$, $V_T$ will approach (and become) zero based on $\Delta V_{DRAG}$ in accordance with equation 1.2, but $V_T$ would not change signs without user input in the form of crown rotation ($\Delta V_{CROWN}$).

As can be seen from equation 1.2, the velocity of scaling can continue to increase as long as $\Delta V_{CROWN}$ is greater than $\Delta V_{DRAG}$. Additionally, the velocity of scaling can have non-zero values even when no $\Delta V_{CROWN}$ input is being received. Thus, if the view is scaling with a non-zero velocity, it can continue to scale without the user rotating the crown. The scale amount and time until the scaling stops can depend on the scale velocity at the time the user stops rotating the crown and the $\Delta V_{DRAG}$ component.

In some examples, when the crown is rotated in the opposite direction corresponding to a scale direction that is opposite the direction that the view is currently being scaled, the $V_{(T-1)}$ component can be reset to a value of zero, allowing the user to quickly change the direction of the scaling without having to provide a force sufficient to offset the current scale velocity of the view.

At block 4108, the display can be updated based on the scale speed and direction determined at block 4106. This can include scaling the view by an amount corresponding to the determined scale speed and in a direction (e.g., larger or smaller) corresponding to the determined scale direction. The process can then return to block 4104, where additional crown position information can be received.

It should be appreciated that blocks 4104, 4106, and 4108 can be repeatedly performed at any desired frequency to continually determine the speed of scaling and to update the display accordingly.

Figure 42:
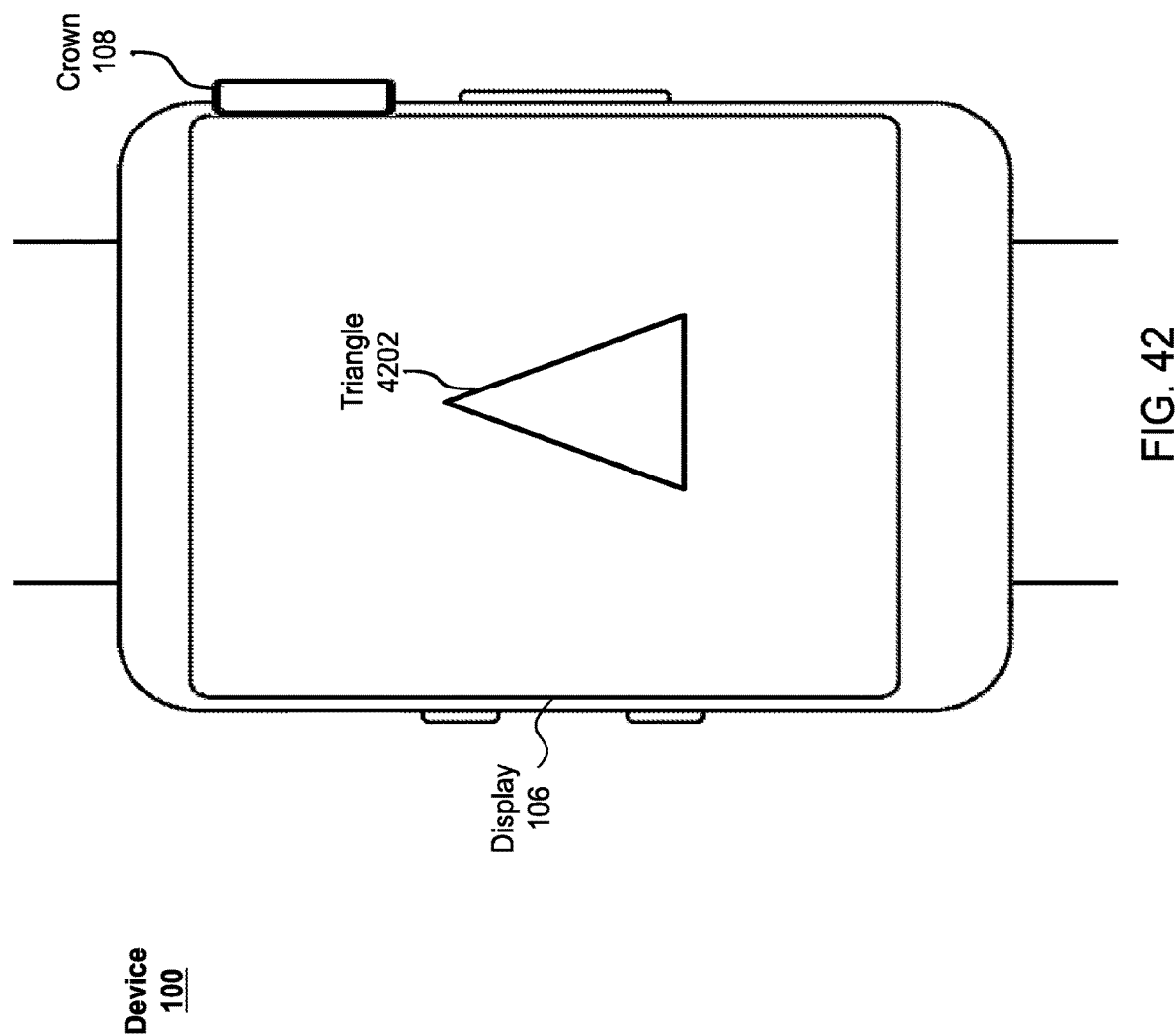
FIGS. 42-44 illustrate screens showing the scaling of a view of a display using the process of FIG. 41.

To further illustrate the operation of process 4100, FIG. 42 depicts an example interface of device 100 having an image of triangle 4202. At block 4102 of process 4100, processor 202 of device 100 can cause display 106 to display the illustrated triangle 4202. At block 4104, processor 202 can receive crown position information from encoder 204. At block 4106, a scale speed and scale direction can be determined. Since the current scroll velocity is zero and since crown 108 is not currently being rotated, it can be determined using equation 1.2 that the new velocity of scaling is zero. At block 4108, processor 202 can cause display 106 to update the display using the speed and direction determined at block 4106. However, since the determined velocity was zero, no change to the display need be made. For purposes of explanation, FIGS. 43 and 44 depict subsequent views of the interface shown in FIG. 42 at different points of time, where the length of time between each view is equal.

Figure 43:
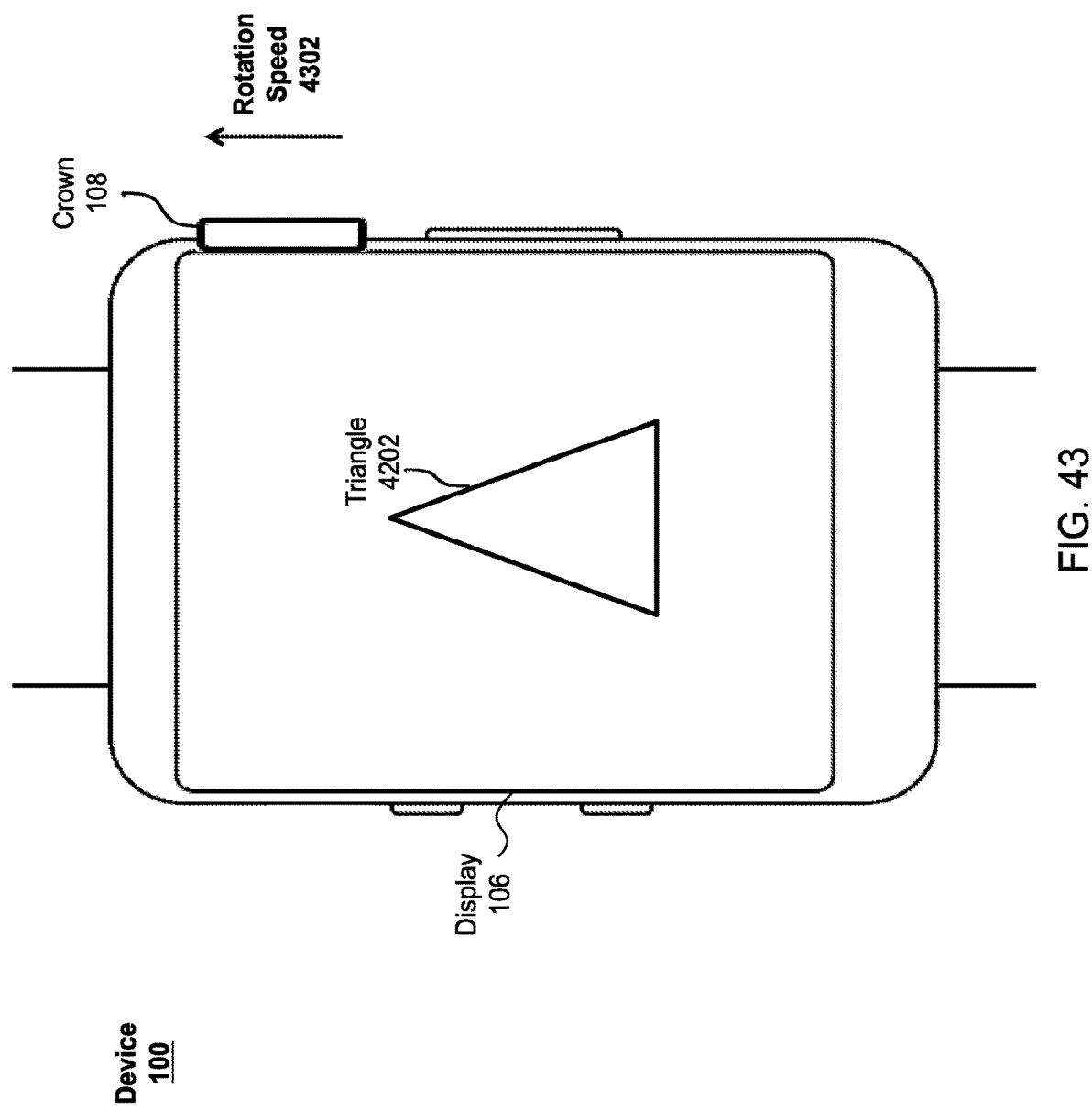
Figure 44:
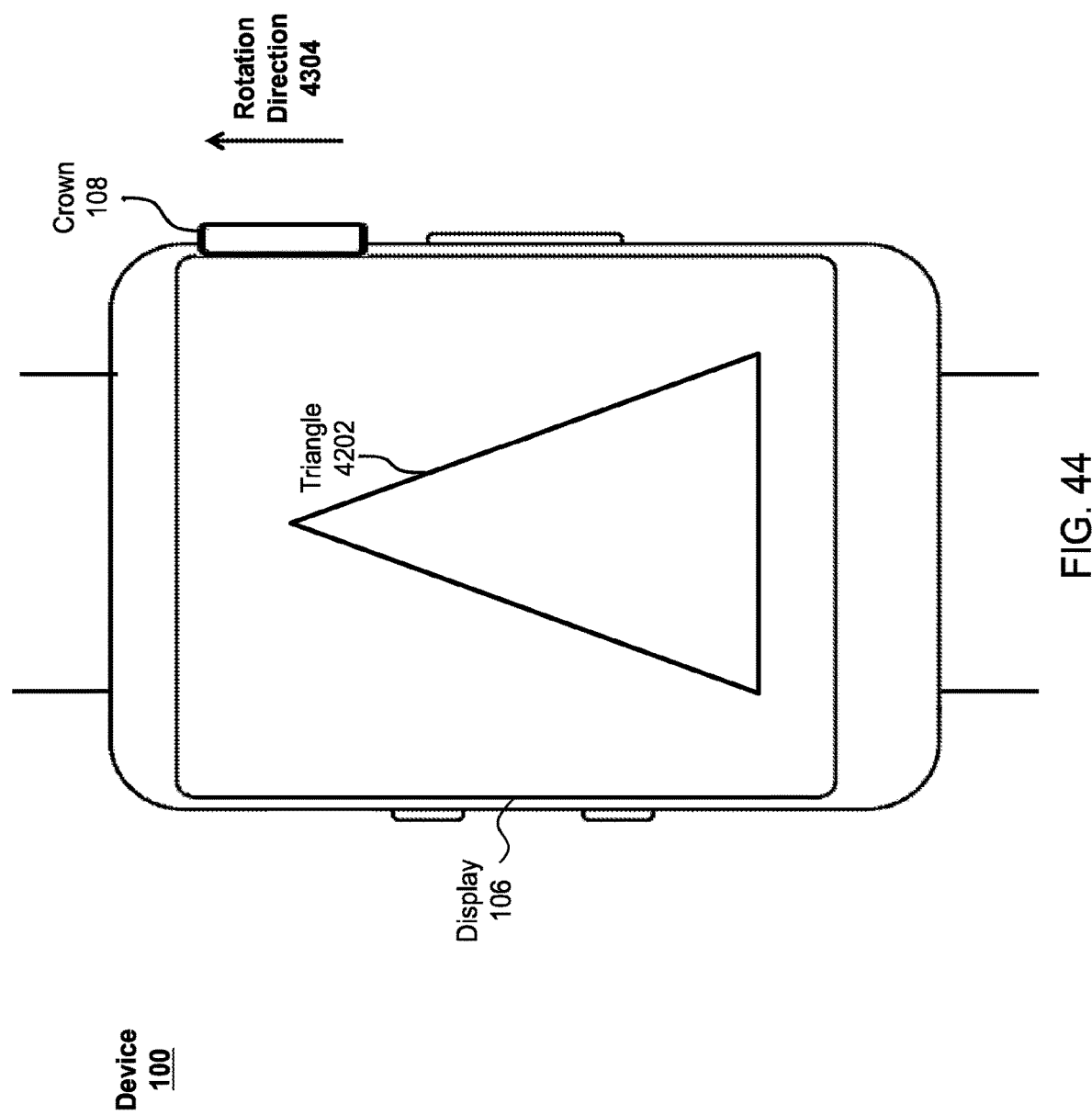

Referring now to FIG. 43, crown 108 is being rotated in the upward rotation direction with rotation speed 4302. Processor 202 can again receive crown position information that reflects this rotation from encoder 204 at block 4104. Thus, at block 4106, processor 202 can convert this rotation speed into a $\Delta V_{CROWN}$ value to determine the new velocity of scaling $V_T$. In this example, rotation of crown in the upward direction equates to a positive scaling direction (e.g., increasing the size of the view). In other examples, other directions can be used. At block 4108, processor 202 can cause display 106 to update the display based on the determined scale speed and direction. As shown in FIG. 43, this update has caused triangle 4202 to increase in size with a rate of change corresponding to the determined scale speed. Since crown 108 has only begun to rotate, rotation speed 4302 can be relatively low compared to typical rotation speeds of the crown. Thus, the scale speed can similarly have a relatively low value compared to typical or maximum scroll speeds. As a result, only a small change in size of triangle 4202 can be observed.

Referring now to FIG. 43, crown 108 is being rotated in the upward rotation direction with rotation speed 4304, which can be greater than rotation speed 4302. Processor 202 can again receive crown position information that reflects this rotation from encoder 204 at block 4104. Thus, at block 4106, processor 202 can convert this rotation speed into a $\Delta V_{CROWN}$ value to determine the new velocity of scaling $V_T$. Since the display previously had a non-zero scale velocity value (e.g., as shown in FIG. 43), the new $\Delta V_{CROWN}$ value corresponding to rotation speed 4304 can be added to the previous scale velocity value $V_{(T-1)}$. Thus, as long as the new $\Delta V_{CROWN}$ value is greater than the $\Delta V_{DRAG}$ value, the new scale velocity can be greater than the previous scale velocity. However, if the $\Delta V_{CROWN}$ value corresponding to rotation speed 4304 is less than the $\Delta V_{DRAG}$ value, the new scale velocity can be less than the previous scale velocity. In the illustrated example, the new $\Delta V_{CROWN}$ value is assumed to be greater than the $\Delta V_{DRAG}$ value. At block 4108, processor 202 can cause display 106 to update the display based on the determined scale speed and direction. As shown in FIG. 44, this update has caused triangle 4202 to increase in size with the determined scale velocity. Since the $\Delta V_{CROWN}$ value corresponding to rotation speed 4304 is greater than the $\Delta V_{DRAG}$ value, the scale velocity can be greater than the previous scale velocity. As a result, a larger change in size of triangle 4202 can be observed than that illustrated in FIG. 43.

Similar to the scrolling performed using process 2100, the scaling of the view containing triangle 4202 can continue after rotation of crown 108 has ceased. However, the rate at which the view containing triangle 4202 increases in size can decrease over time due to the $\Delta V_{DRAG}$ value of equation 1.2. Additionally, a similar scaling that decreases the size of the view containing triangle 4202 can be performed in response to crown 108 being rotated in the opposite direction. The velocity of the scaling can be calculated in a similar manner as that used to calculate the positive scaling shown in FIGS. 42-44. Moreover, similar to the scrolling performed using process 2100, the speed and direction of scaling can be set to zero in response to a rotation of crown 108 in a direction opposite the direction of scaling. This can be performed to allow the user to quickly change the direction of the scaling.

Moreover, in some examples, when reaching a minimum or maximum scaling of a view, the velocity scaling can reverse directions. For example, the velocity of scaling can cause the view to zoom-in with a non-zero speed. Upon reaching a scaling limit, the direction of the scaling can reverse to cause the view to scale in the opposite direction (e.g., zoom-out) with the same speed that the view was scaling prior to reaching the scaling limit.

In some examples, the scrolling or scaling performed in any of the processes described above (e.g., process 300, 900, 1500, 2100, or 4100) can be stopped in response to a change of context of the electronic device. A context can represent any condition that makes up the environment in which the crown position information is being received. For example, a context can include a current application being executed by the device, a type of application or process being displayed by the device, a selected object within a view of the device, or the like. To illustrate, if crown position information indicating that a change in position of crown 108 is being received while performing process 300, device 100 can scroll through a list of applications, as described above. However, in response to a change in context in the form of a user selecting one of the displayed applications, which causes device 100 to open the application, device 100 can cease to perform the previously occurring scrolling function of block 306 to prevent the scrolling function from being performed within the opened application. In some examples, after detecting a change in context, device 100 can also ignore inputs from crown 108 by ceasing to perform the scrolling function of block 306 even if crown 108 continues to be rotated. In some examples, device 100 can cease to perform the scrolling function of block 306 in response to a change in position of crown 108 for a threshold length of time after detecting a change in context. The threshold length of time can be any desired time, such as 1, 2, 3, 4, or more seconds. A similar behavior can also be performed in response to detecting a change in context while performing process 900 or 1500. For example, device 100 can cease to perform a previously occurring scrolling or scaling function in response to detecting a change in context. Additionally, in some examples after detecting a change in context, device 100 can also ignore inputs from crown 108 by ceasing to scroll or zoom a view in response to changes in position of crown 108 for a threshold length of time after detecting the change in context. A similar behavior can also be performed in response to detecting a change in context while performing blocks 2100 or 4100. For example, device 100 can stop a previously occurring scrolling or zooming function having a non-zero speed in response to detecting a change in context. Additionally, in some examples after detecting a change in context, device 100 can also ignore inputs from crown 108 by ceasing to scroll or zoom a view in response to changes in position of crown 108 for a threshold length of time after detecting the change in context. Stopping a scrolling or scaling function and/or ignoring future inputs from crown 108 in response to detecting a change in context can advantageously prevent an input entered while operating in one context from carrying over to another context in an undesired way. For example, a user can use crown 108 to scroll through a list of applications using process 300 and can select a desired music application while the momentum of crown 108 causes crown 108 to continue to spin. Without stopping the scrolling function and without ignoring inputs from crown 108 in response to detecting the change in context, device 100 can cause a scrolling function to be performed within the selected application or can interpret the input from crown 108 in another manner (e.g., to adjust a volume of the music application) unintended by the user.

In some examples, changes in certain types of contexts may not result in device 100 stopping an ongoing scrolling or scaling function and/or causing device 100 to ignore future inputs from crown 108. For example, if device 100 is simultaneously displaying multiple views or objects within display 106, selection between the displayed views or objects may not cause device 100 to stop the scrolling or scaling function and/or may not cause device 100 to ignore future inputs of crown 108, as described above. For example, device 100 can simultaneously display two sets of lines of text similar to that shown in FIG. 10. In this example, device 100 can scroll through one of the sets using process 900. In response to a user selection of the other set of lines of text (e.g., via a tap on the touch-sensitive display of device 100 at a location corresponding to the other set of lines of text), device 100 can begin to scroll through the other set of lines of text based on the previous scroll speed and/or current detected changes in position of crown 108. However, if a different type of change in context occurs (e.g., a new application is opened, an item not currently being displayed by device 100 is selected, or the like), device 100 can stop an ongoing scrolling or scaling function and/or can ignore inputs from crown 108 for a threshold length of time, as described above. In other examples, rather than begin to scroll through the other set of lines of text based on the previous scroll speed and/or the current change in position of crown 108 in response to a user selection of the other set of lines of text (e.g., via a tap on the touch-sensitive display of device 100 at a location corresponding to the other set of lines of text), device 100 can stop an ongoing scrolling or scaling function and/or can ignore inputs from crown 108 for a threshold length of time. However, the threshold length of time can be shorter than the threshold length of time used for changes in other types of changes in context (e.g., a new application is opened, an item not currently being displayed by device 100 is selected, or the like). While specific types of context changes are provided above, it should be appreciated that any type of context changes can be selected.

In some examples, device 100 can include a mechanism for detecting physical contact with crown 108. For example, device 100 can include a capacitive sensor configured to detect changes in capacitance caused by contact with crown 108, a resistive sensor configured to detect changes in resistance caused by contact with crown 108, a pressure sensor configured to detect a depression of crown 108 caused by contact with crown 108, a temperature sensor configured to detect a change in temperature of crown 108 caused by contact with crown 108, or the like. It should be appreciated that any desired mechanism for detecting contact with crown 108 can be used. In these examples, the presence or absence of contact with crown 108 can be used to stop the scrolling or scaling performed in any of the processes described above (e.g., process 300, 900, 1500, 2100, or 4100). For instance, in some examples, device 100 can be configured to perform scrolling or scaling functions as described above with respect to processes 300, 900, 1500, 2100, or 4100. In response to detecting an abrupt stop in the rotation of crown 108 (e.g., a stop or decrease in rotation speed that exceeds a threshold value) while contact with crown 108 is detected, device 100 can stop the scrolling or scaling being performed. This occurrence can represent the situation where the user quickly rotates crown 108, but intentionally brings it to a stop, indicating a desire to halt the scrolling or scaling. However, in response to detecting an abrupt stop in the rotation of crown 108 (e.g., a stop or decrease in rotation speed that exceeds a threshold value) while contact with crown 108 is not detected, device 100 can continue the scrolling or scaling being performed. This occurrence can represent the situation where the user quickly rotates crown 108 by performing a forward or backwards flicking gesture, removes their finger from crown 108, and rotates their wrist back in order to further wind crown 108 using another flicking gesture. In this situation, it is likely that the user does not intend for the scrolling or scaling to stop.

While processes 300, 900, 2100, ad 4100 have been described above as being used to perform scrolling or scaling of objects or views of a display, it should be appreciated that they can more generally be applied to adjust any type of value associated with the electronic device. For example, rather than scroll or scale a view in a particular direction in response to a change in position of crown 108, device 100 can instead increase a selected value (e.g., a volume, a time within a video, or any other value) by an amount or a speed in a manner similar to that described above for scrolling or scaling. Additionally, rather than scroll or scale a view in an opposite direction in response to a change in position of crown 108 in the opposite direction, device 100 can instead decrease the selected value by an amount or a speed in a manner similar to that described above for scrolling or scaling.

One or more of the functions relating to scaling or scrolling a user interface can be performed by a system similar or identical to system 4500 shown in FIG. 45. System 4500 can include instructions stored in a non-transitory computer readable storage medium, such as memory 4504 or storage device 4502, and executed by processor 4506. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM), a read-only memory (ROM), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, system 4500 can be included within device 100. In these examples, processor 4506 can be used as processor 202. Processor 4506 can be configured to receive the output from encoder 204, buttons 110, 112, and 114, and from touch-sensitive display 106. Processor 4506 can process these inputs as described above with respect to FIGS. 3, 9, 15, 21, and 41, and processes 300, 900, 1500, 2100, and 4100. It is to be understood that the system is not limited to the components and configuration of FIG. 45, but can include other or additional components in multiple configurations according to various examples.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A non-transitory computer-readable storage medium storing one or more programs configured to be executed by one or more processors of an electronic device with a touch-sensitive display and a physical crown, the one or more programs including instructions for:
receiving crown position information associated with the physical crown of the electronic device;
determining that a rotation of the physical crown has occurred based on the received crown position information;
in response to determining that the rotation of the physical crown has occurred, causing a view displayed on the touch-sensitive display of the electronic device to be scrolled in a first direction, wherein causing the view displayed on the touch-sensitive display of the electronic device to be scrolled in the first direction comprises causing the view to be scrolled at a determined scroll speed, and wherein the determined scroll speed is based on:
adding a crown scroll speed component to a previous scroll speed, wherein the crown scroll speed component represents a change in scroll speed based on a velocity of angular rotation of the physical crown; and
subtracting a drag scroll speed component from the sum of the crown scroll speed component and the previous scroll speed, wherein the result is the determined scroll speed;
while the view displayed on the touch-sensitive display of the electronic device has been scrolled so that a predefined portion of a content has been scrolled beyond an edge of the touch-sensitive display, determining that the rotation of the physical crown has ceased; and
in response to determining that the rotation of the physical crown has ceased and the view displayed on the touch-sensitive display of the electronic device has been scrolled so that the predefined portion of the content has been scrolled beyond the edge of the touch-sensitive display, causing the view displayed on the touch-sensitive display of the electronic device to be scrolled in a second direction different from the first direction so that the predefined portion of the content is moved closer to the edge of the touch-sensitive display.

2. The non-transitory computer-readable storage medium of claim 1, wherein the electronic device comprises a watch.

3. The non-transitory computer-readable storage medium of claim 1, wherein the crown position information comprises a change in rotational position of the physical crown over a length of time.

4. The non-transitory computer-readable storage medium of claim 1, wherein the physical crown is a mechanical crown.

5. A computer-implemented method comprising:
at an electronic device including a touch-sensitive display and a physical crown:
receiving crown position information associated with the physical crown of the electronic device;
determining that a rotation of the physical crown has occurred based on the received crown position information;
in response to determining that the rotation of the physical crown has occurred, causing a view displayed on the touch-sensitive display of the electronic device to be scrolled in a first direction, wherein causing the view displayed on the touch-sensitive display of the electronic device to be scrolled in the first direction comprises causing the view to be scrolled at a determined scroll speed, and wherein the determined scroll speed is based on:
adding a crown scroll speed component to a previous scroll speed, wherein the crown scroll speed component represents a change in scroll speed based on a velocity of angular rotation of the physical crown; and
subtracting a drag scroll speed component from the sum of the crown scroll speed component and the previous scroll speed, wherein the result is the determined scroll speed;
while the view displayed on the touch-sensitive display of the electronic device has been scrolled so that a predefined portion of a content has been scrolled beyond an edge of the touch-sensitive display, determining that the rotation of the physical crown has ceased; and
in response to determining that the rotation of the physical crown has ceased and the view displayed on the touch-sensitive display of the electronic device has been scrolled so that the predefined portion of the content has been scrolled beyond the edge of the touch-sensitive display, causing the view displayed on the touch-sensitive display of the electronic device to be scrolled in a second direction different from the first direction so that the predefined portion of the content is moved closer to the edge of the touch-sensitive display.

6. The method of claim 5, wherein the electronic device comprises a watch.

7. The method of claim 5, wherein the crown position information comprises a change in rotational position of the physical crown over a length of time.

8. The method of claim 5, wherein the physical crown is a mechanical crown.

9. An electronic device comprising:
one or more processors;
a physical crown operatively coupled to the one or more processors; and
a touch-sensitive display operatively coupled to the one or more processors, the one or more processors configured to:
receiving crown position information associated with the physical crown of the electronic device;
determining that a rotation of the physical crown has occurred based on the received crown position information;
in response to determining that the rotation of the physical crown has occurred, causing a view displayed on the touch-sensitive display of the electronic device to be scrolled in a first direction, wherein causing the view displayed on the touch-sensitive display of the electronic device to be scrolled in the first direction comprises causing the view to be scrolled at a determined scroll speed, and wherein the determined scroll speed is based on:
adding a crown scroll speed component to a previous scroll speed, wherein the crown scroll speed component represents a change in scroll speed based on a velocity of angular rotation of the physical crown; and
subtracting a drag scroll speed component from the sum of the crown scroll speed component and the previous scroll speed, wherein the result is the determined scroll speed;
while the view displayed on the touch-sensitive display of the electronic device has been scrolled so that a predefined portion of a content has been scrolled beyond an edge of the touch-sensitive display, determining that the rotation of the physical crown has ceased; and
in response to determining that the rotation of the physical crown has ceased and the view displayed on the touch-sensitive display of the electronic device has been scrolled so that the predefined portion of the content has been scrolled beyond the edge of the touch-sensitive display, causing the view displayed on the touch-sensitive display of the electronic device to be scrolled in a second direction different from the first direction so that the predefined portion of the content is moved closer to the edge of the touch-sensitive display.

10. The electronic device of claim 9, wherein the electronic device comprises a watch.

11. The electronic device of claim 9, wherein the crown position information comprises a change in rotational position of the physical crown over a length of time.

12. The electronic device of claim 9, wherein the physical crown is a mechanical crown.

* * * * *